US012182912B2

(12) United States Patent
Radford et al.

(10) Patent No.: US 12,182,912 B2
(45) Date of Patent: Dec. 31, 2024

(54) SYSTEMS AND METHODS OF GENERATING A DESIGN BASED ON A DESIGN TEMPLATE AND ANOTHER DESIGN

(71) Applicant: Canva Pty Ltd, Surry Hills (AU)

(72) Inventors: William Radford, Sydney (AU); Melanie Joy Perkins, Sydney (AU); Tristan Martin, Sydney (AU); Sam Parkinson, Sydney (AU); Stanislav Salnikov, Sydney (AU); Adam Schuck, Sydney (AU); Lynneal Santos, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 47 days.

(21) Appl. No.: 17/603,615

(22) PCT Filed: Apr. 15, 2020

(86) PCT No.: PCT/AU2020/050371
§ 371 (c)(1),
(2) Date: Oct. 14, 2021

(87) PCT Pub. No.: WO2020/210867
PCT Pub. Date: Oct. 22, 2020

(65) Prior Publication Data

US 2022/0215606 A1 Jul. 7, 2022

Related U.S. Application Data

(60) Provisional application No. 62/833,986, filed on Apr. 15, 2019.

(51) Int. Cl.
*G06T 11/60* (2006.01)
*G06F 40/186* (2020.01)

(52) U.S. Cl.
CPC ............ *G06T 11/60* (2013.01); *G06F 40/186* (2020.01); *G06T 2200/24* (2013.01)

(58) Field of Classification Search
CPC ... G06T 11/60; G06T 2200/24; G06F 40/186; G06F 40/109; G06F 40/103; G06F 40/106; G06F 40/174
(Continued)

(56) References Cited

U.S. PATENT DOCUMENTS 7,231,599 B2 * 6/2007 Yamada ................ G06F 40/174 715/246
7,617,449 B2 11/2009 Carlson et al.
(Continued)

FOREIGN PATENT DOCUMENTS

WO 2015166436 A1 11/2015
WO 2016053819 A1 4/2016

OTHER PUBLICATIONS

"Template;" Microsoft Computer Dictionary; 2002; Microsoft Press; Fifth Edition; pp. 514-515.*
(Continued)

*Primary Examiner* — Maikhanh Nguyen
(74) *Attorney, Agent, or Firm* — GrowIP Law Group LLC

(57) ABSTRACT

An apparatus includes a processor configured to receive, during editing of a first design, user input indicating that a first design element has a first content role. The processor is configured to generate a content signature of the first design indicating that the first design element has the first content role, to generate a second design based on a design template, and to update the second design by applying the content signature to the second design. Generating the second design includes, based on determining that the design template includes a second design element having the first content role, adding a third design element having the first content
(Continued)

role to the second design. Applying the content signature to the second design includes transferring content from the first design element to the third design element. The processor is configured to generate a graphical user interface including an image of the second design.

21 Claims, 105 Drawing Sheets

(58) Field of Classification Search
USPC .......................................................... 715/202
See application file for complete search history.

(56) References Cited

U.S. PATENT DOCUMENTS

| | | | | |
|---|---|---|---|---|
| 7,683,916 | B2 | 3/2010 | Bossut et al. | |
| 11,226,885 | B1 * | 1/2022 | Gasser | G06F 9/45533 |
| 2005/0172221 | A1 * | 8/2005 | Kobashi | G06F 40/106 715/273 |
| 2007/0180363 | A1 * | 8/2007 | Dance | G06F 40/106 715/210 |
| 2010/0115400 | A1 * | 5/2010 | Yamanakajima | G06F 40/186 715/243 |
| 2010/0328692 | A1 * | 12/2010 | Morooka | G06F 40/103 358/1.9 |
| 2012/0042239 | A1 * | 2/2012 | O'Brien | G06F 40/186 715/243 |
| 2013/0300742 | A1 * | 11/2013 | Ikeda | G06T 5/00 345/428 |
| 2017/0094196 | A1 * | 3/2017 | Adsumilli | G06T 7/194 |
| 2017/0124061 | A1 * | 5/2017 | Amerige | H04L 67/01 |
| 2017/0270079 | A1 * | 9/2017 | Rajwat | G06F 40/166 |
| 2018/0181808 | A1 * | 6/2018 | Sridharan | G06V 30/19173 |
| 2020/0004804 | A1 * | 1/2020 | Srinivasan | G06F 40/186 |
| 2020/0104353 | A1 * | 4/2020 | Chua | G06N 20/00 |
| 2020/0159871 | A1 * | 5/2020 | Bowen | G06T 11/60 |

OTHER PUBLICATIONS

Hyde; answer to When a PC edits a file, does it delete the original file ?; Jan. 23, 2019; StackExchange; p. 3.*

Classification Definitions Class 715, Data Processing: Presentation Processing of Document, Operator Interface Processing, and Screen Saver Display Processing; Feb. 2011; pp. 1-33.*

Staar, P. et al., "Corpus Conversion Service: A Machine Learning Platform to Ingest Documents at Scale, Proceedings of the 24th ACM SIGKDD International Conference on Knowledge Discovery & Data Mining", KDD '18, Jul. 2018, pp. 774-782.

* cited by examiner

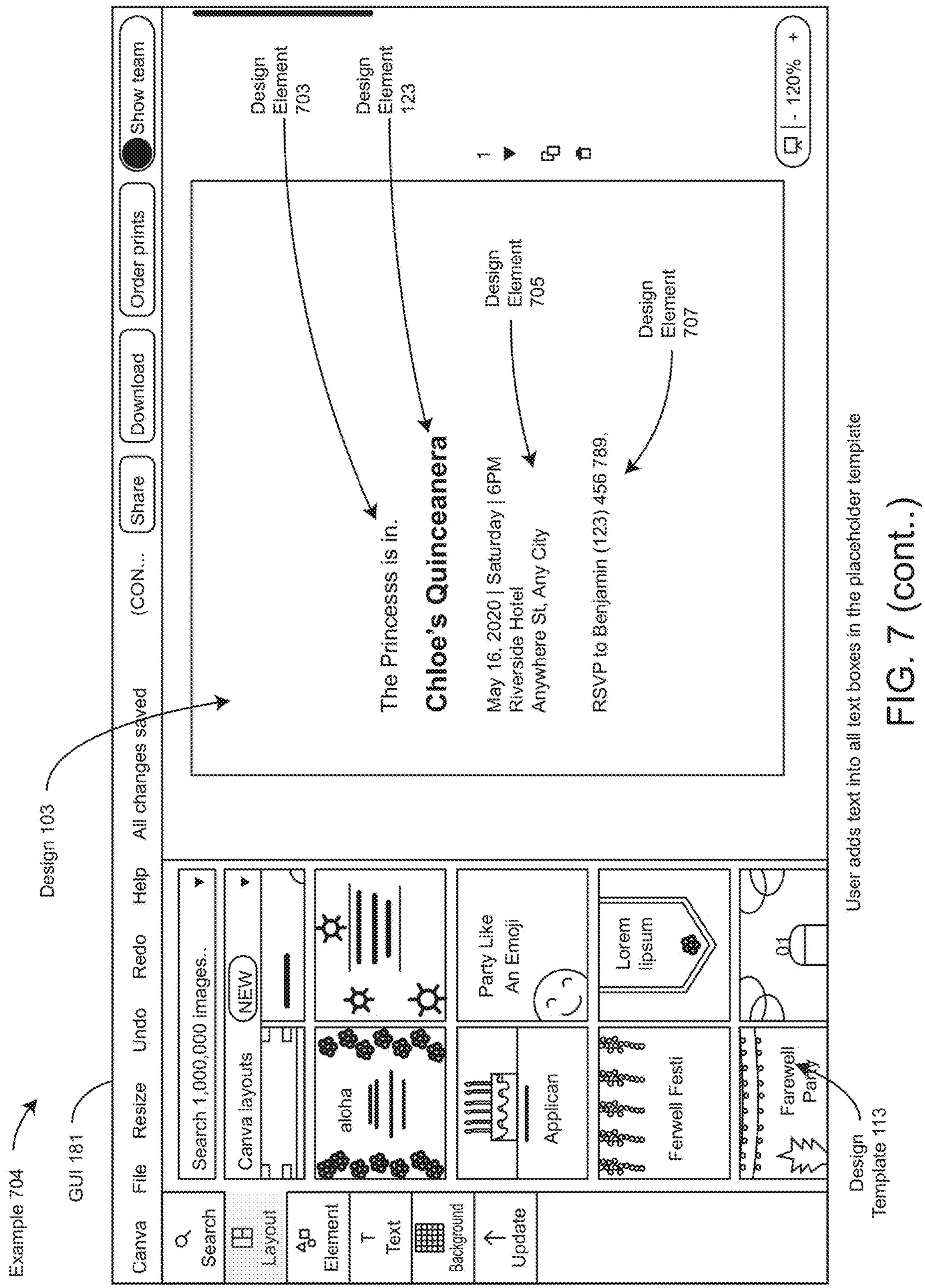
FIG. 7 (cont..)

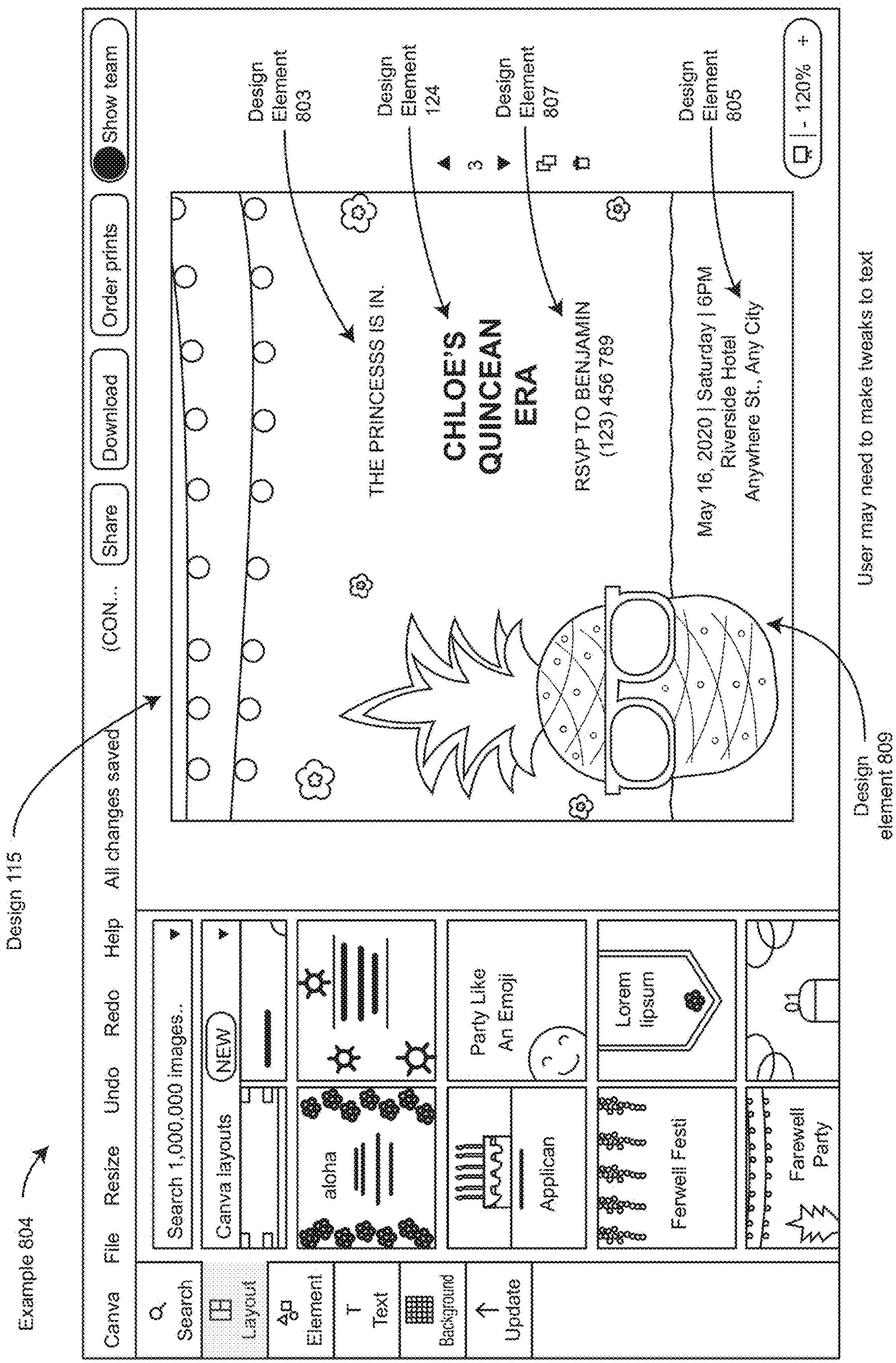
FIG. 8 (cont..)

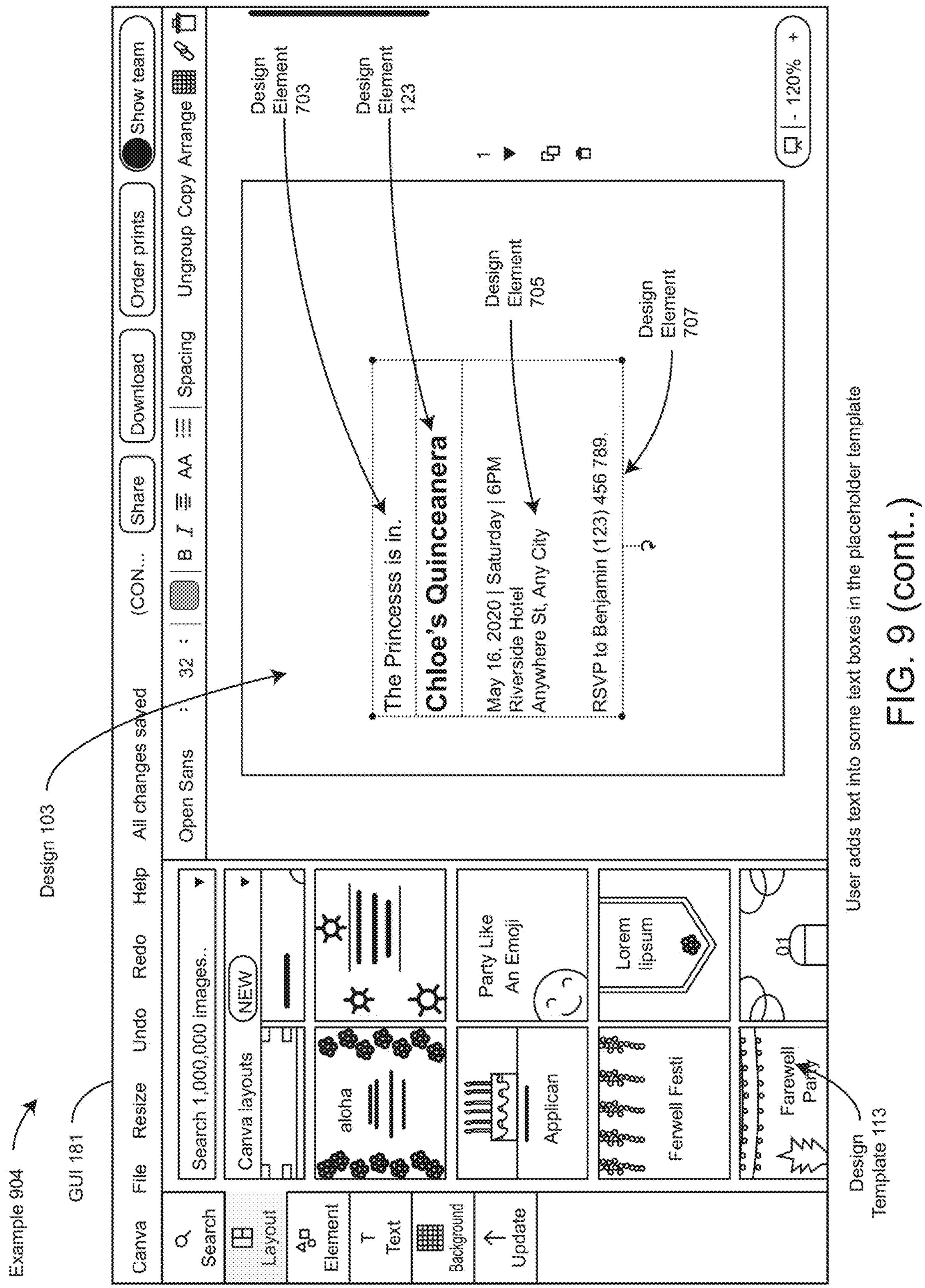
FIG. 9 (cont..)

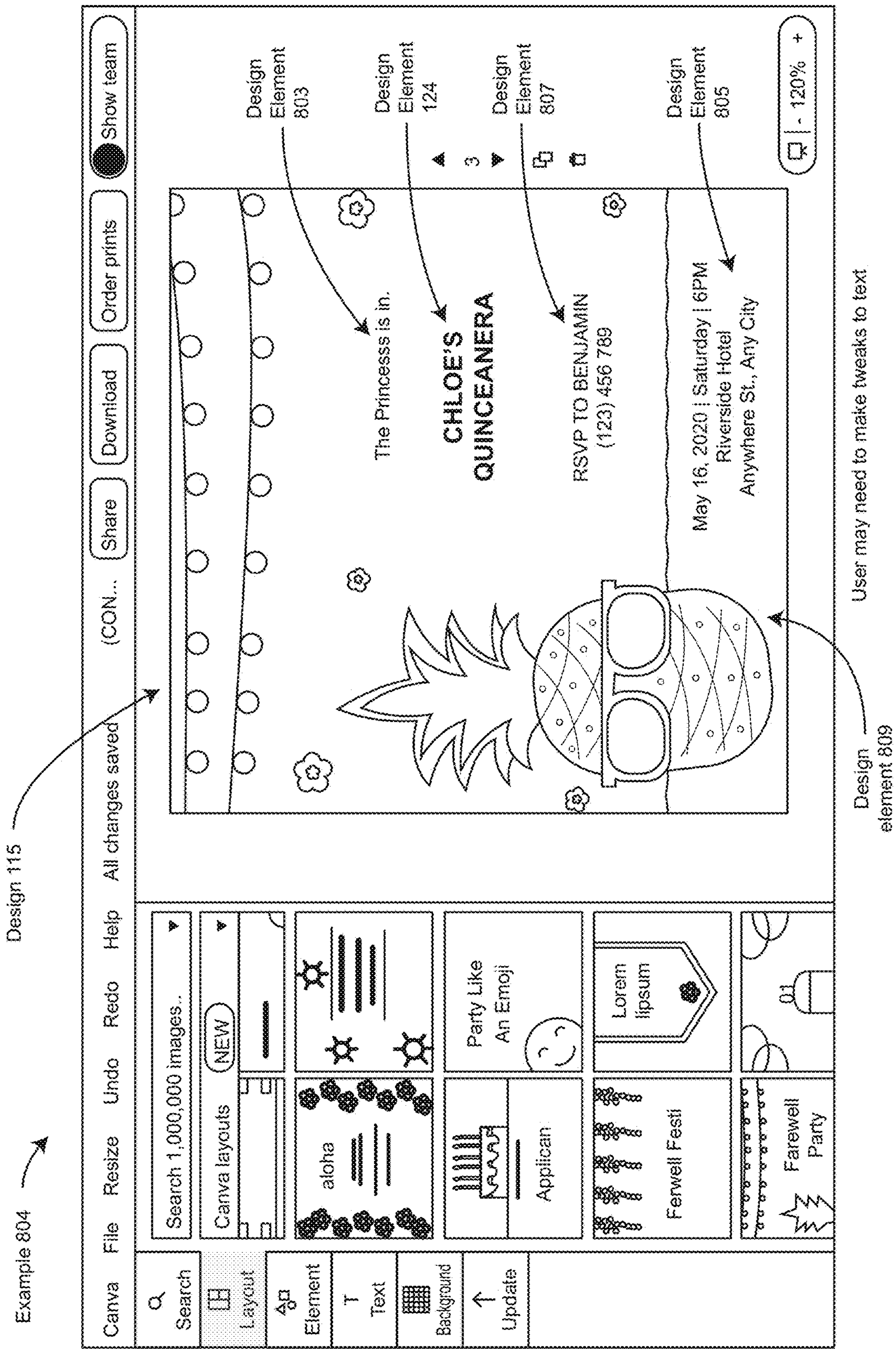
FIG. 10 (cont..)

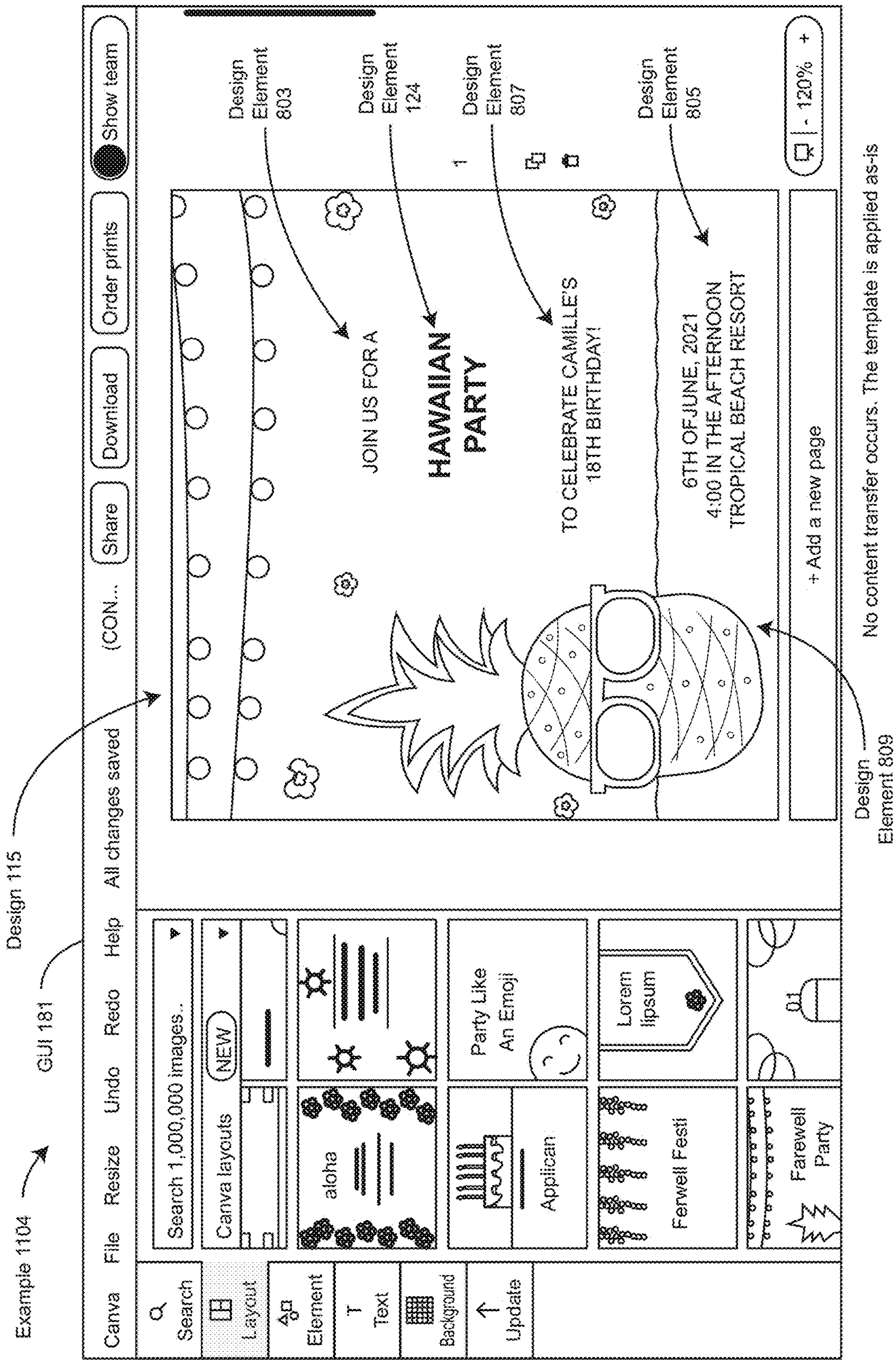
FIG. 11 (cont..)

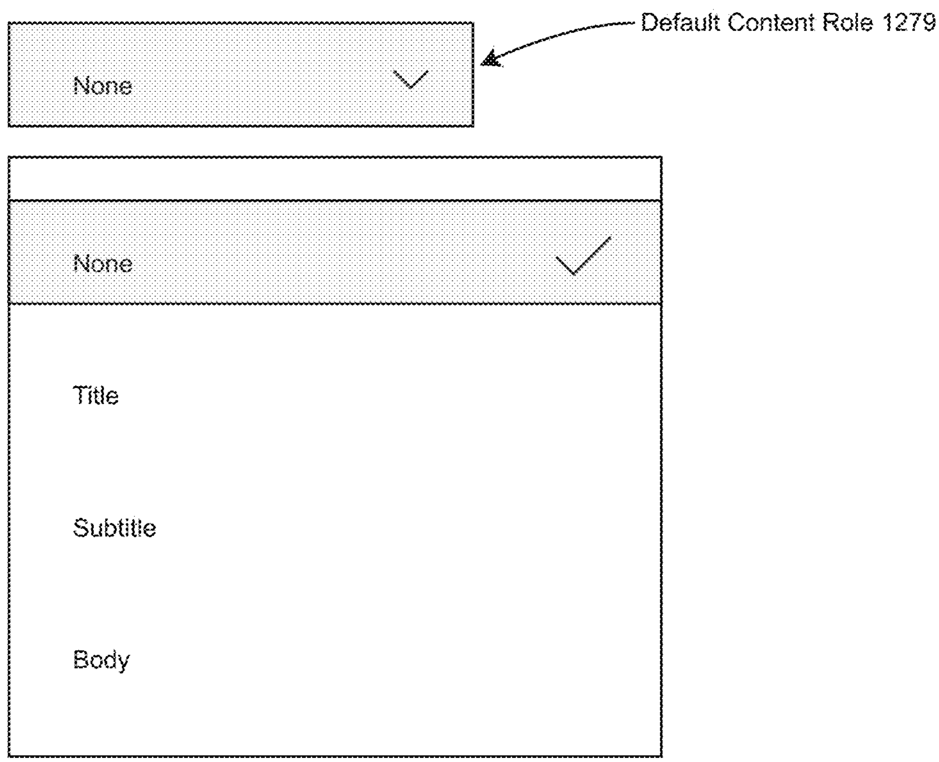
User adds a new text box with a default content role to their design
FIG. 12 (cont..)

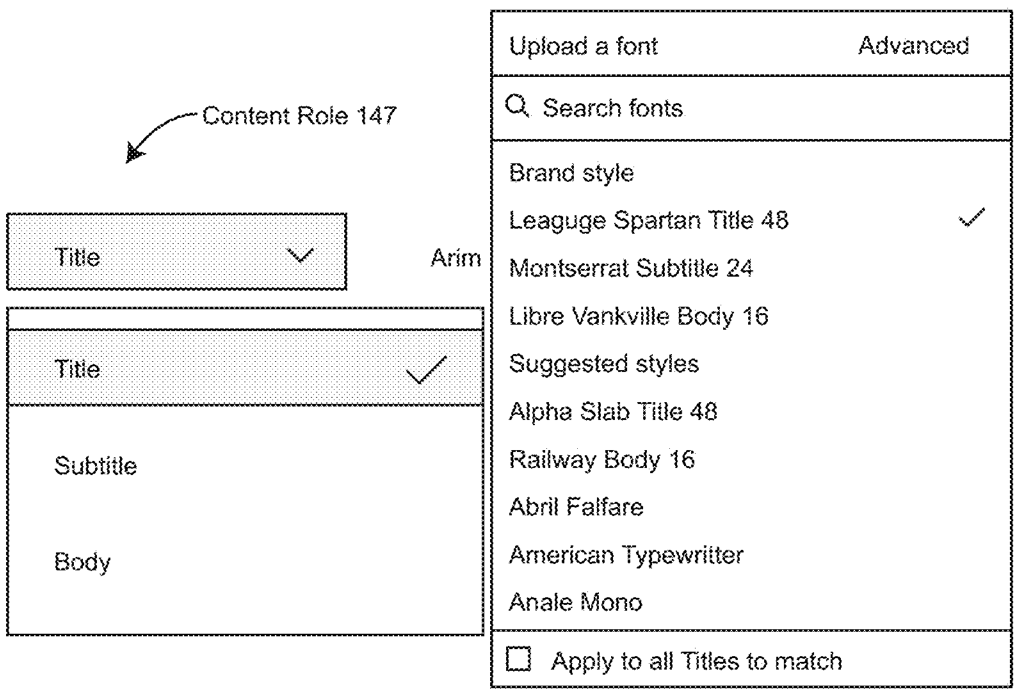
User adds a new text box with a text style to their design
FIG. 14 (cont..)

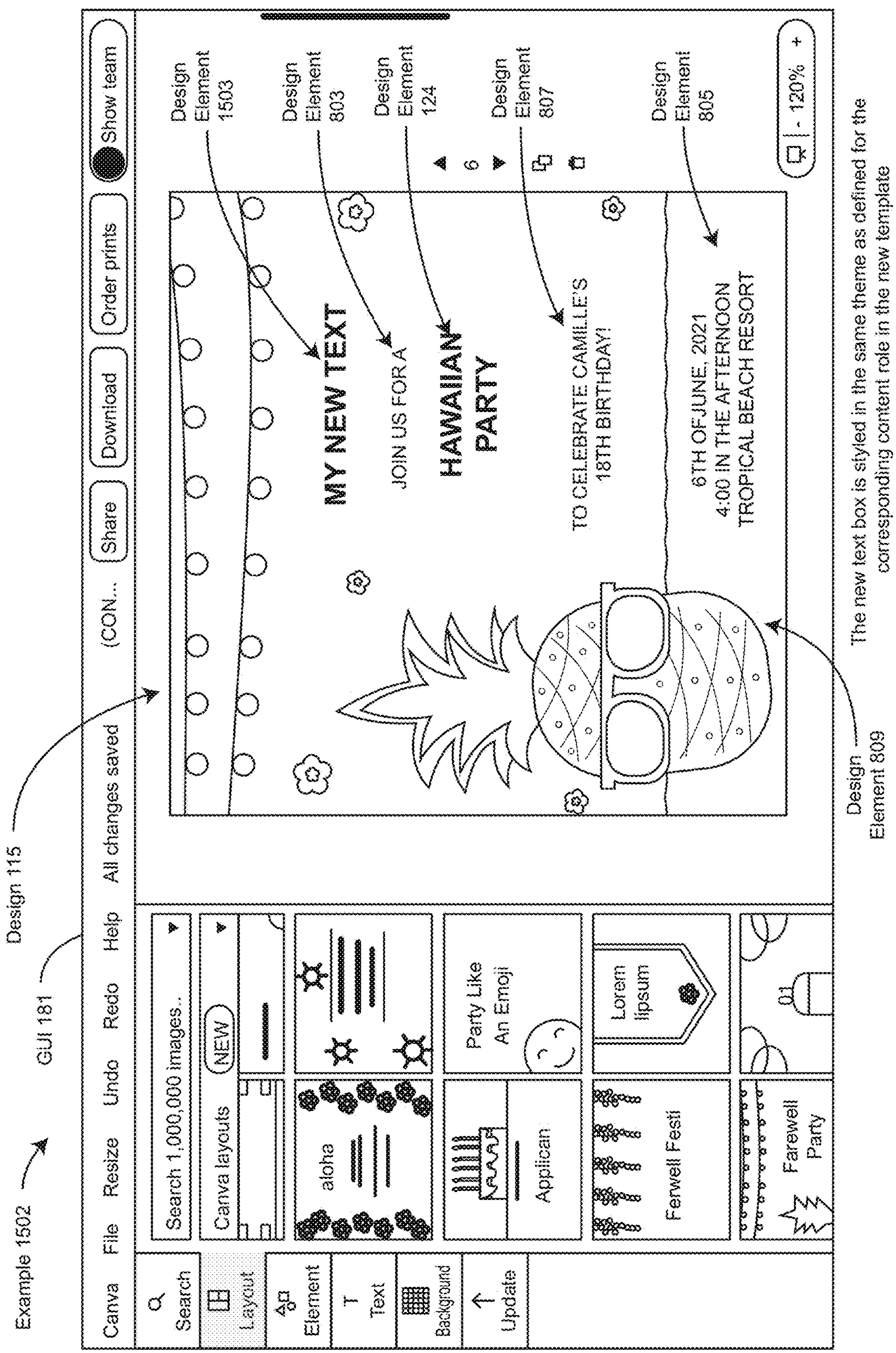
FIG. 15 (cont..)

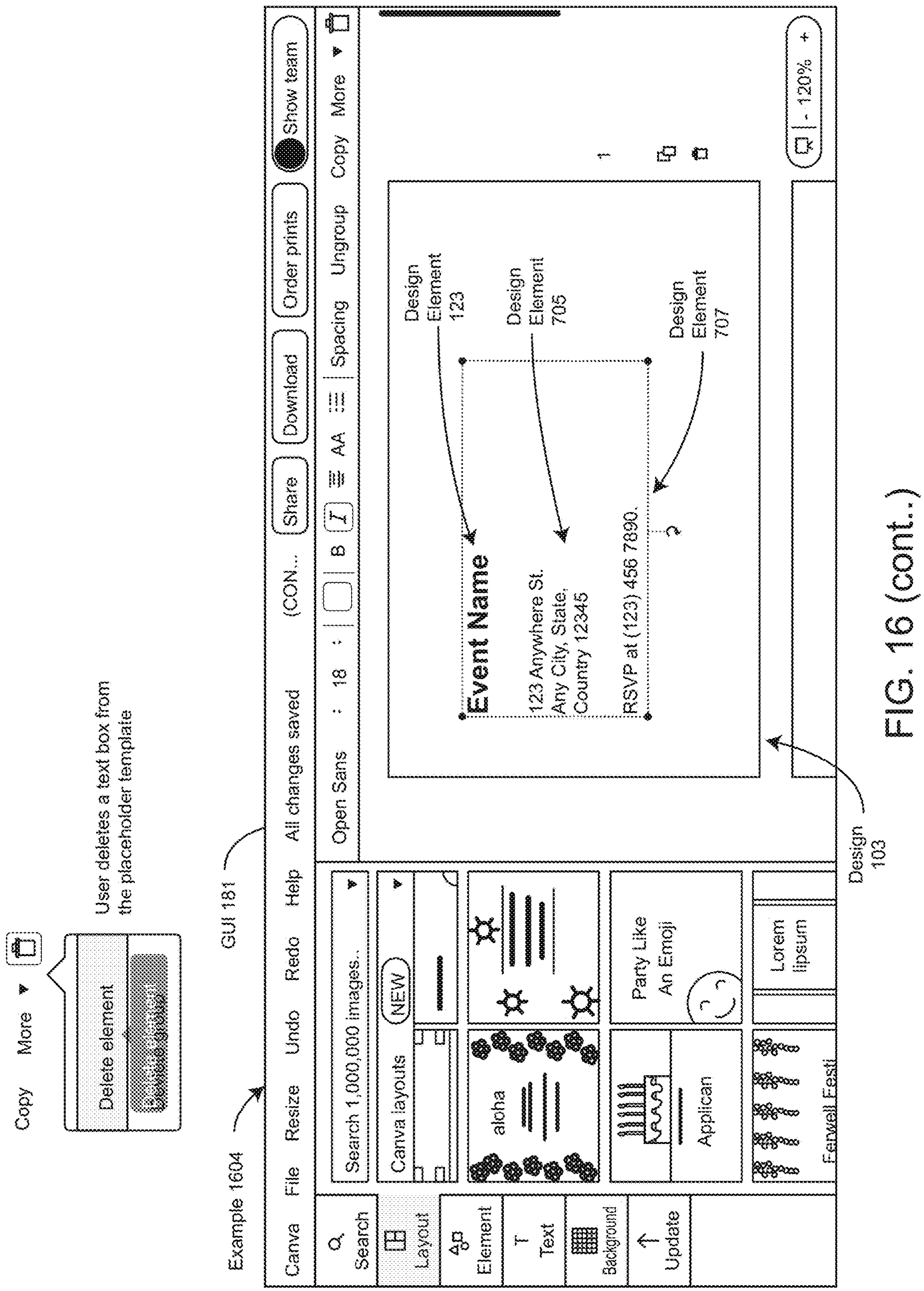
FIG. 16 (cont..)

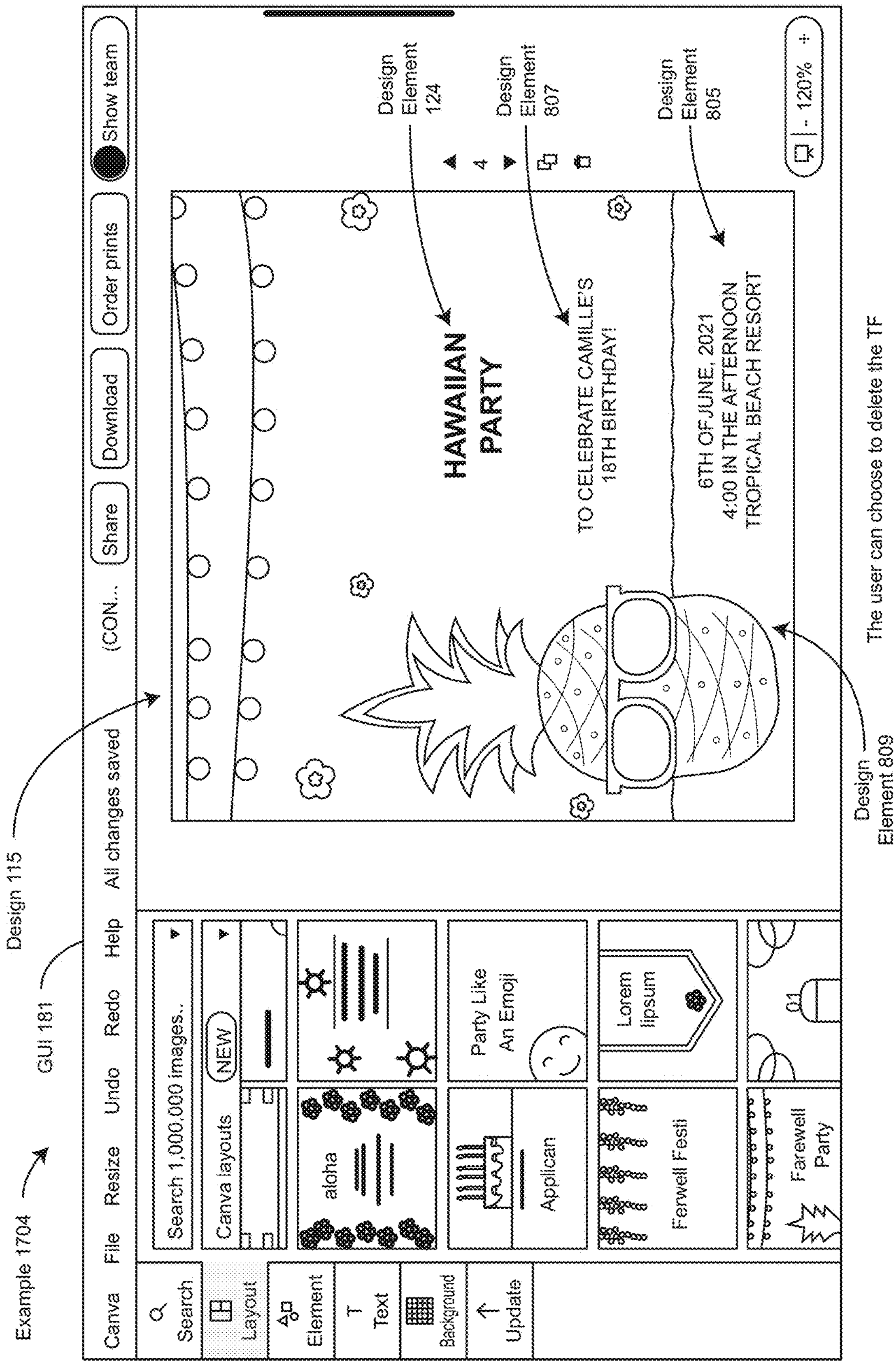
FIG. 17 (cont..)

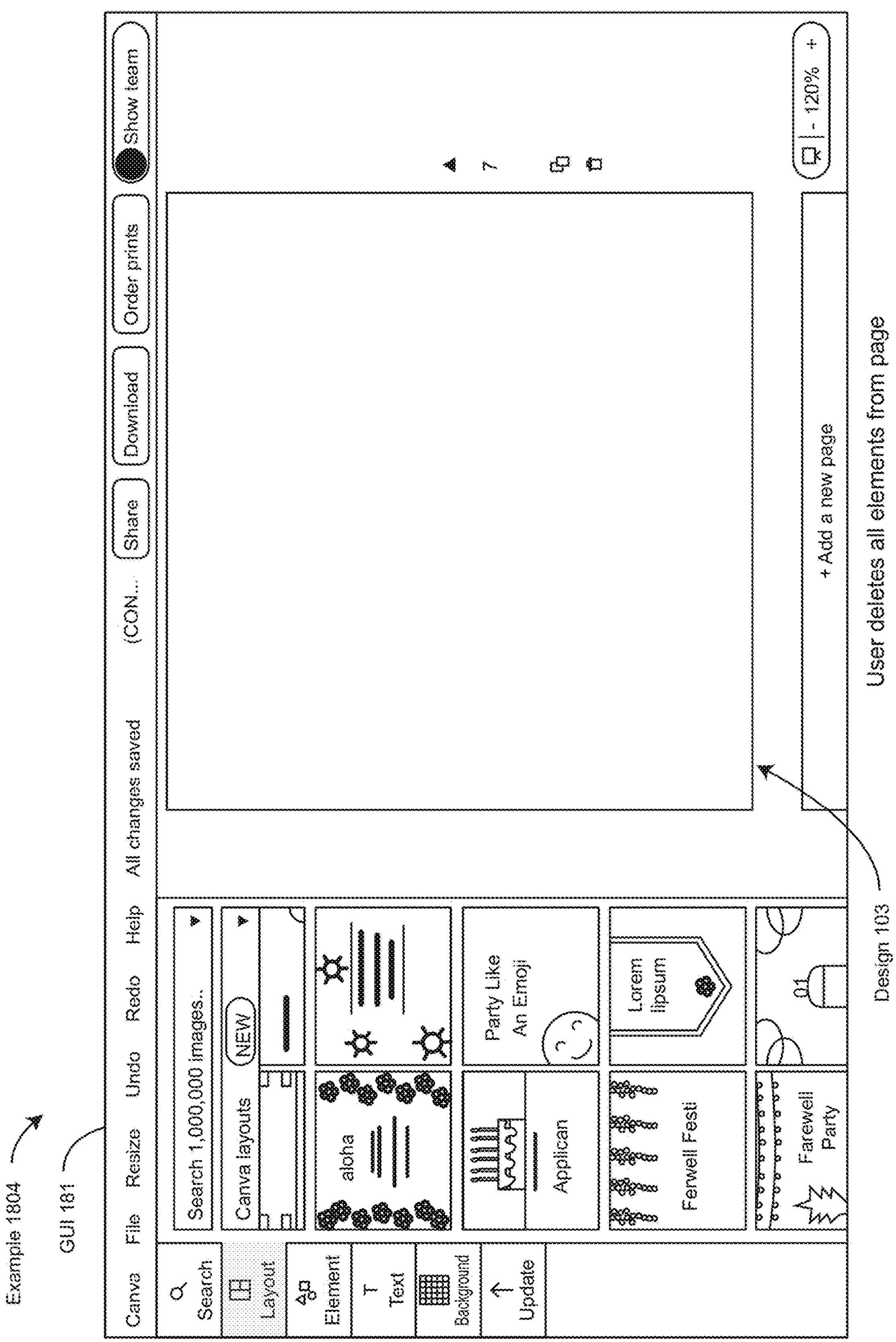
FIG. 18 (cont..)

User deletes all elements from page

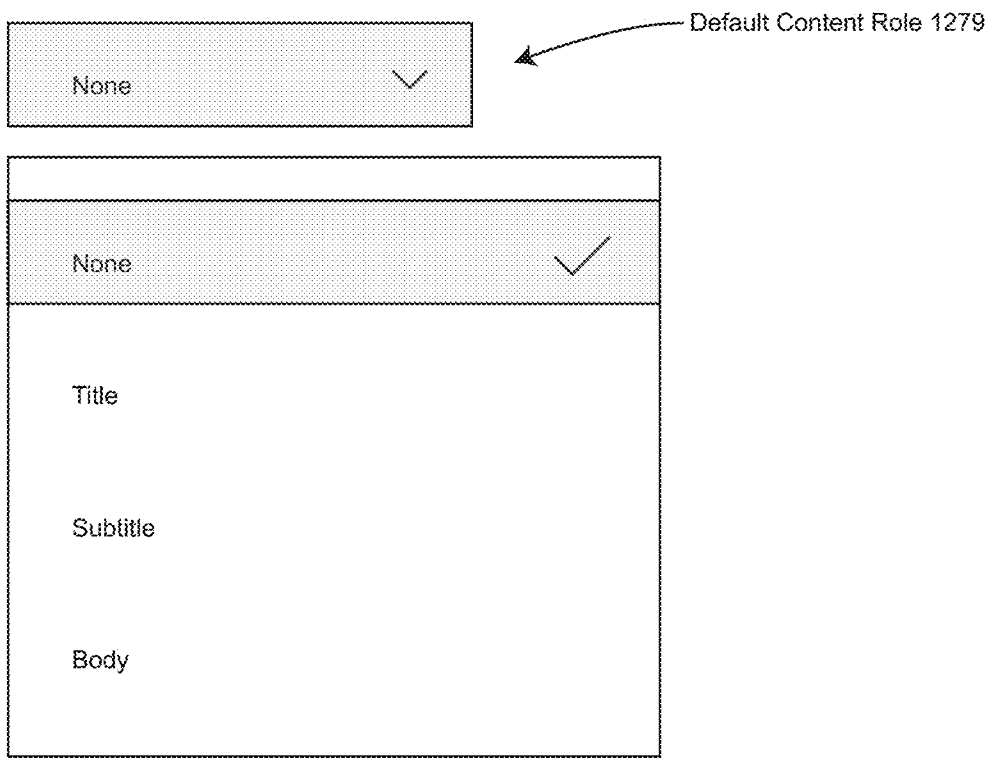
User adds text boxes to make own design
All text boxes tagged as none by default
FIG. 19 (cont..)

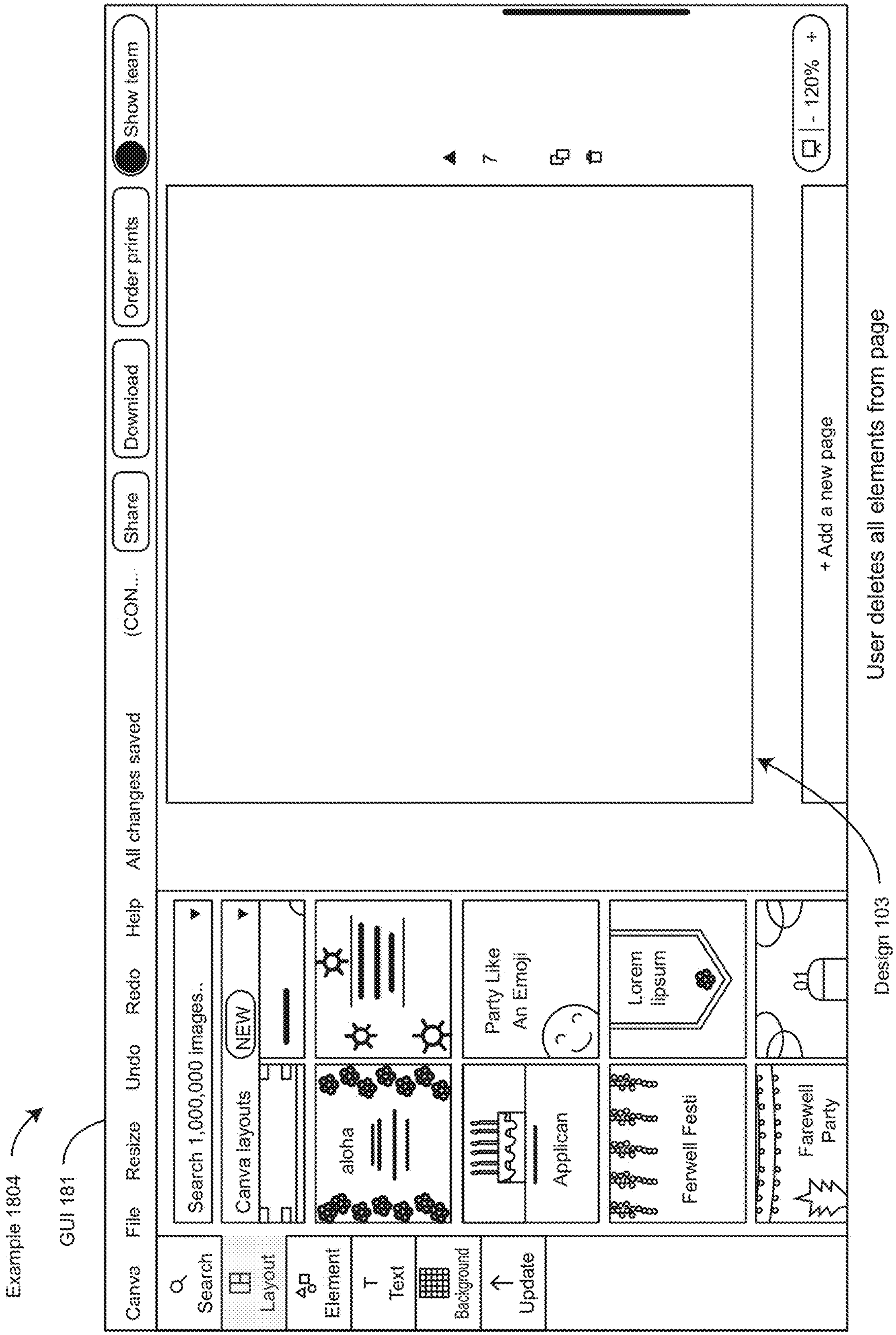
User deletes all elements from page
FIG. 21 (cont..)

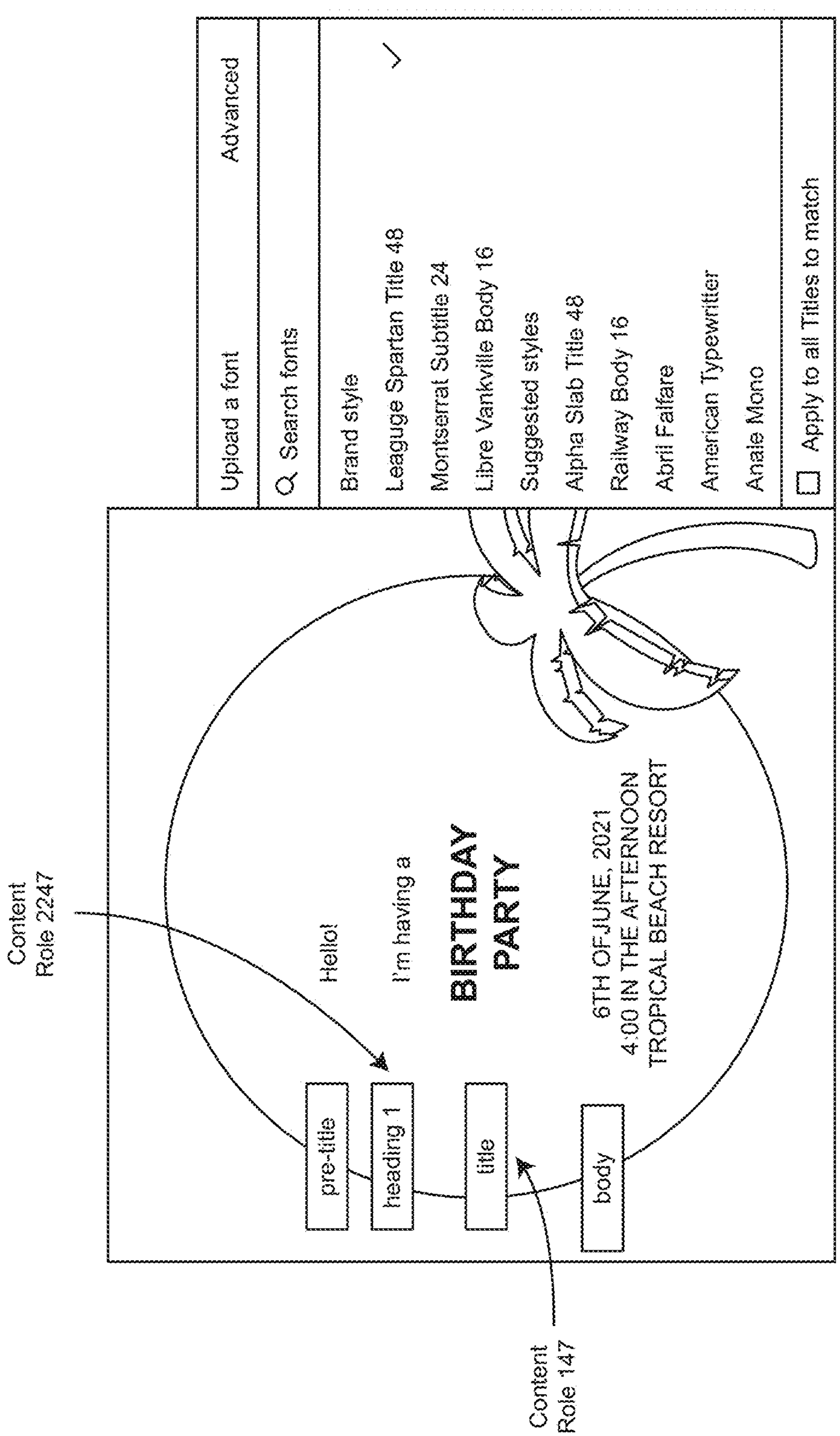
User adds text boxes to make own design
User assigns content roles to text boxes
FIG. 22 (cont...)

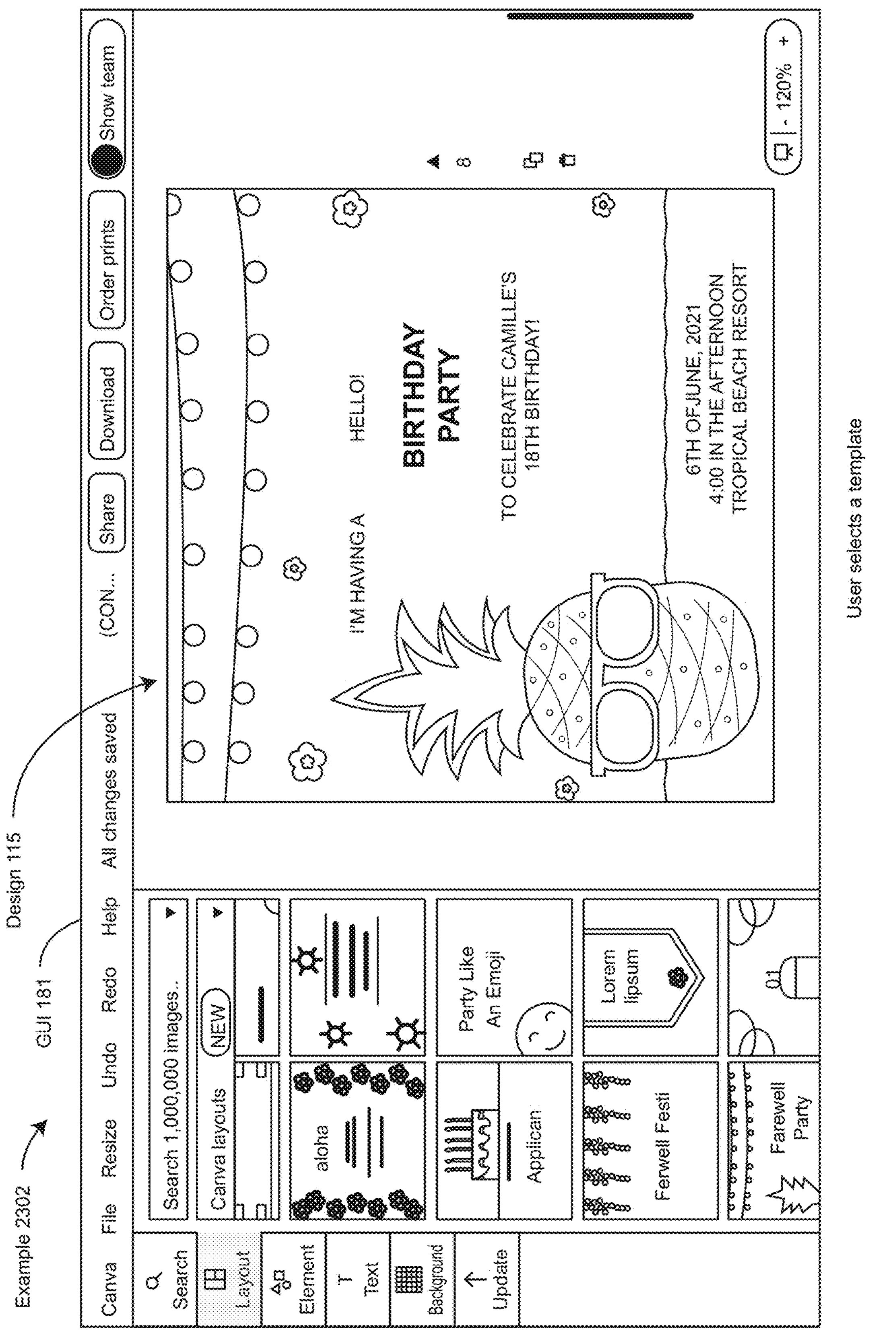
FIG. 24 (cont..)

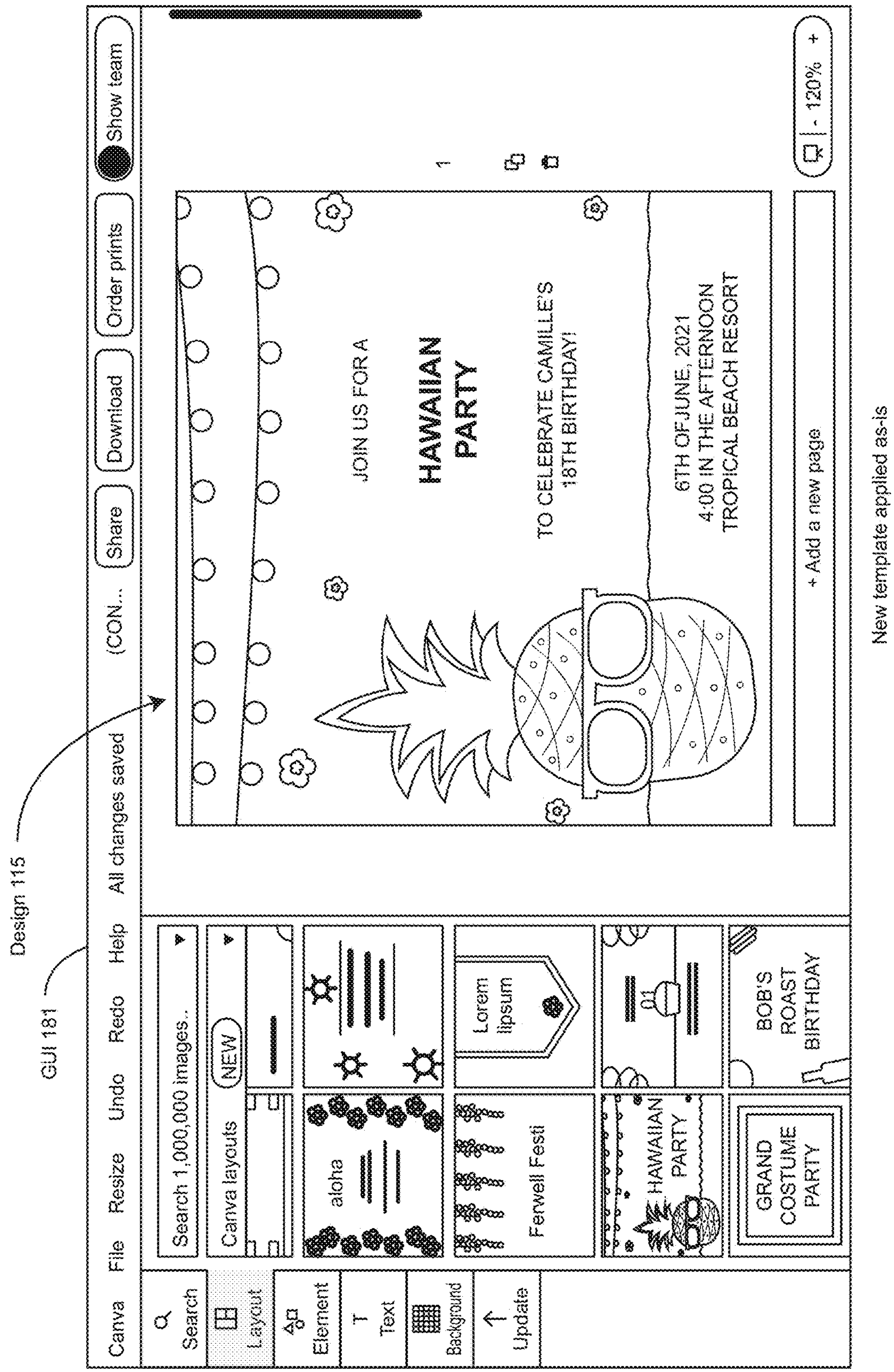
FIG. 25 (cont..)

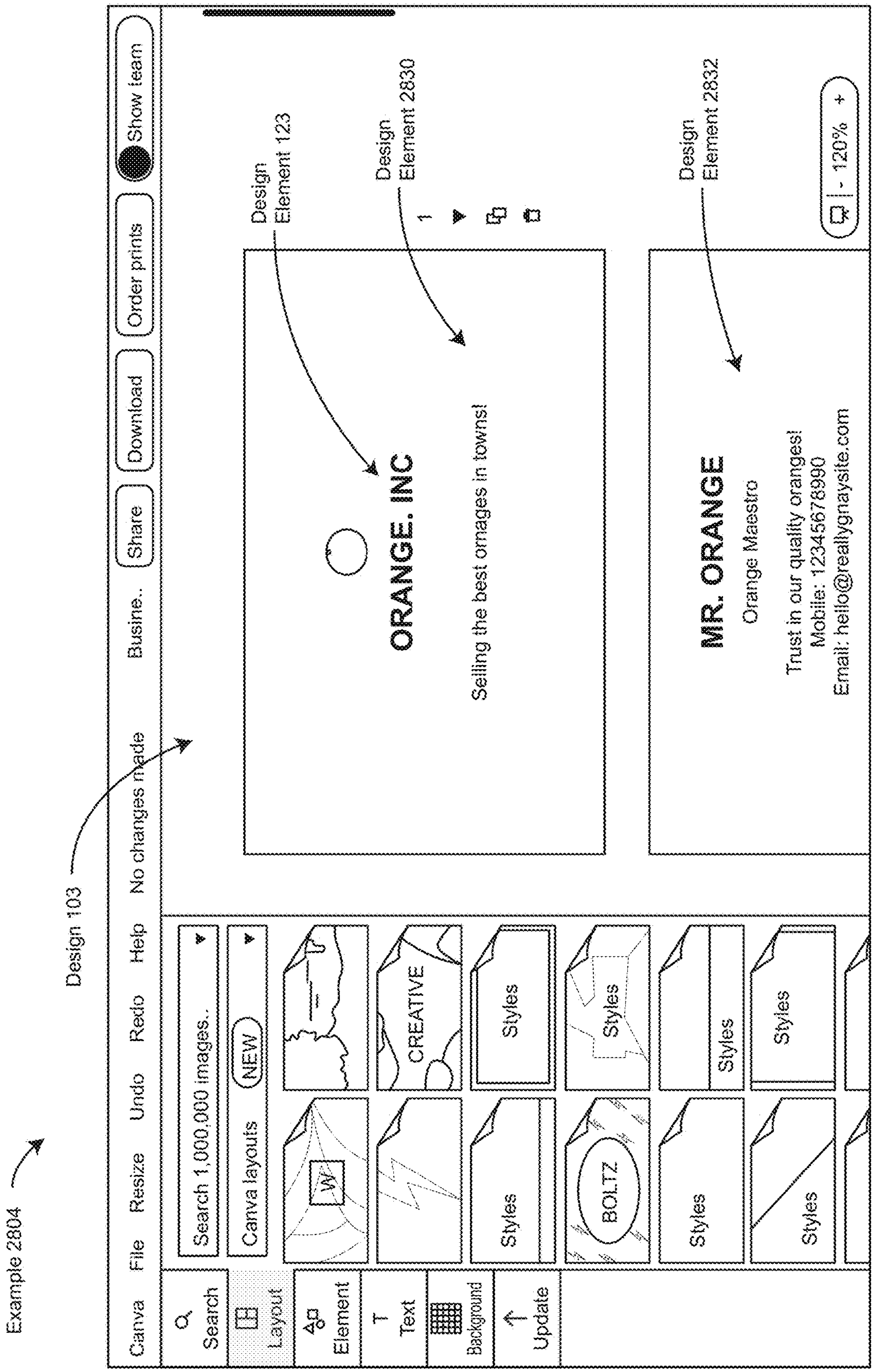
FIG. 28 (cont..)

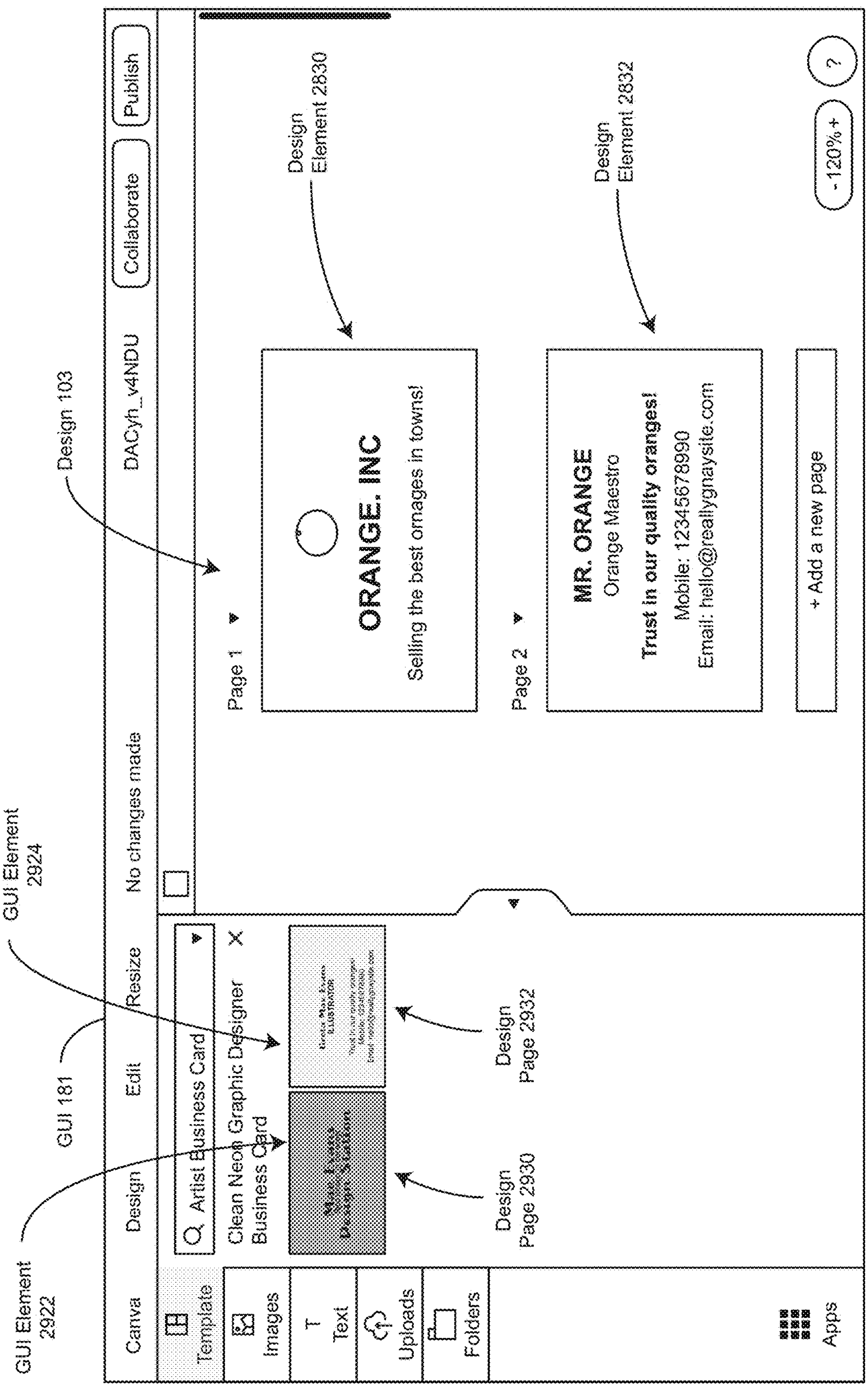
FIG. 29 (cont..)

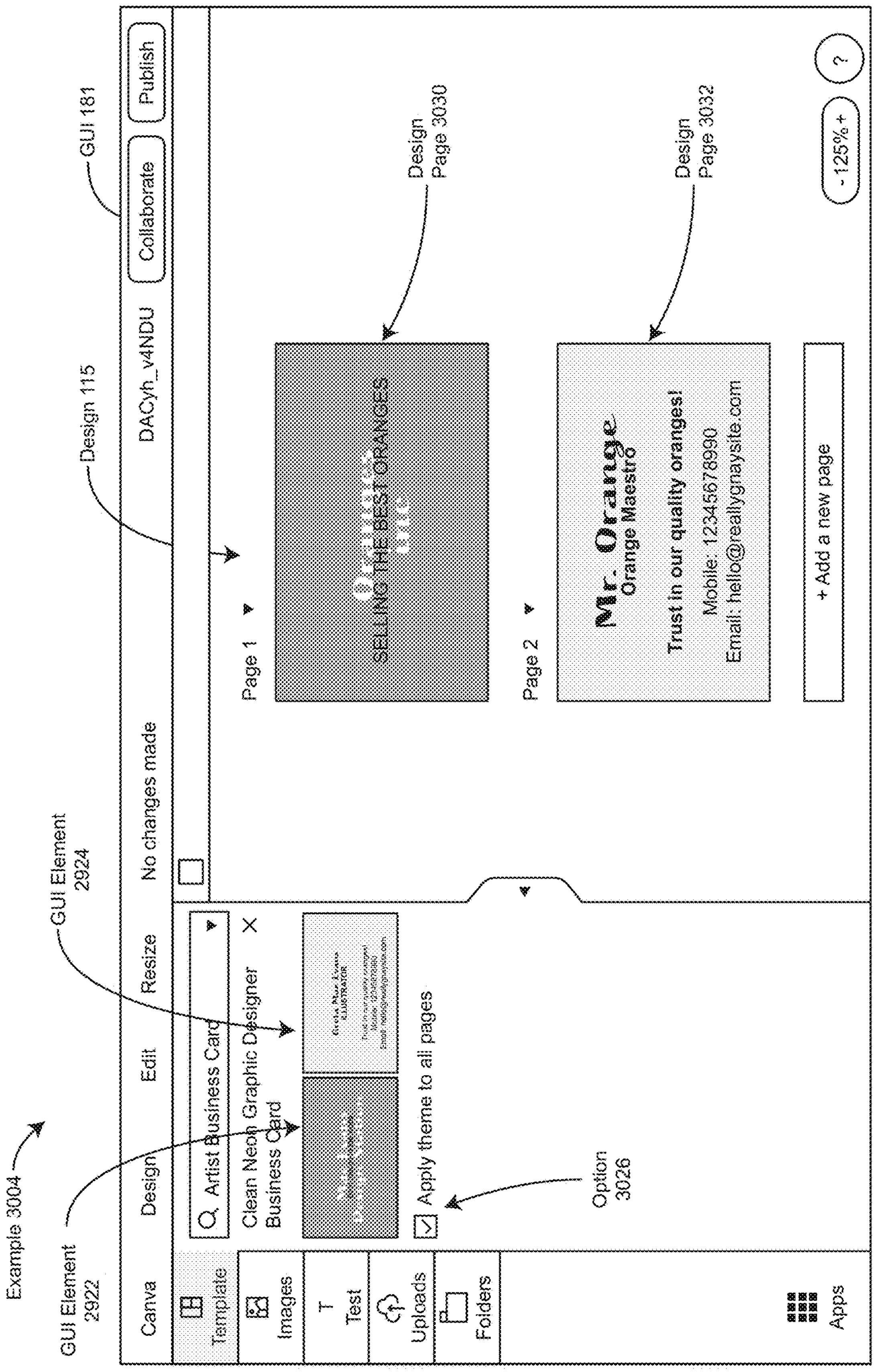
FIG. 30 (cont..)

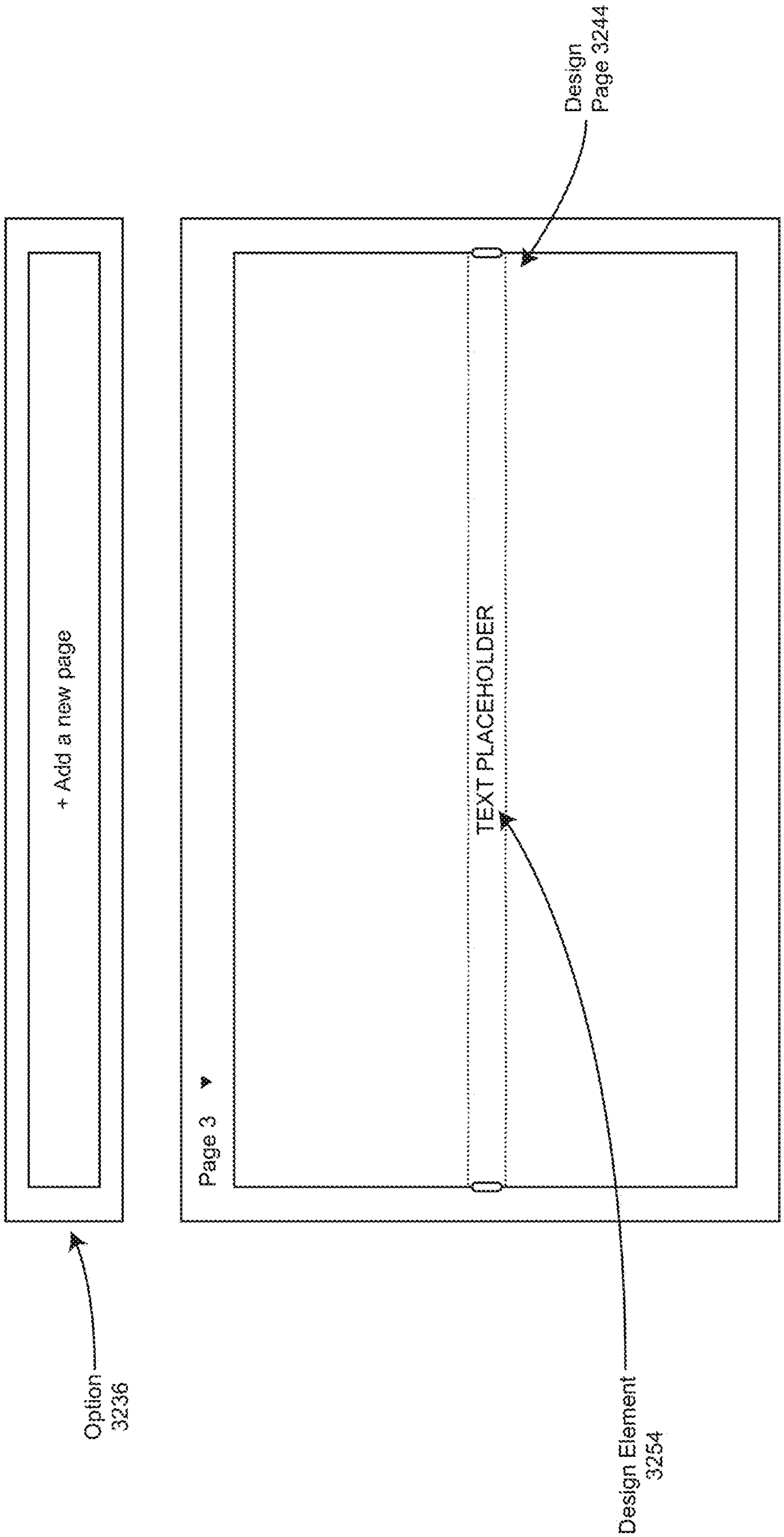
FIG. 32 (cont...)

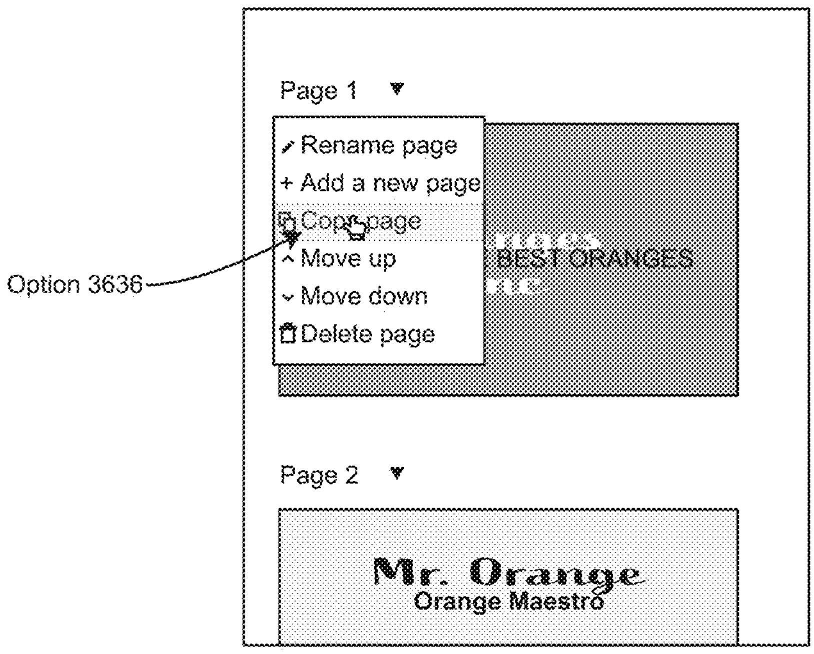
FIG. 36 (cont..)

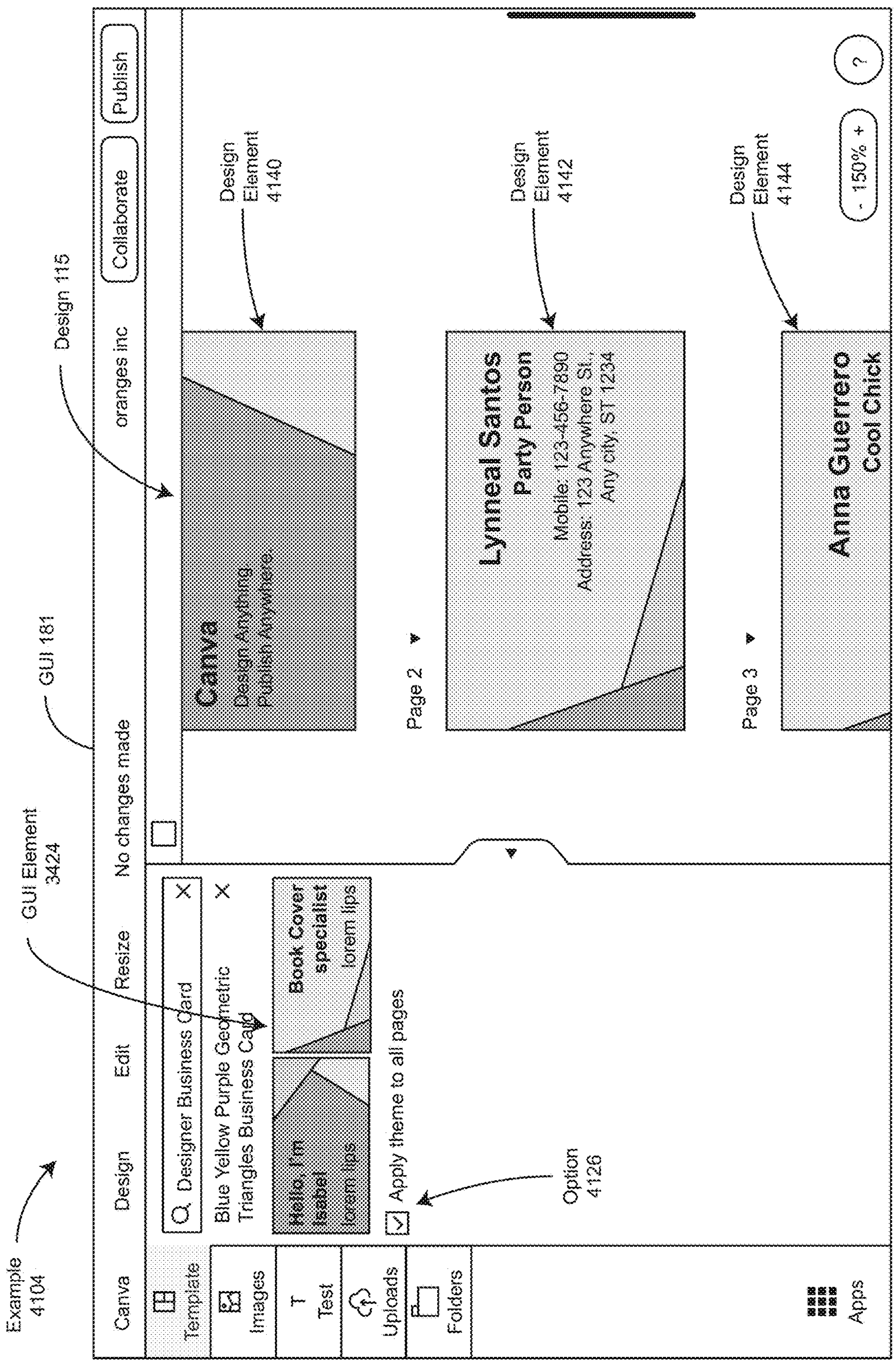
FIG. 41 (cont..)

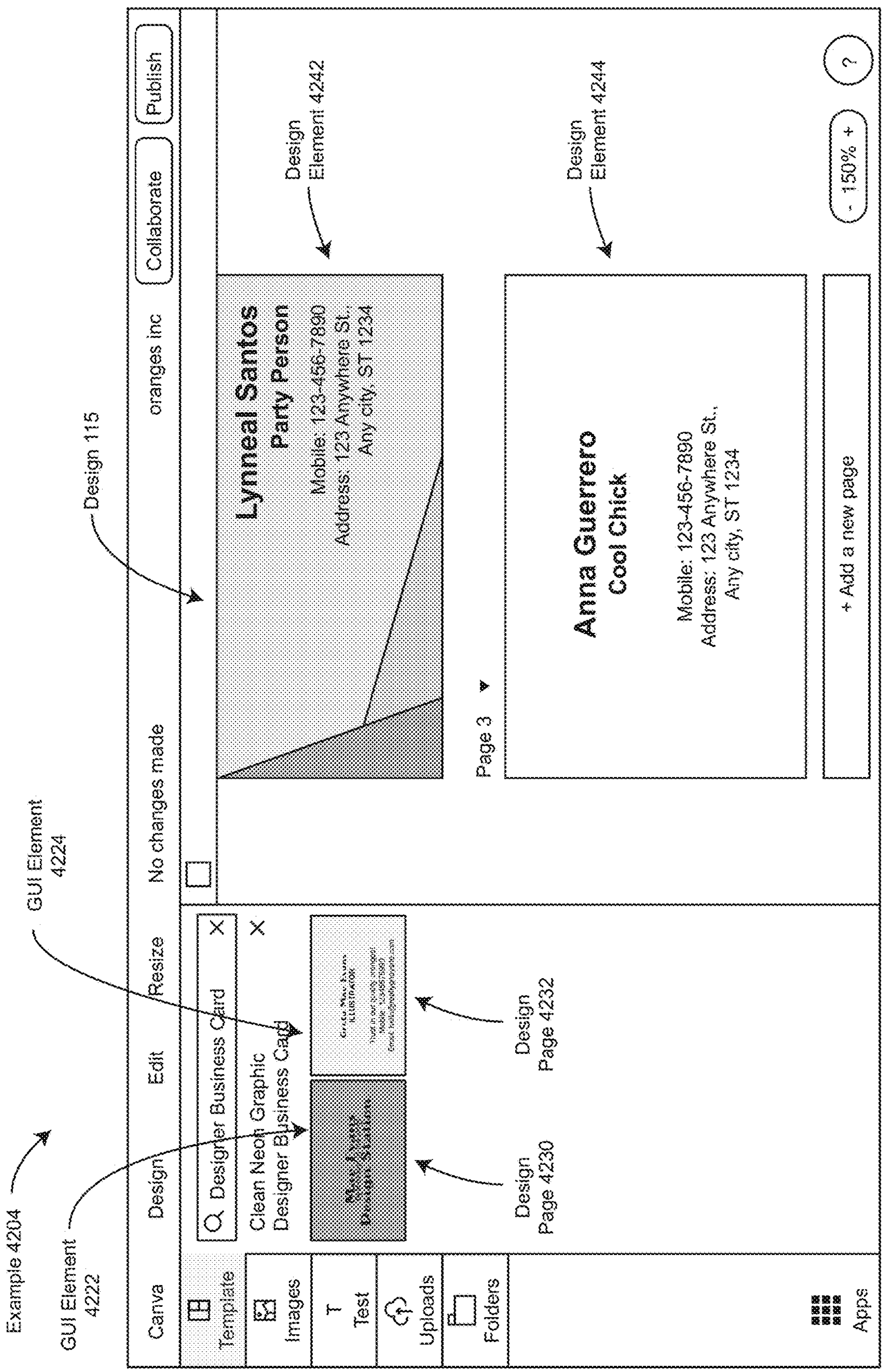
FIG. 42 (cont..)

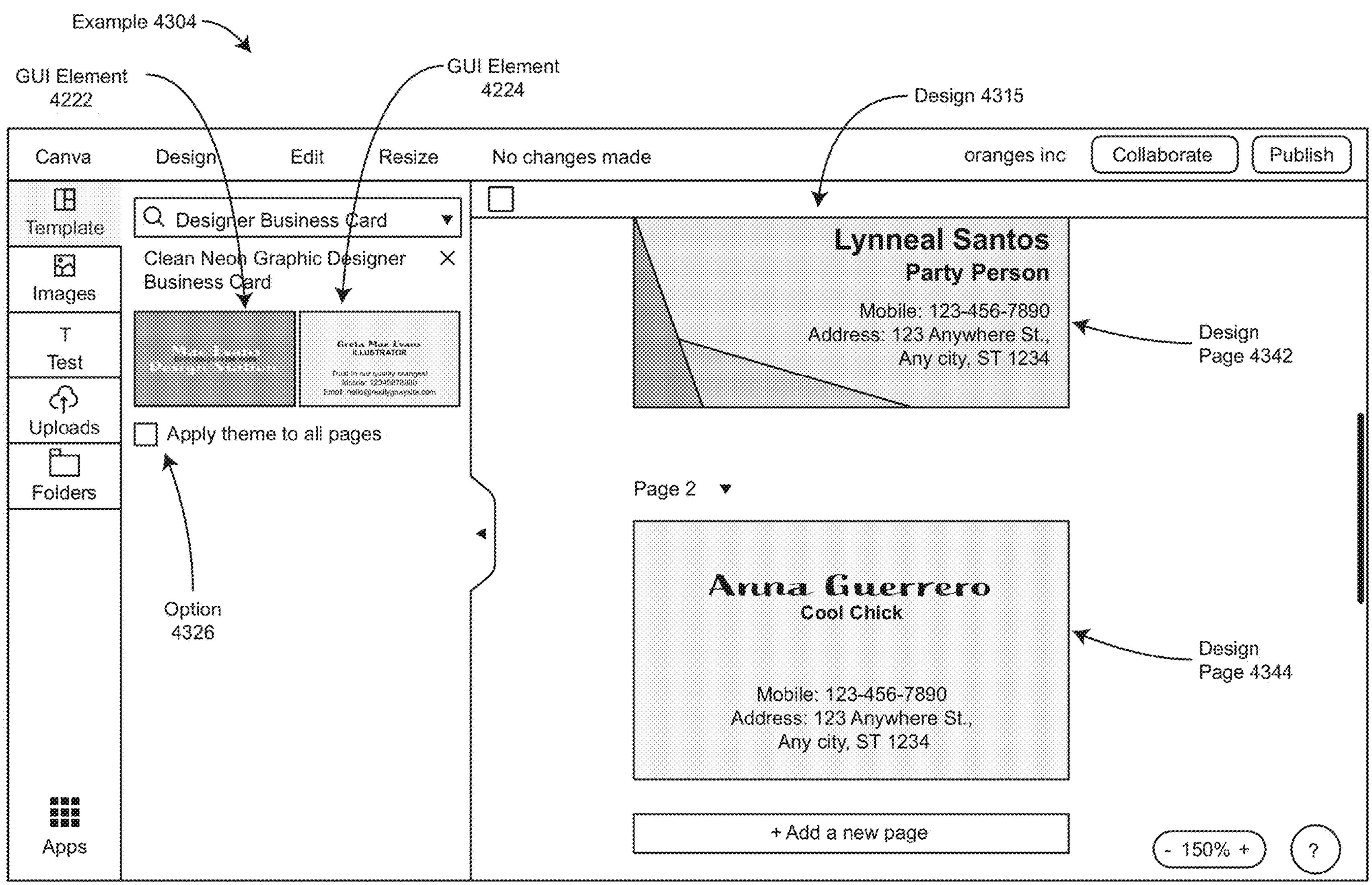
FIG. 43 (cont..)

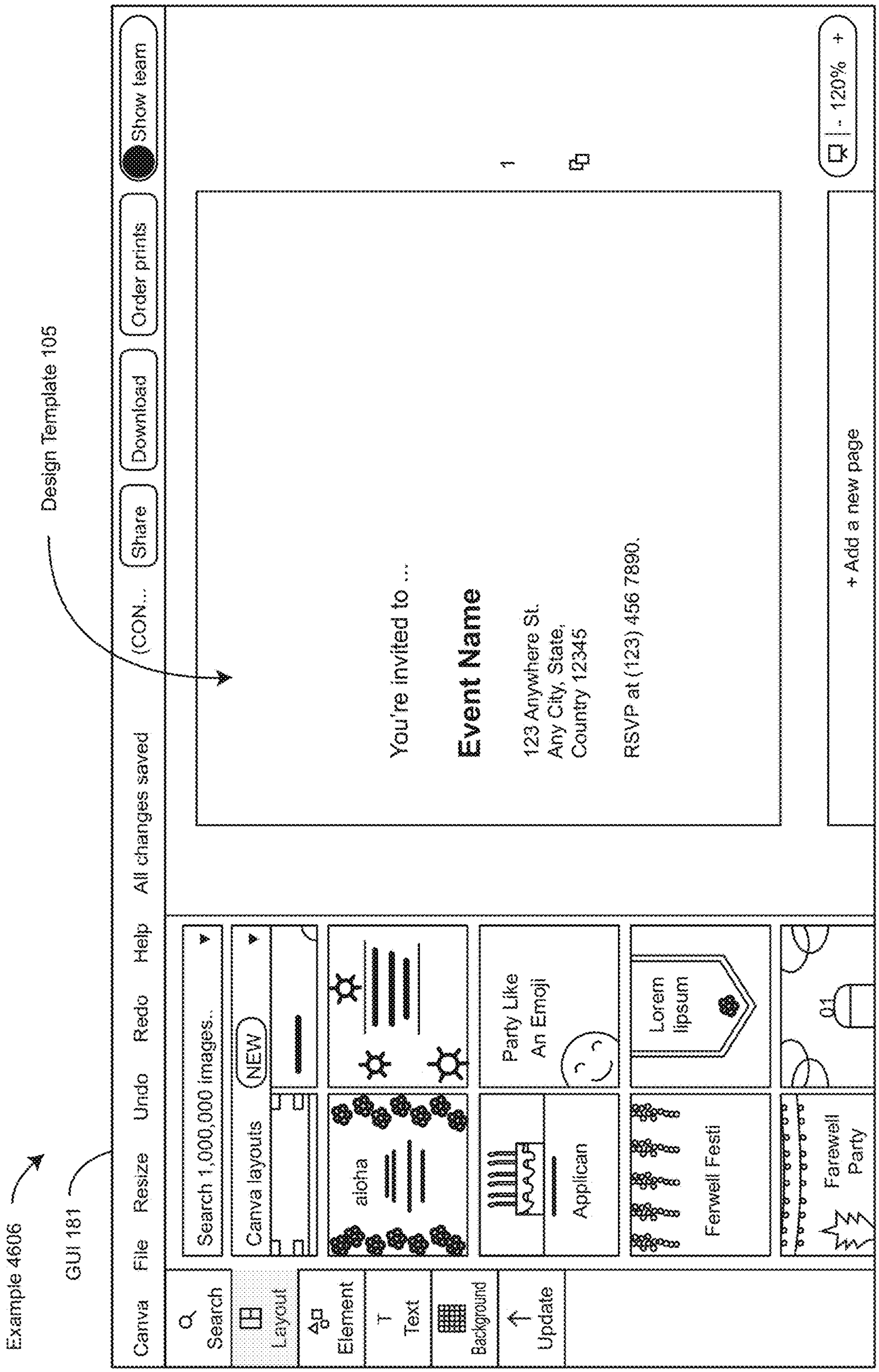
FIG. 46 (cont..)

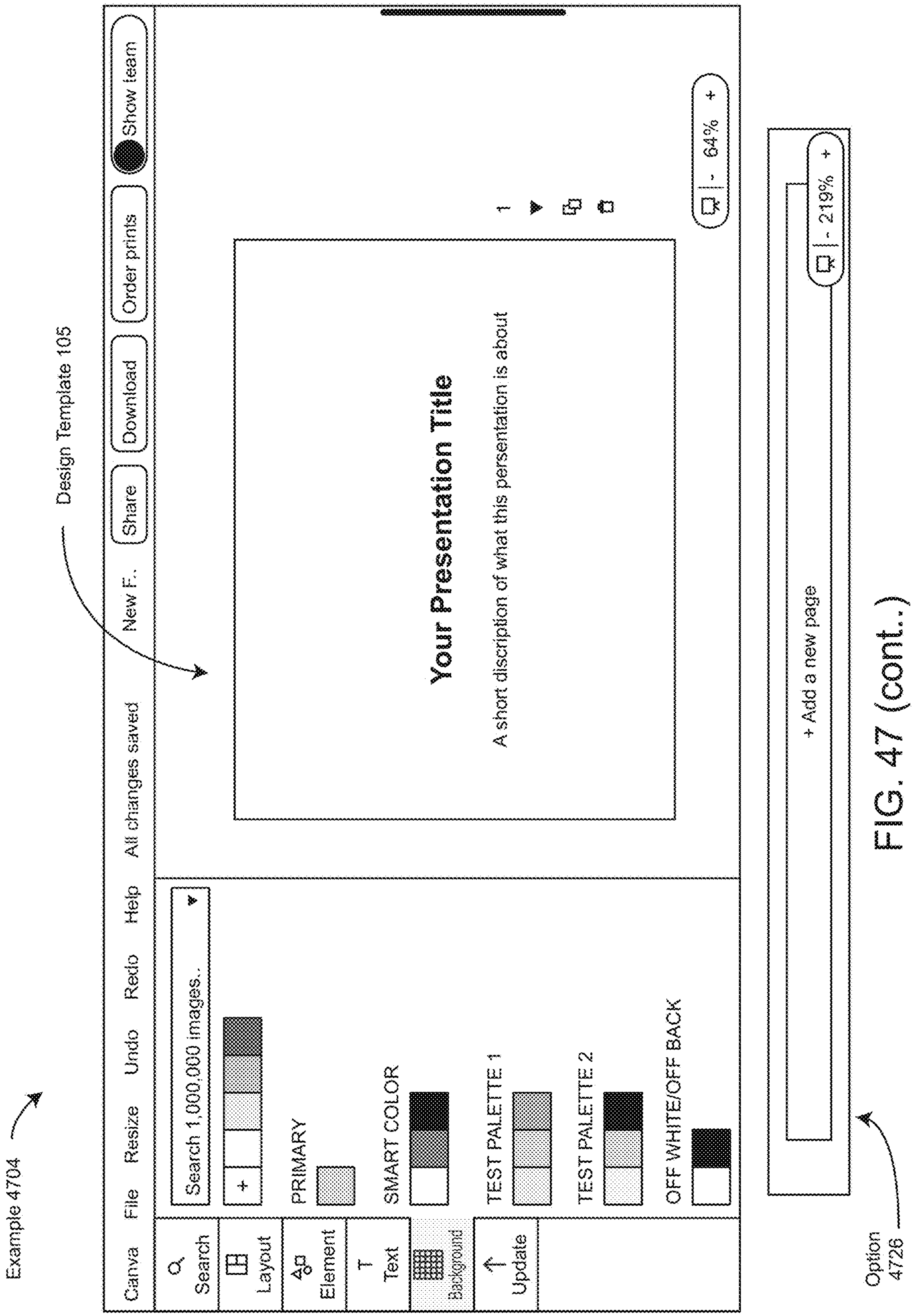
FIG. 47 (cont..)

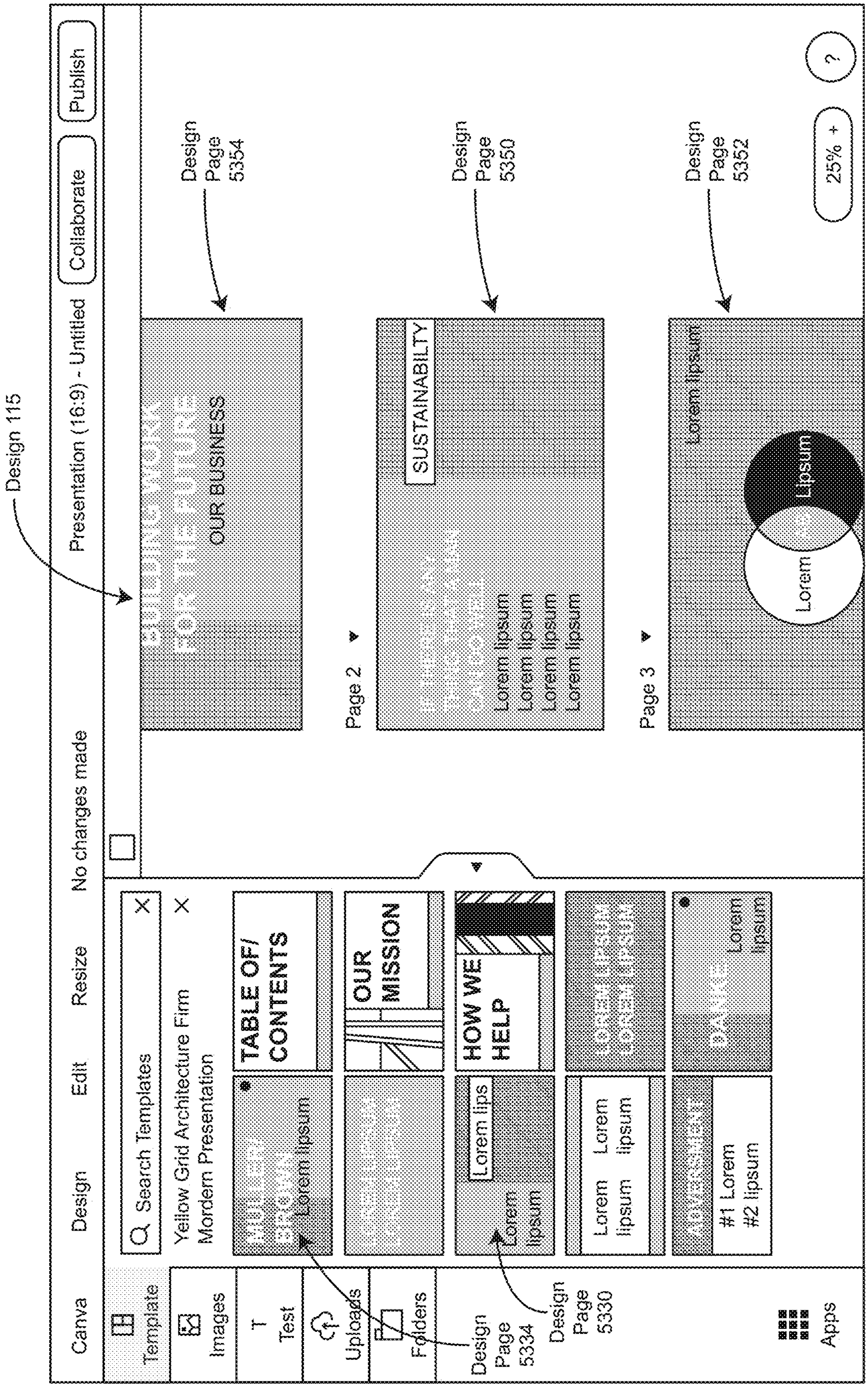
FIG. 53 (cont..)

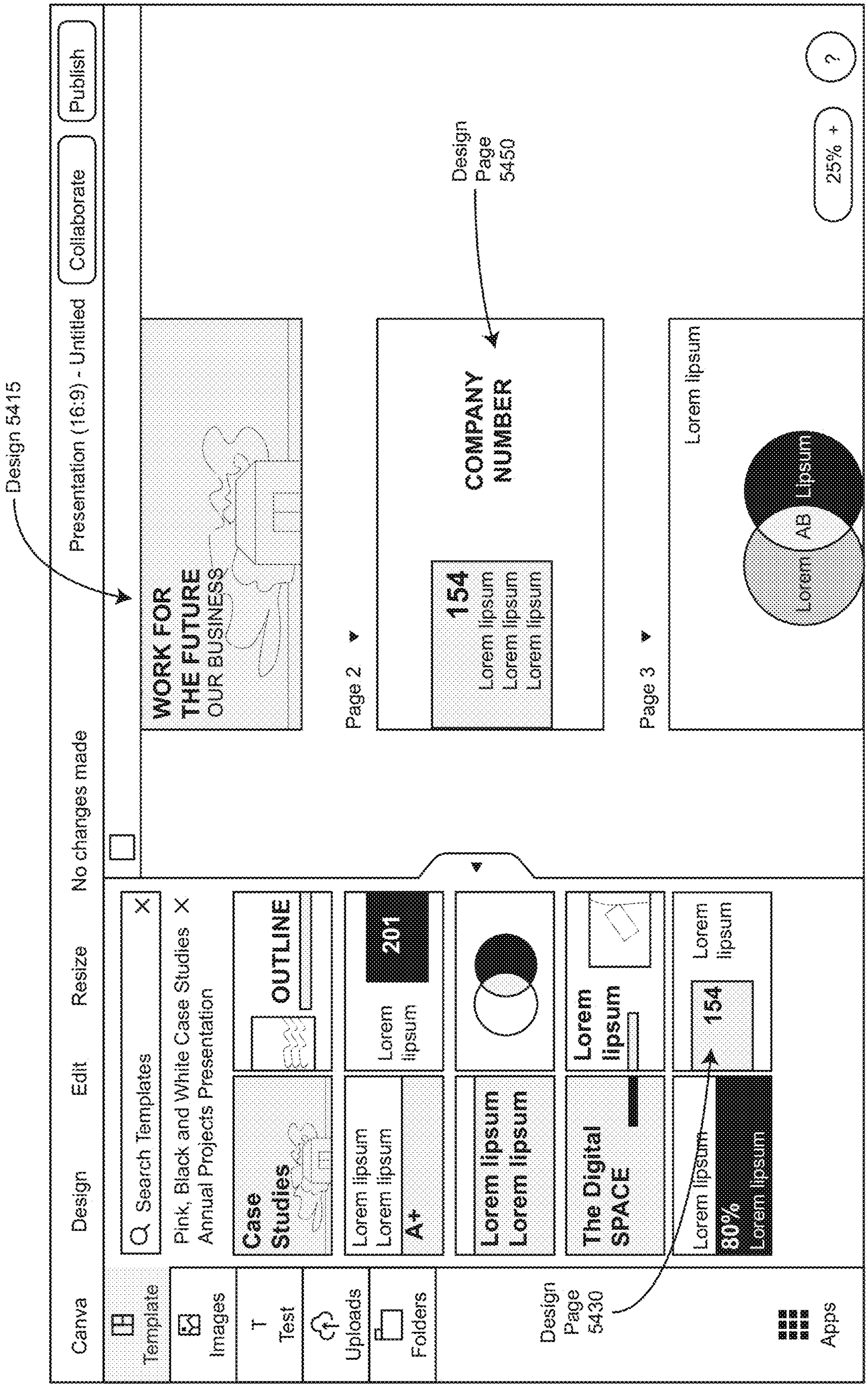
FIG. 54 (cont..)

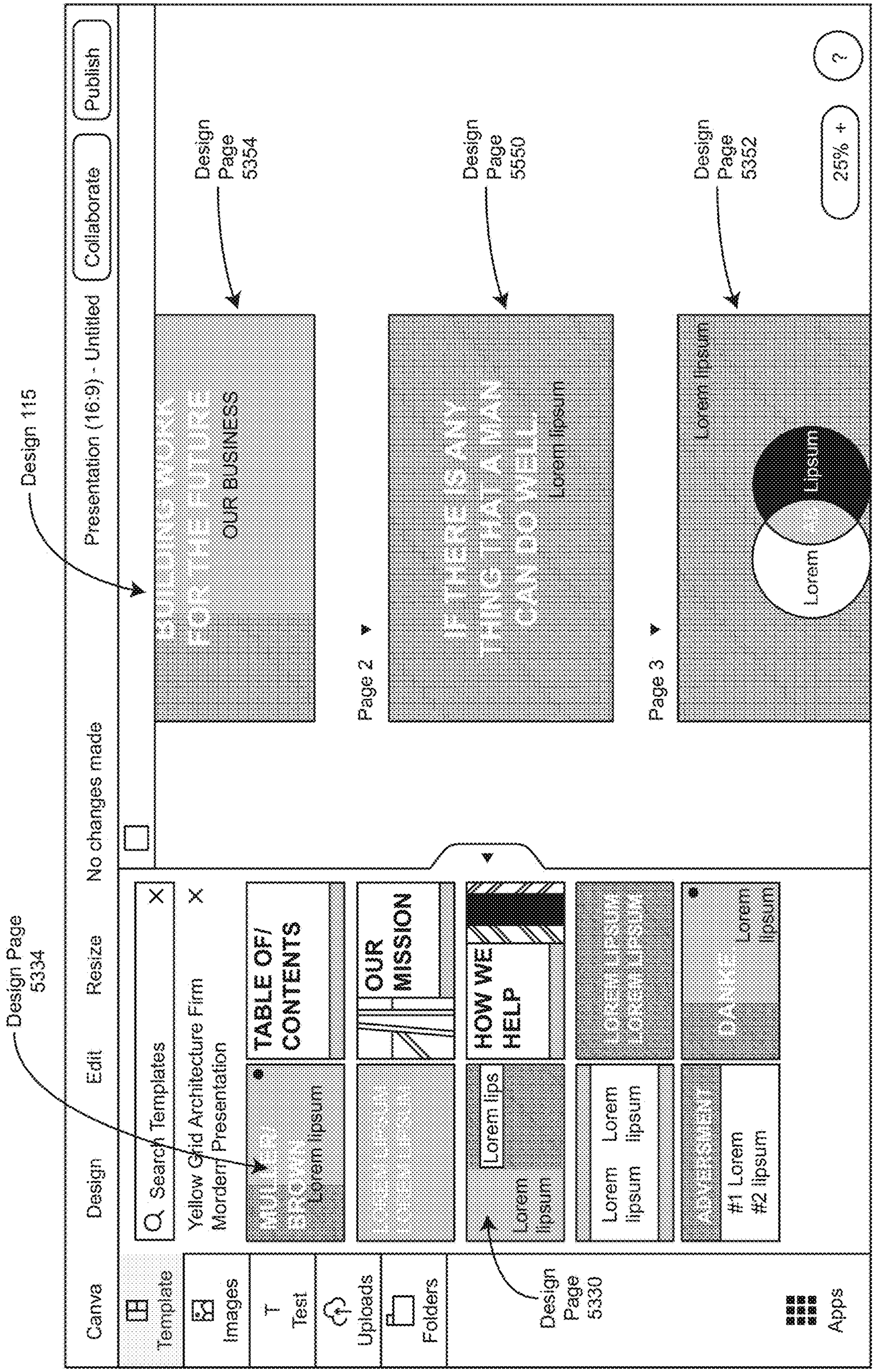
FIG. 55 (cont..)

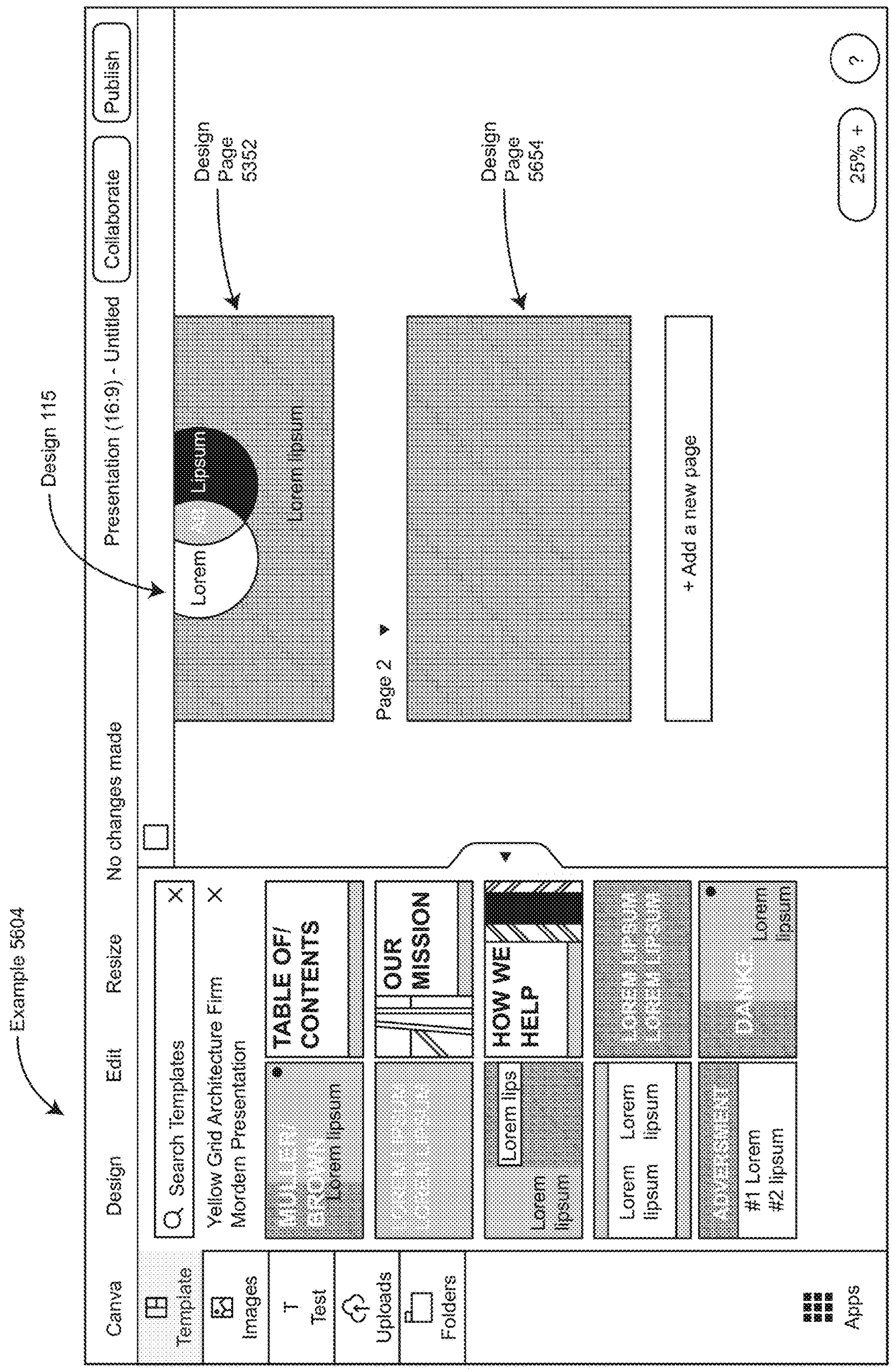
FIG. 56 (cont..)

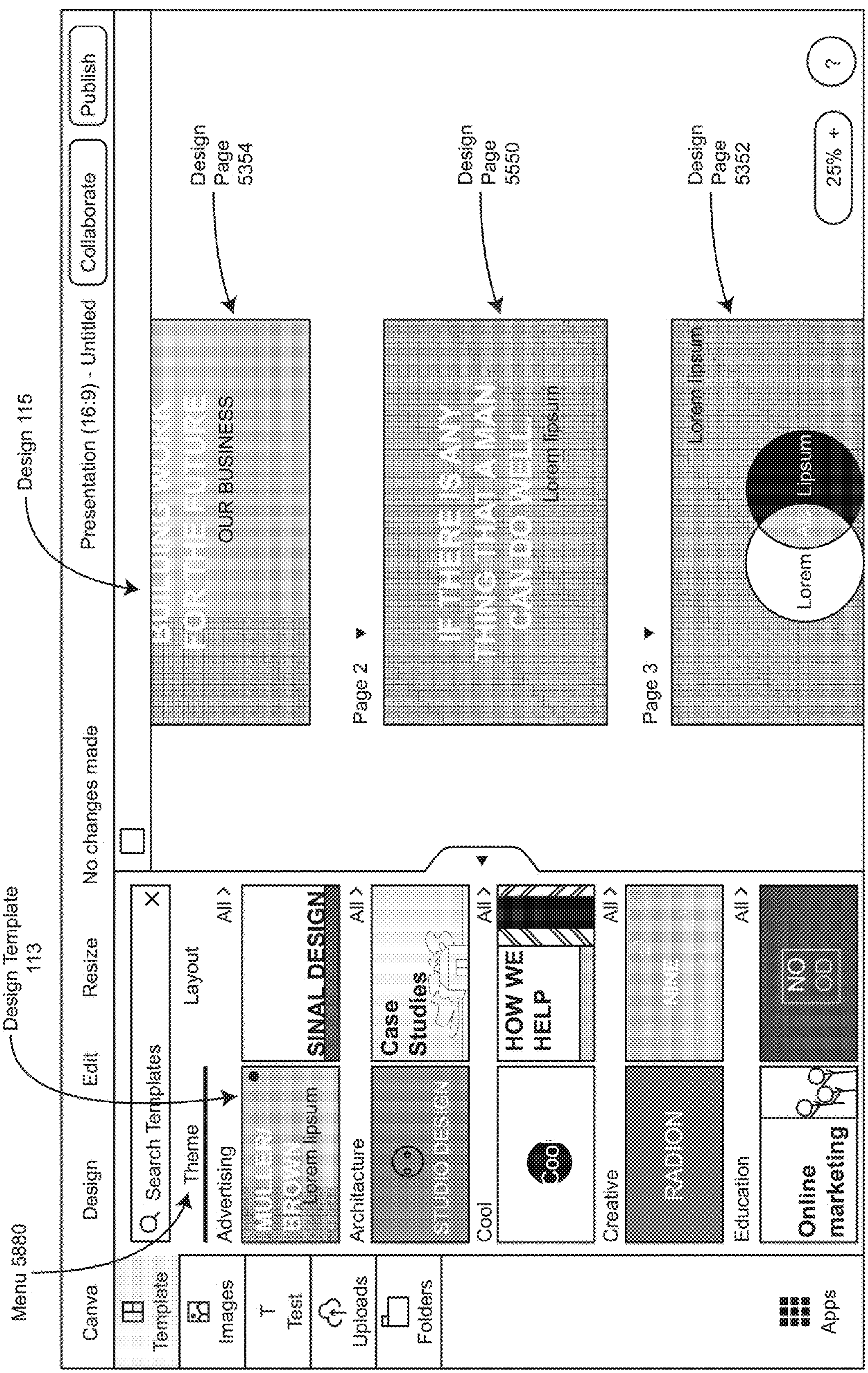
FIG. 58 (cont..)

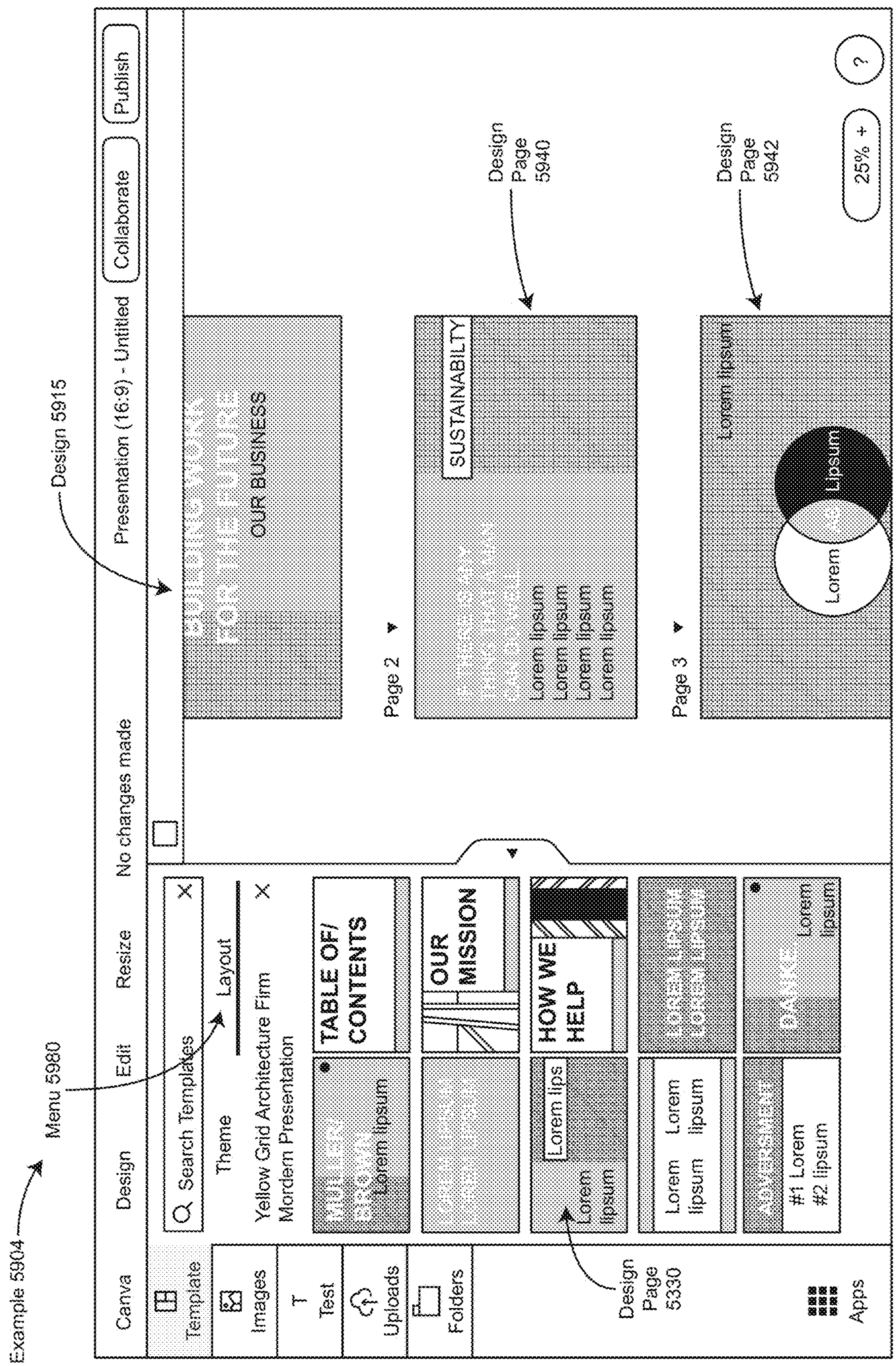
FIG. 59 (cont..)

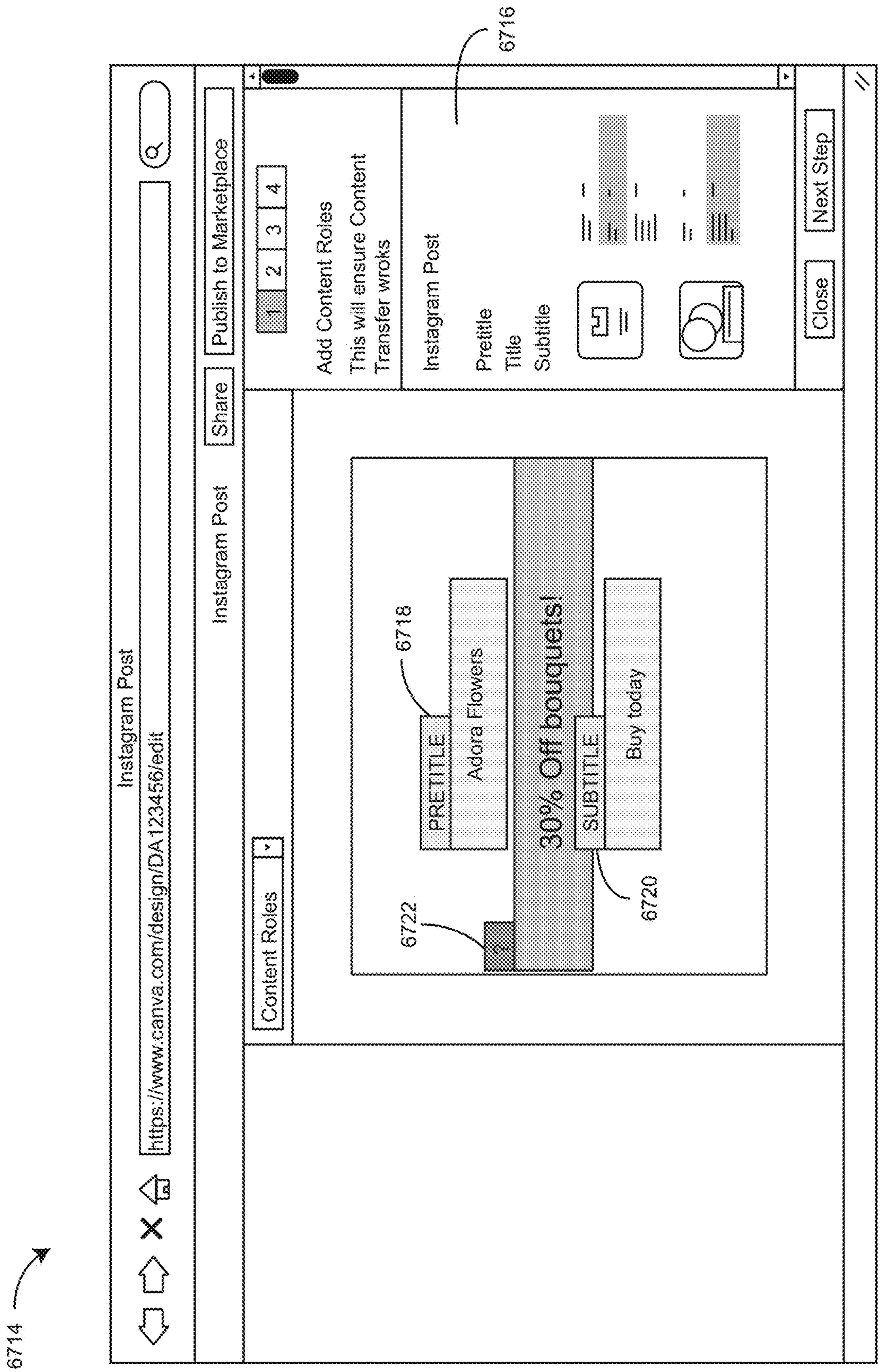
FIG. 67 (cont..)

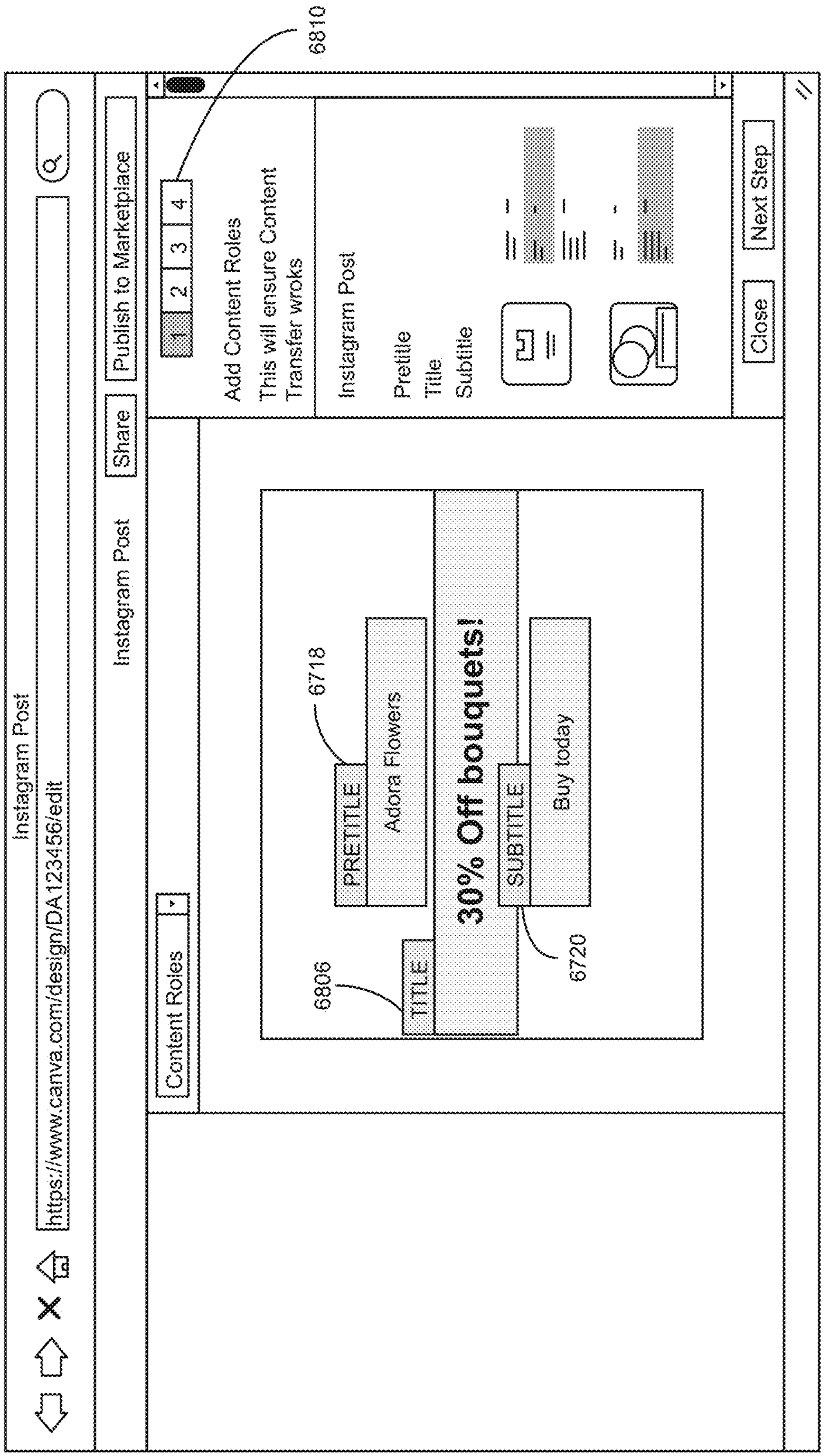
FIG. 68 (cont..)

SYSTEMS AND METHODS OF GENERATING A DESIGN BASED ON A DESIGN TEMPLATE AND ANOTHER DESIGN

CROSS-REFERENCE TO RELATED APPLICATIONS

This application is a national stage of and claims priority to International PCT Application No. PCT/AU2020/050371, filed on Apr. 15, 2020, that in turn claims priority to U.S. Provisional Patent Application No. 62/833,986, filed on Apr. 15, 2019, the contents of which are all expressly incorporated herein.

BACKGROUND

With the proliferation of design tools, there is increasing use of templates to generate designs. Typically, a user selects a template from multiple templates and adds user content. The selection of the template is performed prior to adding the user content. The user can select another template and manually add the same user content to the newly selected template to compare the results of adding the user content to the two templates. Manually adding the same user content to multiple templates for comparison can be repetitive, time-consuming, and lead to inconsistencies.

DETAILED DESCRIPTION

Figure 1:
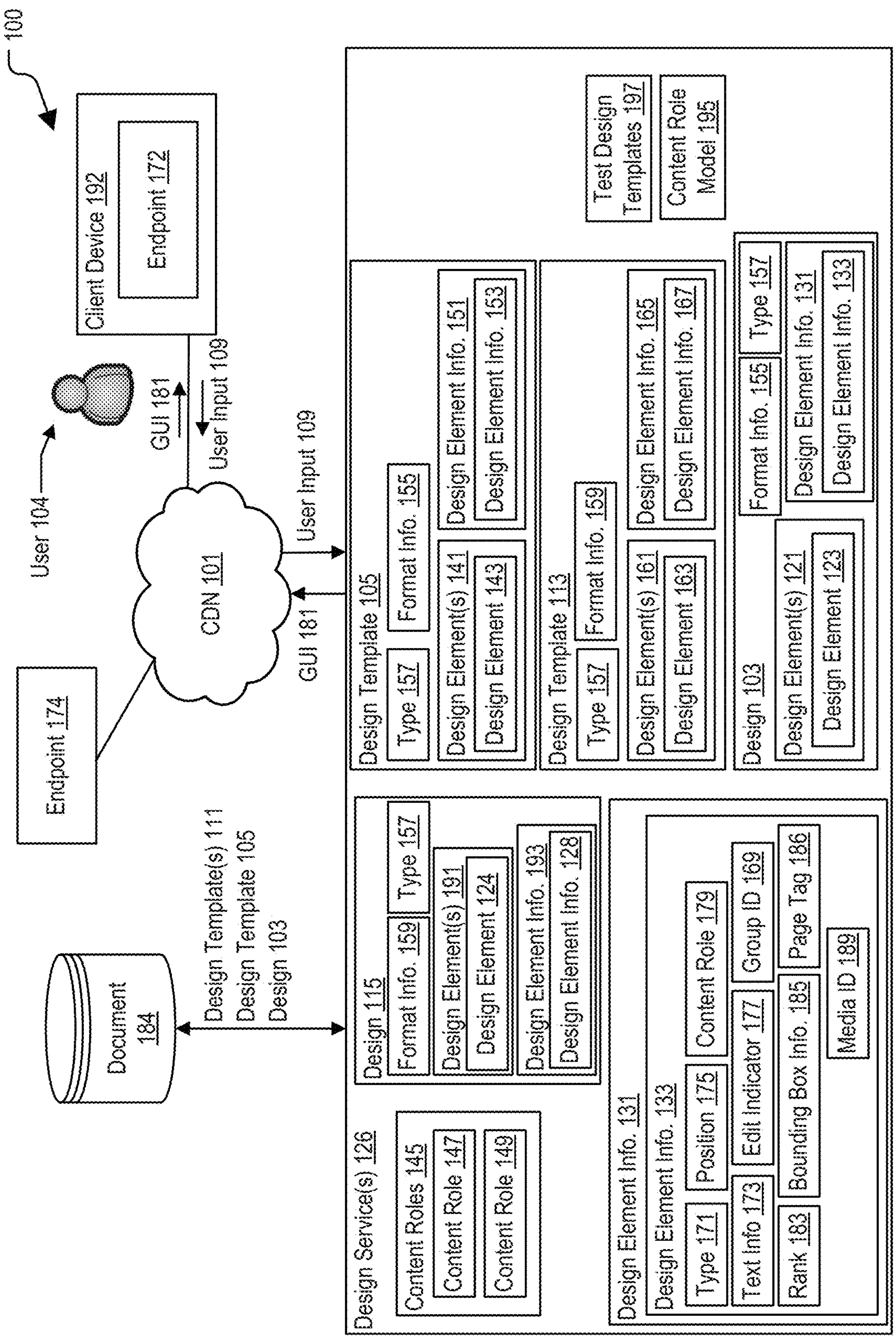
FIG. 1 illustrates a particular example of a system that is operable to generate a design based on a design template and another design.

Design templates are a popular way to generate graphic designs, e.g., for websites, brochures, invitations, etc. In accordance with particular embodiments of the present disclosure, a first design includes one or more design elements and a second design may be generated by applying a design template to the first design. In some cases, a design may be updated by applying a design template to the design. For example, the design may be generated using a first design template and updated by applying a second design template. As used herein, a "design" includes one or more design elements and format information (e.g., color information, font type, font size, etc.). A "design element" includes image content (e.g., in vector format or pixel format), text content, etc. In a particular aspect, the format information includes first format information corresponding to a first design element type (e.g., a title text element). For example, the first format information (e.g., default format information) indicates color information, font type, font size, etc. associated with design elements of the first design element type. In a particular aspect, the first format information indicates default format information that is used to format a first design element of the first design element type that is added to the design. Thus, the format information may cause a "title" design element to have a different font face and size than other types of design elements. In a particular aspect, the design includes design element information associated with the design elements. For example, first design element information of the first design element indicates one or more attributes of the first design element. To illustrate, the first design element information indicates second format information associated with the first design element. In a particular aspect, a user updates a format of the first design element and the second format information indicates the updated format of the first design element.

Applying a design template to a design includes generating a second design based on the design template and transferring content from the design to the second design. For example, the user may edit the design and then apply the design template. It will be appreciated that automatically transferring the user-provided content to the second design as described herein may enable faster design processes and a more intuitive user experience. For example, the user may efficiently apply various design templates to an edited design without having to repetitively provide the same edits each time a design template is applied. Additional illustrative, non-limiting advantages of the present disclosure are described herein.

In the following description, certain aspects of the present disclosure are described in conjunction with a graphic design website that enables users to create designs using web application(s) or other Software-as-a-service (SaaS) components. Examples of graphic designs include, but are not limited to, social media posts or headers, presentations, letterheads, magazine templates, certificates, resumes, flyers, book/album covers or art, infographics, flyers, posters, menus, business cards, brochures, logos, greeting cards, postcards, invitations, collages, announcements, blog graphics, Internet advertisements, videos, animations, etc. In some examples, the graphic design website can be accessed by using Internet browsers and/or an application installed on a mobile device, such as a mobile phone or tablet. Unless specified otherwise, reference to the "graphic design website" herein includes the graphic design web application(s)/SaaS component(s) accessible via the graphic design website. Use of the graphic design website to create designs may be faster and/or more convenient than using a standalone downloaded/purchased software program. However, it is to be understood that the description of website-based aspects herein is for illustration only and is not to be considered limiting. In alternative implementations, the techniques of the present disclosure may be applied in the context of a standalone computer application executed on a desktop computer, a laptop computer, a mobile device, etc. A "user" can refer to an internal user or an external user of the graphic design website. For example, an internal user includes a designer, an employee, a software engineer, or another person that manages or designs the graphic design website. An external user includes a person that is not an internal user, such as someone that accesses the graphic design website to generate designs and does not manage or design the graphic design website. In a particular aspect, one or more operations described herein with reference to a user can be performed by a first user (e.g., an internal user) and one or more operations described herein with reference to the user can be performed by a second user (e.g., an external user).

When a user creates a new design (e.g., a first design) on the graphic design website, the user may start with a blank design or may start from a design template that has a pre-applied layout. As used herein, a "template" includes a default layout of images, text, colors, and/or fonts. For example, a placeholder template includes text elements that are placed on a white background. In a particular aspect, the layout of the text elements is based on a type of the template. For example, an Instagram® (a registered trademark of Instagram LLC, Menlo Park, CA) post template includes a pre-title text element that includes default pre-title text (e.g., "Tap to add a pre-title (optional)"), a title text element that includes default title text (e.g., "Tap to add text"), and a subtitle text element that includes default subtitle text (e.g., "Tap to add a subtitle (optional)"). As another example, the graphic design website may provide access to several "holiday greeting card" templates, and a user may select one of the templates as a starting point from which to customize their own holiday greeting card by uploading photos of their own family, entering a personalized greeting message, changing the images/text/fonts/colors included in the pre-applied template, etc.

To provide a more comprehensive design experience, the graphic design website may enable the user to search for templates, designs, design elements and/or format information including images, templates, fonts, etc., as described above. To illustrate, the user may enter the search term "dog" to search for stock images of dogs that can be inserted into a design, pre-existing templates featuring images and/or text about dogs, previously stored designs (by that user or by other users) featuring dogs, or any combination thereof. Incorporating a search result image (e.g., a photo of a dog) into a design may be as simple as "dragging-and-dropping" the image into the design, at which point the user may be free to edit the image in terms of size, color, etc. Certain media assets (e.g., images, templates, fonts, etc.) may be free to incorporate into designs while others may be available for a price and may have an associated license (e.g., a one-time-use license) that is enforced by the graphic design website.

The graphic design website enables application of another template to change the design. In a particular example, the user selects a second template and drags and drops the second template onto the first design. In an alternative example, the graphic design website selects the second template. A second design is generated based on the second template. At least some of the customizations that the user added to the first design are applied to the second design. For example, the personalized greeting message, the search result image, or both, previously added by the user are automatically applied to the second design. In some examples, the personalized greeting message and the search result image replace a pre-applied (e.g., default) message and a pre-applied image, respectively, of the second template in the second design.

The graphic design website generates a graphical user interface (GUI) including a first GUI element (e.g., an image) corresponding to the first design, a second GUI element (e.g., a thumbnail image) corresponding to the second design, or both. The graphic design website provides the GUI to a display. In a particular aspect, the user can compare the results (e.g., the first GUI element and the second GUI element) of applying various templates to the design with the user customizations. In a particular example, when the user selects the first design or the second design, the selected design is stored in a database and the remaining design is discarded (e.g., marked for deletion). In another example, the selected design overwrites the remaining design (e.g., the design that was not selected) in the database.

An illustrative example of a system that supports operation of such a graphic design website and that is operable to generate a design based on a template and another design is shown in FIG. 1 and is generally designated 100. The system 100 includes a client device 192 that is communicably coupled, via a content delivery network (CDN) 101, to a computing environment (e.g., a network-accessible cloud computing environment). For example, the client device 192 is communicatively coupled to one or more design service(s) 126 of the computing environment. In a particular aspect, the design service(s) 126 correspond to one or more services or components described with reference to FIG. 64, one or more additional services or components, or a combination thereof. Although FIG. 1 shows a CDN 101, it is to be understood that in alternative aspects devices shown in FIG. 1 may communicate using one or more networks (or portions thereof) that include but are not limited to CDN(s), private network(s), cellular network(s), the Internet, etc. The client device 192 is configured to be operated by a user 104. As further described herein, the system 100 may enable the user 104 to quickly and easily create and edit various forms of graphic designs and other visual media works, even if the user 104 is not a trained graphic designer or other visual arts professional. In some examples, the computing environment includes one or more servers and/or one or more databases, data stores, and/or data storage devices. For example, the computing environment includes a document database 184. The computing environment may include additional databases, such as a media database, an export database, or both. The computing environment may include one or more load balancers, as further described with reference to FIG. 64.

In particular aspects, the client device 192 corresponds to a desktop computer, a laptop computer, a mobile phone, a tablet, or other computing device configured to access websites via the Internet. The client device 192 may include (or may be connected to) one or more input devices (e.g., a keyboard, a mouse, a touchscreen, etc.) and one or more output devices (e.g., a monitor, a touchscreen, audio speakers, a headphone connection, etc.).

In particular aspects, the client device 192, the computing environment, the one or more servers, the document database 184, the media database, the export database, the load balancers, or a combination thereof may include one or more processors or processing logic, memories, and/or network interfaces. The memories may include instructions executable by the processors to perform various functions as described herein. The network interfaces may include wired and/or wireless interfaces operable to enable communication to local area networks (LANs) and/or wide area networks (WANs), such as the Internet.

A first server may be configured to execute a web front end. The web front end is configured to serve a graphic design website to requestors. For example, the web front end may send one or more graphical user interfaces to the client device 192 in response to receiving a request from the client device 192. The same or a different (e.g., second) server may be configured to execute a design service(s) 126. The design service(s) 126 may enable core design creation, design updating, and design deletion functionality of the graphic design website. The same or a different (e.g., third) server may be configured to execute an export service. The export service may support graphic design export tasks (e.g., publishing a design as a web output).

The load balancers may be configured to send a message to a server requesting instantiation of a particular service. The server may execute a virtual machine including an instance of the particular service. For example, the load balancers may be configured to send a message to the second server to instantiate the design service(s) 126. The second server may, in response to receiving the message, execute a virtual machine including an instance of the design service(s) 126. In a particular aspect, multiple servers may execute instances of the same service. For example, the load balancers may send a second message to a fourth server to instantiate the design service(s) 126. In this example, the third server may execute a first virtual machine executing a first instance of the design service(s) 126 and the fourth server may execute a second virtual machine including a second instance of the design service(s) 126.

The design service(s) 126, the export service, or both, may be coupled to one or more endpoints. In FIG. 1, the design service(s) 126, the export service, or both may be coupled, via the CDN 101, to an endpoint 172, an endpoint 174, one or more additional endpoints, or a combination thereof. An "endpoint" may also be included in the client device 192. For example, the client device 192 may include the endpoint 172. An endpoint may refer to an application, a server, a social network site, a web server, a device, or a combination thereof.

During operation, the user 104 may operate the client device 192 to access a graphic design website via the computing environment. The graphic design website may enable the user to create and modify a design 103 (which may be persisted to the document database) using web application(s) and/or Software-as-a-service components presented by the graphic design website. For example, the web front end may generate a graphical user interface (GUI) 181 of the graphic design website. The user 104 may use the GUI 181 to create and modify the design 103. For example, the user 104 selects a design template 105 to generate the design 103. The GUI 181 may include one or more options to edit the design 103. The GUI 181 may include a display portion that displays the design 103. In various aspects, the GUI 181 may enable at least any graphic design function that is generally found in a standalone graphic design application, although it is to be appreciated that the GUI 181 may enable other functionality as well.

In a particular aspect, the user 104 selects the options to edit the design 103. The client device 192, in response to receiving user input 109 indicating the edits to the design 103, sends the user input 109 to the computing environment. The design service(s) 126 updates the design 103 based on the user input 109 and stores the updated version of the design 103 in the document database 184. In a particular aspect, the design service(s) 126 sends an updated version of the GUI 181 to the client device 192. The updated version of the GUI 181 is used to display the updated version of the design 103.

In a particular aspect, the graphic design website enables the user 104 (or another user) to create and modify one or more design templates. In a particular aspect, a design template 105 is of a type 157 (e.g., a design type). The type 157 can be a post, an invitation, a card, a presentation, a flyer, a brochure, etc. The design template 105 includes one or more design elements 141 and design element information 151 of the design elements 141. For example, the design template 105 includes a design element 143 and corresponding design element information 153. In a particular aspect, the design element information 153 indicates a type 171 of the design element 143. For example, the type 171 indicates whether the design element 143 is or includes an image element, a text element, or a fill element. In a particular aspect, the type 171 indicates whether the design element 143 is or includes a foreground image element or a background image element. In a particular aspect, the design element information 153 indicates a fill color of the design element 143 (e.g., a fill element).

Figure 2:
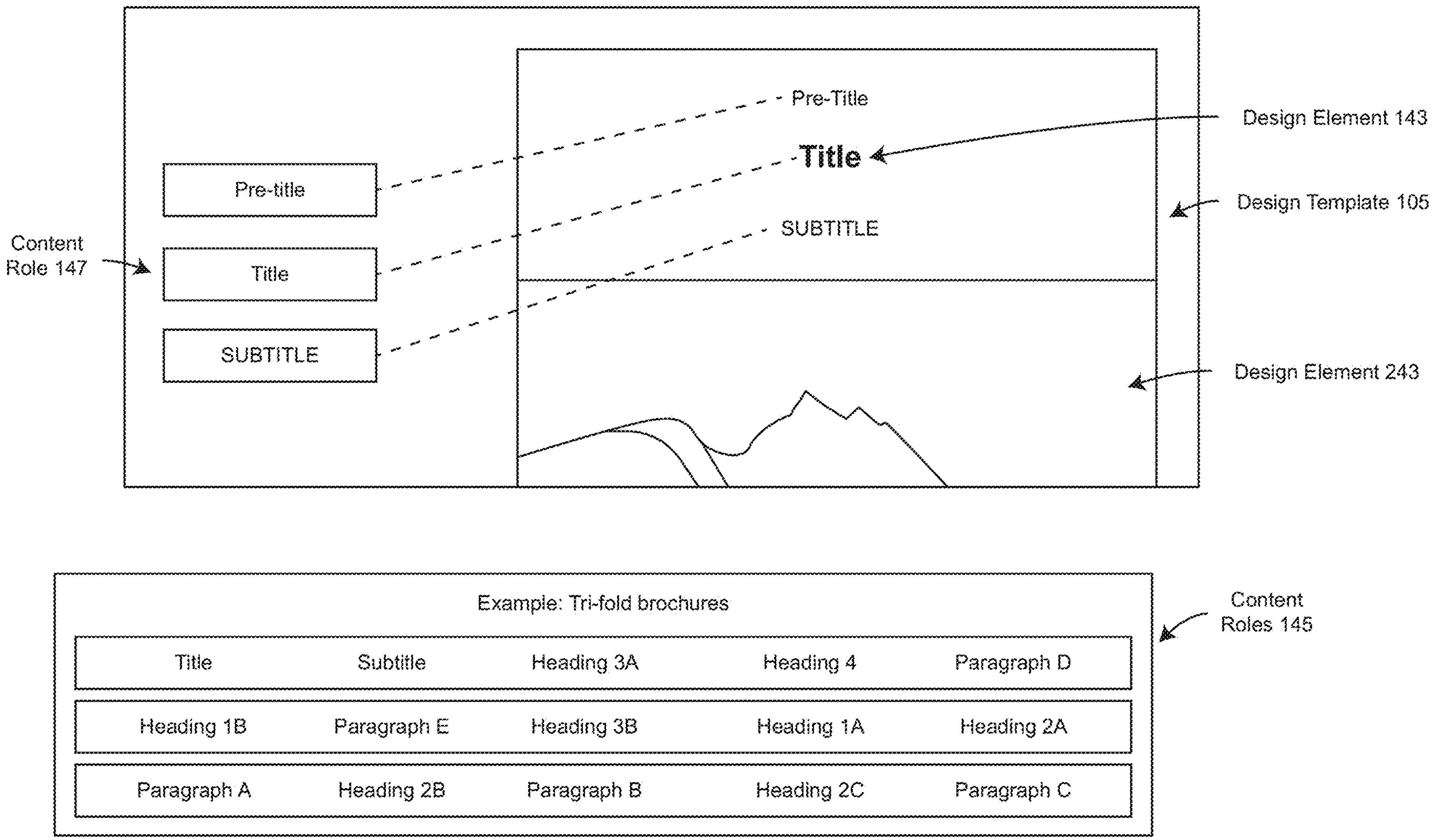
FIG. 2 illustrates a particular example of a design template and content roles that may be generated by the system of FIG. 1.

Turning to the example illustrated in FIG. 2, the design template 105 includes a text element (e.g., the design element 143), an image element (e.g., a design element 243), one or more additional design elements, or a combination thereof. The text element includes first text (e.g., "Title"). For example, the first text is based on default data or user input. In a particular aspect, the first text of the text element is a placeholder that a user can update in a design that is generated based on the design template 105.

The text element is associated with a content role 147 (e.g., "Title"). In a particular example, the image element is associated with a content role 149 (e.g., Pic-1). Some illustrative examples of content roles include style-related content roles (e.g., title, pre-title, subtitle, heading, or paragraph) and information structure-related content roles (e.g., name, address, invoice-tax-details, or invoice-items-purchased). In a particular aspect, a first set of content roles is associated with a first design type of the design template 105. For example, the first set of content roles associated with Instagram® post design type includes a pre-title content role, a title content role, and a subtitle content role. A second set of content roles associated with another design type may include more, fewer, or different content roles. A content role enables identification of corresponding design elements in designs and design templates. For example, the text element (e.g., the design element 143) of the design template 105 having the content role 147 (e.g., "Title") corresponds to a text element of another design template (or a design) having the same content role (e.g., the content role 147). When a design is applied to a design template, content may be transferred between corresponding design elements, as further described herein. In a particular aspect, the GUI 181 includes one or more options to create and modify content roles 145, create and modify design templates using the content roles 145, or a combination thereof.

Figure 3:
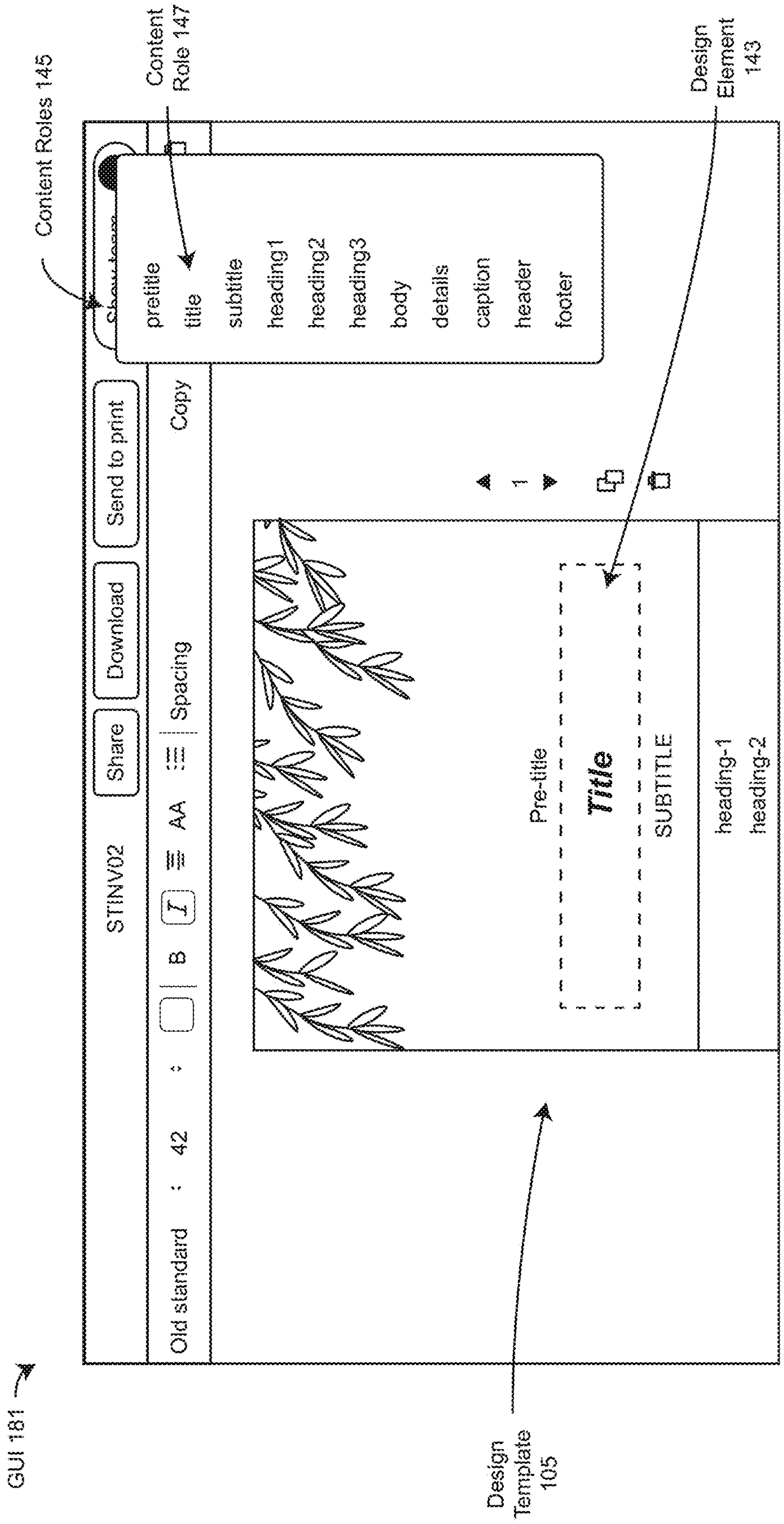
FIG. 3 illustrates another particular example of a design template that may be generated by the system of FIG. 1.

In the example illustrated in FIG. 3, the design template 105 includes a text element (e.g., the design element 143), one or more additional design elements, or a combination thereof. The GUI 181 enables the user 104 (e.g., an internal user or an external user) to select the content role 147 for the design element 143. The design service(s) 126, in response to the user selection, updates a content role 179 of the design element information 153 to indicate that the design element 143 has the content role 147 (e.g., "Title").

For the examples illustrated in FIGS. 2-3, the design element information 153 includes text information 173 indicating that the text element (e.g., the design element 143) includes first text (e.g., "Title"). In a particular aspect, the design template 105 includes format information 155 (e.g., a font type, a font size, color, italics, bold, etc.) of design element types. For example, the design service(s) 126, in response to determining that the text element is of a first design element type (e.g., a style type) and determining that the text element is associated with first format information (e.g., font type, font size, color, italics, bold, underline, etc.), updates the format information 155 to indicate that the first design element type is associated with the first format information. The design element information 153 indicates a position 175 (e.g., coordinates, page number, or both) of the text element in the design template 105.

In a particular aspect, the document database 184 stores one or more design templates 111. A subset of the design templates 111 is associated with the type 157. For example, the design templates 111 include a design template 113. The design template 113 includes one or more design elements 161 (e.g., image elements, text elements, fill elements, or a combination thereof). The design template 113 includes design element information 165 of the design elements 161. For example, the design template 113 includes a design element 163 and design element information 167 of the design element 163. For example, the design element information 167 indicates a type 171, a content role 179 (e.g., pre-title, title, subtitle, Pic-1), or both, of the design element 163. In a particular aspect, the type 171 indicates an element type (e.g., image element, text element, or fill element), a style type, or both, of the design element 163.

The design template 113 includes format information 159 of the design element types. In a particular aspect, the format information 159 is the same as the format information 155 of the design template 105. In an alternative aspect, the format information 159 is distinct from the format information 155. For example, the format information 155 indicates that a first text color (e.g., blue) is assigned to a first design element type (e.g., a "Title" style) and the format information 159 indicates that a second text color is assigned to the first design element type. The second text color may be the same as the first text color (e.g., blue), or may be distinct from the first text color (e.g., green).

Figure 4:
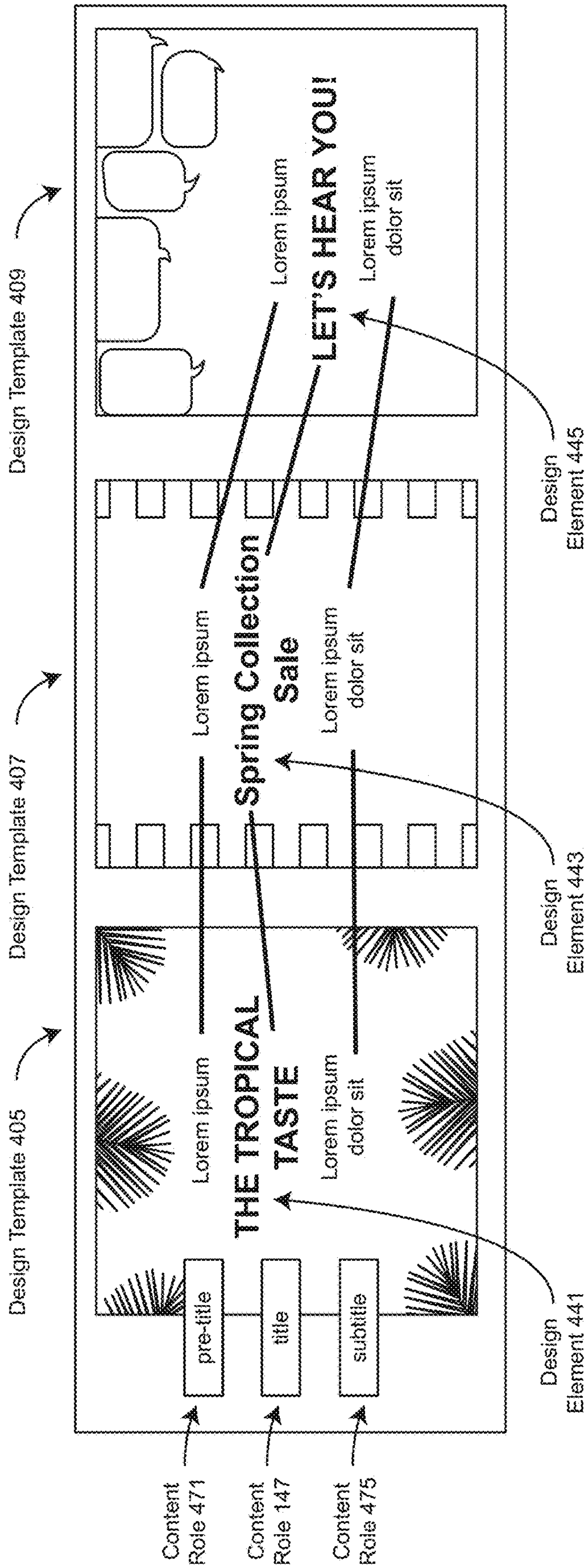
FIG. 4 illustrates particular examples of design templates that may be generated by the system of FIG. 1.

In the example illustrated in FIG. 4, multiple design templates include design elements corresponding to the same content role. For example, each of a design template 405, a design template 407, and a design template 409 includes a design element corresponding to each of a content role 471, the content role 147 and a content role 475. To illustrate, the design template 405, the design template 407, and the design template 409 include a first title placeholder (e.g., a design element 441), a second title placeholder (e.g., a design element 443), and a third title placeholder (e.g., a design element 445), respectively. Each of the design element 441, the design element 443, and the design element 445 has the content role 147 (e.g., "Title"). Having design templates with design elements corresponding to the same content roles enables content transfer between corresponding design elements.

Figure 5:
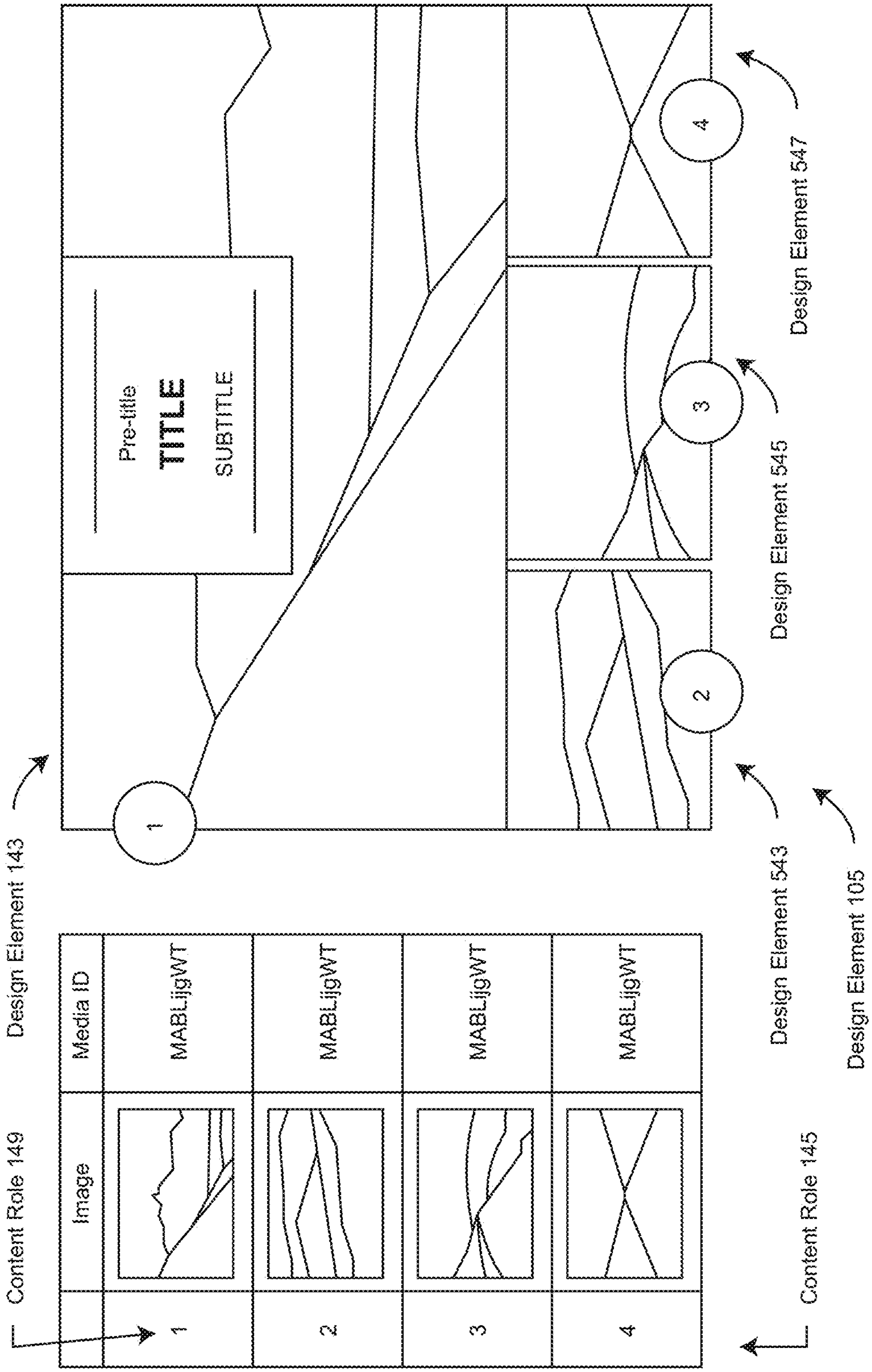
FIG. 5 illustrates a particular example of a design template that may be generated by the system of FIG. 1.

In the example illustrated in FIG. 5, the design template 105 includes a first image element (e.g., the design element 143), a second image element (e.g., a design element 543), a third image element (e.g., a design element 545), a fourth image element (e.g., a design element 547), one or more additional design elements, or a combination thereof. It should be understood that the design template 105 including four image elements is provided as an illustrative example. In other examples, the design template 105 includes fewer than four image elements or more than four image elements. For the example illustrated in FIG. 5, the design element 143 is associated with the content role 149 (e.g., "1"). The design element information 153 indicates a type 171 (e.g., image element), a content role 179 (e.g., the content role 149), a media identifier 189 (e.g., "MABLihgWTjE") of an image included in the first image element, or combination thereof, of the design element 143.

In a particular aspect, the design service(s) 126 applies the design template 113 to the design 103, as described herein. The design service(s) 126, before applying the design template 113, extracts a content signature from the design 103. In a particular example, the content signature of the design 103 includes the design element information 131. To illustrate, the content signature (e.g., the design element information 131) indicates the text elements that are included, positions of the text elements, whether the text elements have been edited (e.g., added, modified, or both) by a user relative to the design template 105, fill elements that are included, content roles of the fill elements, positions of the fill elements, filters of the fill elements, whether the fill elements have been edited (e.g., added, modified, or both) by a user relative to the design template 105, or a combination thereof.

The design service(s) 126 generates a design 115 by copying the design template 113. The design service(s) 126 updates the design 115 based on the content signature (e.g., the design element information 131), as described herein. For example, the design service(s) 126, in response to determining that a first text element of the design 103 has the same content role (e.g., "Title") as a second text element of the design 115, transfers content (e.g., text) of the first text element (e.g., as indicated by the content signature) to the second text element. In a particular aspect, the design service(s) 126 refrains from performing content transfer for design elements of the design 103 that are unedited relative to the design template 105.

In a particular aspect, the design service(s) 126 maintains a list of first unmapped elements of the design 103 and second unmapped elements of the design 115 for which a corresponding design element has not been identified in the other design (e.g., the design 115 or the design 103), for which content has not been transferred, or both. For example, the design service(s) 126 initiates such an "unmapped list" by including the design elements of the design 103 and the design template 105. The design service(s) 126, in response to determining that a first design element of the design 103 corresponds to (e.g., has the same content role as) a second design element of the design 115, removes the first design element and the second design element from the unmapped list. The design service(s) 126 transfers content from the first design element to the second design element, e.g., in response to determining that the first design element is edited relative to the design template 105.

In a particular aspect, the design service(s) 126, in response to determining that none of the first unmapped elements (e.g., the remaining first unmapped elements of the unmapped list) correspond to any of the second unmapped elements (e.g., the remaining second unmapped elements of the unmapped list), uses a heuristic to map between at least some of the first unmapped elements and at least some of the second unmapped elements. For example, the design service(s) 126 sorts first text elements of the first unmapped elements based on a character count and sorts second text elements of the second unmapped elements based on a character count. The design service(s) 126, in response to determining that a first text element of the first text elements has a same sort order (e.g., first) as a second text element of the second text elements, designates the first text element as corresponding to the second text element. The design service(s) 126 removes the first text element and the second text element from the unmapped list. The design service(s) 126 transfers content (e.g., text) from the first text element to the second text element, e.g., in response to determining that the first text element is edited relative to the design template 105. In a particular example, the first text element, the second text element, or both, are not associated with a content role or are associated with a default content role. In a particular aspect, the design service(s) 126 uses the heuristic to determine mappings for one, multiple, or all text elements of one design that have sort order matches in the other design.

The design service(s) 126, in response to determining that the unmapped list includes at least one first unmapped element (e.g., at least one remaining first unmapped elements of the unmapped list), copies the first unmapped elements to the design 115. For example, the design service(s) 126 adds a second element to the design 115 and transfers content (e.g., text) from a first unmapped element to the second element. In a particular aspect, the second element is included in a second position in the design 115 that is the same as a first position of the first unmapped element in the design 103. In a particular aspect, the second element is formatted based on format information associated with the design 115, the design template 113, or both. In a particular example, the second element is formatted to have a font type that is used in the design template 113, a text color that is used the most in the design template 113, or both.

In a particular aspect, the design service(s) 126, subsequent to performing content transfer, performs "reflow" of first text elements of the design 115. Reflow refers to updating bounding boxes of at least some text elements subsequent to content transfer and moving neighboring elements to reduce or prevent overlap. For example, the design service(s) 126, in response to determining that the design template 113 has a font resizing mode enabled, updates font sizes of the first text elements so that a font size of each of the first text elements is a largest font size such that a first bounding box of a first text element of the design 115 is smaller than or equal to a second bounding box of a second text element of the design template 113. The second text element corresponds to (has the same content role as or is designated as corresponding to) the first text element. In a particular aspect, the design service(s) 126 use a binary search to update the font sizes. In a particular aspect, the design service(s) 126 updates bounding boxes of the first text elements subsequent to updating font sizes of the first text elements.

In a particular aspect, the design service(s) 126 performs group reflow for design elements of the design 115 that are included in groups. For example, the design service(s) 126 identifies first design elements that are included in a first group in a first design page of the design 115. The design service(s) 126 determines that the first design elements (e.g., first text elements) correspond to second design elements (e.g., second text elements) included in a second group in a second design page of the design template 113. The design service(s) 126 uses an algorithm to preserve distances between the first design elements. For example, the design service(s) 126 uses the algorithm to set distances between the first design elements in the first design page based on distances between the second design elements in the second design page. In a particular aspect, the design service(s) 126 identifies first foreground elements and first background elements of the first design elements. The design service(s) 126 maintains distances between the first foreground elements based on distances between second foreground elements in the second design page.

In a particular aspect, the design service(s) 126, in response to determining that a bounding box of a first design element is equal in size to a bounding box of the first group, designates the first design element as a background design element. Alternatively, the design service(s) 126, in response to determining that the bounding box of the first design element is not equal to the bounding box of the first group, designates the first design element as a foreground design element. The design service(s) 126, in response to determining that a first foreground element corresponds to a second design element of the design template 113, updates a first width of the first foreground element to be the same as a second width of the second design element. In a particular aspect, the first group grows/shrinks vertically as width of the foreground elements is updated. In a particular example, the first width is reduced without changing a font size of first text of the first foreground element. In this example, the first foreground element grows vertically to accommodate the first text as the first width is reduced. In another example, the first width is increased without changing the font size of the first text. In this example, the first foreground element shrinks vertically and continues to accommodate the first text as the first width is increased. In a particular aspect, a direction of change, a magnitude of change, or both, in a size of the first foreground element is based on a vertical alignment attribute of the first foreground element. The first group grows/shrinks vertically as design elements of the first group grow/shrink. In a particular aspect, the first group, the second group, or both, are created by the user 104 (e.g., a designer). The design service(s) 126, subsequent to performing reflow of the foreground design elements, updates the background design element to continue to "encompass" the foreground design elements. For example, the design service(s) 126 updates a bounding box of a background design element to have a smallest size such that each of the foreground design elements is included within the bounding box. Additional examples of reflow operation are described with reference to FIG. 61.

Figure 6:
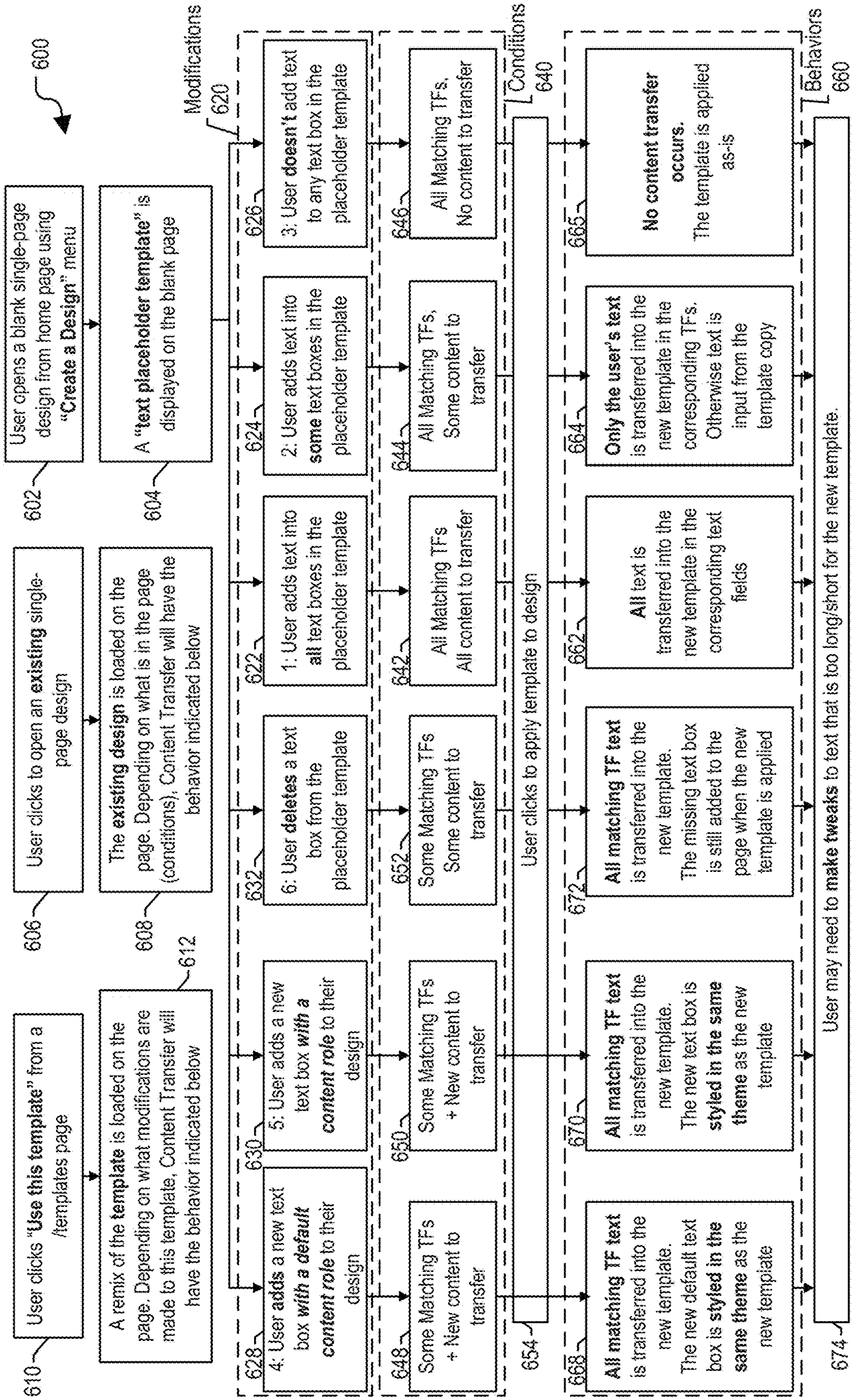
FIG. 6 illustrates a particular example of a method of generating a design based on a design template and another design.

In FIG. 6, a method is shown and generally designated 600. In a particular aspect, the method 600 is performed by components of the system 100 of FIG. 1, such as the design service(s) 126. In a particular aspect, one or more operations of the method 600 are described as performed by a user. It should be understood that operations described as performed by the user 104 may be detected by the design service(s) 126 as performed by the user 104 based on communication between the design service(s) 126 and the client device 192. FIG. 6 provides examples of one or more modifications 620 performed by the user 104 to the design template 105 to generate the design 103. One or more conditions 640 are detected by the design service(s) 126 based on comparing the design template 113 to the design 103. The design service(s) 126 performs one or more behaviors 660 based on detecting the one or more conditions 640.

In a particular aspect, the method 600 includes a user opening a blank single-page design from home page using a "Create a Design" menu, at 602. For example, the user 104 selects a menu option from a "Create a Design" menu of the GUI 181. The menu option corresponds to a single-page design type (e.g., an invitation, an announcement, a card, a post, a poster, a flyer, a business card, an advertisement, or another type of single-page design). The design service(s) 126 generates the design 103 (e.g., a blank design) based on the design template 105 in response to receiving a selection of a menu option associated with the type 157 (e.g., a particular design type) and determining that the design template 105 is designated as a default (e.g., blank) design template associated with the type 157.

Figure 7:
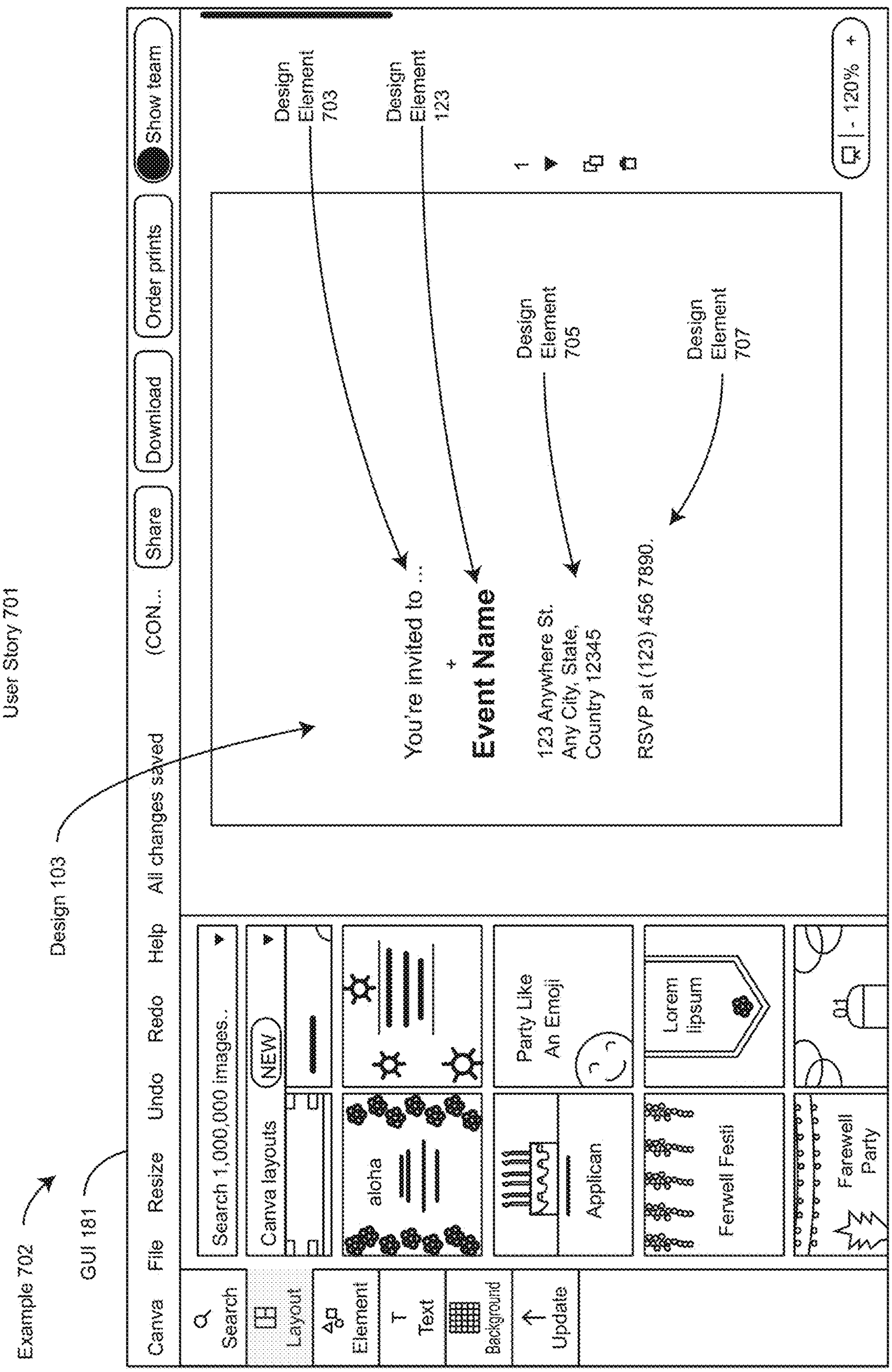
FIG. 7 illustrates particular examples of a design that may be generated by the system of FIG. 1.

In an example 702 illustrated FIG. 7, the design service(s) 126 generates the design 103 by copying the design template 105. The design template 105 includes a first text element (e.g., "You're invited to . . . "), a second text element (e.g., "Event Name"), a third text element (e.g., "123 Anywhere St. Any City, State Country 12345"), and a fourth text element (e.g., "RSVP at (123)456-7890"). The first text element, the second text element, the third text element, and the fourth text element are associated with a first content role (e.g., "pre-title"), the content role 147 (e.g., "title"), a third content role (e.g., "body"), and a fourth content role (e.g., "subtitle"), respectively. Copying the design template 105 includes copying the design elements 141 to generate design elements 121 of the design 103. Copying the design elements 141 includes copying at least a portion of the design element information 151 of the design template 105 to generate design element information 131 of the design 103. For example, the design service(s) 126 generates a design element 703, the design element 123, a design element 705, and a design element 707 by copying the first text element, the second text element, the third text element, and the fourth text element, respectively, of the design template 105. In a particular aspect, design element information 133 of the design element 123 is a copy of the design element information 153 of the design element 143.

Each of the design elements 123, 703, 705, and 707 includes text indicated by corresponding text information 173. For example, the design element information 133 indicates the text information 173 of the design element 123. The design element 123 is initialized to include text (e.g., "Event Name") indicated by the text information 173 of the design element 123. In the example 702, the design elements 141 of the design template 105 do not include any image elements.

In a particular aspect, generating the design 103 includes updating the design element information 131 to indicate that all of the design elements 121 are unedited (e.g., unchanged relative to the design template 105). For example, the design service(s) 126 updates (or initializes) an edit indicator 177 of the design element information 133 to a first value (e.g., 0) to indicate that the design element 123 is unedited in the design 103. In a particular aspect, the design service(s) 126 copies the type 157, the format information 155, or both, from the design template 105 to the design 103.

Returning to FIG. 6, the method 600 includes a displaying a "text placeholder template" in a blank page, at 604. For example, the design service(s) 126 updates a display portion of the GUI 181 to display the design 103. A first text element (e.g., the design element 703), a second text element (e.g., the design element 123), a third text element (e.g., the design element 705), and a fourth text element (e.g., the design element 707) are displayed.

The method 600 includes the user adding text into all text boxes in the placeholder template, at 622. In an example 704 of FIG. 7, the user 104 provides the user input 109 indicating updates to text of each of the design elements 123, 703, 705, and 707. The design service(s) 126, in response to receiving the user input 109, updates the design element information 131 to indicate the updates. For example, the design service(s) 126, in response to determining that the user input 109 indicates that the design element 123 (e.g., the title text element) is updated to include second text (e.g., "Chloe's Quinceanera") with second format information, updates the design element information 133 to indicate that the text information 173 of the design element 123 includes the second text, the second format information, or both. The design service(s) 126, in response to determining that the user input 109 indicates updates to text, format information, or both, of the design element 123, updates the design element information 133 so that the edit indicator 177 of the design element 123 has a second value (e.g., 1) indicating the design element 123 has been edited.

Returning to FIG. 6, the method 600 includes detecting all matching text fields and determining that all content is to transfer, at 642. For example, the design service(s) 126 determines whether the design template 113 matches the design 103 based on a comparison of a first comparison subset of the design elements 121 of the design 103 and a second comparison subset of the design elements 161 of the design template 113. In a particular implementation, the design service(s) 126, in response to determining that the design 103 does not include any image elements, determines whether the design 103 matches the design template 113 independently of any image elements of the design template 113. In a particular implementation, the design service(s) 126, in response to determining that the design 103 does not include any edited image elements, determines whether the design 103 matches the design template 113 independently of any image elements of the design template 113. The first comparison subset includes text elements of the design elements 121 and the second comparison subset includes text elements (and no image elements, if there are any) of the design elements 161. The design service(s) 126 determines that the design template 113 matches the design 103 in response to determining that the first comparison subset includes the same count of design elements as are included in the second comparison subset and that the content role 179 of each of the design elements of the first comparison subset matches the content role 179 of a corresponding design element of the second comparison subset.

The design service(s) 126, in response to determining that the design template 113 matches the design 103 and that each design element of the first comparison subset has been edited, determines that applying the design template 113 to the design 103 is to include transferring all content from the first comparison subset.

The method 600 includes the user clicking to apply the template to the design, at 654. For example, the design service(s) 126 receives the user input 109 indicating a selection by the user 104 of the design template 113 of FIG. 1. In a particular example, the user 104 drags and drops the design template 113 on the design 103 to apply the design template 113 to the design 103. In another example, the design service(s) 126 selects the design template 113 based on determining that the design template 113 is associated with the same design type (e.g., the type 157) as the design 103, that the design template 113 includes the same count of image elements as the design 103, that the design template 113 includes the same count of text elements as the design 103, that the design template 113 includes the same count of design elements as the design 103, that the design template 113 includes the same type of design elements (e.g., having the same content role) as the design 103, or a combination thereof.

In a particular implementation, the design service(s) 126 selects the design template 113 based on usage history associated with the design template 113. For example, the design service(s) 126 selects the design template 113 based on determining that the usage history indicates that the design template 113 is associated with a design that was recently (e.g., within a last hour or a last month) selected by a second user or stored in the document database 184, that the design template 113 is associated with a search term used by the user 104 in an active (e.g., current) session, that the second user is the same as the user 104, that the second user is associated with the same demographic information (e.g., age, gender, location, occupation, or interests) as the user 104, or a combination thereof. To illustrate, the design service(s) 126 selects a party invitation template (e.g., the design template 113) in response to determining that the party invitation template is popular in the last 24 hours among users located in the same city as the user 104, that the user 104 has recently been testing different party invitation templates, or both.

The method 600 includes transferring all text into the new template in the corresponding text fields, at 662. For example, the design service(s) 126 applies the design template 113 to the design 103. Applying the design template 113 to the design 103 includes generating the design 115 by copying the design template 113, updating the design 115 to indicate that design elements have not been edited relative to the design template 113, and applying a content signature of the design 103 to the design 115. For example, generating the design 115 by copying the design template 113 includes generating design elements 191 and design element information 193 of the design 115 by copying the design elements 161 and the design element information 165, respectively, of the design template 113. Applying the content signature (e.g., the design element information 131) of the design 103 to the design 115 includes updating the design elements 191 based on edited design elements of the design 103.

In a particular example, the user 104 edits text of the design 103 and drags and drops the design template 113 onto the design 103. The design template 113 includes certain images and certain text. Rather than such "default content" replacing the user-entered content, at least some of the user-entered content is transferred based on content roles. Therefore, a default image (e.g., an image of a pineapple) of the design template 113 is included in the updated design (e.g., the design 115) but the title text is changed to user-entered text (e.g., "Chloe's Quinceanera").

Figure 8:
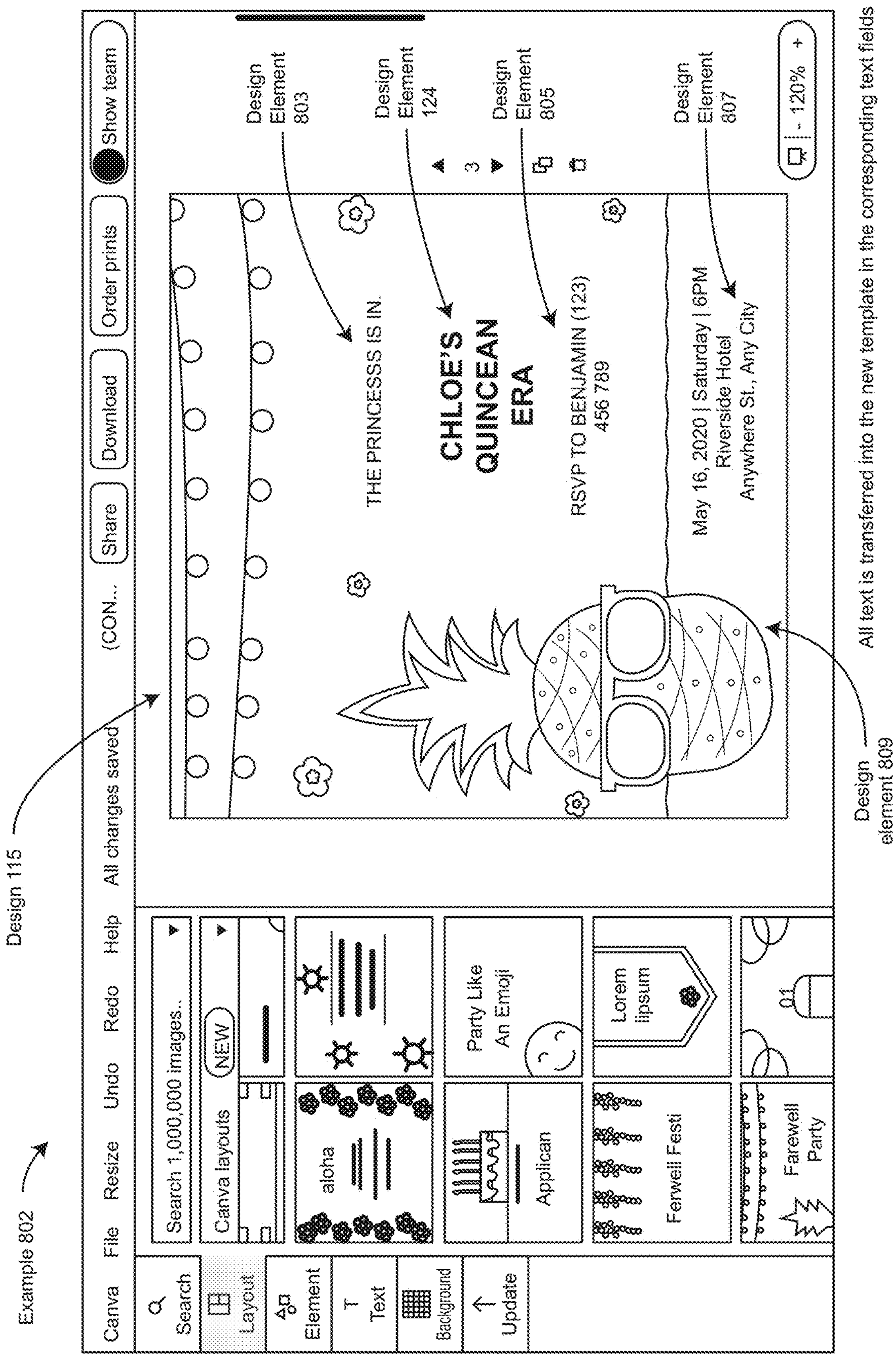
FIG. 8 illustrates particular examples of a design that may be generated by the system of FIG. 1.

In an example 802 of FIG. 8, the design 115 includes a pre-title element (e.g., a design element 803), a title element (e.g., the design element 124), a subtitle element (e.g., a design element 805), a body element (e.g., a design element 807), and an image element (e.g., a design element 809) corresponding to a pre-title element, a title element, a subtitle element, a body element, and an image element, respectively, of the design template 113. For example, the design element 809 includes an image (e.g., an image of a pineapple) copied from the image element of the design template 113.

Content roles of the design elements 124, 803, 805, 807, and 809 are copies of content roles of the design elements 161 of the design template 113. For example, the design element 124 has the content role 147 (e.g., "title"). Copying the design template 113 also includes copying the type 157 and the format information 159 from the design template 113 to the design 115. The design service(s) 126 initializes an edit indicator 177 of each of the design elements 191 to a first value (e.g., 0) to indicate that the corresponding design element has not been edited relative to the design template 113.

In a particular aspect, at least some of the design elements of the design 115 correspond to (e.g., have the some content roles as) design elements of the design 103. For example, the design element 124 of the design 115 corresponds to (e.g., has the same content role as) the design element 123 of the design 103.

The design service(s) 126 applies a content signature (e.g., the design element information 131) of the design 103 to the design 115. Applying the content signature of the design 103 to the design 115 includes identifying edited design elements of the design 103, identifying corresponding design elements of the design 115, and updating the identified design elements (e.g., the design element information of the identified design elements) of the design 115 based on the edited design elements of the design 103. For example, the design service(s) 126 determines that the design element 124 corresponds to the design element 123 in response to determining that each of the design element 123 and the design element 124 corresponds to the content role 147 (e.g., "Title"). The design service(s) 126, in response to determining that the design element 124 corresponds to the design element 123 and that the design element 123 has been edited, copies text information 173 of the design element information 133 to text information 173 of the design element information 128. Updating the text information 173 of the design element 124 enables the title text element (e.g., "Chloe's Quinceanera" or the design element 123) of the design 103 to in effect replace the title text element (e.g., "Hawaiian Party" or the design element 163) of the design template 113 in the design 115.

In a particular aspect, the design service(s) 126 copies text (e.g., "Chloe's Quinceanera") and format information (e.g., text color, font size, etc.) of edited design elements (e.g., indicated by the text information 173) of the design 103 to corresponding design elements (e.g., the text information 173) of the design 115. In an alternate aspect, the design service(s) 126 copies the text (e.g., "Chloe's Quinceanera") of edited design elements of the design 103 to the corresponding design elements of the design 115 and refrains from copying format information of the edited design elements of the design 103 to the corresponding design elements of the design 115. In this aspect, the copied text (e.g., "Chloe's Quinceanera") is formatted based on default format information of the design 115 (e.g., copied from the design template 113) corresponding to design element types of the design elements. For example, the format information 159 indicates first format information associated with the type 171 (e.g., a title style) of the design element 124 and the text of the design element 124 is formatted based on the first format information.

In a particular aspect, the design service(s) 126 sets the edit indicator 177 of the design element 124 to a second value (e.g., 1) to indicate that the design element 124 has been edited relative to the design template 113. In a particular aspect, the remaining fields (e.g., other than the text information 173 and the edit indicator 177) of the design element information 128 of the design element 124 are not updated based on the design element information 133 of the design element 123. For example, the title text element (e.g., the design element 124) of the design 115 is located at the same position (e.g., the position 175 indicated by the design element information 128 and the design element information 167) as the title text element of the design template 113. The design service(s) 126 updates the GUI 181 to display the design 115. In a particular aspect, the GUI 181 includes a GUI element (e.g., an image) indicating the design 103, a GUI element (e.g., a thumbnail image) indicating the design 115, or both.

Thus, FIGS. 7-8 illustrate an example where a design is automatically generated as a combination of transferred user-entered content from another design and certain design elements from a user-selected template, where the content transfer is achieved in an intuitive fashion through the use of content roles.

Returning to FIG. 6, the method 600 includes user making tweaks to text that is too long/short for the new template, at 674. In an example 804 of FIG. 8, the user 104 updates a font size of the title text element (e.g., the design element 124). In an alternative example, the design service(s) 126 perform reflow operations, as further described with reference to FIG. 61. The design service(s) 126 updates the text information 173 of the title text element (e.g., the design element

124) to indicate the updated font size. In a particular aspect, the format information indicated by the text information 173 overrides the first format information (associated with the design element type) indicated by the format information 159. For example, the format information 159 indicates default format information associated with a design element type and format information indicated by the text information 173 enables the user 104 to override the default format information for a particular design element of the design element type. To illustrate, the format information 159 includes first format information associated with the type 171 (e.g., "title" style) indicating a first font size, a first font, and a first color. The text information 173 (indicated by the design element information 128) of the title text element indicates a second font size. The title text element is styled in the GUI 181 based on the second font size, the first font, and the first color. For example, the second font size overrides the first font size. The design service(s) 126 sets the edit indicator 177 of the updated design element to a second value (e.g., 1) to indicate that the design element has been edited relative to the design template 113.

In a particular aspect, the user 104 selects a save option of the GUI 181. The design service(s) 126, in response to receiving the user input 109 indicating the selection of the save option, stores the design 115 in the document database 184, removes the design 103 from the document database 184, marks the design 103 for deletion from the document database 184, or a combination thereof. In a particular aspect, the design service(s) 126 updates usage history at a first time to indicate that the design 115 is stored or saved by the user 104 at the first time, to indicate one or more search terms used by the user 104 in an active session, or a combination thereof.

FIGS. 7-8 thus illustrate a user story 701 where the user 104 edits all the text elements of the design 103, and the design service(s) 126 generates the design 115 by applying the design template 113 to the updated design 103. For example, the design service(s) 126 applies the content signature (e.g., the design element information 131) of the updated design 103 to the design 115.

Returning to FIG. 6, the method 600 includes a user adding text to some text boxes in the placeholder template, at 624. In an example 904 of FIG. 9, the user 104 provides the user input 109 indicating an update (e.g., "Chloe's Quinceanera") to the title text element (e.g., the design element 123) and an update (e.g., "The Princess is in.") to the pre-title element (e.g., the design element 703). The remaining text elements (e.g., the design elements 705 and 707) remain unchanged. The design service(s) 126 updates the design elements 123 and 703 based on the user input and updates the design element information 131 to indicate that the design elements 123 and 703 are updated. For example, the design service(s) 126 updates the text information 173 of the design element 123 to indicate the update to the title text element and updates the edit indicator 177 of the design element 123 to indicate that the design element 123 has been edited relative to the design template 105. The edit indicator 177 of the design elements 705 and 707 indicates no edits have been made relative to the design template 105.

The method 600 also includes detecting all matching text fields and determining that some content is to transfer, at 644. For example, the design service(s) 126, in response to determining that the design template 113 matches the design 103 and that some design elements of the design elements 121 (e.g., the first comparison subset) have been edited, determines that applying the design template 113 to the design 103 is to include transferring content from the edited design elements. The method 600 proceeds to 654.

The method 600 further includes transferring only the user's text into the new template in the corresponding text fields, at 664. Otherwise text is input from the template copy. For example, the design service(s) 126 generates the design 115 by copying the design template 113 and applies the content signature (e.g., the design element information 131) of the design 103 to the design 115.

Figure 10:
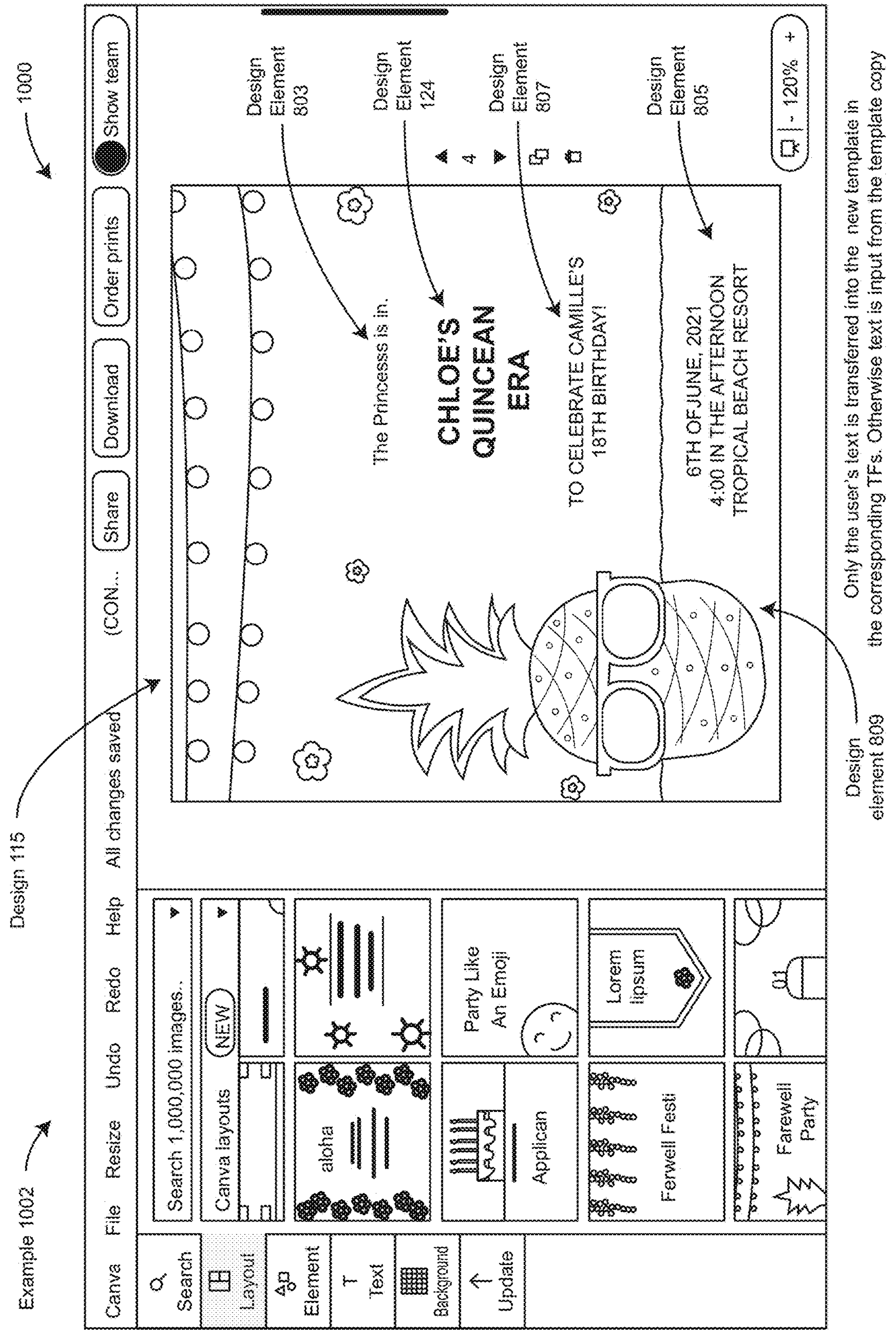
FIG. 10 illustrates particular examples of a design that may be generated by the system of FIG. 1.

In an example 1002 of FIG. 10, the design 115 includes the design elements 124, 803, 805, 807, and 809. In a particular aspect, the design element 124 indicates the text (e.g., "Chloe's Quinceanera") copied from the design element 123 (e.g., the edited design element) of the design 103 and the design element 803 includes the text (e.g., "The Princess is in.") copied from the design element 703 of the design 103. The design elements 805 and 807 that correspond to unedited text elements of the design 103 retain the text information indicated in the design template 113 and are not updated based on the design 103. Similarly, the design element 809 corresponding to unedited image element of the design 103 retains the image indicating in the design template 113 and is not updated based on the design 103. The method 600 proceeds to 674.

Figure 9:
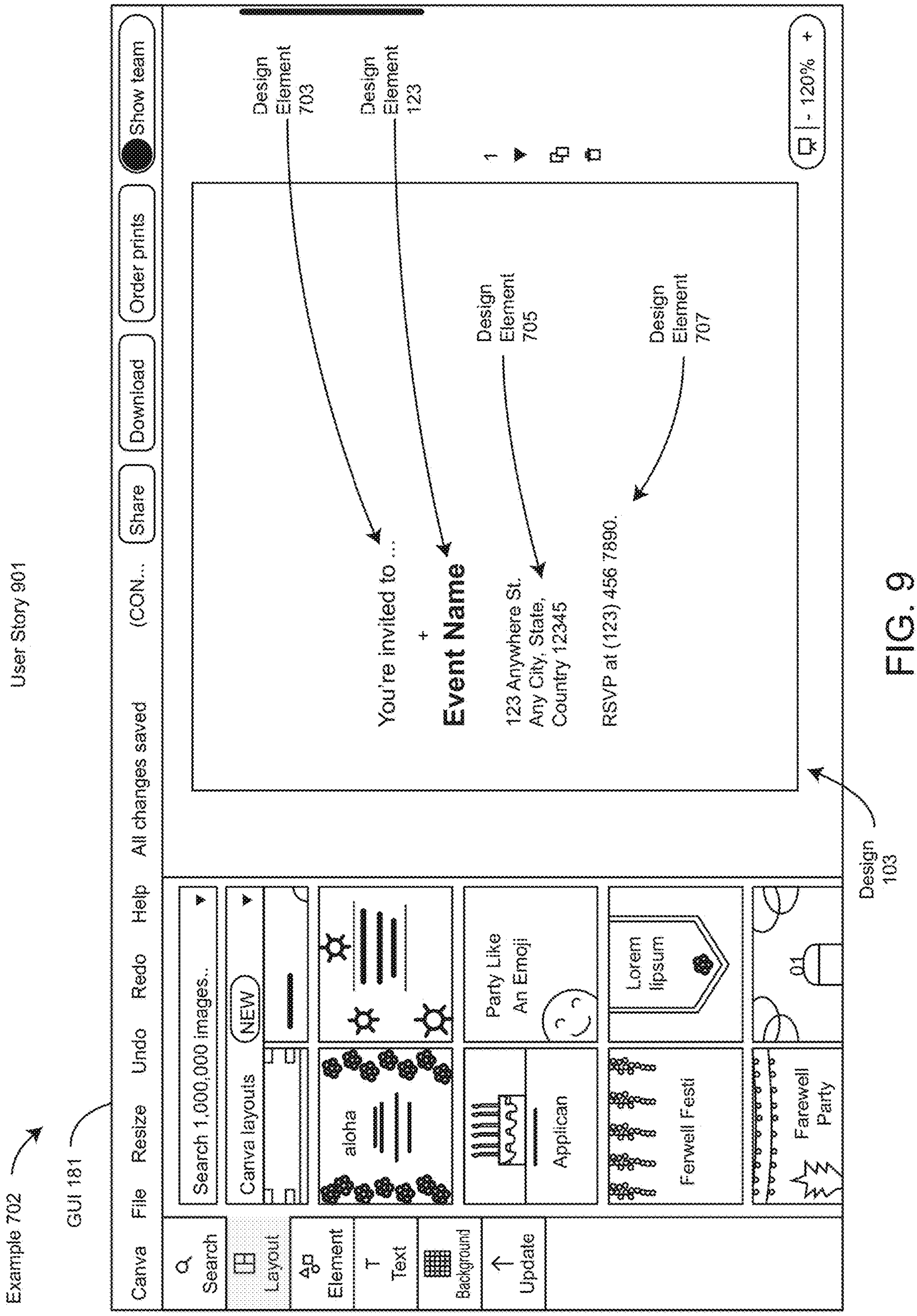
FIG. 9 illustrates particular examples of a design that may be generated by the system of FIG. 1.

FIGS. 9-10 thus illustrate a user story 901 where the user 104 edits some of the text elements of the design 103 and the design service(s) 126 generates the design 115 by applying the design template 113 to the updated design 103. For example, the design service(s) 126 applies the content signature of the updated design 103 to the design 115. The design elements 124 and 803 of the design 115 that correspond to edited text elements (e.g., the design elements 123 and 703) of the design 103 include text copied from the edited text elements. The design elements 805 and 807 of the design 115 that correspond to unedited text elements (e.g., the design elements 705 and 707) of the design 103 include text copied from corresponding text elements of the design template 113. The design element 809 of the design 115 that corresponds to an unedited image element of the design 103 includes an image copied from a corresponding image element of the design template 113.

Returning to FIG. 6, the method 600 includes a user not adding text to any text box in the placeholder template, at 626. In an example 1102 of FIG. 11, the user 104 refrains from updating the design elements 123, 703, 705, and 707 of the design 103.

The method 600 also includes detecting all matching text fields and determining that no content transfer is to occur, at 646. For example, the design service(s) 126, in response to determining that the design template 113 matches the design 103 and that none of the design elements 121 (e.g., the first comparison subset) have been edited, determines that applying the design template 113 to the design 103 does not include any content transfer from the design 103. The method 600 proceeds from 644 to 654.

The method 600 further includes no content transfer occurring and applying of template as is, at 665. For example, the design service(s) 126, in response to determining that applying the design template 113 to the design 103 does not include any content transfer from the design 103, generates the design 115 by copying the design template 113 and refrains from applying the content signature of the design 103 to the design 115.

Figure 11:
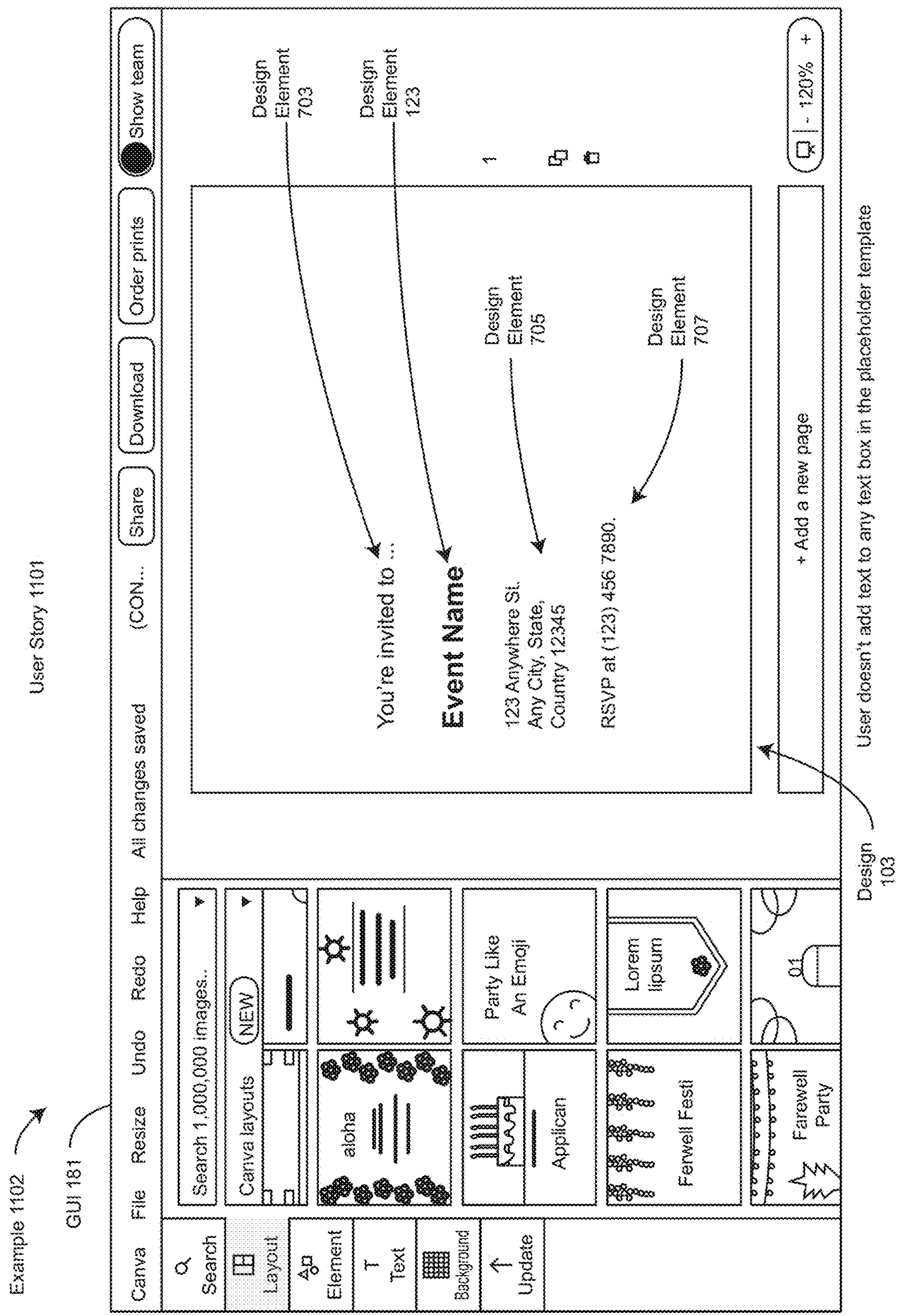
FIG. 11 illustrates particular examples of designs that may be generated by the system of FIG. 1.

In an example 1104 of FIG. 11, the design 115 includes the design elements 124, 803, 805, 807, and 809. The design elements 124, 803, 805, 807, and 809 correspond to the design elements 161 of the design template 113. For example, the design elements 124, 803, 805, 807, and 809 are generated by copying the design elements 161 and are not updated based on the design 103. The method 600 proceeds to 674.

FIG. 11 thus illustrates a user story 1101 where the user 104 does not edit any text elements of the design 103. The design service(s) 126 generates the design 115 by copying the design template 113 without applying a content signature of the design 103 to the design 115.

The method 600 includes a user adding a new text box with a default content role to their design, at 628. In an example 1202 of FIG. 12, the user 104 uses the GUI 181 to add a text element (e.g., a design element 1211) to the design 103. The user 104 provides the user input 109 indicating a selection of a default content role 1279 (e.g., "none") for the design element 1211. The design service(s) 126 adds the design element 1211 to the design 103. The design service(s) 126 updates the design element information 131 to indicate design element information of the design element 1211. For example, the design service(s) 126 sets the type 171 and the content role 179 of the design element 1211 to indicate a text element and the default content role 1279 (e.g., "none"), respectively. The design service(s) 126 updates the text information 173 of the design element 1211 to indicate text of the text element (e.g., the design element 1211). In a particular aspect, the text (e.g., "Add a little bit of body text") is based on user input, default text associated with the default content role 1279, or both. In a particular aspect, the design service(s) 126 updates the text information 173 of the design element 1211 to indicate format information of the text element (e.g., the design element 1211). In a particular aspect, the design service(s) 126 updates the edit indicator 177 of the design element 1211 to indicate that the design element 1211 has been edited (e.g., added) relative to the design template 105.

The method 600 also includes detecting some matching text fields and determining that new content is to transfer, at 648. For example, the design service(s) 126 determines that at least some of the design elements 161 of the design template 113 match at least some of the design elements 121 of the design 103. The design service(s) 126, in response to determining that at least one of the design elements 121 of the design 103 does not match any of the design elements 161 of the design template 113 and that the unmatched design element(s) are edited relative to the design template 105, determines that applying the design template 113 to the design 103 is to include transferring content of the unmatched design element(s). For example, in cases where the unmatched design element was included in the design template 105 and is not edited, the unmatched design element is not to be transferred when the design template 113 is applied to the design 103. In cases where the unmatched design element (e.g., added by the user 104 or included in the design template 105) is edited, the unmatched and edited design element is to be transferred when the design template 113 is applied to the design 103. The method 600 continues to 654.

The method 600 further includes transferring all matching text fields into the new template and styling the new default text box in the same theme as the new template, at 668. For example, the design service(s) 126 applies the content signature of the design 103 to the design 115. Applying the content signature includes identifying design elements of the design 115 that correspond to edited design elements of the design 103, updating the identified design elements of the design 115 based on the corresponding edited design elements of the design 103, identifying unmatched design elements of the design 103 that are edited, and adding design elements to the design 115 based on the identified unmatched and edited design elements of the design 103.

Figure 13:
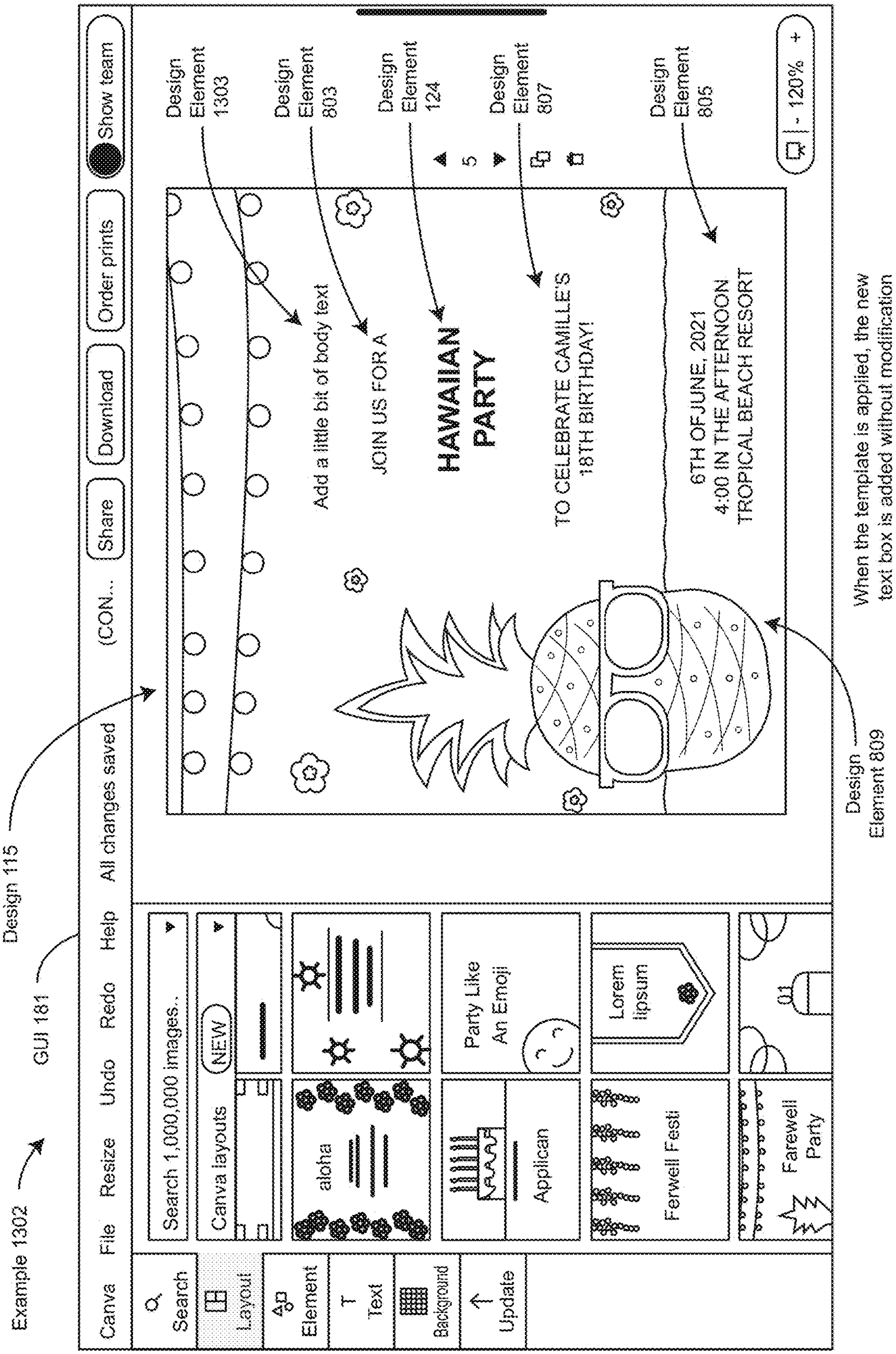
FIG. 13 illustrates another particular example of a design that may be generated by the system of FIG. 1.

In an example 1302 of FIG. 13, the design 115 includes a design element 1303 and the design elements 124, 803, 805, 807, and 809. The design elements 124, 803, 805, 807, and 809 correspond to the design elements 161 of the design template 113. The design element 1303 corresponds to the design element 1211 of the design 103. In a particular aspect, the design element 1303 is formatted based on the format information 159 of the design 115 (and the design template 113). For example, the format information 159 indicates first format information corresponding to the type 171 (e.g., a default style) of the design element 1303 and the design element 1303 is formatted based on the first format information. In an alternative aspect, the design element 1303 is styled based on second format information indicated by the text information 173 of the design element 1303 (e.g., copied from the text information 173 of the design element 1211). In a particular example, the design element 1303 is styled (e.g., formatted) based on the first format information, the second format information, or a combination thereof. The method 600 proceeds to 674.

Figure 12:
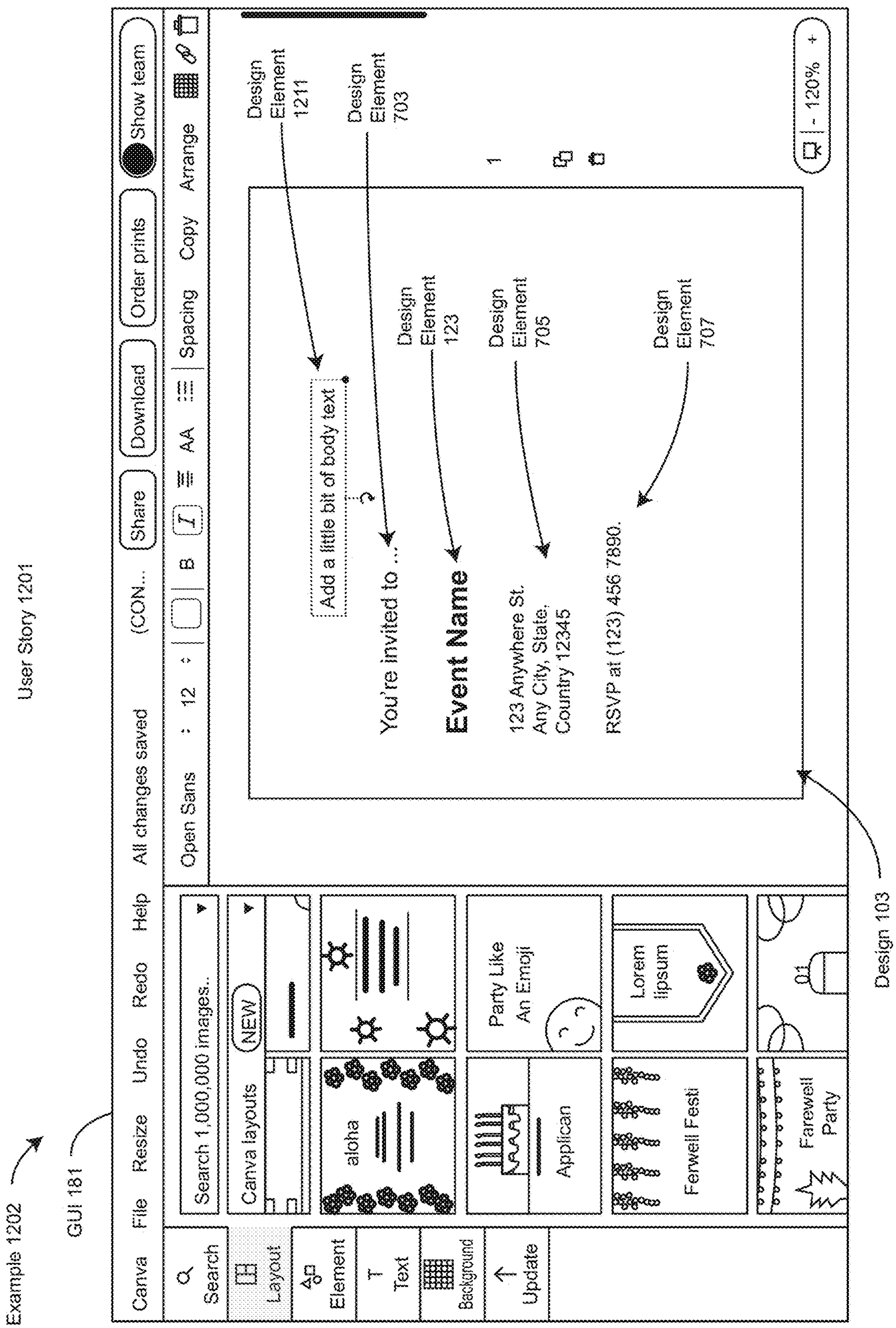
FIG. 12 illustrates another particular example of a design that may be generated by the system of FIG. 1.

FIGS. 12-13 thus illustrate a user story 1201 where a user adds a text element with a default content role to the design 103 and the design service(s) 126 adds a copy of the text element to the design 115. The copy of the text element is formatted based format information of the design template 113.

Returning to FIG. 6, the method 600 includes a user adding a new text box with a content role to their design, at 630. Example 1402 of FIG. 14 differs from the example 1202 of FIG. 12 in that the user 104 provides the user input 109 indicating a selection of the content role 147 (e.g., "Title") for an added text element (e.g., a design element 1411). The design service(s) 126 updates the content role 179 of the design element information of the design element 1411 to indicate the content role 147 (e.g., "Title").

The method 600 also includes detecting some matching text fields and determining that new content is to transfer, at 648. For example, the design service(s) 126, in response to determining that at least one of the design elements 121 of the design 103 does not match any of the design elements 161 of the design template 113 and that the unmatched design element(s) are edited relative to the design template 105, determines that applying the design template 113 to the design 103 is to include transferring content of the unmatched and edited design element(s). The method 600 continues to 654.

The method 600 further includes transferring all matching text fields into the new template and styling the new text box in the same theme as the new template, at 640. For example, the design service(s) 126 identifies design elements of the design 115 that correspond to edited design elements of the design 103, updates the identified design elements of the design 115 based on the corresponding edited design elements of the design 103, and adds design elements to the design 115 based on unmatched and edited design elements of the design 103.

Figure 15:
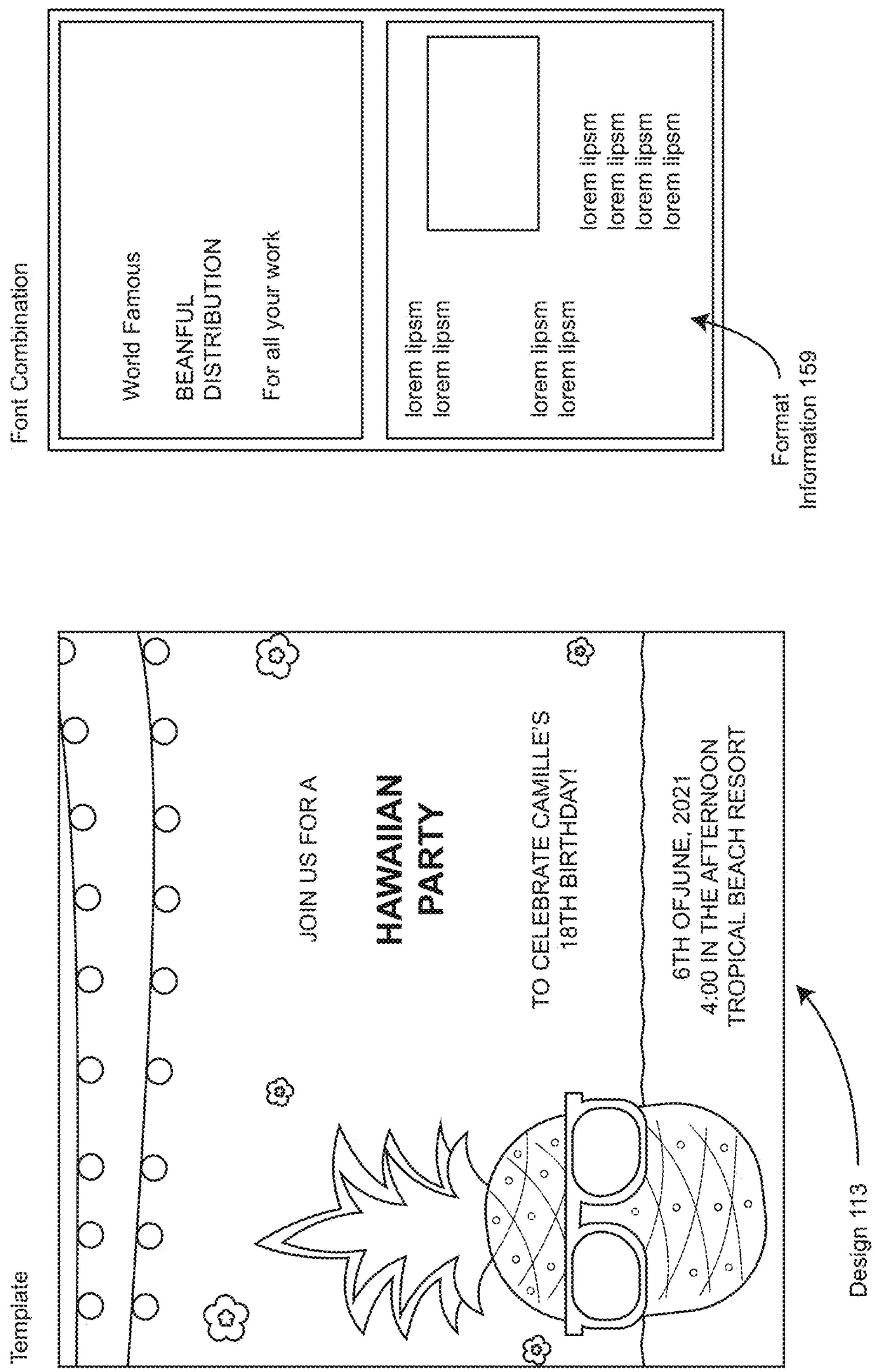
FIG. 15 illustrates particular examples of a design template and a design that may be generated by the system of FIG. 1.

In an example 1502 of FIG. 15, the design 115 includes a design element 1503 and the design elements 124, 803, 805, 807, and 809. The design elements 124, 803, 805, 807, and 809 correspond to the design elements 161 of the design template 113. The design element 1503 corresponds to the design element 1411 of the design 103. For example, the design element 1503 includes text that was included in the design element 1411.

In a particular aspect, the design element 1503 is formatted based on the format information 159 of the design 115 (and the design template 113). For example, the format information 159 indicates first format information corresponding to the type 171 (e.g., "Title" style) and the design element 1503 is styled based on the first format information. In an alternative aspect, the design element 1503 is formatted based on second format information of the added text element (e.g., the design element 1411). For example, the design element 1503 is formatted based on the second format information indicated by the text information 173 of the design element 1503 (e.g., copied from the text information 173 of the design element 1411).

In a particular example, the design element 1503 is formatted based on the first format information and the second format information. For example, the design element 1503 is formatted based on a text color indicated by the second format information (e.g., corresponding to the added text element) and based on a font type and a font size indicated by the first format information (e.g., specified by the design template 113). The method 600 proceeds to 674.

Figure 14:
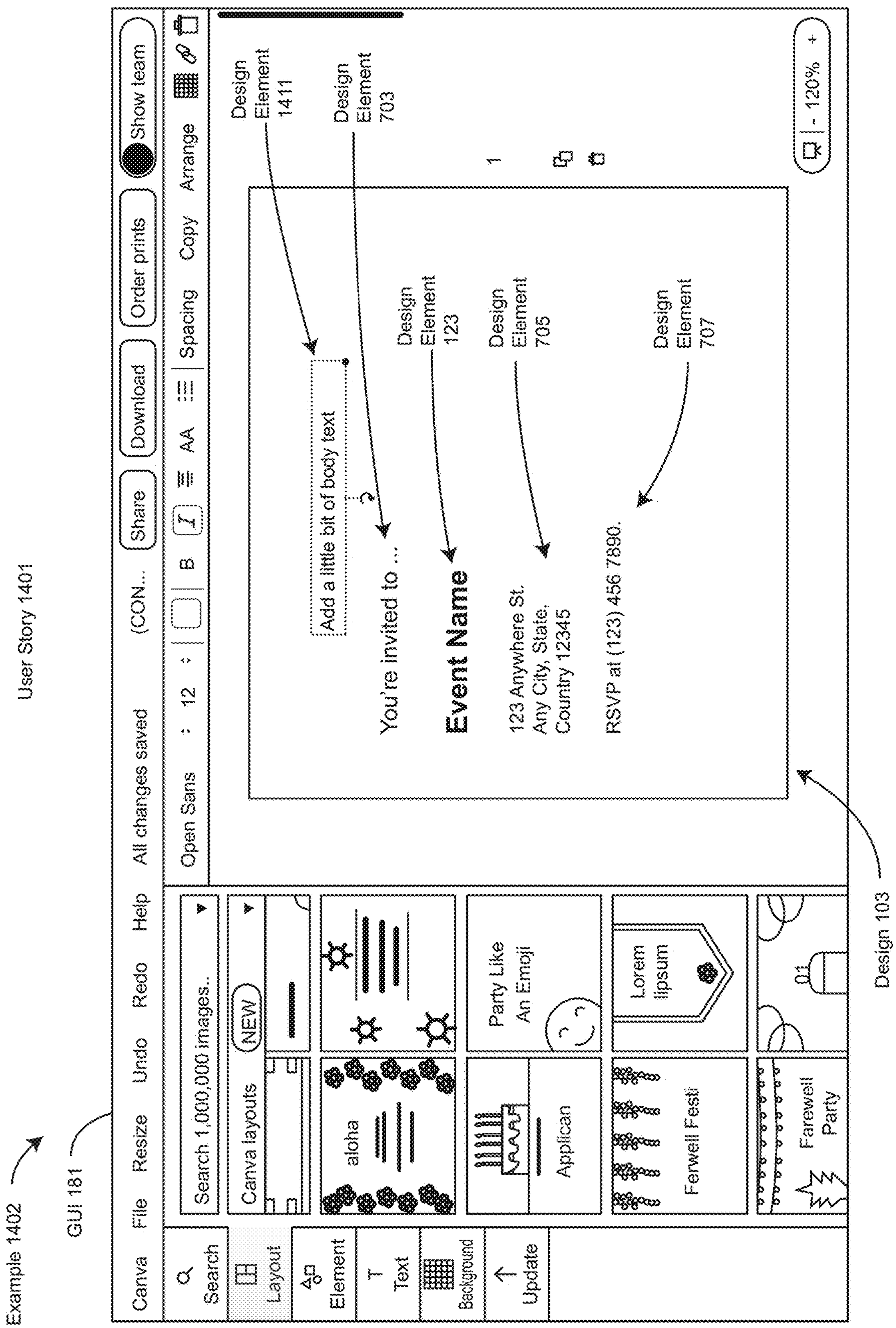
FIG. 14 illustrates another particular example of a design that may be generated by the system of FIG. 1.

FIGS. 14-15 thus illustrate a user story 1401 where a user adds a text element with a particular content role to the design 103 and the design service(s) 126 adds a copy of the text element to the design 115. The copy of the text element is formatted based format information of the design template 113, format information of the text element, or both.

Returning to FIG. 6, the method 600 includes a user deleting a text box from the placeholder template, at 632. In an example 1602 of FIG. 16, the user 104 provides the user input 109 indicating that the design element 703 is to be deleted from the design 103. The design service(s) 126, in response to receiving the user input 109, removes the design element 703 from the design 103. In an example 1604 of FIG. 16, the design 103 includes the design elements 123, 705, and 707, and does not include the design element 703.

The method 600 also includes detecting some matching text fields and determining that some content is to transfer, at 652. For example, the design service(s) 126, in response to determining that at least some of the design elements 121 of the design 103 are edited relative to the design template 105, determines that applying the design template 113 to the design 103 is to include transferring content of the edited design element(s). In cases where an edited design element of the design 103 matches a corresponding design element of the design 115, the corresponding design element is updated based on the edited design element. In cases where an edited design element of the design 103 does not match any corresponding design element of the design 115, a corresponding design element is added to the design 115 based on the edited design element. In cases where none of the design elements 121 of the design 103 are edited, no content transfer is to occur. In a particular aspect, a deleted design element of the design elements 121 is considered an edited design element. For example, the design service(s) 126, in response to determining that the deleted design element of the design 103 corresponds to a design element of the design 115, removes the corresponding design element from the design 115. In an alternate aspect, a deleted design element of the design elements 121 is not considered an edited design element. For example, the design service(s) 126 refrains from removing a design element of the design 115 that corresponds to a deleted design element of the design 103. The method 600 continues to 654.

The method 600 further includes transferring all matching text fields into the new template, at 672. The missing text box is still added to the page when the new template is applied. For example, the design service(s) 126 identifies design elements of the design 115 that correspond to edited design elements of the design 103, updates the identified design elements of the design 115 based on the corresponding edited design elements of the design 103, and adds design elements to the design 115 based on unmatched and edited design elements of the design 103. In a particular example, the design service(s) 126 generates the design 115 by copying the design template 113. The design service(s) 126, in response to determining that the design 103 does not include any edited design elements, refrains from updating the design 115 based on the design 103. In a particular aspect, the design element 703 that is deleted from the design 103 is not considered an edited design element, the design template 113 includes a first design element that corresponds to the design element 703, and the design service(s) 126 adds the design element 803 to the design 115 by copying the first design element. In a particular aspect, the design service(s) 126 refrains from removing the design element 803 corresponding to the design element (e.g., the design element 703) that was deleted from the design 103.

Figure 17:
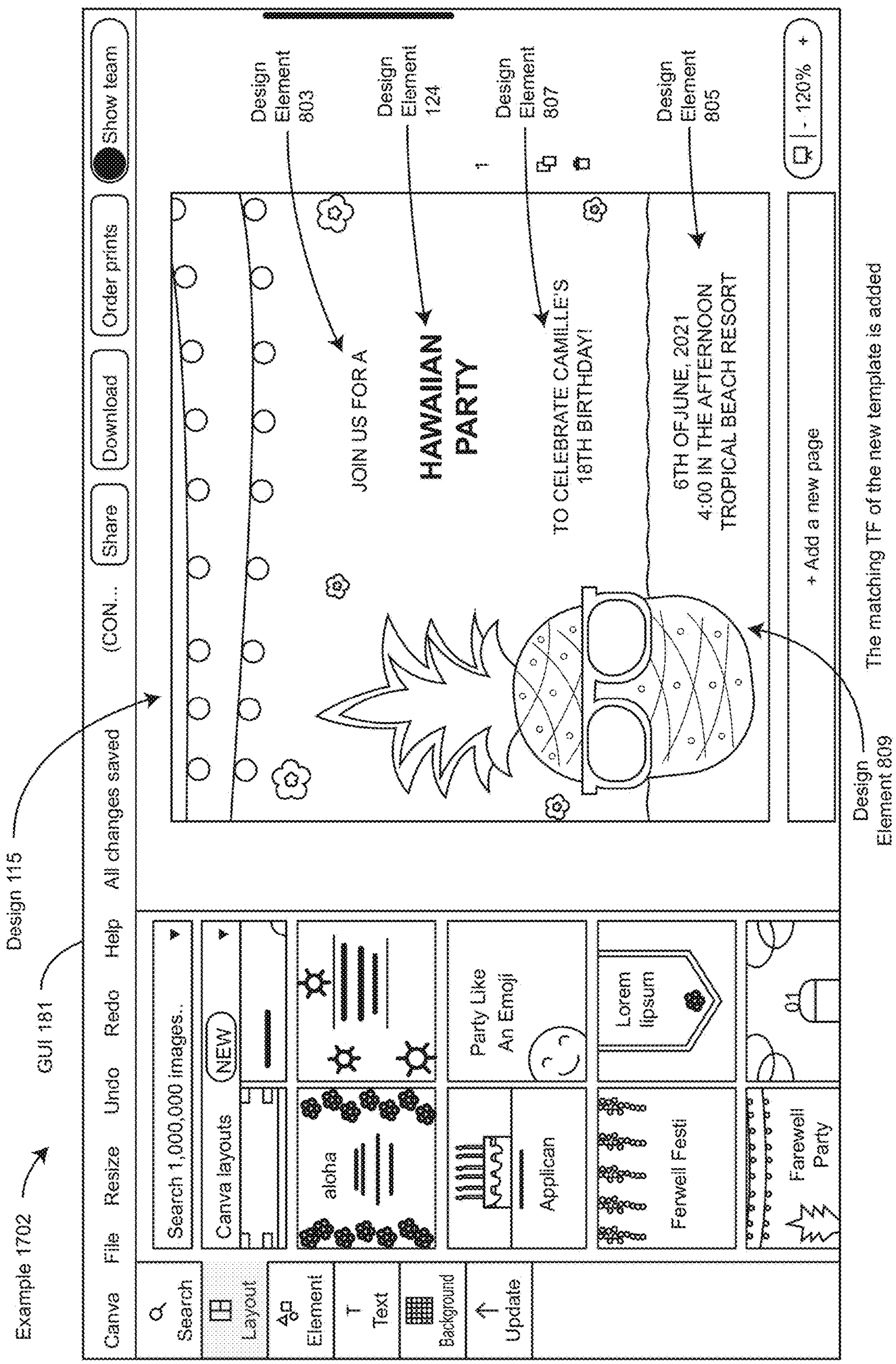
FIG. 17 illustrates particular examples of a design that may be generated by the system of FIG. 1.

In an example 1702 of FIG. 17, the design 115 includes the design elements 124, 803, 805, 807, and 809. The design elements 124, 803, 805, 807, and 809 correspond to the design elements 161 of the design template 113. For example, the design 115 includes the design element 803 although the corresponding design element 703 was deleted from the design 103.

In an example 1704 of FIG. 17, the user 104 provides the user input 109 indicating that the design element 803 is to be removed from the design 115. The design service(s) 126, in response to receiving the user input 109 removes the design element 803 from the design elements 191 of the design 115.

In a particular aspect, the design service(s) 126 removes the design element 803 from the design 115 in response to determining that the corresponding design element (e.g., the design element 703) was deleted from the design 103. For example, in this aspect, the design service(s) 126 tracks in the design element information 133 of the design element 703 that the design element 703 is generated from the design template 105 (e.g., by copying a design element of the design template 105). The design service(s) 126, in response to receiving the user input 109 indicating that the design element 703 is to be removed from the design 103, updates the design element information 133 to indicate that the design element 703 that was generated from the design template 105 has been deleted. The design service(s) 126, in response to determining that the design element 703 that was generated from the design template 105 has been deleted, refrains from adding the design element 803 to the design 115 or removes the design element 803 from the design 115.

Figure 16:
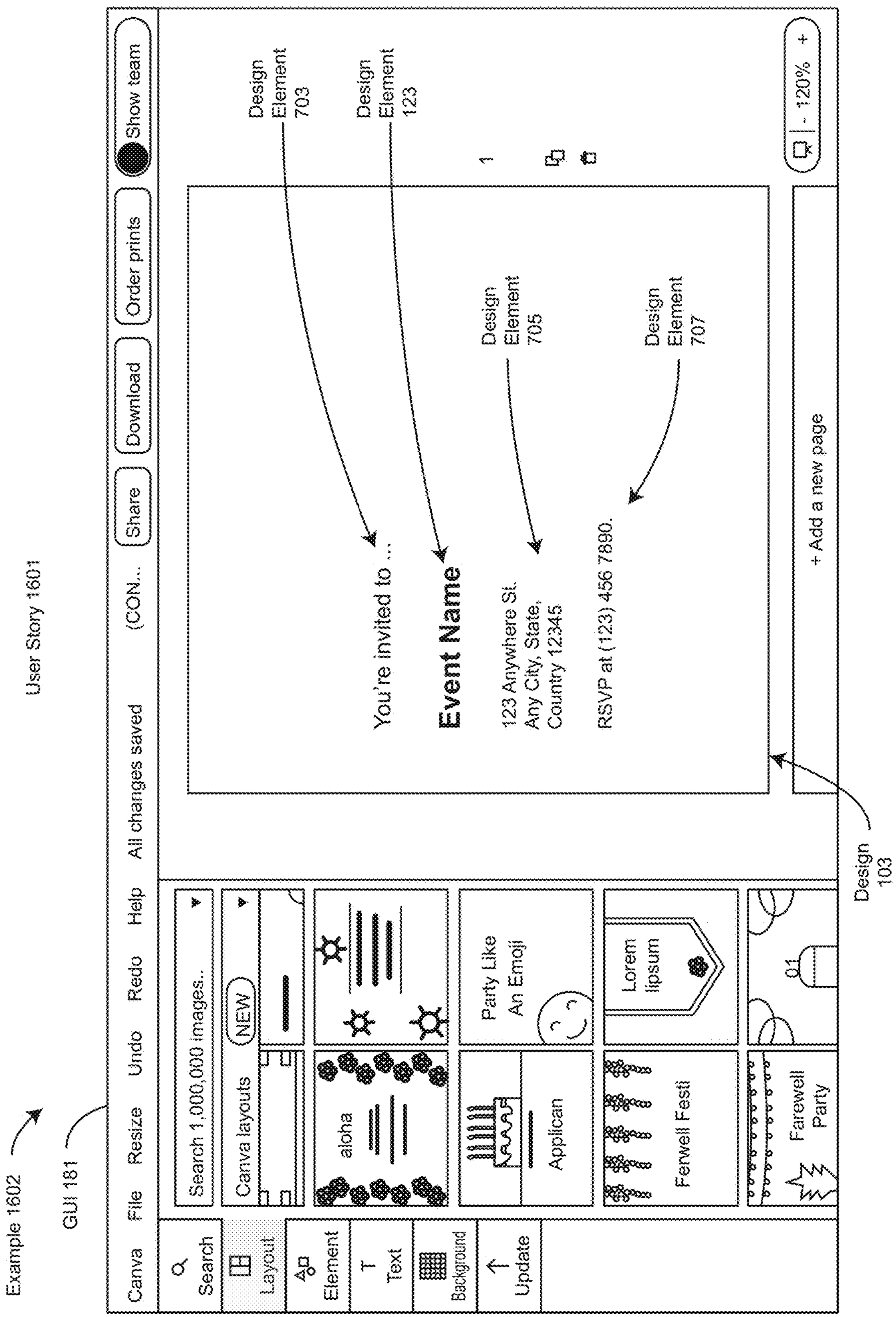
FIG. 16 illustrates particular examples of a design that may be generated by the system of FIG. 1.

FIGS. 16-17 thus illustrate a user story 1601 where a user removes a text element from the design 103 and the design service(s) 126 applies the design template 113 that includes a corresponding text element. In the user story 1601, the design service(s) 126 keeps the corresponding text element in the design 115. In other implementations, the design service(s) 126 removes the corresponding text element from the design 115.

Returning to FIG. 6, the method 600 includes a user clicking to open an existing single-page design, at 606. For example, the user 104 selects an option of the GUI 181 to open the design 103.

The method 600 also includes loading the existing design on a page, at 608. For example, the design service(s) 126 updates the GUI 181 to display the design 103. The design service(s) 126, in response to detecting one or more of the conditions 640, performs, based on one or more of the behaviors 660, content transfer to apply the design template 113 to the design 103, as described herein.

The method 600 includes a user clicking "Use this template" from a/templates page, at 610. For example, the user 104 selects an option of the GUI 181 to open the design template 105.

The method 600 also includes loading a remix of the template, at 612. For example, the design service(s) 126 updates the GUI 181 to display the design template 105. In a particular aspect, the design service(s) 126 generates the design 103 based on the design template 105 and updates the GUI 181 to display the design 103. The design service(s) 126, in response to detecting one or more of the conditions 640, performs, based on one or more of the behaviors 660, content transfer to apply the design template 113 to the design 103, as described herein.

The method 600 thus enables automatic transfer of user-provided content to design templates. The automatic transfer of user-provided content may enable faster design processes and a more intuitive user experience. For example, the user may efficiently apply various design templates to an edited design without having to repetitively provide the same edits each time a design template is applied. The user can compare the results of applying the various design templates and choose a particular design template based on the comparison.

Figure 18:
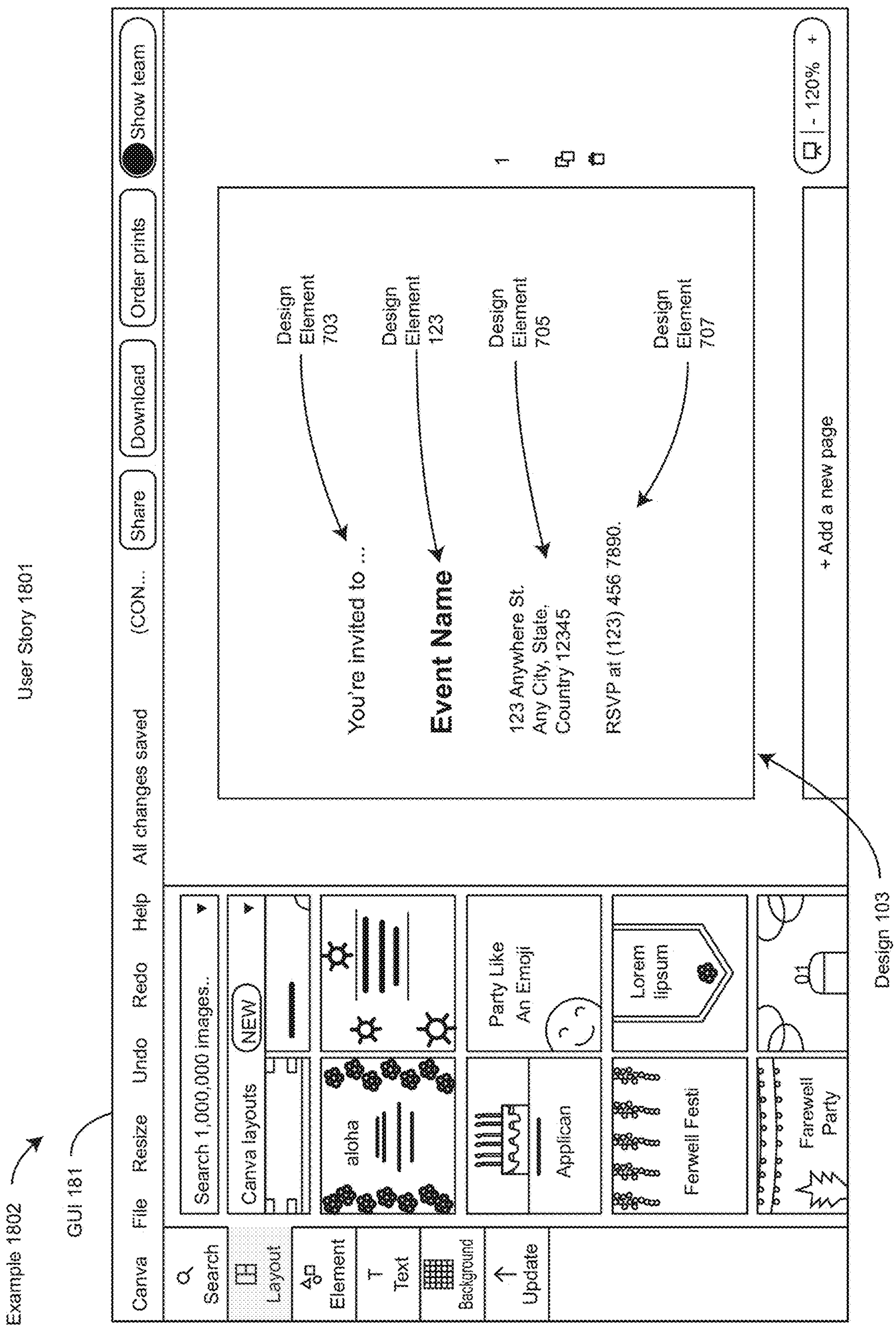
FIG. 18 illustrates particular examples of a design that may be generated by the system of FIG. 1.
Figure 19:
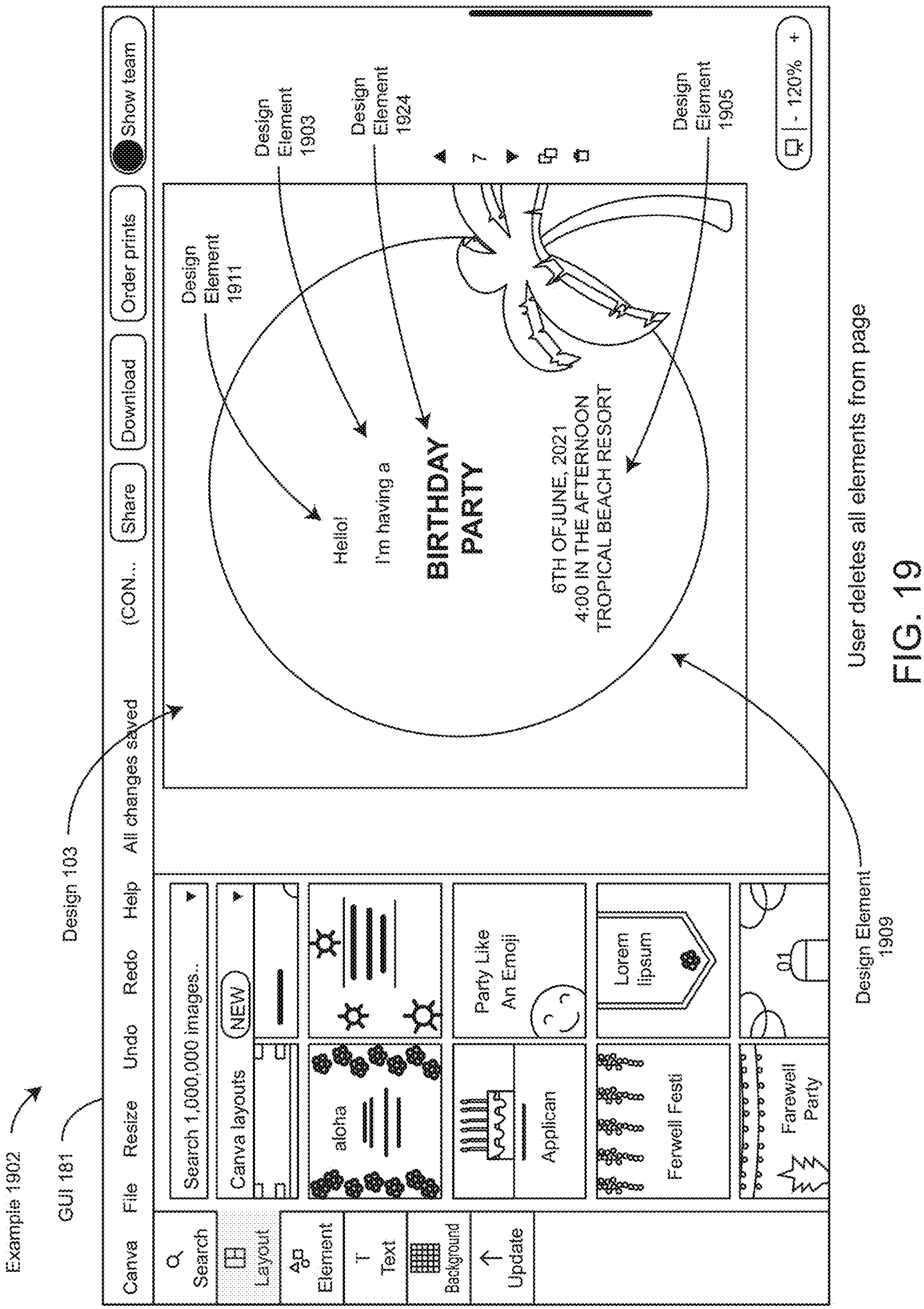
FIG. 19 illustrates a particular example of a design that may be generated by the system of FIG. 1.
Figure 20:
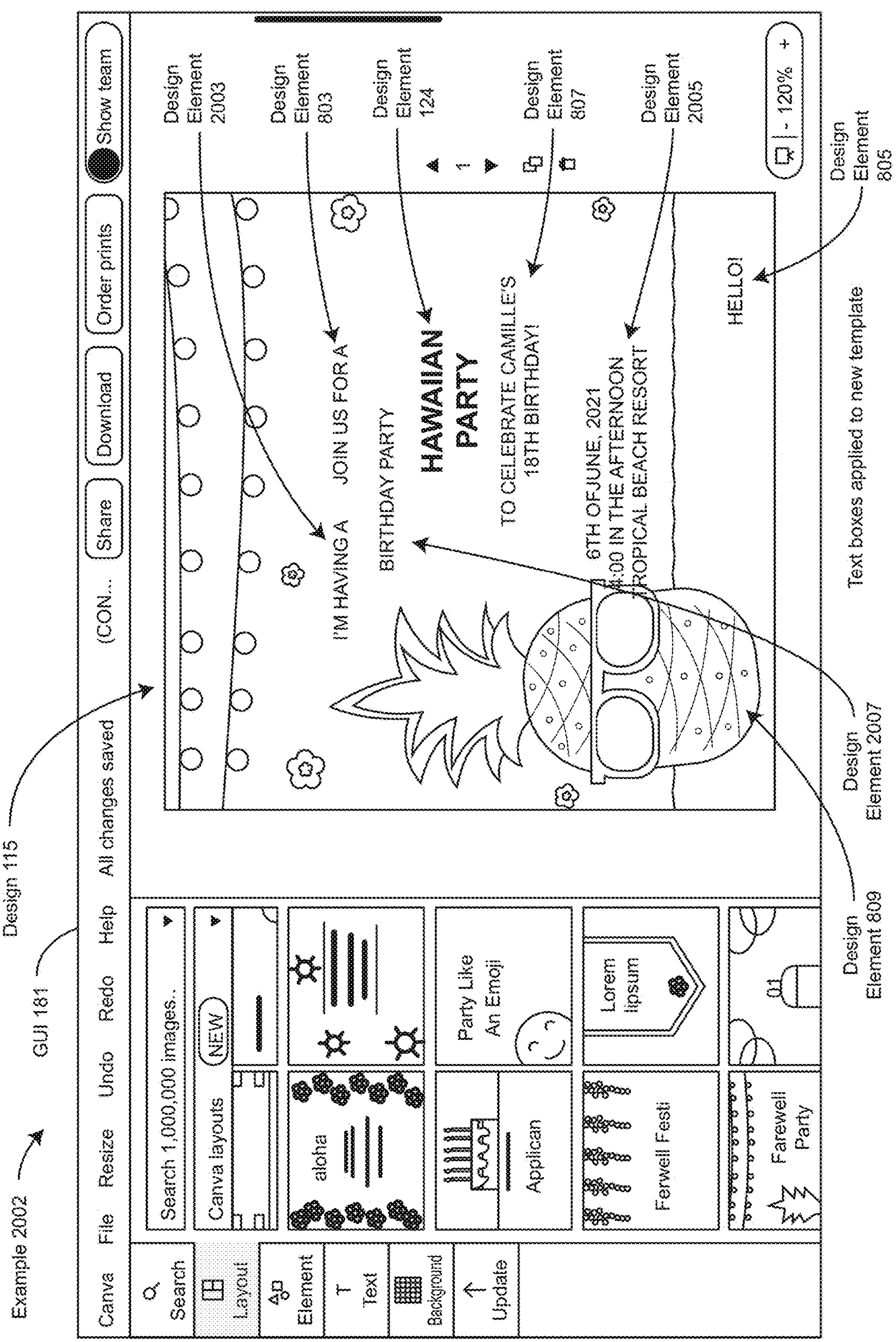
FIG. 20 illustrates a particular example of a design that may be generated by the system of FIG. 1.

FIGS. 18-20 illustrate a user story 1801 where a user removes all design elements from the design 103 and adds design elements having the default content role 1279 to the design 103. The design service(s) 126 applies the design template 113 to the design 103. In an example 1802 of FIG. 18, the design 103 includes the design elements 123, 703, 705, and 707 corresponding to the design elements 141 of the design template 105. In an example 1804 of FIG. 18, the user 104 deletes the design elements 123, 703, 705, and 707 from the design 103. It should be understood that a user performing an operation includes the design service(s) 126 performing the operation in response to receiving the user input 109.

In an example 1902 of FIG. 19, the user 104 adds an image element (e.g., a design element 1909), a first text element (e.g., a design element 1903), a second text element (e.g., a design element 1905), a third text element (e.g., a design element 1911), and a fourth text element (e.g., a design element 1924) to the design 103. The user 104 assigns the default content role 1279 (e.g., "none") to each of the design elements 1903, 1905, 1911, and 1924. In a particular aspect, the design service(s) 126, in response to determining the default content role 1279 is assigned to multiple design elements of the design 103, updates the GUI 181 to provide information to the user 104 regarding benefits of assigning content roles to design elements. The design service(s) 126 updates the text information 173 of each of the design elements 1903, 1905, 1911, and 1924 to indicate text and font information of the design element (e.g., the text element).

The design service(s) 126 generates the design 115 by applying the design template 113 to the design 103. In an example 2002 of FIG. 20, the design 115 includes the design elements 124, 803, 805, 807, and 809. For example, the design service(s) 126 generates the design 115 to include the design elements 124, 803, 805, 807, and 809 by copying the design elements 161 of the design template 113.

The design service(s) 126 applies a content signature of the design 103 to the design 115. In a particular aspect, the design service(s) 126 determines that the design element 805 has the same content role (e.g., the default content role 1279) as each of the design elements 1903, 1905, 1911, and 1924 of the design 103. The design service(s) 126 selects the design element 1911 in response to determining that the design element 1911 has a highest vertical position among the design elements 1903, 1905, 1911, and 1924 in the design 103. The design service(s) 126 designates the design element 1911 as corresponding to the design element 805. The design service(s) 126 updates the design element 805 based on the design element 1911.

In a particular aspect, the design service(s) 126, in response to determining that the design element 1909 includes an image element, refrains from updating the design element 809 based on the design element 1909. In an alternative aspect, the design service(s) 126, in response to determining that the design element 1909 matches the design element 809 and has been edited relative to the design template 105, updates the design element 809 based on the design element 1909. For example, the design service(s) 126 updates the design element 809 to include an image included in the design element 1909 (e.g., a background image with a sun and a palm tree).

The design service(s) 126 adds a design element 2003, a design element 2005, and a design element 2007 to the design 115. For example, the design service(s) 126, in response to determining that none of the remaining design elements of the design 115 match the design elements 1903, 1905, and 1924, generates the design elements 2003, 2005, and 2007 corresponding to the design elements 1903, 1905, and 1924, respectively. The design service(s) 126 generates the design element information for the design elements 2003, 2005, and 2007 based on the design element information of the design elements 1903, 1905, and 1924, respectively. Each of the design elements 2003, 2005, and 2007 is formatted based on first format information of the corresponding text element added to the design 103, second format information associated with a default style in the design template 113, or both. For example, the design element 2003 is formatted to have a first text color indicated by the first format information and a first font size indicated by the second format information. If content roles are not assigned to design elements added to the design 103, applying a design template may generate a design with default design elements of the design template and the added design elements. For example, content transfer may not occur between the added design elements and the default design elements.

In a particular aspect, the design service(s) 126 predicts content roles by analyzing design elements that do not have an assigned content role (or are assigned the default content role 1279). The design service(s) 126 generates or has access to a content role model 195. The content role model 195 includes a trained machine learning model, such as an artificial neural network. For example, the design service(s) 126 uses machine learning techniques to train the content role model 195 based on test design templates 197. The content role model 195 is trained to identify (e.g., predict) content roles of design elements of the test design templates 197. To illustrate, the design service(s) 126 extracts features of a design element of a test design template, the content role model 195 is used to predict a content role corresponding to the features, and the predicted content role is compared to an actual content role of the design elements. If the predicted content role differs from the actual content role, the content role model 195 is updated (trained) to improve a likelihood of the content role model 195 predicting the actual content role for the features. In a particular implementation, the content role model 195 is trained by updating weights assigned to one or more of the features. In a particular aspect, the design service(s) 126 generates and trains the content role model 195 offline, such as during a setup phase or a configuration phase.

In a particular aspect, the design service(s) 126, in response to determining that a design element is not assigned a content role (or is assigned the default content role 1279), performs analysis of the design element to determine a content role for the design element. For example, the design service(s) 126 extracts features of the design element 1924 and determines a predicted content role by applying the content role model 195 to the features. The design service(s) assigns the predicted content role (e.g., the content role 147) to the design element 1924.

The features of the design element 1924 include at least one of a rank 183, a position 175, a width, a height, a text-transform attribute, a count of text words, a count of text lines, a count of common element words and template description, a count of page elements with the same font size, a count of page elements with the same font type (e.g., font face), a count of page elements (e.g., element count), or an element group membership indicator.

The rank 183 of the design element 1924 includes a relative position (e.g., a position rank), a relative font size, a relative width, a relative height of the design element 1924, or a combination thereof. For example, the relative position indicates the position 175 of the design element 1924 relative to the positions of the design elements 1903, 1905, and 1911 (e.g., middle, third, or both) in a page of the design 103. In a particular aspect, the relative position indicates the position 175 relative to a design element with a particular format (e.g., largest font size).

The relative font size of the design element 1924 indicates its font size relative to the font sizes of other design elements in the page of the design 103. The relative width of the design element 1924 indicates its width relative to the width of other design elements in the page of the design 103. The relative height of the design element 1924 indicates its height relative to the height of other design elements in the page of the design 103. In a particular aspect, the width of the design element 1924 includes a width of a bounding box of the design element 1924. In a particular aspect, a height of the design element 1924 includes a height of a bounding box of the design element 1924.

Bounding box information 185 of the design element 1924 indicates the width of the design element 1924, the height of the design element 1924, the width of the bounding box, the height of the bounding box, or a combination thereof. In cases where a design element (e.g., the design element 1924) includes a text element, a "bounding box" of the design element refers to a rectangle representing a full extent of text of the text element. In cases where a design element includes an image element, a "bounding box" of the design element refers to a rectangle representing a full extent of an image of the image element.

The text information 173 of the design element 1924 indicates the text-transform attribute (e.g., underline, bold, italics, lower case, all caps, bold, or a combination thereof) of the design element 1924, a count of words of text of the design element 1924, a count of lines of the text of the design element 1924, or combination thereof.

The count of common element words and template description indicates a count of words that are included in each of the text of the design element 1924 and a description of the design template 105. The count of page elements with font size of the design element 1924 indicates a count (e.g., 0) of other design elements in the design page that have the same font size as the font size of the design element 1924. The count of page elements with font type of the design element 1924 indicates a count of other design elements in the design page that have the same font type as the font type of the design element 1924. The count of page elements indicates a count of design elements (or text elements) in the design page.

The element group membership indicator indicates whether the design element 1924 is included in a group of design elements in the design page. In cases where the design element 1924 is not grouped with other design elements in the design 103, a group identifier 169 of the design element 1924 has a first value (e.g., −1) indicating that the design element 1924 is not a member of a group. In cases where the design element 1924 is included in a particular group of the design elements 121 in the design 103, the group identifier 169 of the design element 1924 indicates an identifier of the particular group.

Figure 21:
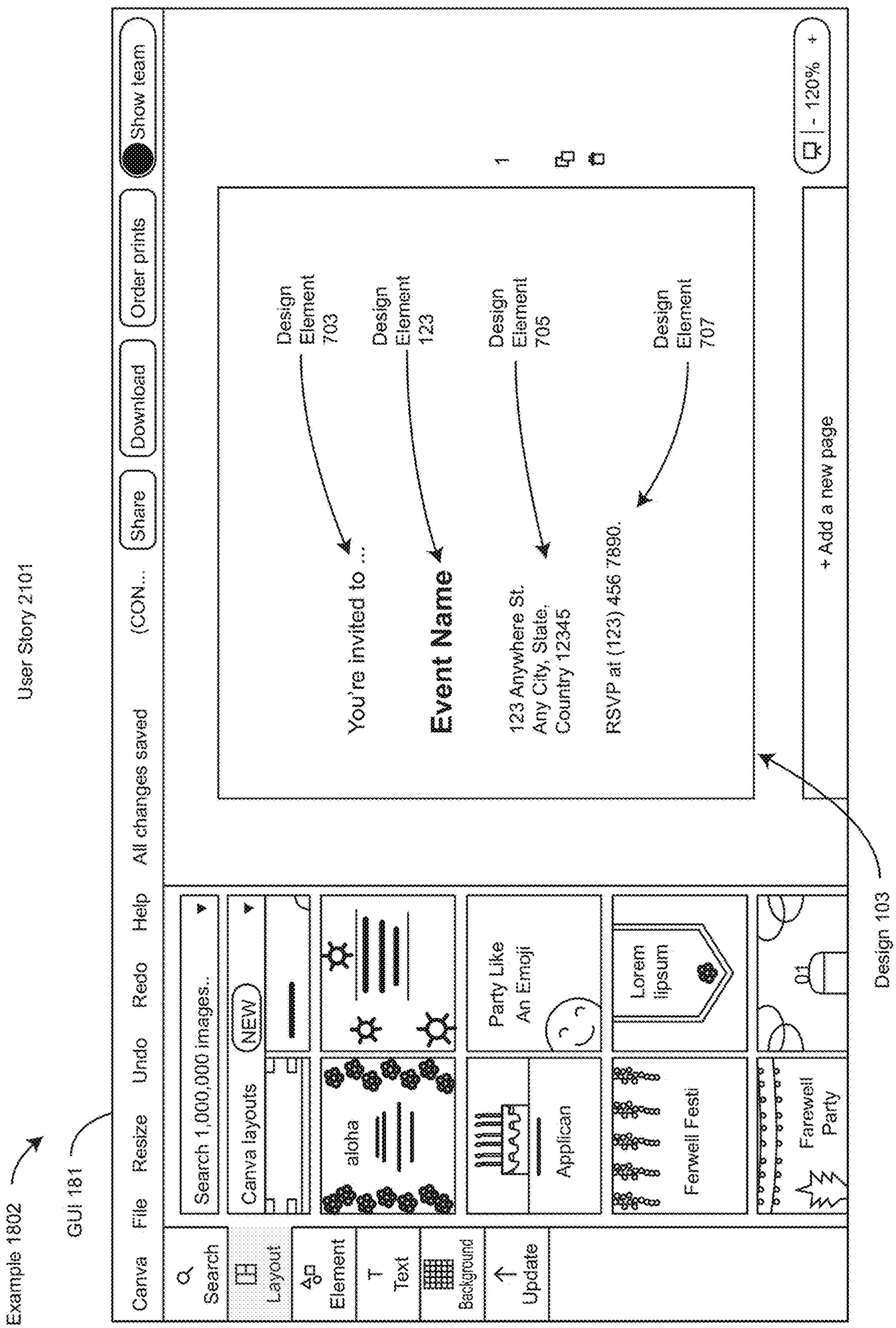
FIG. 21 illustrates particular examples of a design that may be generated by the system of FIG. 1.
Figure 22:
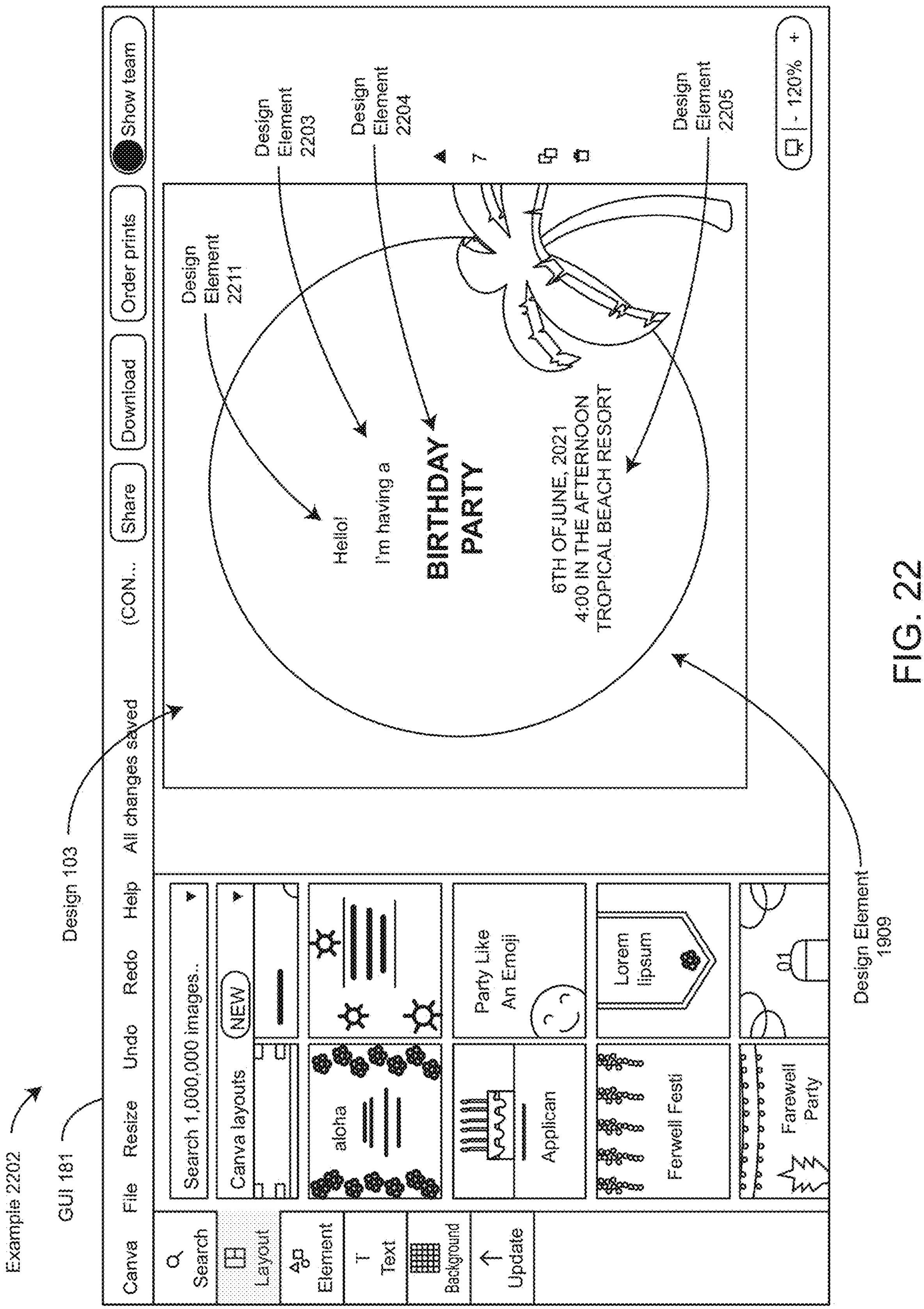
FIG. 22 illustrates a particular example of a design that may be generated by the system of FIG. 1.
Figure 23:
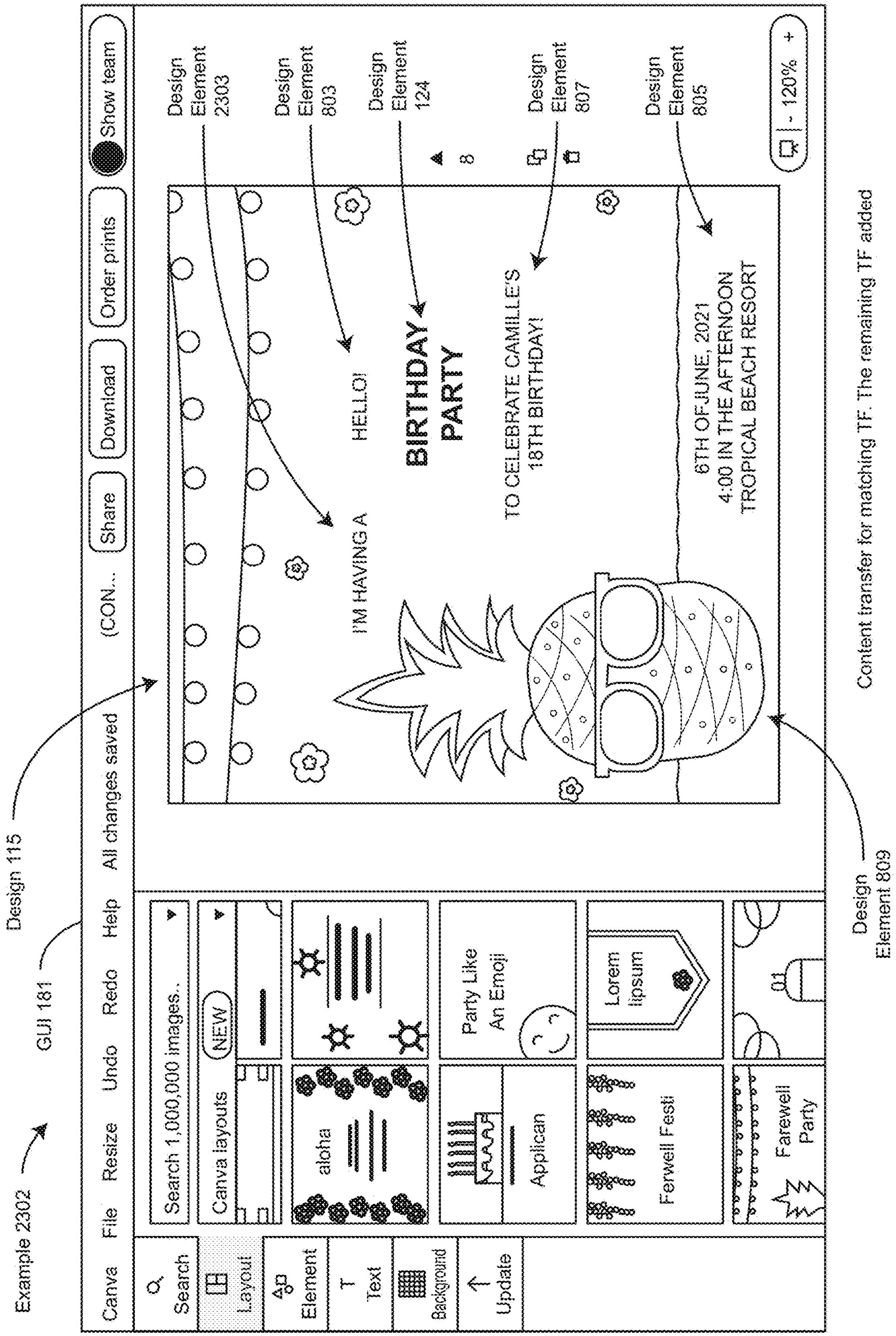
FIG. 23 illustrates a particular example of a design that may be generated by the system of FIG. 1.

FIGS. 21-23 illustrate a user story 2101 where a user removes all design elements from the design 103 and adds design elements having various content roles to the design 103 (rather than a default content role, as in FIGS. 18-20). The design service(s) 126 applies the design template 113 to the design 103. In an example 1802 of FIG. 21, the design 103 includes the design elements 123, 703, 705, and 707 corresponding to the design elements 141 of the design template 105. In an example 1804 of FIG. 21, the user 104 deletes the design elements 123, 703, 705, and 707 from the design 103.

The example 2202 of FIG. 22 differs from the example 1902 of FIG. 19 in that the user 104 assigns various content roles to added text elements (e.g., a design element 2203, a design element 2205, a design element 2211, and a design element 2224). For example, the user 104 designates the design element 2211 as a "pre-title" (e.g., a first content role), the design element 2203 as a "heading 1" (e.g., a content role 2247), the design element 2204 as a "title" (e.g., the content role 147), and the design element 2205 as a "body" (e.g., a fourth content role). The design service(s) 126 updates the text information 173 of each of the design elements 2203, 2205, 2211, and 2224 to indicate text and font information of the design element (e.g., the text element). In a particular aspect, the design service(s) 126 updates the format information 155 of the design 103 to indicate that a pre-title design element style, a heading design element style, a title design element style, and a body design element style are associated with a format of the design element 2211, a format of the design element 2203, a format of the design element 2204, and a format of the design element 2205, respectively The design service(s) 126 generates the design 115 by applying the design template 113 to the design 103. In an example 2302 of FIG. 23, the design service(s) 126 generates the design 115 to include the design elements 124, 803, 805, 807, and 809 by copying the design elements 161 of the design template 113. In a particular aspect, the design service(s) 126, in response to determining that the design element 163 is included in a first group of design elements in the design template 113, adds the design element 124 to a second group of design elements in the design 115. The second group of design elements corresponds to the first group of design elements. In a particular aspect, the design service(s) 126, in response to determining that the design element 163 is included as a foreground element in the first group of design elements, adds the design element 124 as a foreground element in the second group of design elements.

In a particular aspect, the design service(s) 126, in response to determining that a design element (corresponding to the design element 809) of the design elements 161 is added as a background element in the first group of design elements, adds the design element 809 as a background element in the second group of design elements. In a particular aspect, a first size of a bounding box of the design element 809 is based on sizes of bounding boxes of the foreground elements of the second group of design elements.

The design service(s) 126 applies a content signature of the design 103 to the design 115. In a particular aspect, the design service(s) 126 identifies edited design elements of the design 103 that match a design element of the design 115. For example, the design service(s) 126 determines that the design elements 124, 803, and 805 are edited relative to the design template 105 and that the design elements 124, 803, and 805 match the design elements 2224, 2211, and 2205, respectively. The design service(s) 126 uses the matching edited design elements to update a corresponding design element of the design 115. For example, the design service(s) 126 updates the title text element (e.g., the design element 124) of the design 115 based on the title text element (e.g., the design element 2224) of the design 103. To illustrate, the title text element (e.g., the design element 124) of the design 115 includes a copy of the text (e.g., "Birthday Party") indicated by the title text element (e.g., the design element 2224) of the design 103.

In a particular aspect, the design service(s) 126 refrains from updating the "subtitle" element (e.g., the design element 807) of the design 115 based on the design 103 in response to determining that the design 103 does not include a "subtitle" element. In an alternative aspect, the design service(s) 126 removes the "subtitle" element (e.g., the design element 807) from the design 115 in response to determining that the design 103 does not include a "subtitle" element.

The design service(s) 126, in response to determining that the design 115 does not include a "heading 1" element that corresponds to the "heading 1" element (e.g., the design element 2203) of the design 103, generates a design element 2303 corresponding to the "heading 1" element (e.g., the design element 2203). The design element 2303 has the content role 2247 and the heading design element style. The design element 2303 is formatted based on first format information of the "heading 1" element (e.g., the design element 2203) added to the design 103, second format information associated with the heading design element style in the design template 113, or both.

Figure 24:
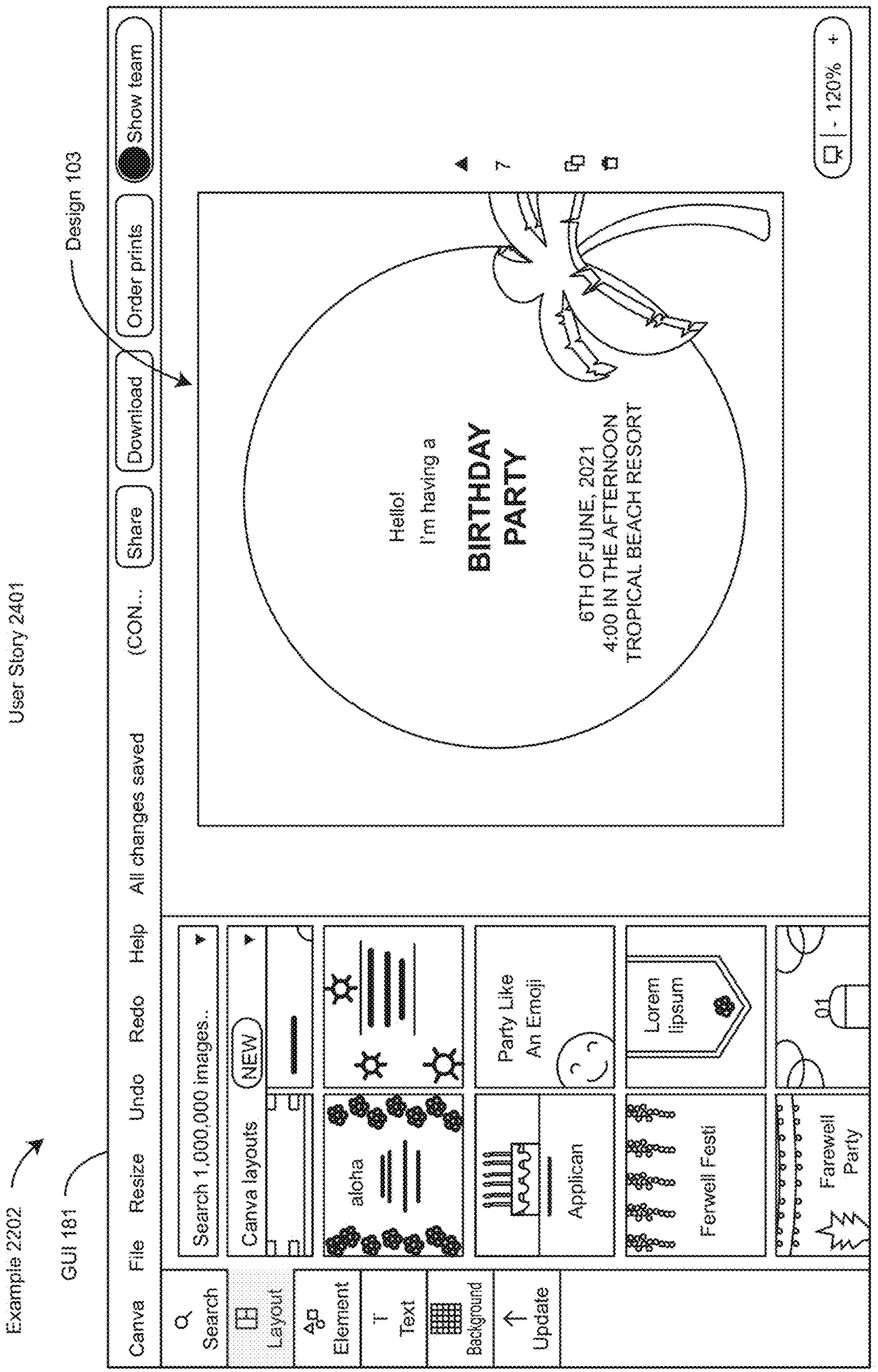
FIG. 24 illustrates particular examples of designs that may be generated by the system of FIG. 1.
Figure 25:
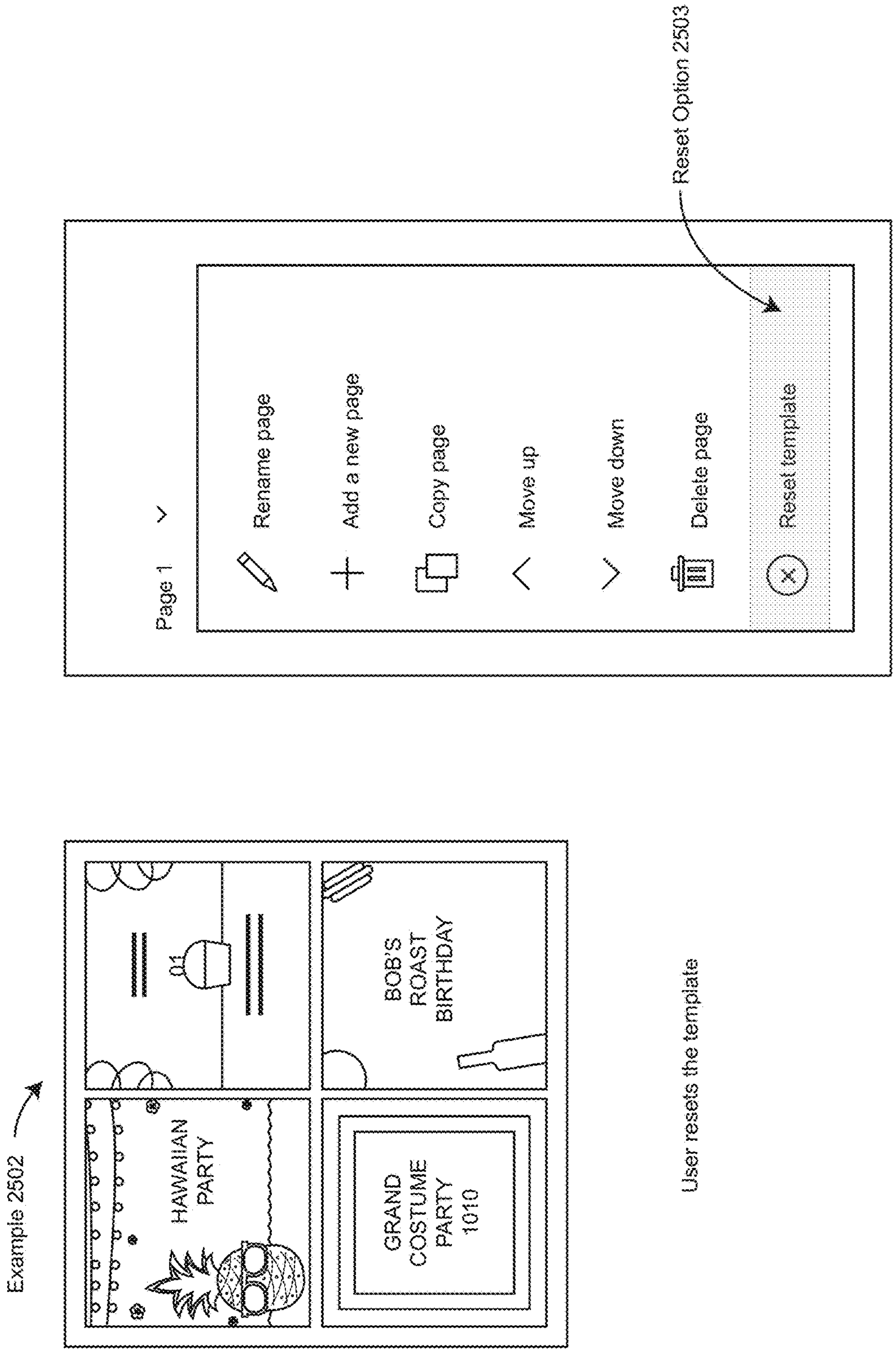
FIG. 25 illustrates a particular example of a design that may be generated by the system of FIG. 1.

FIGS. 24-25 illustrate a user story 2401 where a user removes all design elements from the design 103, updates the design 103, and selects the design template 113 for application to the design 103. The design service(s) 126 applies the design template 113 to the design 103. The user 104 selects an option to reset the design template 113. In an example 2202 of FIG. 24, the design 103 is updated by the user 104, as described with reference to FIG. 22. In an example 2302 of FIG. 24, the design service(s) 126 generates the design 115 by applying the design template 113 to the design 103, as described with reference to FIG. 23. In an example 2502 of FIG. 25, the user 104 selects a reset option 2503 of the GUI 181 indicating that the design template 113 is to be reset. The design service(s) 126, in response to receiving the selection of the reset option 2503, resets the design 115 based on the design template 113. For example, the design service(s) 126 removes the design elements 191 and the design element information 193 from the design 115. The design service(s) 126 generates a second version of the design elements 191 and a second version of the design element information 193 by copying the design template 113 and adds the second version of the design elements 191 and the second version of the design element information 193 to the design 115. The user story 2401 thus illustrates that the design service(s) 126 enables the user 104 to undo the transferred content and instead revert to the default content of an applied template.

Figure 26:
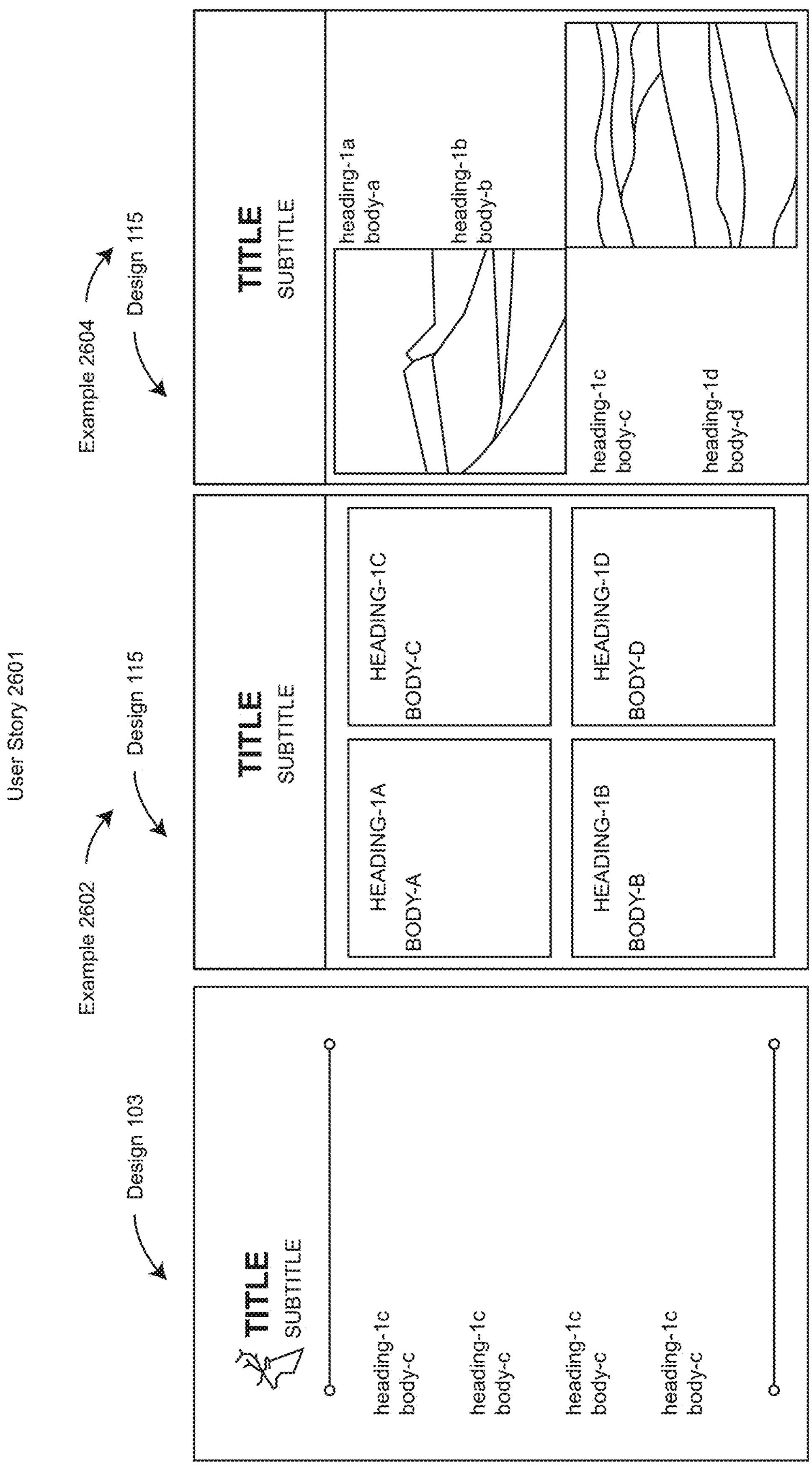
FIG. 26 illustrates particular examples of designs that may be generated by the system of FIG. 1.

FIG. 26 illustrates a user story 2601 where the user 104 uses content roles to specify an order (or position) of design elements that are associated with the same format information. For example, the design template 105 includes a first text element, a second text element, a third text element, and a fourth text element that are assigned a first content role, a second content role, a third content role, and a fourth content role, respectively. Each of the first content role, the second content role, the third content role, and the fourth content role indicates a content role (e.g., "heading-1") and an order tag (e.g., A, B, C, or D). Each of the first text element, the second text element, the third text element, and the fourth text element are assigned a design element type (e.g., a heading design element style). In a particular aspect, the format information 155 includes first format information of the design element type (e.g., the heading design element style). In a particular example, each of the first text element, the second text element, the third text element, and the fourth text element is formatted based on the first format information. The design service(s) 126 generates the design 103 by copying the first text element, the second text element, the third text element, and the fourth text element.

In example 2602, the design service(s) 126 generates the design 115 by applying the design template 113 to the design 103. For example, the design template 113 includes first text elements having the first content role, the second content role, the third content role, and the fourth content role. The design service(s) 126 generates the design 115 (by copying the design template 113) to include second text elements having the first content role, the second content role, the third content role, and the fourth content role. The design service(s) 126 applies a content signature of the design 103 to the design 115. For example, a second text element of the design 115 having the first content role (e.g., "heading-1A") is updated based on the first text element of the design 103 having the first content role (e.g., "heading-1A"). Example 2604 differs from the example 2602 in that the design template 113 includes one or more image elements.

Figure 27:
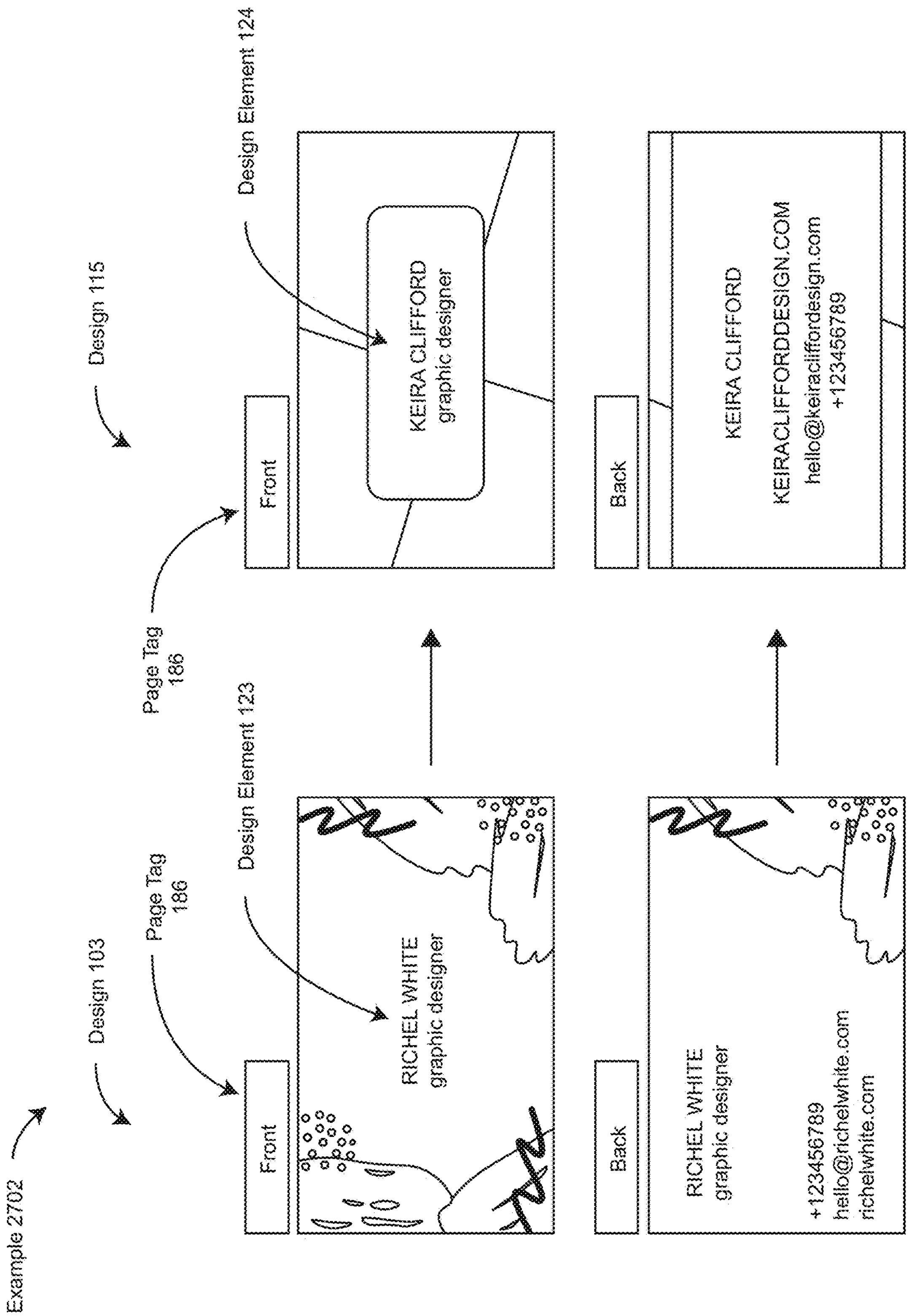
FIG. 27 illustrates particular examples of designs that may be generated by the system of FIG. 1.
Figure 28:
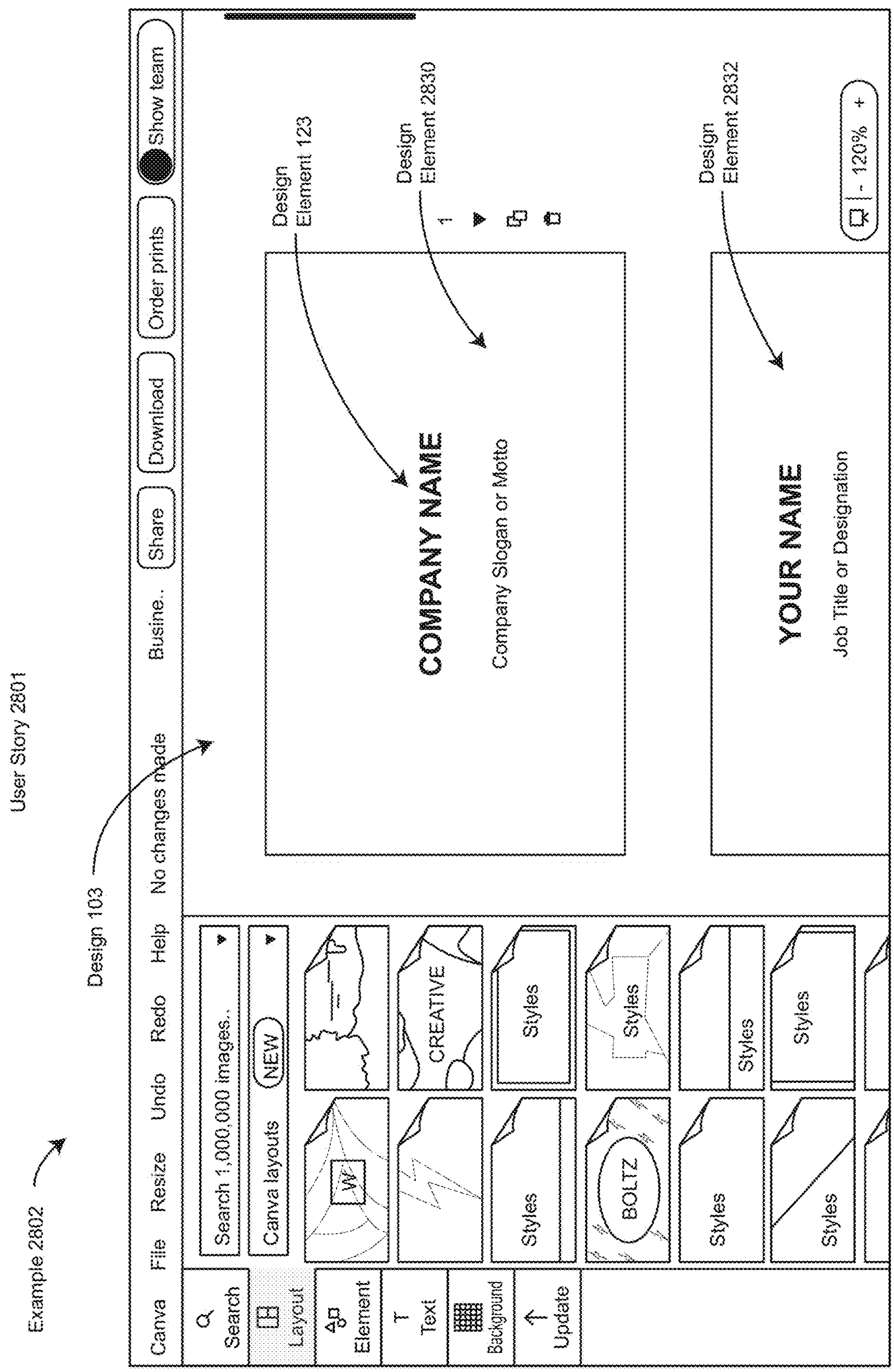
FIG. 28 illustrates particular examples of a design that may be generated by the system of FIG. 1.

In example 2702 of FIG. 27, each of the design templates 105 and 113 includes multiple design pages, in this case the two sides of a business card. Design elements of a particular design page include a page tag 186 indicating a particular page number, a particular page type, or both, of the particular design page (e.g., front, back, 1, 2). The design service(s) 126 identifies matching design elements based at least in part on the page tag 186. For example, the design service(s) 126 determines that the design element 123 corresponds to the design element 124 in response to determining that the content role 179 of the design element 123 matches the content role 179 of the design element 124 and that the page tag 186 of the design element 123 (e.g., a page number, a page type, or both) matches the page tag 186 of the design element 124.

FIGS. 28-31 illustrate a user story 2801 where the design 103 includes multiple design pages and the user 104 edits the design 103. The design service(s) 126 applies the design template 113 to the updated version of the design 103. In an example 2802 of FIG. 28, the design 103 is based on the design template 105. For example, the design template 105 includes a first design page and a second design page. The design service(s) 126 generates the design 103 by copying the design template 105. For example, the design 103 includes a design page 2830 corresponding to the first design page and a design page 2832 corresponding to the second design page. The design 103 includes the design element 123 on the design page 2830. The design element 123 includes default text (e.g., "Company Name"), which may be copied from the design element 143 of the design template 105. The page tag 186 (e.g., front) of the design element 123 indicates the page tag 186 (e.g., page type, page number, or both) of the design page 2830. In example 2804 of FIG. 28, the user 104 edits the design 103. For example, the user 104 updates the text (e.g., "Oranges, Inc.") of the design element 123.

Figure 29:
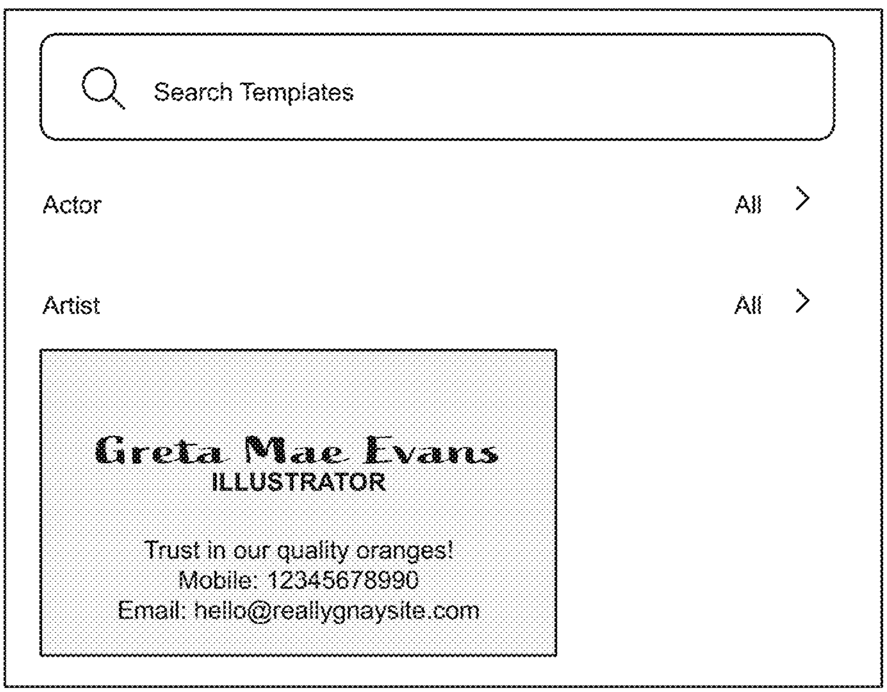
FIG. 29 illustrates a particular example of a design that may be generated by the system of FIG. 1.

In the example illustrated in FIG. 29, the user 104 uses the GUI 181 to search for design templates and selects the design template 113. The design service(s) 126, in response to receiving the user input 109 indicating the selection of the design template 113, updates the GUI 181 to include GUI elements corresponding to design pages of the design template 113. For example, the GUI 181 includes a GUI element 2922 (e.g., a first thumbnail image) and a GUI element 2924 (e.g., a second thumbnail image) corresponding to a design page 2930 and a design page 2932, respectively, of the design template 113. In a particular aspect, the design service(s) 126, in response to determining that the design page 2830 is a first design page of the design 103 that is displayed in the GUI 181, designates the design page 2830 as an active page of the design 103.

In FIG. 29, the GUI element 2922 corresponding to the design page 2930 of the design template 113 enables the user 104 to preview the design page 2930 before determining whether to apply the design template 113 to the design 103. In an alternative implementation, the GUI element 2922 is based on a first design page of the design 115. The first design page of the design 115 is a result of applying a content signature of the design page 2830 to the design page 2930. In this implementation, the GUI element 2922 enables the user 104 to preview the results of applying the design template 113 to the design 103 and compare the results with the design page 2830 of the design 103 that is also displayed in the GUI 181.

Figure 30:
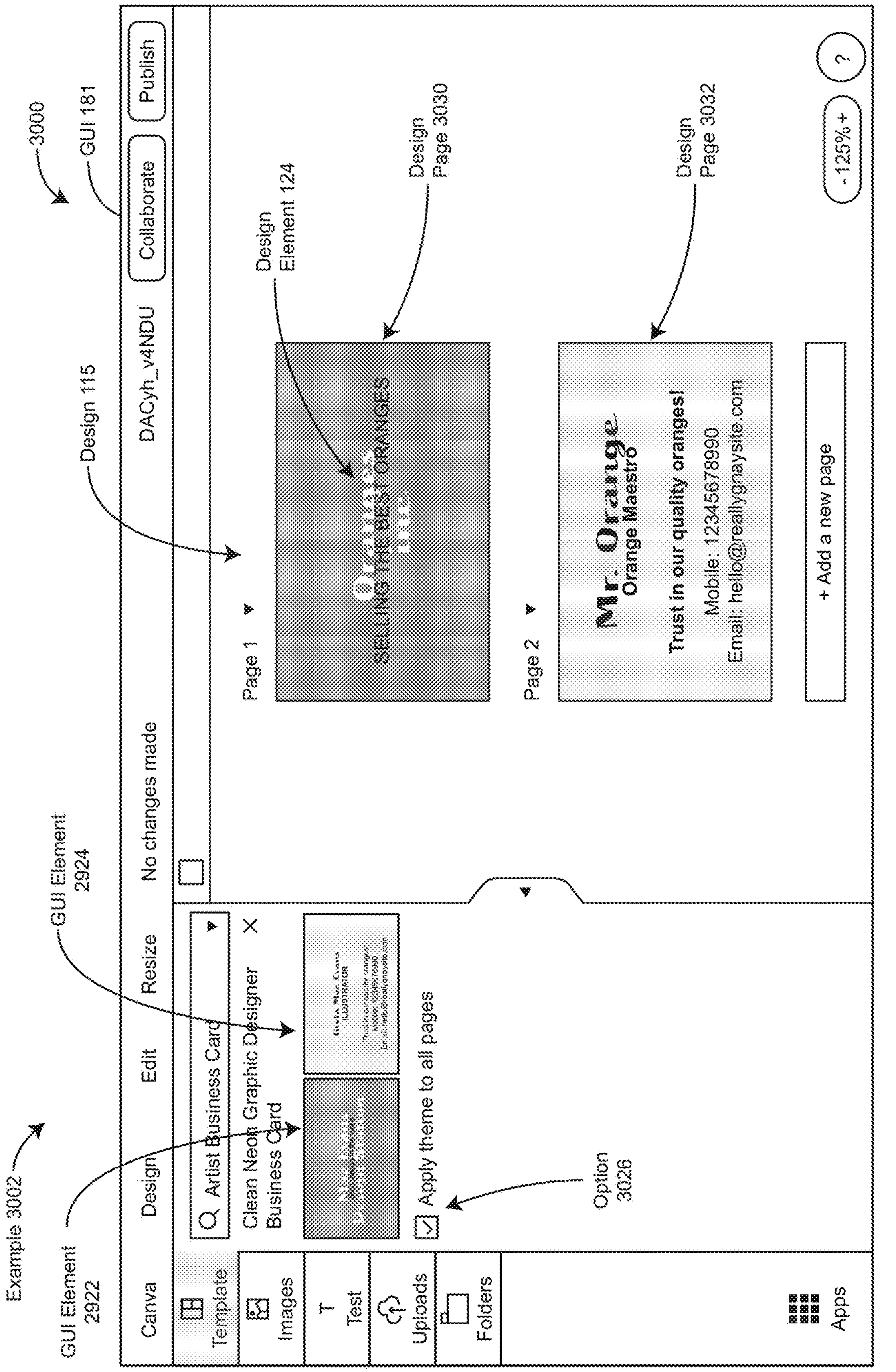
FIG. 30 illustrates particular examples of a design that may be generated by the system of FIG. 1.

In an example 3002 of FIG. 30, the user 104 selects the GUI element 2922 corresponding to the design page 2930 of the design template 113. In a particular aspect, the design service(s) 126, in response to determining that the GUI element 2922 is selected, designates the design page 2930 as an active page of the design template 113. In an example 3004 of FIG. 30, the user selects the GUI element 2924 corresponding to the design page 2932 of the design template 113. In a particular aspect, the design service(s) 126, in response to determining that the GUI element 2922 is selected, designates the design page 2932 as an active page of the design template 113.

In each of the examples 3002 and 3004, an option 3026 is selected indicating that each design page of the design template 113 is to be applied to the design 103. The design service(s) 126, in response to receiving the selection of the GUI element 2922 or the selection of the GUI element 2924 and determining that the option 3026 is selected, applies the design template 113 to the design 103. The design service(s) 126 generates the design 115 by copying the design template 113. For example, the design 115 includes a design page 3030 and a design page 3032 corresponding to the design page 2930 and the design page 2932, respectively. The design service(s) 126 updates the design 115 by applying a content signature of a design page of the design 103 to a corresponding design page (e.g., having the same page number, page type, or both, for the page tag 186) of the design 115. For example, the design service(s) 126 updates content of the design page 3030 by applying a content signature of the design page 2830 to the design page 3030. To illustrate, content from an edited design element of the design page 2830 is copied to a corresponding design element of the design page 3030. As another example, the design service(s) 126 updates content of the design page 3032 by applying a content signature of the design page 2832 to the design page 3032.

Figure 31:
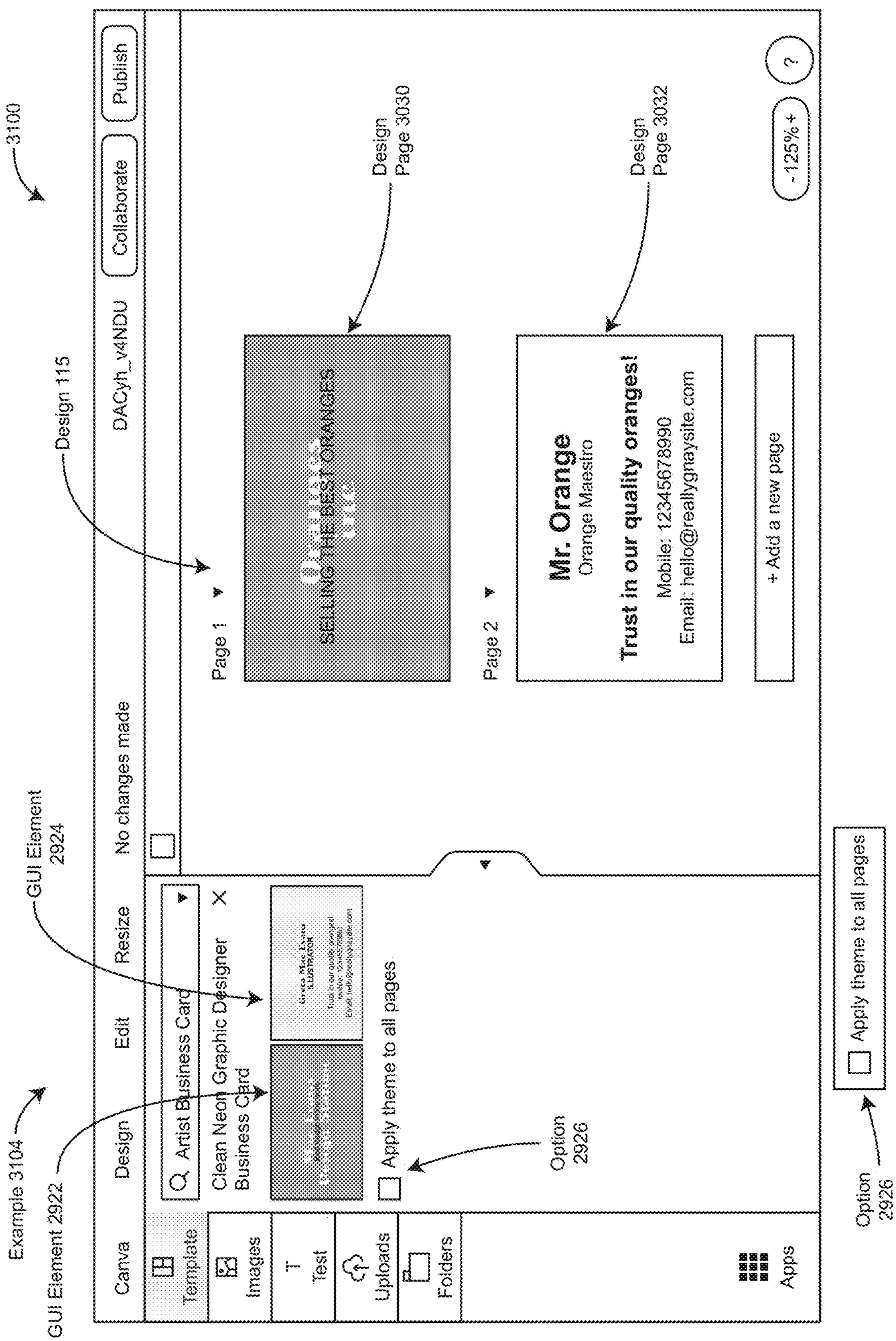
FIG. 31 illustrates a particular example of a design that may be generated by the system of FIG. 1.
Figure 32:
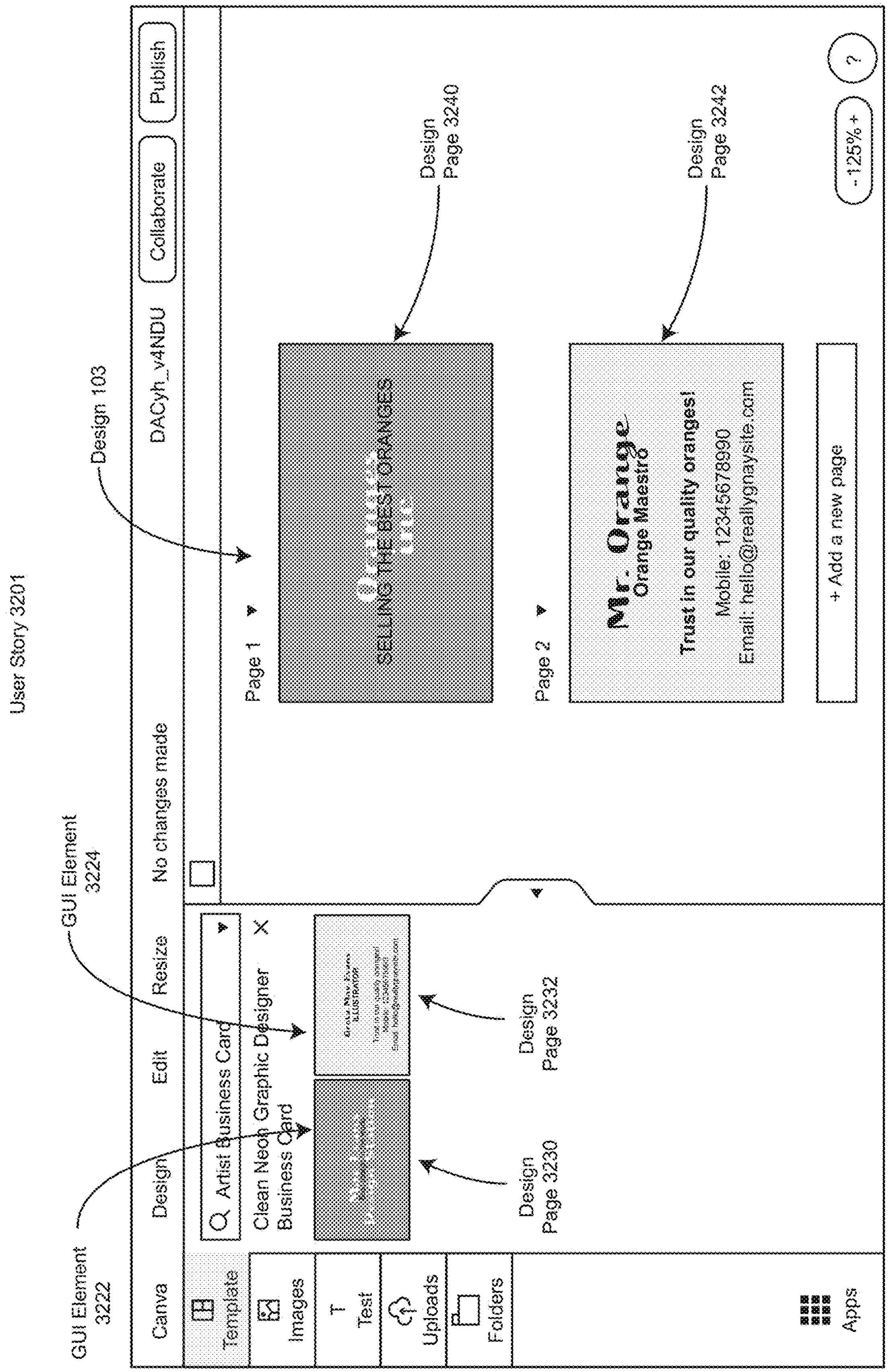
FIG. 32 illustrates a particular example of a design that may be generated by the system of FIG. 1.

In an example 3104 of FIG. 31, the option 2926 is unselected indicating that the active page (e.g., the design page 2930) of the design template 113 is to be applied to the active page (e.g., the design page 2830) of the design 103. The design service(s) 126, in response to determining that the option 2926 is unselected, that the design page 2830 is designated as the active page of the design 103, and that the design page 2930 of the design template 113, designates the design page 3030 as an active page of the design 115. The design service(s) 126 updates the active page (e.g., the design page 3030) of the design 115 by copying the active page (e.g., the design page 2930) of the design template 113. The design service(s) 126 applies a content signature of the active page (e.g., the design page 2830) of the design 103 to updated version of the active page (e.g., the design page 3030). By unchecking the option 2926, the user 104 can apply different templates to different pages of a multi-page design.

FIGS. 32-35 illustrate a user story 3201 where the user 104 uses generates the design 115 having more design pages than design templates used to generate the design 115. In an example of FIG. 32, the GUI 181 includes a GUI element 3222 and a GUI element 3224 corresponding to a design page 3230 and a design page 3232, respectively, of the design template 105. The design service(s) 126 generates the design 103 by copying the design template 105. For example, a design page 3240 and a design page 3242 of the design 103 correspond to the design page 3230 and the design page 3232, respectively, of the design template 105. The user 104 selects an option 3236 of the GUI 181 indicating that a new page is to be added to the design 103. The design service(s) 126 adds a design page 3244 to the design 103. The user 104 adds a text element (e.g., a design element 3254) to the design page 3244. The format information 155 of the design 103 indicates that the design element type of the design element 3254, a page tag of the design page 3244, or both, are associated with first format information. The text element (e.g., the design element 3254) is formatted based on the first format information.

Figure 33:
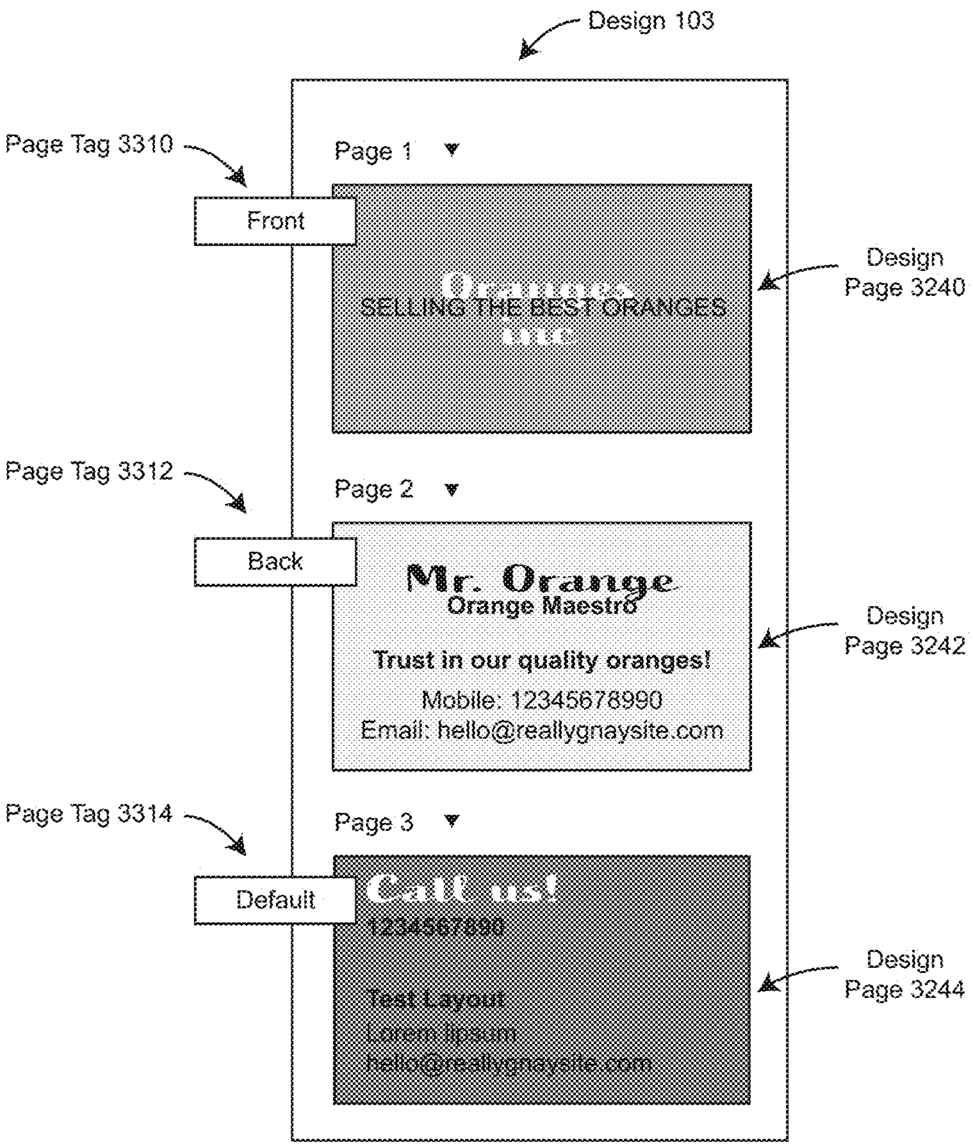
FIG. 33 illustrates a particular example of a design that may be generated by the system of FIG. 1.
Figure 34:
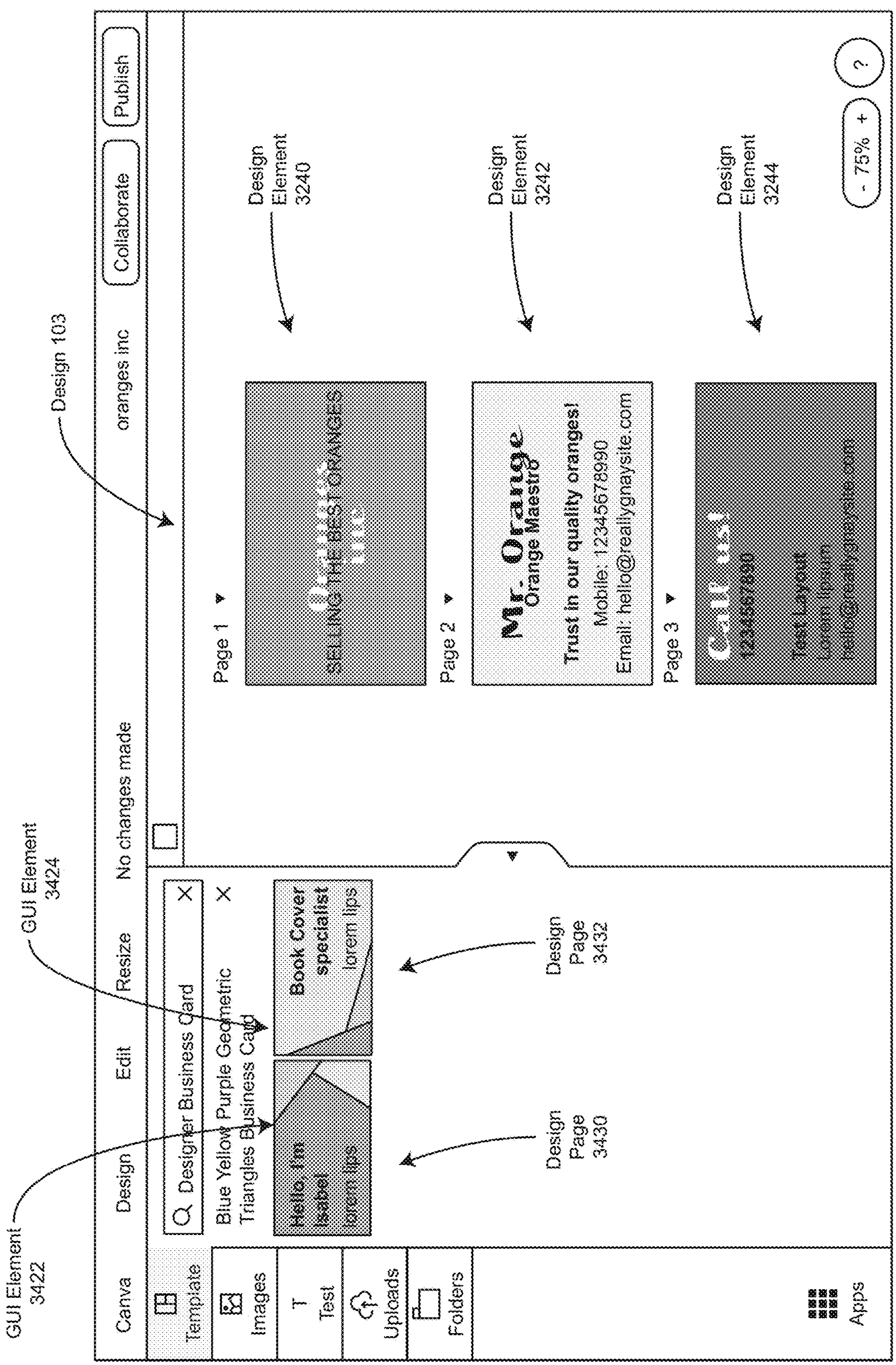
FIG. 34 illustrates a particular example of a design that may be generated by the system of FIG. 1.

In an example of FIG. 33, a page tag 3310, a page tag 3312, and a page tag 3314 are assigned to the design page 3240, the design page 3242, and the design page 3244, respectively. In a particular aspect, the design service(s) 126, when generating the design 103 by copying the design template 105, assigns the page tag 3310 to the design page 3240 by copying the page tag 3310 of the design page 3230. The design service(s) 126 also assigns the page tag 3312 to the design page 3242 by copying the page tag 3312 of the design page 3232. The design service(s) 126, in response to receiving the selection of the option 3236, assigns the page tag 3314 (e.g., a default page tag) to the design page 3244. The user 104 edits the design page 3244. In a particular aspect, the design service(s) 126 initializes the design page 3244 to include a background color, a background image, or both, that is included in a previous design page (e.g., the design page 3242) of the design 103.

The user 104 enters search terms (e.g., "Designer Business Card"). The design service(s) 126 selects the document template 113 as corresponding to the search terms. In the example illustrated in FIG. 34, the design template 113 includes a design page 3430 and a design page 3432. The design service(s) 126 updates the GUI 181 to include a GUI element 3422 and a GUI element 3424 corresponding to the design page 3430 and the design page 3432, respectively.

Figure 35:
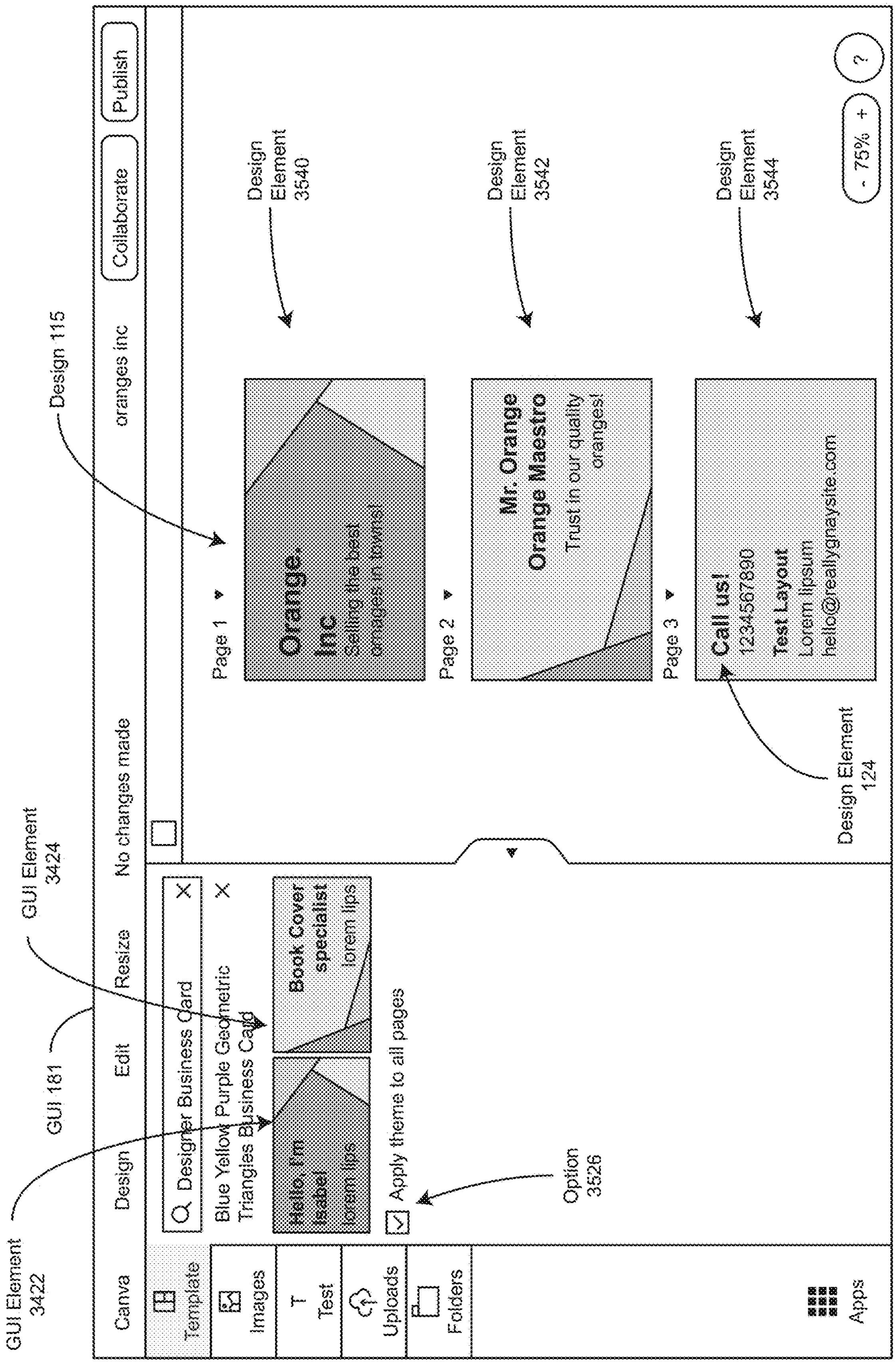
FIG. 35 illustrates a particular example of a design that may be generated by the system of FIG. 1.
Figure 36:
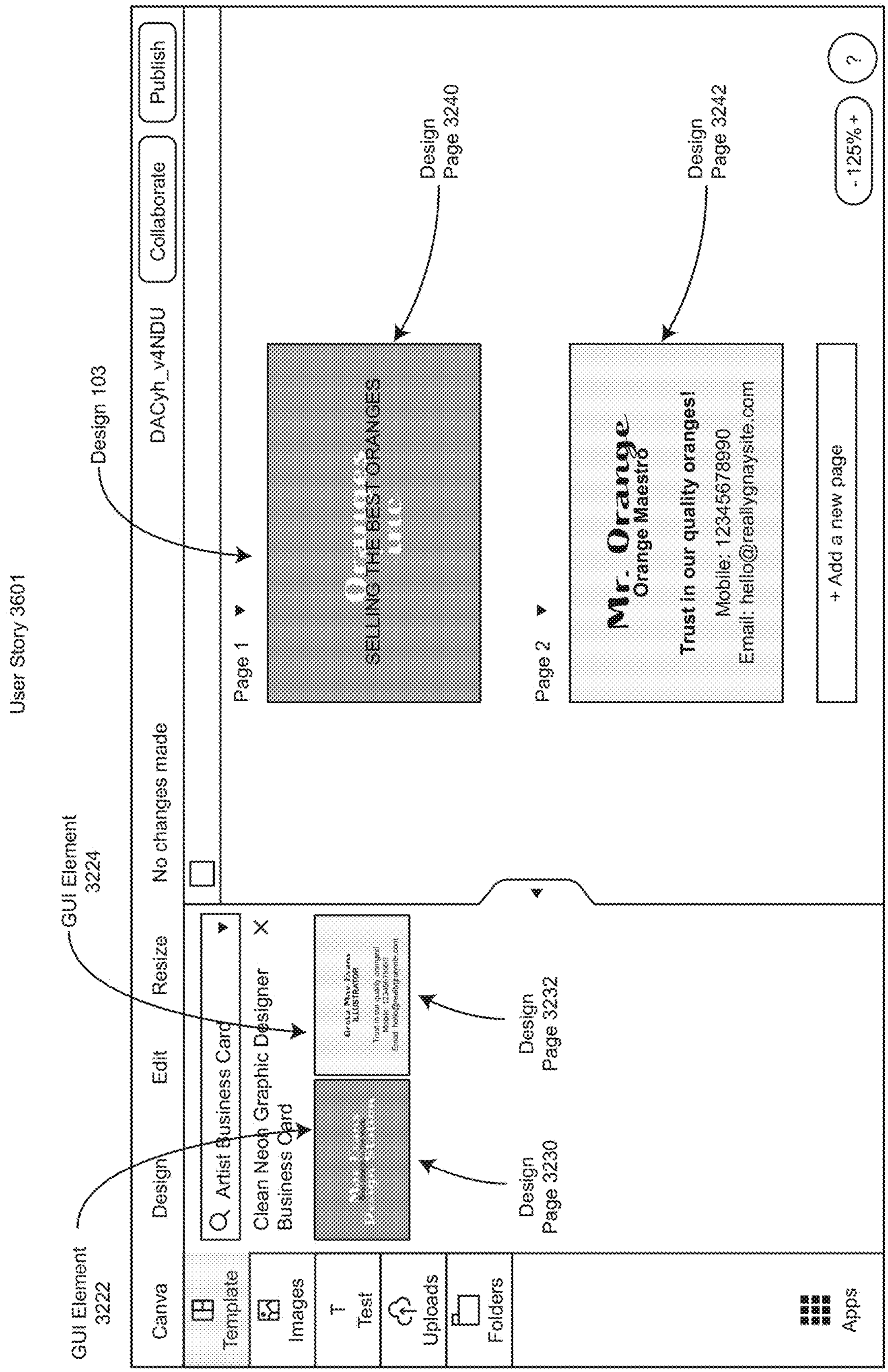
FIG. 36 illustrates a particular example of a design that may be generated by the system of FIG. 1.

In an example of FIG. 35, the GUI 181 includes an option 3526. The option 3526 is selected indicating that design pages of the design template 113 are to be applied to the design 103. The user 104 selects the GUI element 3422. The design service(s) 126, in response to receiving a selection of the GUI element 3422 and determining that the option 3526 is selected, applies the design template 113 to the design 103. For example, the design service(s) 126 generates the design 115 by copying the design template 113. The design 115 includes a design page 3540 and a design page 3542 corresponding to the design page 3430 and the design page 3432, respectively. The design service(s) 126 applies a content signature of the design page 3240 and a content signature of the design page 3242 to the design page 3540 and the design page 3542, respectively.

The design service(s) 126, in response to determining that the design 103 includes the design page 3244 that does not correspond to any design pages of the design 115, adds a design page 3544 to the design 115, applies a content signature of the design page 3244 to the design 115, and assigns the page tag 3314 (e.g., default page tag) to the design page 3244. The design page 3544 is formatted based on the format information 159 of the design 115. For example, the design page 3244 includes the design element 124. The format information 159 includes first format information associated with the page tag 3314 (e.g., default page tag), the design element type of the design element 124, or both. The design element 124 is formatted based on the first format information. In a particular example, the format information 159 indicates a background color, a background image, or both, associated with the page tag 3314. The design service(s) 126 updates the design page 3544 to include the background color, the background image, or both.

Figure 37:
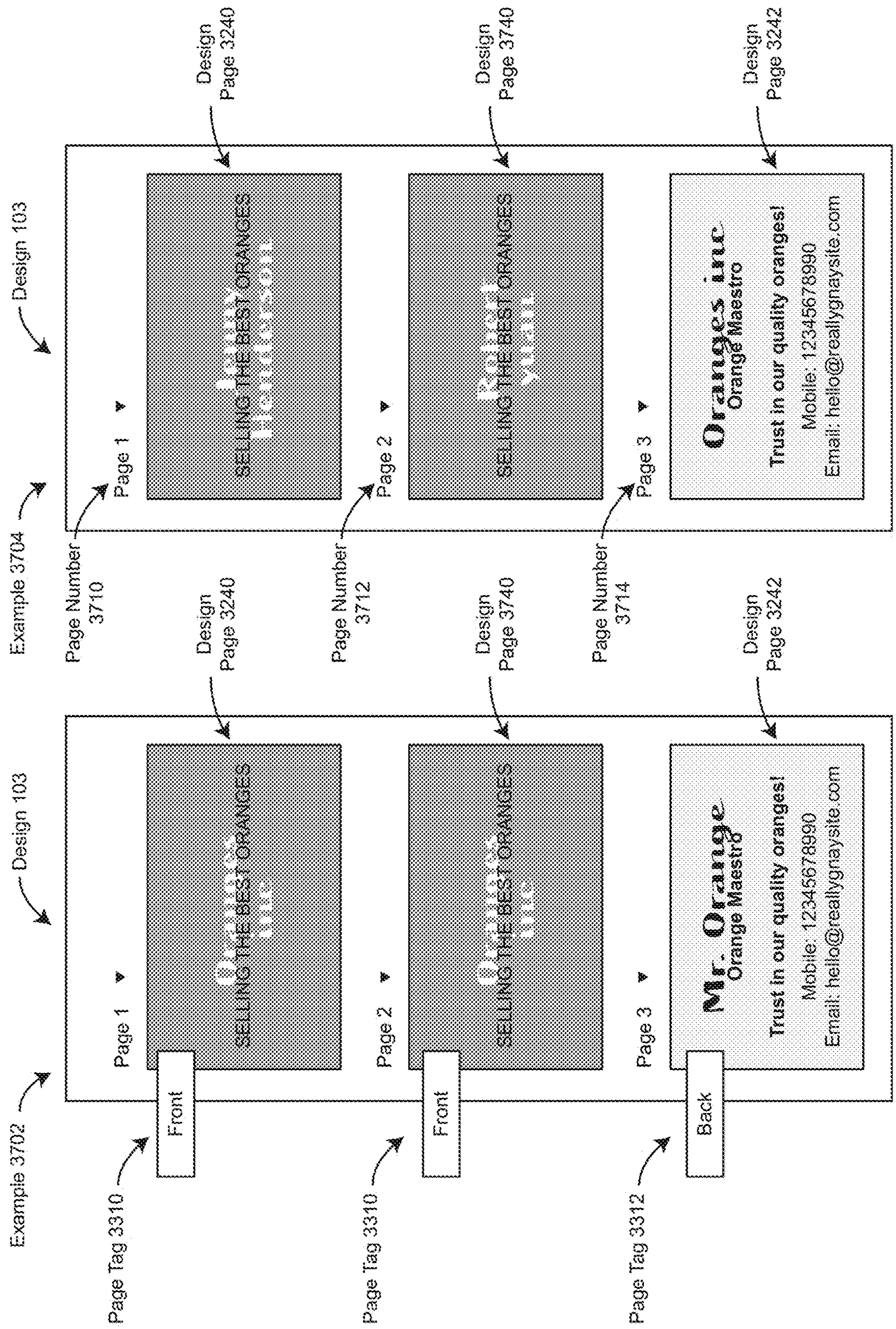
FIG. 37 illustrates particular examples of a design that may be generated by the system of FIG. 1.
Figure 38:
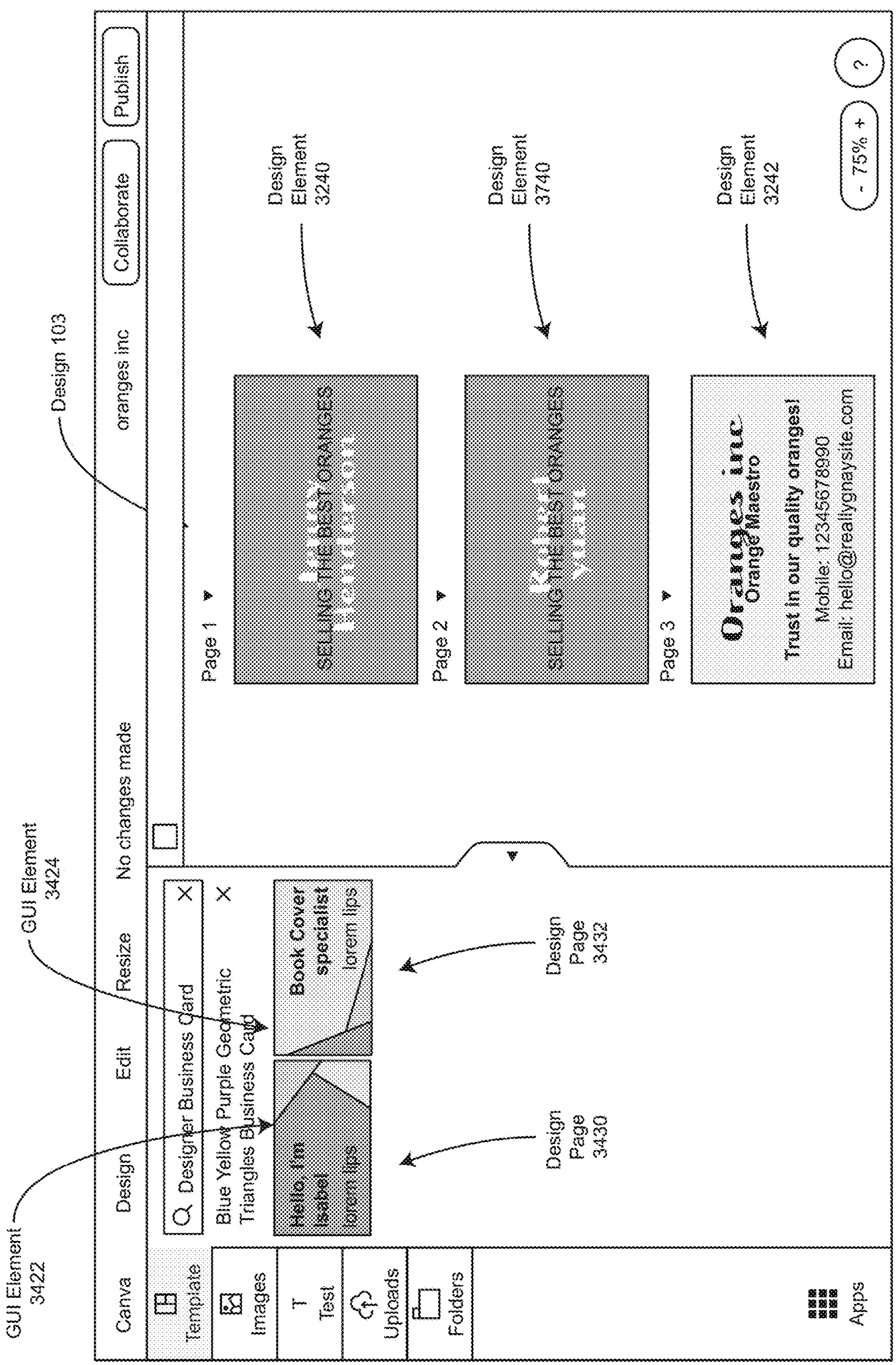
FIG. 38 illustrates a particular example of a design that may be generated by the system of FIG. 1.

FIGS. 36-39 illustrate a user story 3601 where the user 104 adds a copy of a design page of the design 103 to the design 103 and applies the design template 113 to the updated design 103. In an example illustrated in FIG. 36, the GUI 181 includes an option 3636 (e.g., a copy page option) associated with the design page 3240. As illustrated in FIG. 37, the design service(s) 126, in response to receiving a selection of the option 3636 associated with the design page 3240, adds a design page 3740 to the design 103 by copying the design page 3240. In a particular aspect, a page number 3710 of the design page 3240 has a first value. Adding the design page 3740 to the design 103 includes setting a page number 3712 of the design page 3740 based on the first value (e.g., first value+1) and updating (e.g., incrementing by 1) page numbers of design pages subsequent to the design page 3740 in the design 103. For example, the design service(s) 126 updates (e.g., increments by 1) a page number 3714 of the design page 3242. Generating the design page 3740 by copying the design page 3240 includes assigning the page tag 3310 to the design page 3740. In an example 3702 of FIG. 37, content (e.g., text elements, image elements, fill elements, design element information, or a combination thereof) of the design page 3240 is copied to the design page 3740. In an example 3704 of FIG. 37, the user 104 edits each of the design pages 3240, 3242, and 3740. In a particular example, the user 104 uses the design 103 to print a first business card with the front based on the design page 3240 and a second business card with the front based on the design page 3740. The back of each business card is based on the design page 3242. In another example, the user 104 generates the design 103 to include multiple design pages corresponding to the same page tag to compare the different design pages, choose one of the design pages, and remove the remaining design pages associated with the page tag. In the example of FIG. 38, the GUI 181 includes the GUI element 3422 and the GUI element 3424 corresponding to the design page 3430 and the design page 3432, respectively, of the design template 113.

Figure 39:
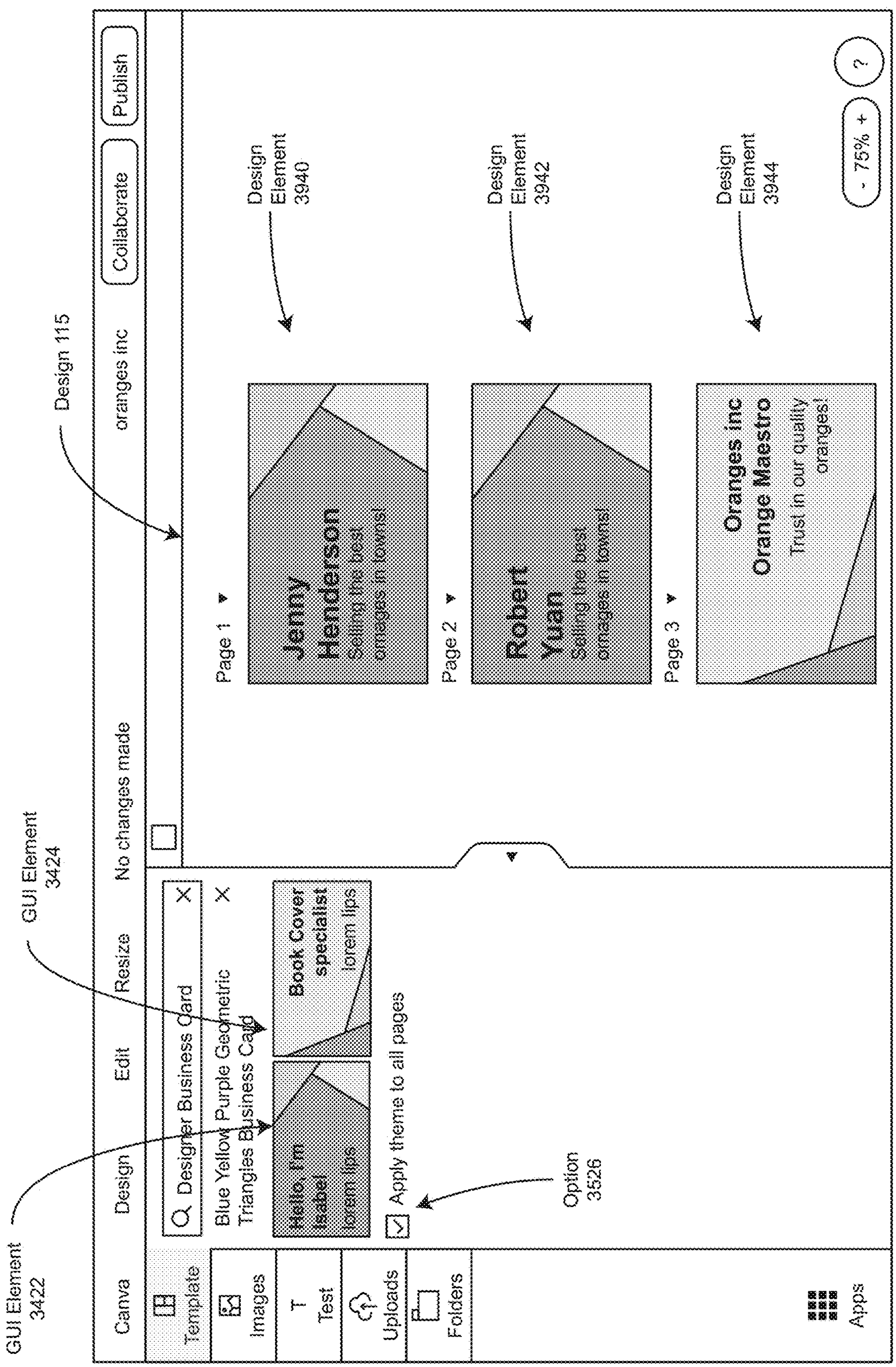
FIG. 39 illustrates a particular example of a design that may be generated by the system of FIG. 1.

In an example of FIG. 39, the design service(s) 126, in response to receiving a selection of the GUI element 3424 and determining that the option 3526 is selected, generates the design 115 by applying the design template 113 to the design 103. For example, the design 115 includes a design page 3940 and a design page 3944. The design service(s) 126 generates a design page 3940 of the design 115 by copying the design page 3430 of the design template 113. The design service(s) 126 generates a design page 3944 of the design 115 by copying the design page 3432 of the design template 113.

The design service(s) 126, in response to determining that the design page 3240 of the design 103 has a first page tag (e.g., the page tag 3310) that is the same as a second page tag of the design page 3940, marks (e.g., designates) the design page 3940 as corresponding to the design page 3240. The design service(s) 126, in response to determining that the design page 3740 of the design 103 is associated with a first page tag (e.g., the page tag 3310) that does not match any remaining (e.g., unmarked) design pages of the design 115, adds a design page 3942 to the design 115, assigns the first page tag (e.g., the page tag 3310) to the design page 3942, and designates the design page 3942 as corresponding to the design page 3740. The design service(s) 126, in response to determining that the design page 3430 of the design template 113 is assigned the same page tag (e.g., the page tag 3310) as assigned to the design page 3942, updates the design page 3942 by copying the design page 3430.

The design service(s) 126, in response to determining that the design page 3940 is designated as corresponding to the design page 3240, applies a content signature of the design page 3240 to the design page 3940. For example, content from edited design elements of the design page 3240 is copied to corresponding design elements of the design page 3940.

Figure 40:
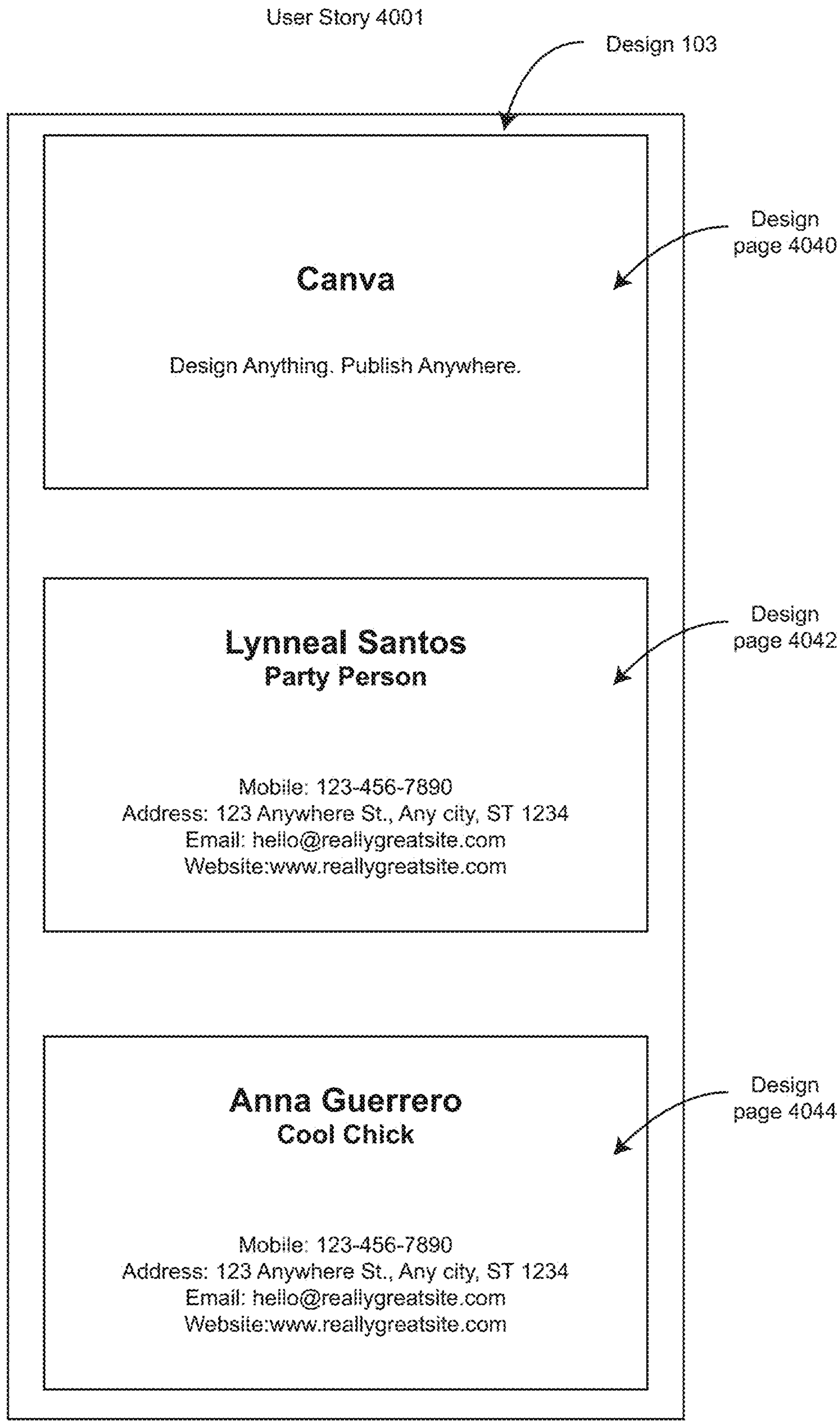
FIG. 40 illustrates a particular example of a design that may be generated by the system of FIG. 1.

FIGS. 40-43 illustrate an example of applying different design templates to different design pages of a design. In the example of FIG. 40, the design 103 includes a design page 4040, a design page 4042, and a design page 4044. In an example 4102 of FIG. 41, the GUI 181 includes a GUI element 3422 and a GUI element 3424 of the design page 3430 and the design page 3432, respectively, of the design template 113.

Figure 41:
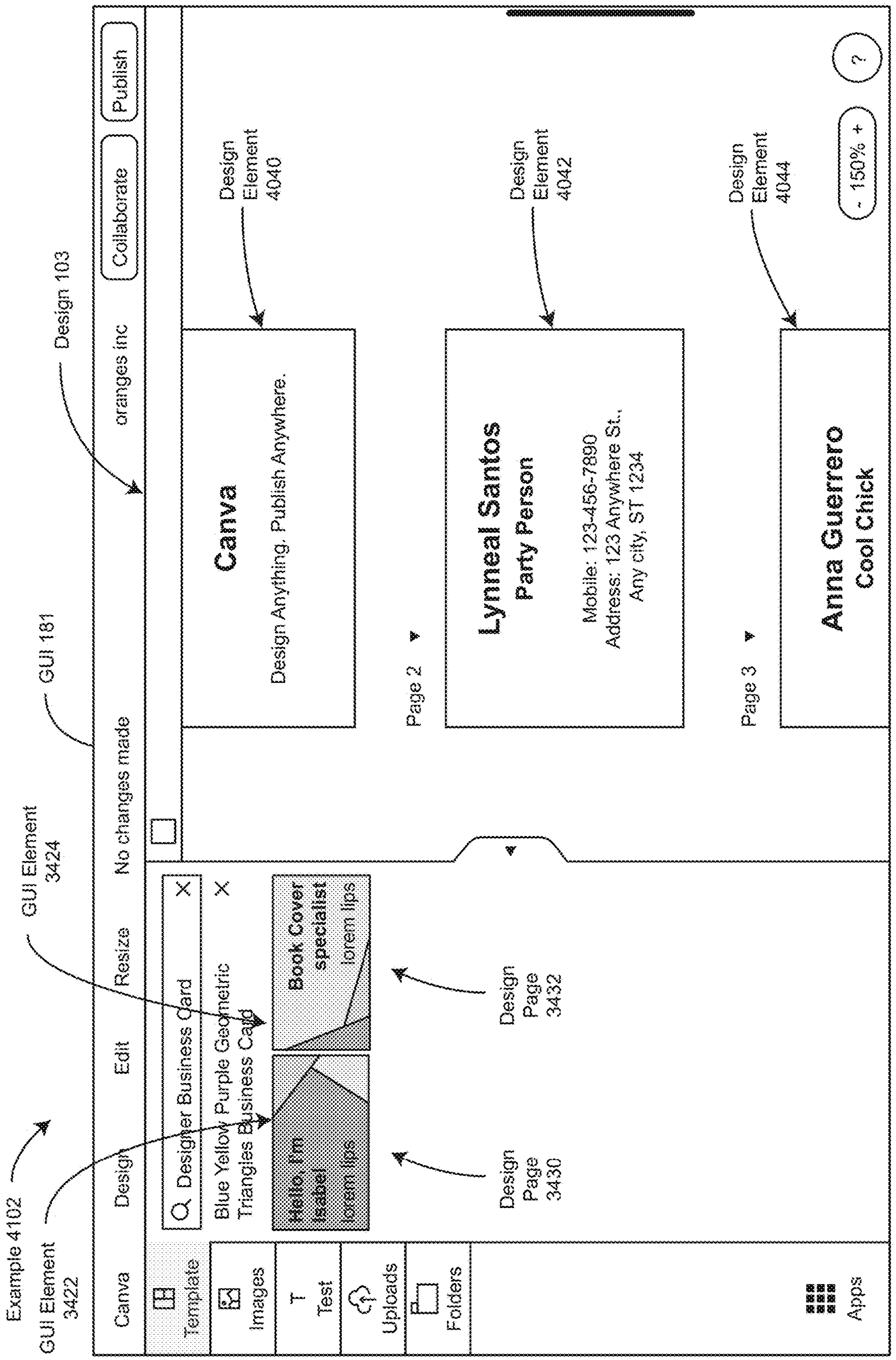
FIG. 41 illustrates particular examples of designs that may be generated by the system of FIG. 1.

In an example 4104 of FIG. 41, the GUI 181 includes an option 4126 indicating that design pages of the design template 113 are to be applied to the design 103. In an example 4104 of FIG. 40, the design service(s) 126, in response to receiving a selection of the GUI element 3424 and determining that the option 4126 is selected, generates the design 115 by applying the design template 113 to the design 103. For example, the design 115 includes a design page 4140, a design page 4142, and a design page 4144 corresponding to the design page 4040, the design page 4042, and the design page 4044, respectively. The design service(s) 126, in response to receiving the selection of the GUI element 3424, designates the design page 3432 as an active page of the design template 113. The design service(s) 126, in response to determining that the design page 4042 is the first design page that is fully displayed by the GUI 181 at the time of receiving the selection of the GUI element 3424, designates the design page 4042 as an active page of the design 103. The design service(s) 126, in response to determining that the design page 4142 is based on the design page 3432 of the design template 113, the design page 4042 of the design 103, or both, designates the design page 4142 as an active page of the design 115.

Figure 42:
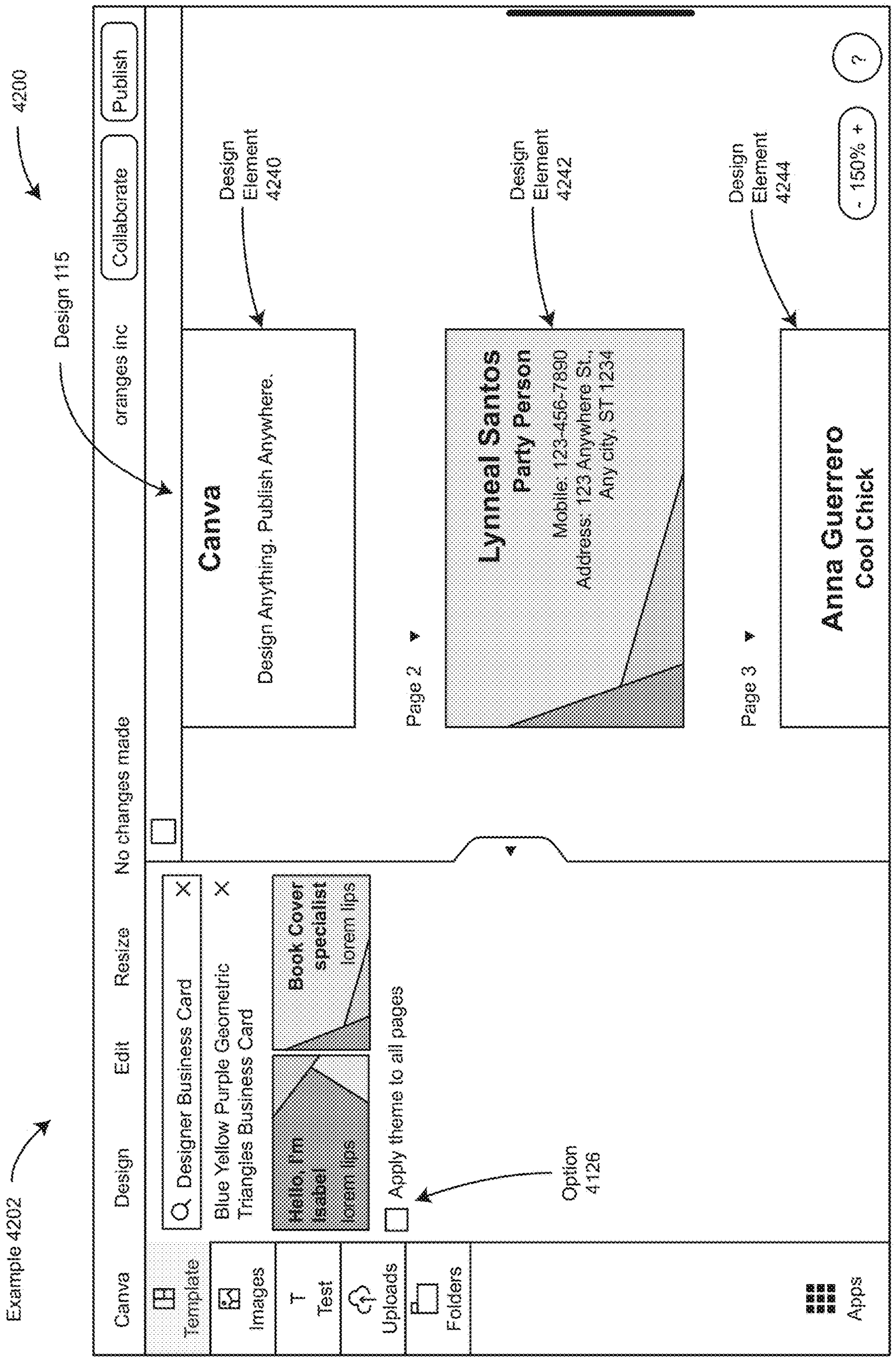
FIG. 42 illustrates particular examples of a design that may be generated by the system of FIG. 1.

In an example 4202 of FIG. 42, the user 104 unselects the option 4126. The design service(s) 126, in response to detecting that the option 4126 is unselected, updates inactive pages of the design 115 by copying corresponding pages of the design 103. For example, the design service(s) 126, in response to determining that the design page 4240 is designated as an inactive page of the design 115 and that the design page 4040 of the design 103 corresponds to the design page 4240, updates the design page 4240 by copying the design page 4040. As another example, the design service(s) 126, in response to determining that the design page 4242 is designated as the active page of the design 115, refrains from updating the design page 4242.

In an example 4204 of FIG. 42, the GUI 181 includes a GUI element 4222 and a GUI element 4224 of a design page 4230 and a design page 4232, respectively, of a particular design template of the design templates 111. In example 4302 of FIG. 43, the GUI 181 includes an option 4326. The design service(s) 126, in response to receiving a selection of the GUI element 4224 and determining that the option 4326 is selected, generates a design 4315 by applying the particular design template to the design 115. The design service(s) 126, in response to receiving the selection of the GUI element 4224 and determining that the design page 4244 is a first design page of the design 115 that is fully displayed in the GUI 181, designates the design page 4244 as an active page of the design 115. The design service(s) 126, in response to determining that the design page 4344 corresponds to the active page (e.g., the design page 4244) of the design 115, designates the design page 4344 as an active page of the design 4315.

Figure 43:
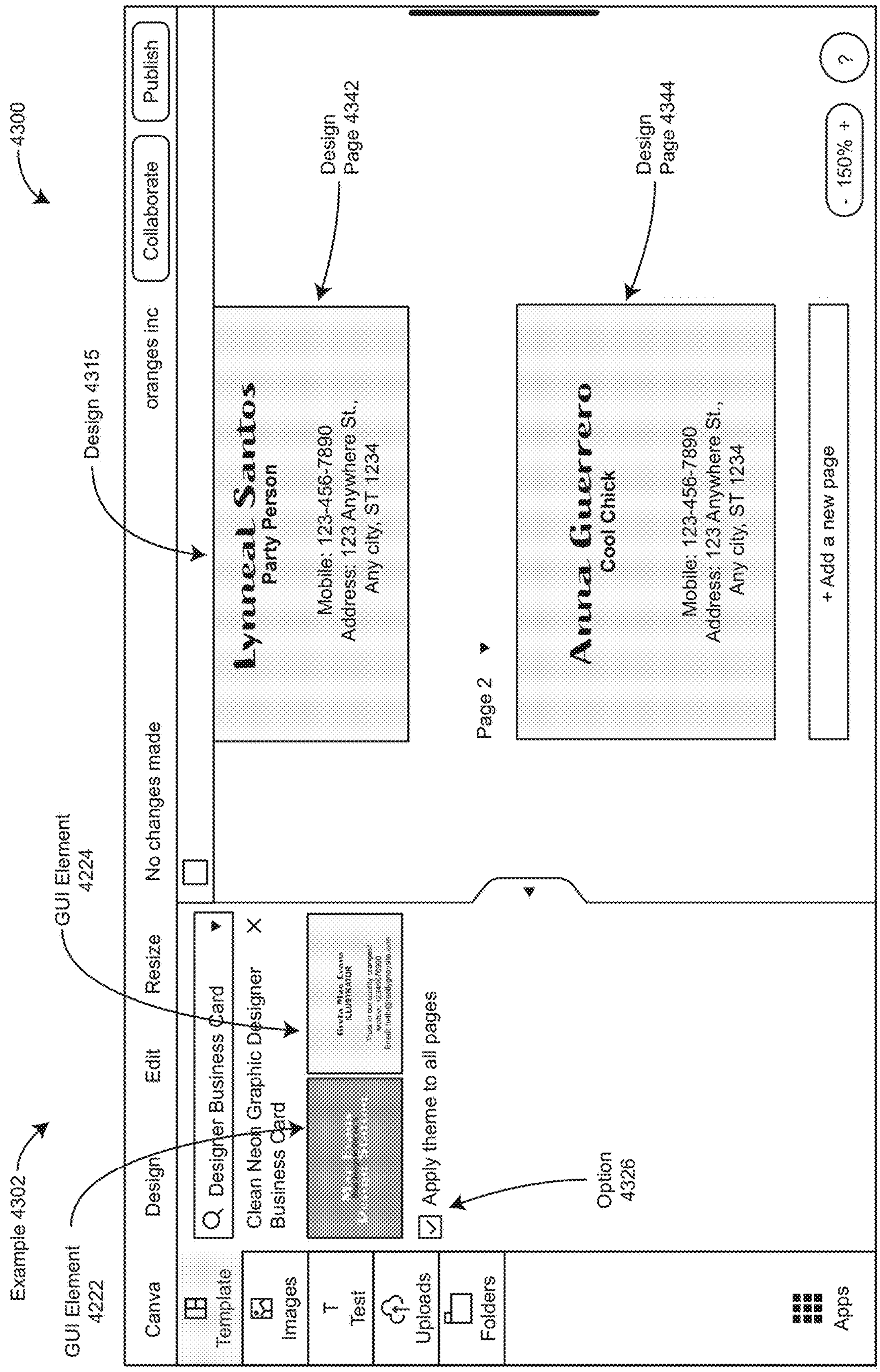
FIG. 43 illustrates particular examples of a design that may be generated by the system of FIG. 1.

In an example 4304 of FIG. 43, the user 104 unselects the option 4326. The design service(s) 126, in response to detecting that the option 4326 is unselected, updates inactive pages of the design 4315 by copying corresponding pages of the design 115. For example, the design service(s) 126, in response to determining that the design page 4342 is designated as an inactive page of the design 4315 and that the design page 4242 of the design 115 corresponds to the design page 4342, updates the design page 4342 by copying the design page 4242. As another example, the design service(s) 126, in response to determining that the design page 4344 is designated as the active page of the design 4315, refrains from updating the design page 4344. The design 4315 thus includes design pages that are based on different design templates.

Figure 44:
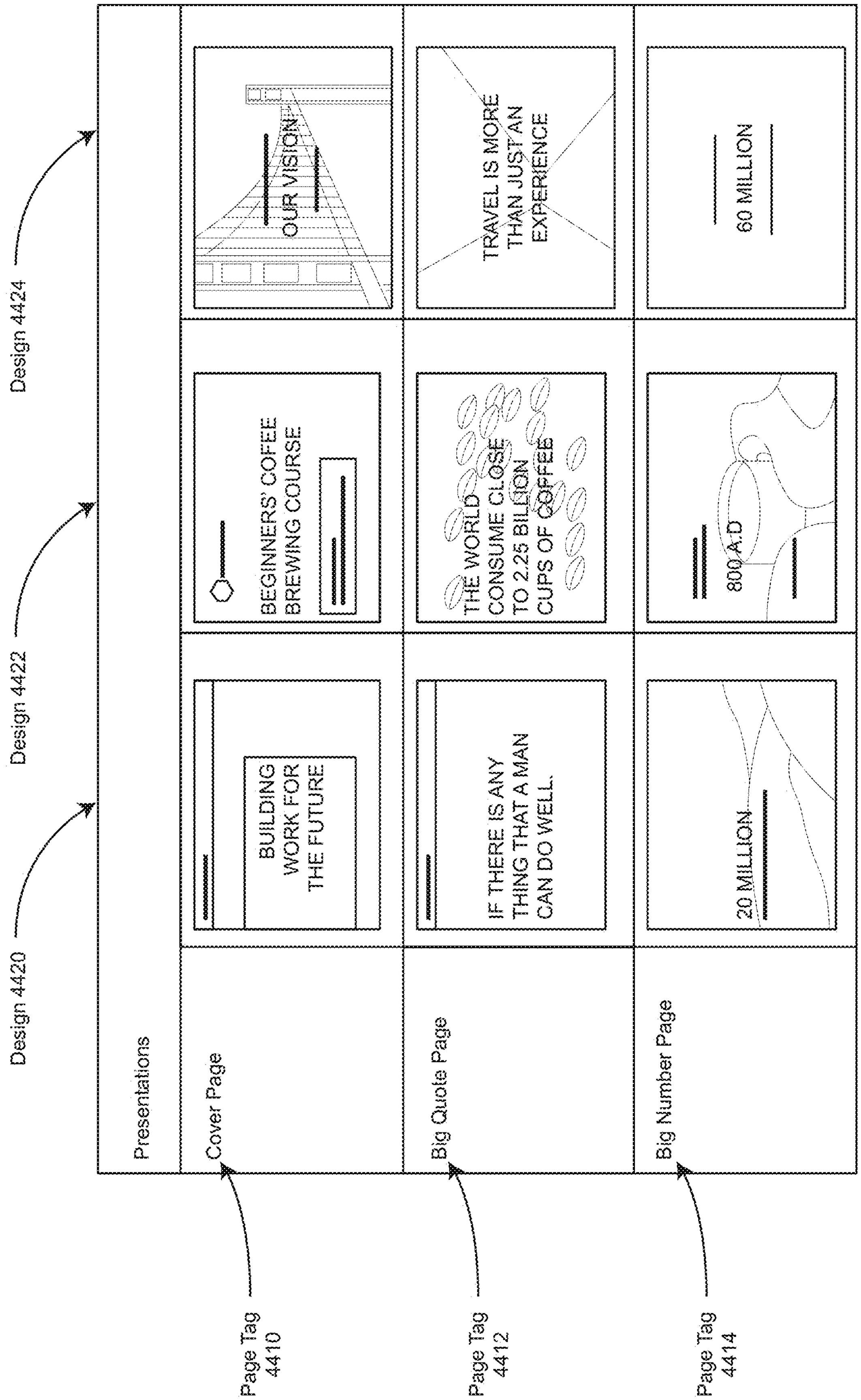
FIG. 44 illustrates particular examples of designs that may be generated by the system of FIG. 1.

FIG. 44 provides examples of a design 4420, a design 4422, and a design 4424. Each of the designs 4420, 4422, and 4424 is based on the design template 105. The design template 105 is of a presentation design type (e.g., the type 157). The design template 105 includes a first design page, a second design page, and a third design page assigned a page tag 4410 (e.g., a cover page), a page tag 4412 (e.g., big quote page), and a page tag 4414 (e.g., a big number page), respectively. In a particular aspect, page tags associated with the presentation design type include a title page, a pie graph page, a line graph page, a bullet points page, a big quote page, a big number page, a content details page, or a combination thereof. In a particular aspect, page tags associated with a yearbook design type include a front cover, a table of contents, a class photos page, an individual portraits page, an autographs page, or a combination thereof. In a particular aspect, page tags associated with a magazine design type include a front cover, a table of contents, publication credits, letter from the editor, an article page, or a combination thereof.

Figure 45:
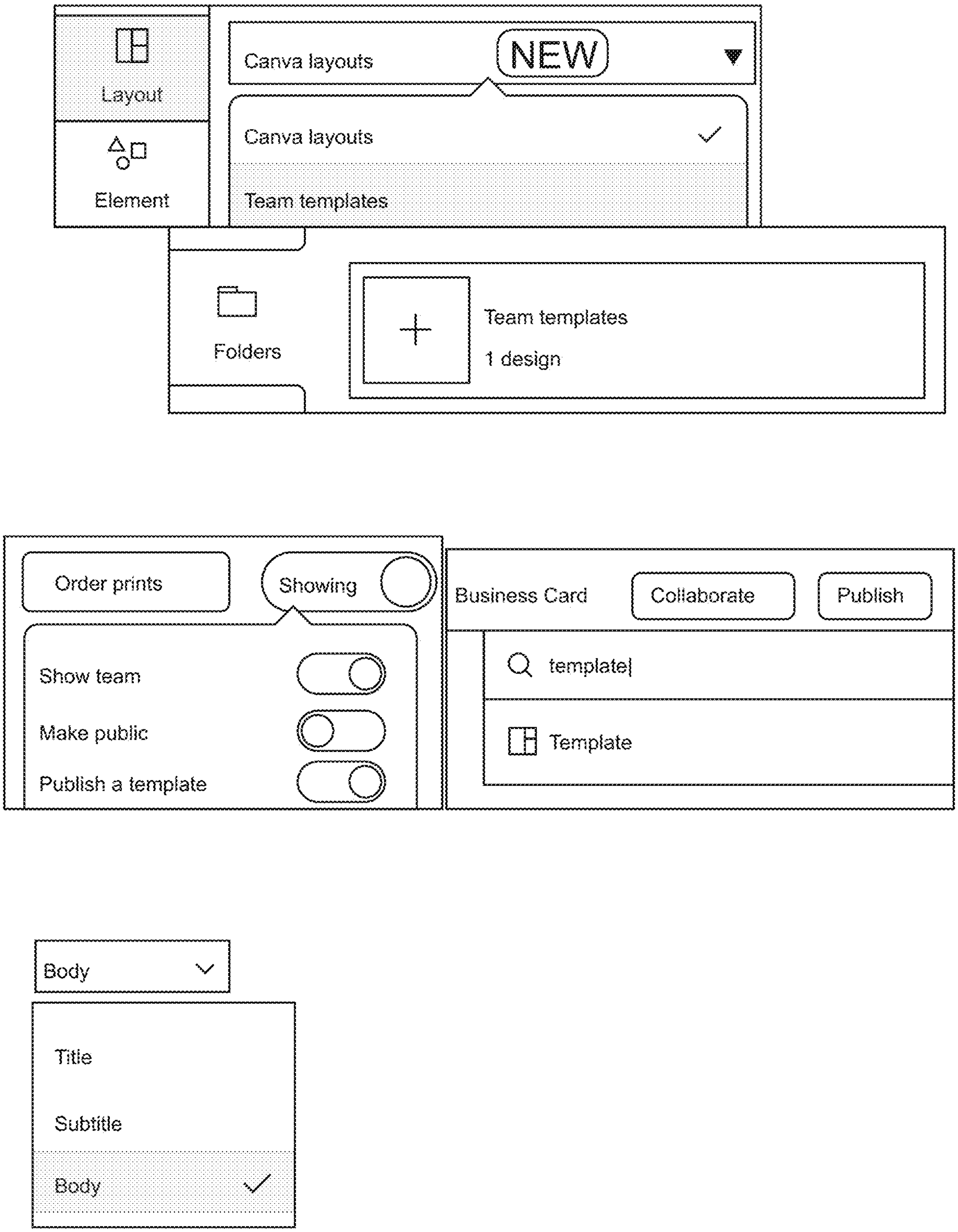
FIG. 45 illustrates a particular example of a website that may be generated by the system of FIG. 1.

In the example illustrated in FIG. 45, the GUI 181 enables a template designer (e.g., the user 104 or another user) to generate a design template that is available for use by team members (e.g., users) of a particular team. In an example 4602 of FIG. 46, the GUI 181 includes a tutorial (e.g., a pop-up tutorial). The tutorial provides information regarding assigning content roles to design elements. In a particular example, the tutorial is displayed in response to determining that the template designer is specifying a team template for the first time. In an example 4604 of FIG. 46, the GUI 181 displays suggestions for content roles in response to determining that the template designer has added a design element to the design template.

Figure 46:
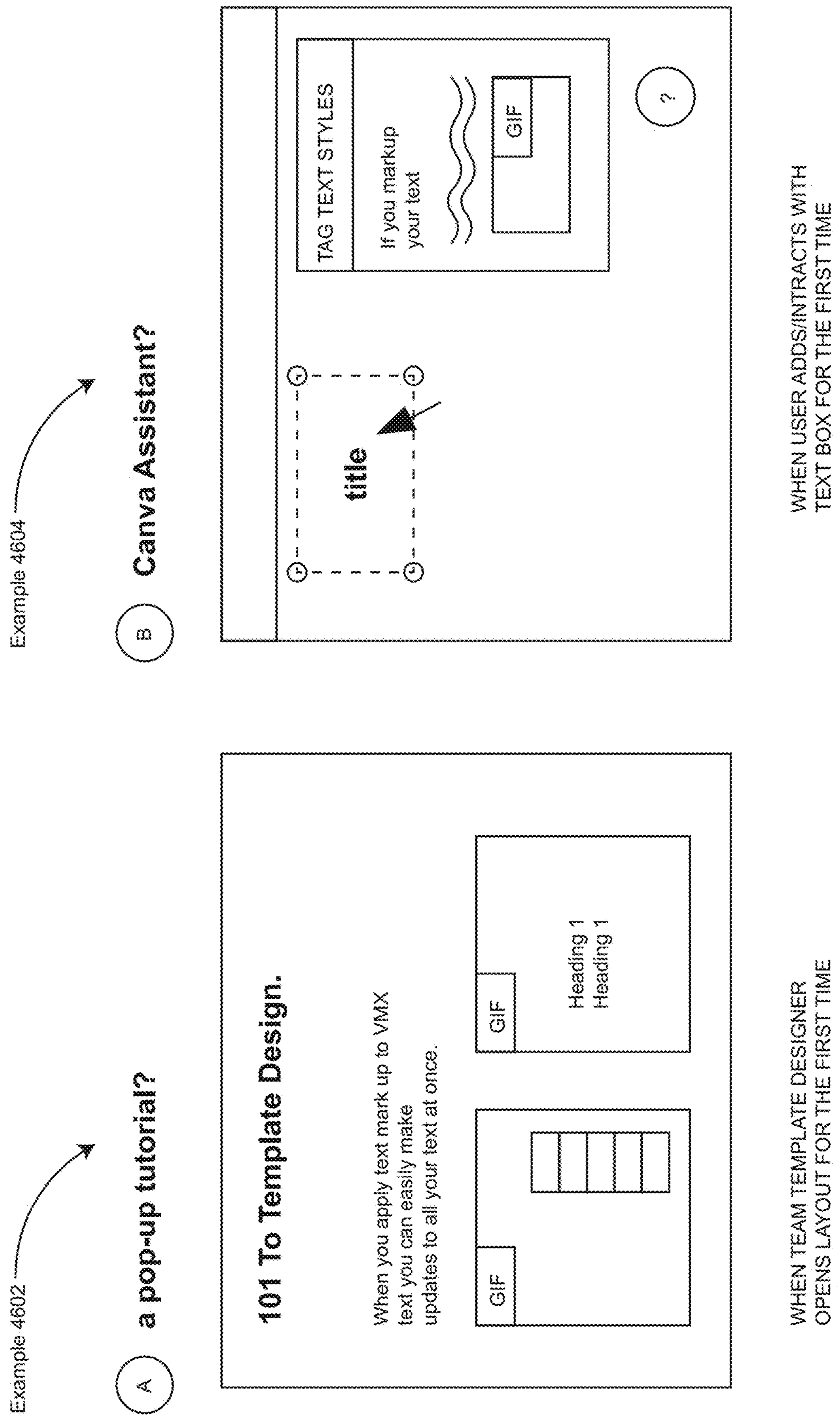
FIG. 46 illustrates a particular example of a design template that may be generated by the system of FIG. 1.

In an example 4606 of FIG. 46, a design template 105 of a single-page design is shown. In a particular aspect, the design template 105 includes a team template. For example, the design template 105 is designated as available for use by one or more teams. The design template 105 includes one or more text elements. In a particular aspect, the text elements are assigned content roles. In a particular aspect, the type 157 of the design template 105 indicates that the design template 105 is a default single-page design template. In a particular aspect, the GUI 181 displays suggested design templates. In an example 4702 of FIG. 47, a design template 105 of a two-page design is shown. For example, the type 157 of the design template 105 indicates that the design template 105 is a default two-page design template. In a particular aspect, the design pages of the design template 105 are assigned page tags.

Figure 47:
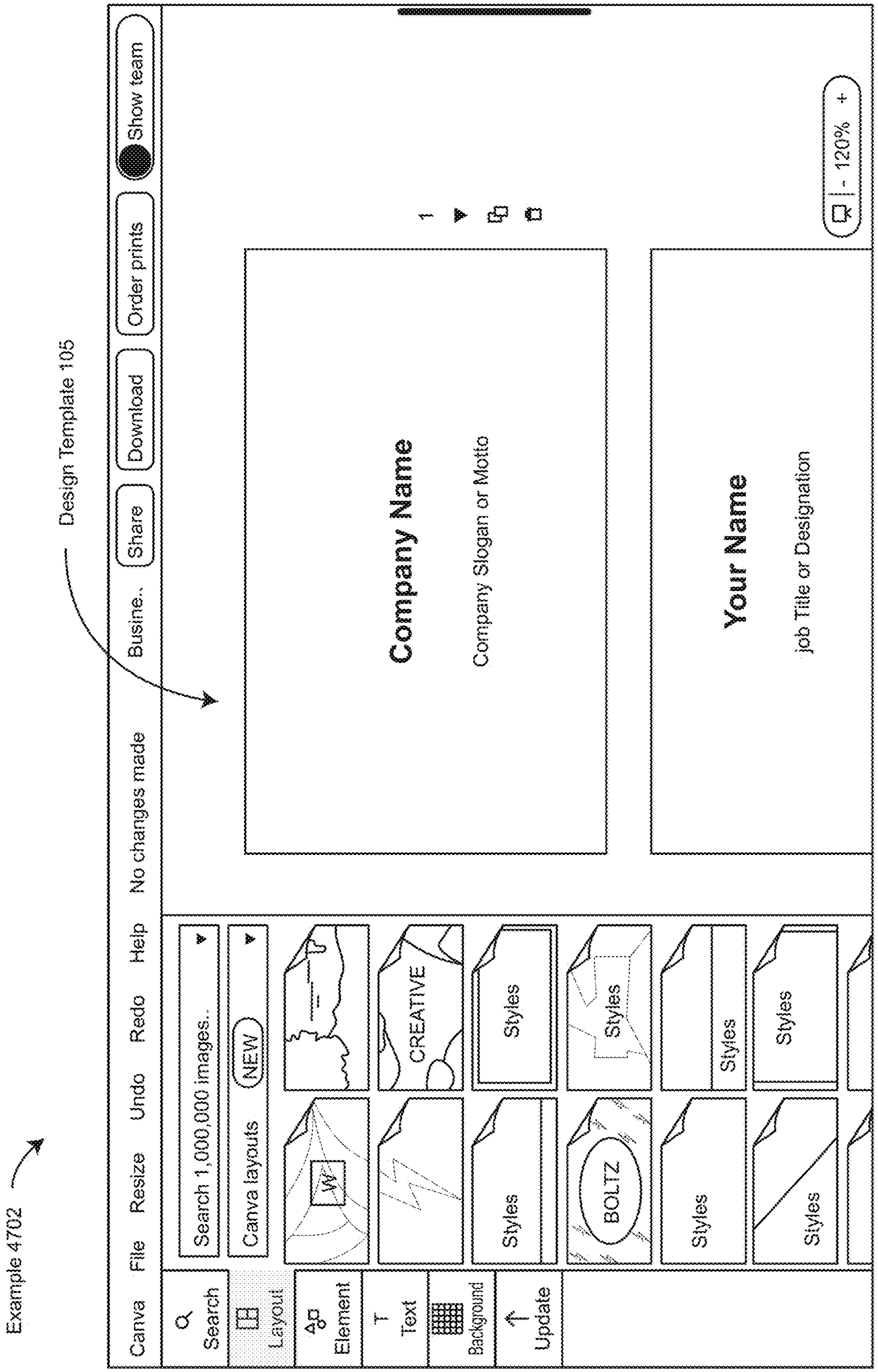
FIG. 47 illustrates particular examples of a design template that may be generated by the system of FIG. 1.

In an example 4704 of FIG. 47, a design template 105 of a multi-page design is shown. For example, the type 157 of the design template 105 indicates that the design template 105 is a default multi-page design template. In a particular aspect, the GUI 181 includes an option 4726 to add a new page to the design template 105. The design service(s) 126, in response to receiving a selection of the option 4726, adds a default design page to the design template 105. The default design page is associated with a default page tag (e.g., "Default Page"). In a particular aspect, the default design page includes one or more design elements (e.g., pre-populated text elements). In a particular aspect, a first default design page added to a design template of a first type (e.g., a presentation type) differs from a second default design page added to a design template of a second type (e.g., a business card type). For example, the first design template includes a text element having a first content role (e.g., "Presentation Title") and the second design template includes a text element having a second content role (e.g., "Contact Information").

Figure 48:
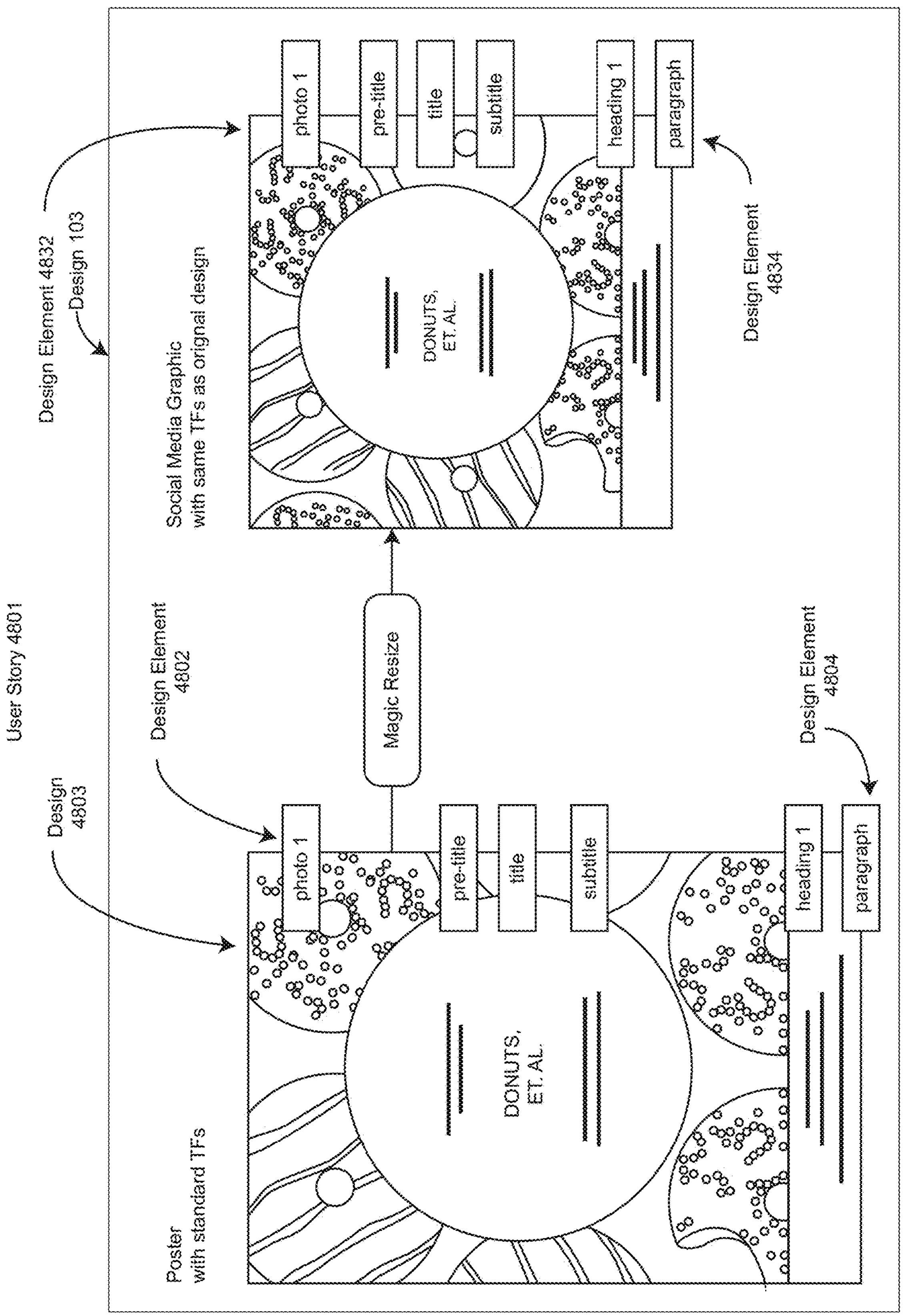
FIG. 48 illustrates particular examples of designs that may be generated by the system of FIG. 1.
Figure 49:
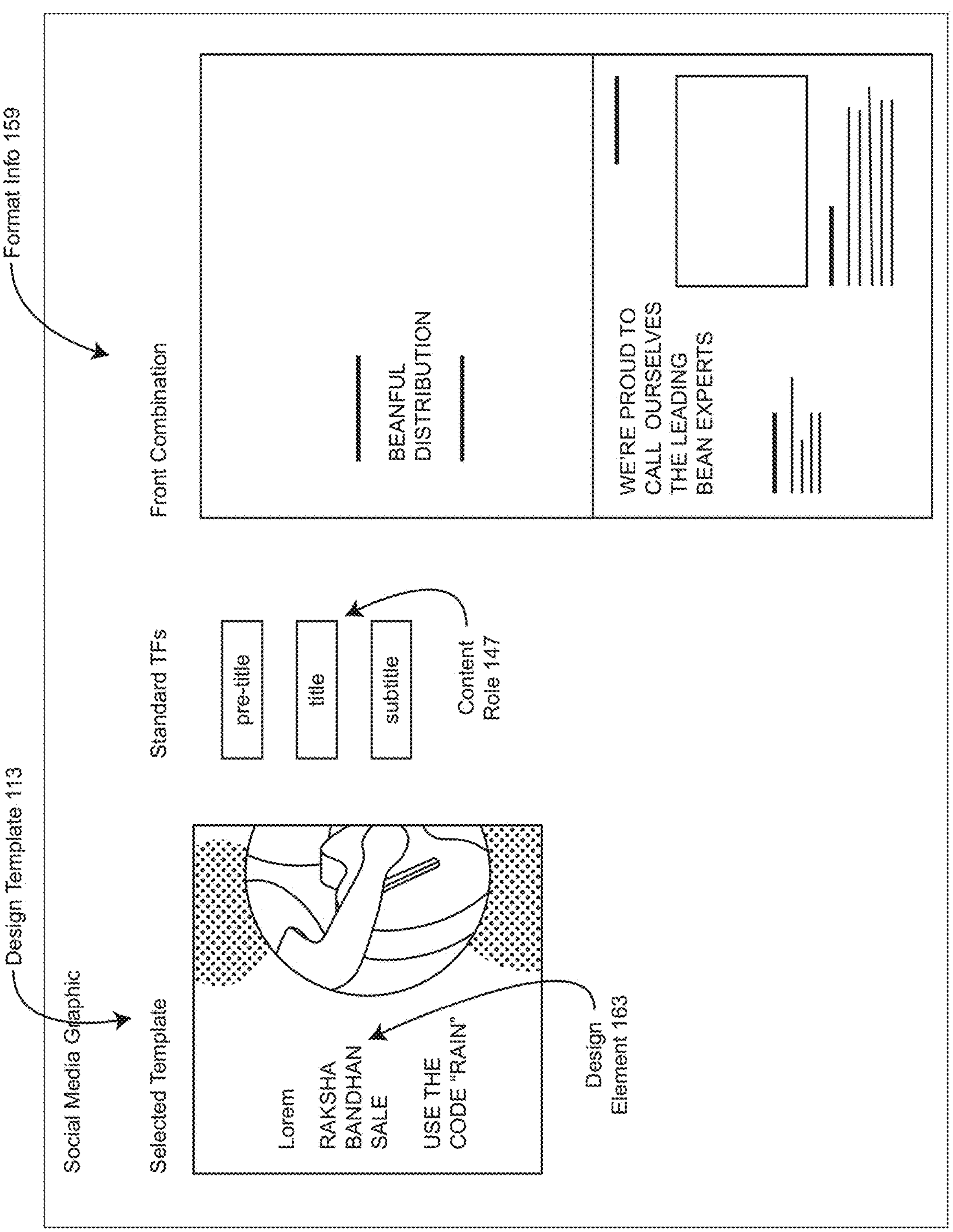
FIG. 49 illustrates a particular example of a design template that may be generated by the system of FIG. 1.
Figure 50:
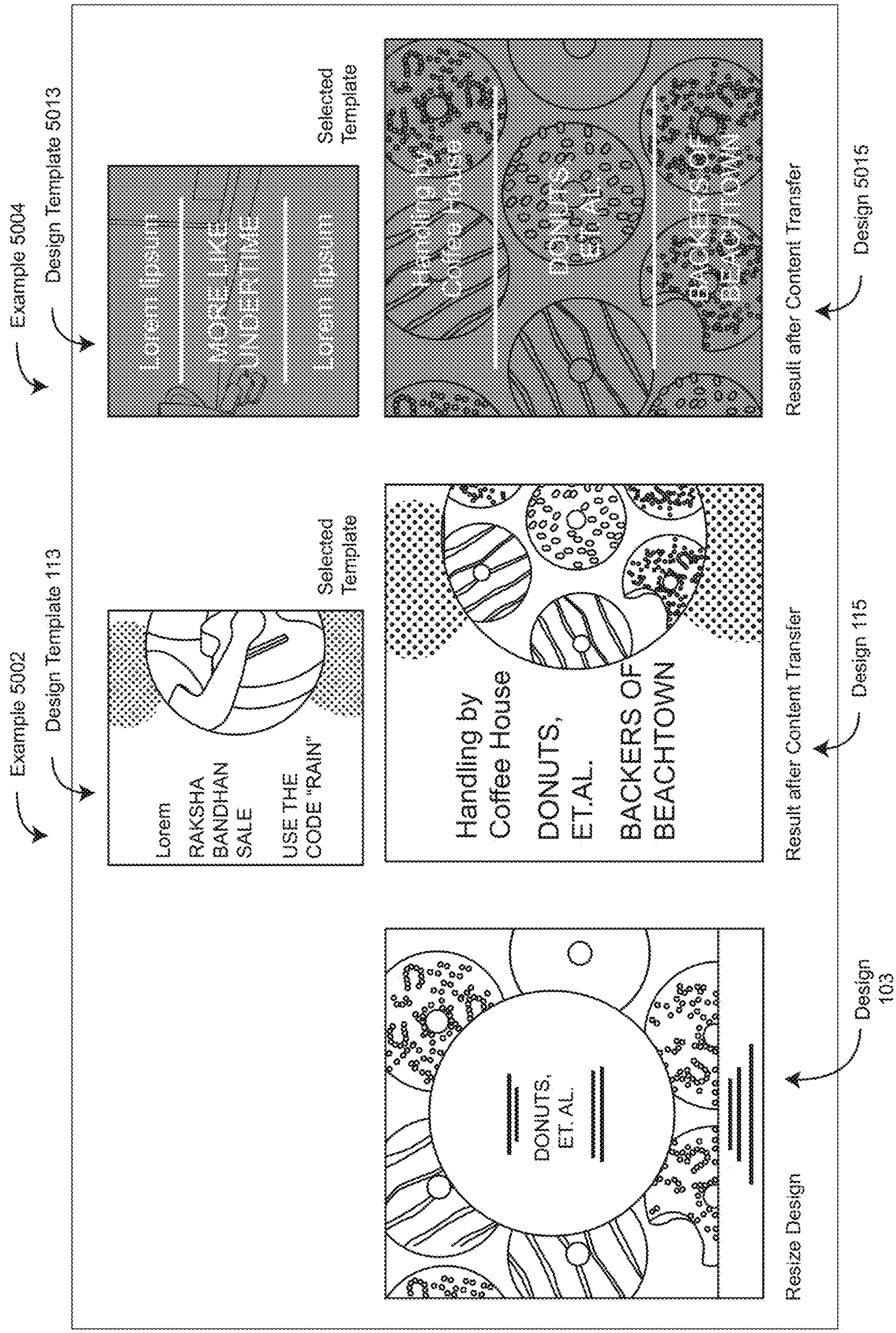
FIG. 50 illustrates particular examples of designs that may be generated by the system of FIG. 1.

FIGS. 48-50 illustrate a user story 4801 where a design is based on the design template 105, the design is resized, and the design template 113 is applied to the resized design. In an example illustrated in FIG. 48, a design 4803 is based on the design template 105. The design template 105 is of a poster design type. The poster design type is associated with a first width and a first height. For example, the design template 105 includes a design page having the first width and the first height.

The user 104 selects an option to change a type of the design 4803. For example, the user 104 selects an option to change the type to a social media graphic type. The social media graphic type is associated with a second width and a second height. The design service(s) 126, in response to receiving the selection of the option, generates the design 103 based on the design 4803. For example, the design 103 includes a design element 4832 and a design element 4834 corresponding to a design element 4802 and a design element 4804, respectively, of the design 4803.

In a particular aspect, the design elements of the design 103 are resized relative to corresponding design elements of the design 4803. In a particular aspect, the design service(s) 126 sets a text element (e.g., the design element 4834) to have a particular width and a particular height. The particular width is based on the first width and the second width. The particular height is based on the first height and the second height. In a particular aspect, the design service(s) 126 updates a font size of the text element based on the first height, the second height, the first width, the second width, or a combination thereof.

In a particular example, the design service(s) 126 sets a background image element (e.g., the design element 4832) of the design 103 to have the second width and the second height. In a particular aspect, a first image is included in a background image element (e.g., the design element 4802) of the design 4803. The design service(s) 126 generates a second image by performing a cropping operation, a resizing operation, or both, on the first image. The background image element (e.g., the design element 4832) of the design 103 includes the second image.

In the example illustrated in FIG. 49, the design template 113 includes a first design element associated with a pre-title content role, a second design element (e.g., the design element 163) associated with a title content role (e.g., the content role 147), and a third design element associated with a subtitle content role. The design template 113 indicates the format information 159.

In an example 5002 of FIG. 50, the design service(s) 126 generates the design 115 by applying the design template 113 to the design 103. In an example 5004, the design service(s) 126 generates a design 5015 by applying a design template 5013 to the design 103. Content transfer can thus be performed from a first type of design (e.g., a poster design) to a design template of a second type (e.g., a social media graphic design template) to generate a design of the second type (e.g., the social media graphic design).

Figure 51:
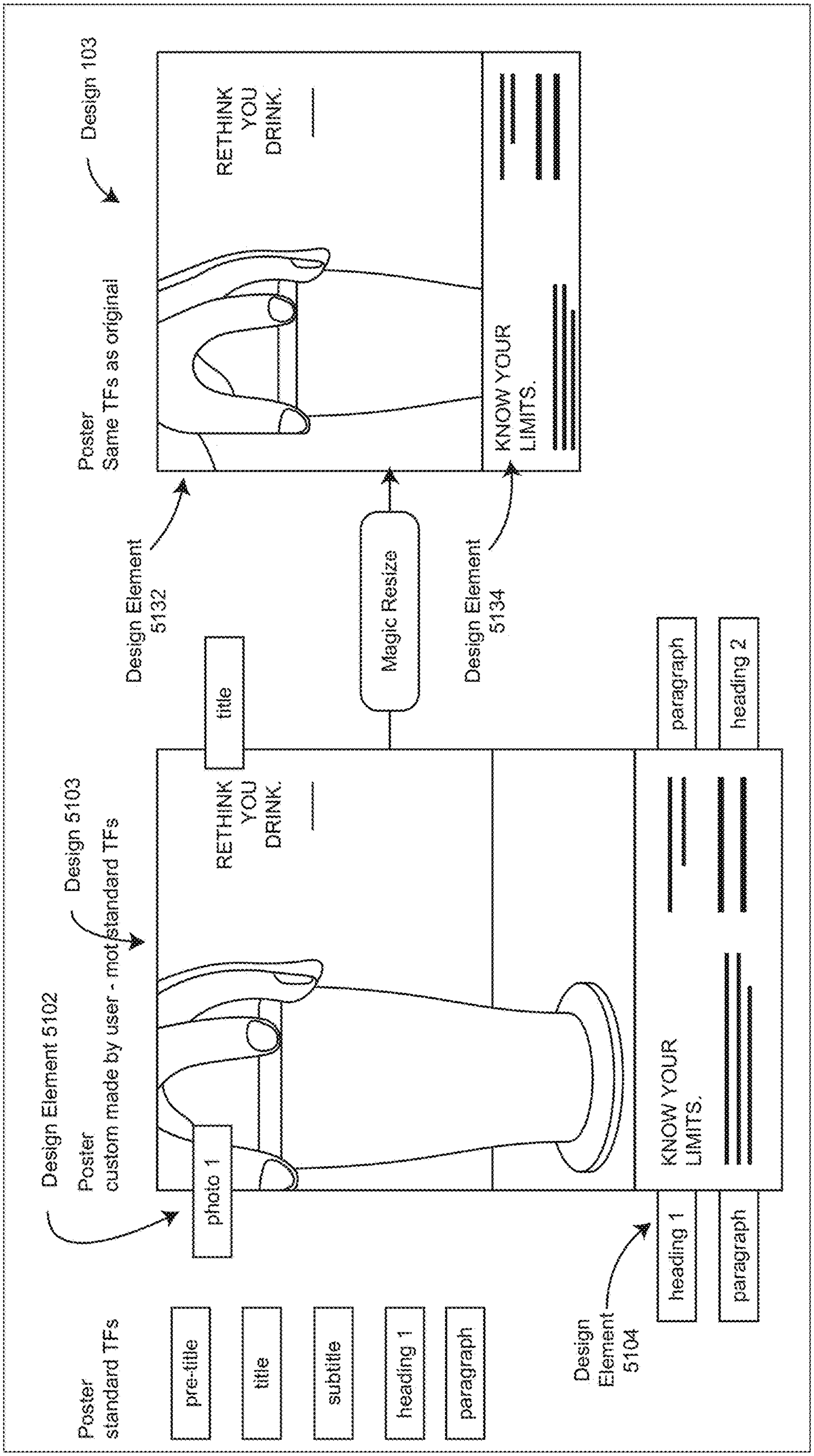
FIG. 51 illustrates particular examples of designs that may be generated by the system of FIG. 1.
Figure 52:
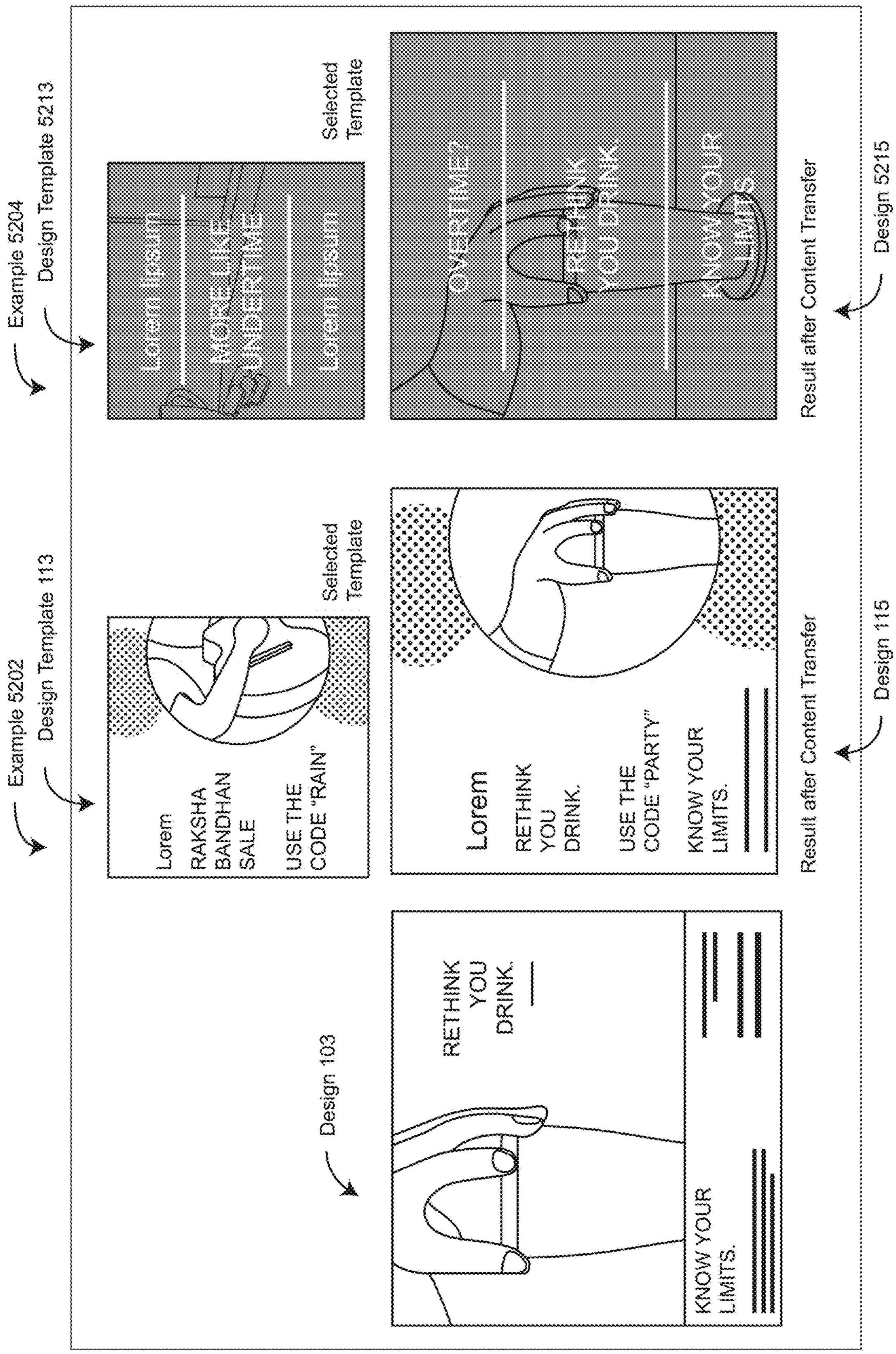
FIG. 52 illustrates particular examples of design templates that may be generated by the system of FIG. 1.

FIGS. 51-52 illustrate a user story 5101 of the user 104 resizing a custom design and applying design templates to the resized design. In an example illustrated in FIG. 51, the user 104 generates a design 5103 by adding design elements to the design 5103. For example, the design 5103 includes an image element (e.g., a design element 5102) and a text element (e.g., a design element 5104). The design 5103 has a first width and a first height that are based on user input. For example, the user 104 provides the user input to update a default poster size. As another example, the user 104 generates the design 5103 by editing a blank design that has the first width and the first height, and the user 104 updates the type to indicate that the design 5103 is a poster.

The user 104 selects an option to resize the design 5103 to have a size associated with a poster design type. For example, the poster design type is associated with a second width and a second height. The design service(s) 126, in response to receiving the selection of the option, generates the design 103 based on the design 5103. The design 103 includes a design element 5132 and a design element 5134 corresponding to the design element 5102 and the design element 5104, respectively. The design 103 has the second width and the second height. In a particular aspect, the design element 5134 is resized relative to the design element 5104. In a particular aspect, the design element 5132 is resized relative to the design element 5102. In a particular aspect, the design element 5132 includes a second image that is a cropped version of a first image included in the design element 5102.

In an example 5202 of FIG. 52, the design service(s) 126 applies the design template 113 to the design 103. For example, the design service(s) 126 generates the design 115 by copying the design template 113. The design 115 includes a pre-title text element, a title text element, a subtitle text element, and an image element corresponding to a pre-title text element (e.g., "Any Store"), a title text element (e.g., "Raksha Bandhan Sale"), a subtitle text element ("Use the Code 'Rakhi' to Get 50% Off"), and an image element (e.g., an image with a guitar), respectively, of the design template 113.

The design service(s) 126 updates the design 115 by applying a content signature of the design 103 to the design 115. The design service(s) 126, in response to determining that the design 103 includes a title text element (e.g., "Rethink Your Drink") and an image element (e.g., an image with a glass), copies the text (e.g., "Rethink Your Drink") and the image (e.g., an image with a glass) to the title text element and the image element, respectively, of the design 115. The design service(s) 126, in response to determining that the design 103 does not include a pre-title text element and a subtitle text element, refrains from updating the pre-title text element and the subtitle text element of the design 5215. In a particular aspect, the design service(s) 126, in response to determining that the design 103 includes a background image element that is edited, updates.

The design service(s) 126 determines that the design 103 includes one or more unmatched elements that do not correspond to any remaining elements of the design 115, such as a heading1 text element (e.g., "Know Your Limits."), a first paragraph text element (e.g., "Through moderate drinking you can reduce . . . and stay sober"), a second paragraph element (e.g., "Learn more about . . . "), and a heading 2 text element (e.g., "National Organization Against Drunk Driving"). The design service(s) 126 adds design elements to the design 115 that correspond to the unmatched design elements of the design 103.

In an example 5204 of FIG. 52, the design service(s) 126 applies a design template 5213 to the design 103. For example, the design service(s) 126 generates a design 5215 by copying the design template 5213 and updates the design 5215 by applying a content signature of the design 103 to the design 5215.

Figure 53:
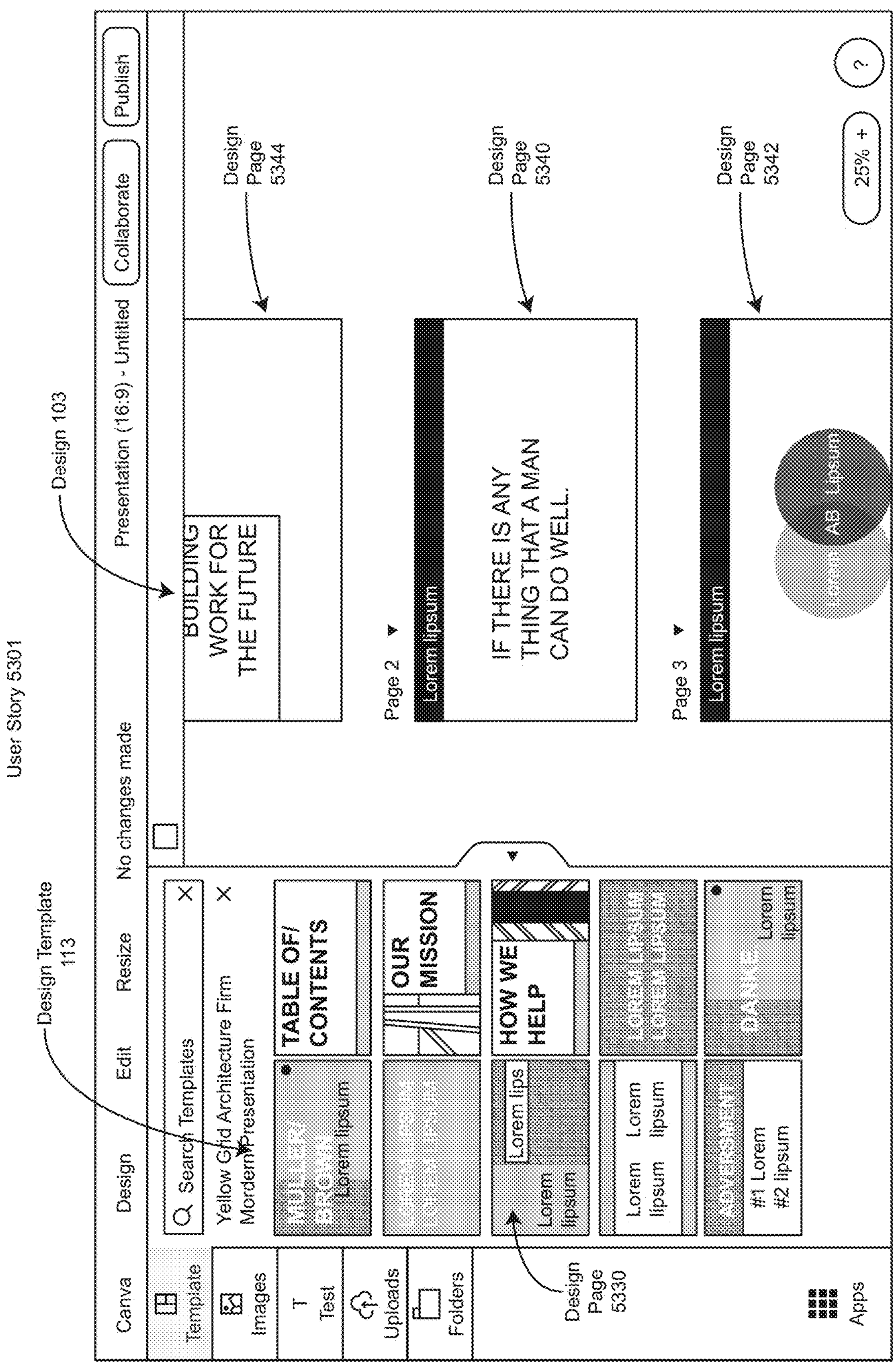
FIG. 53 illustrates particular examples of designs that may be generated by the system of FIG. 1.
Figure 54:
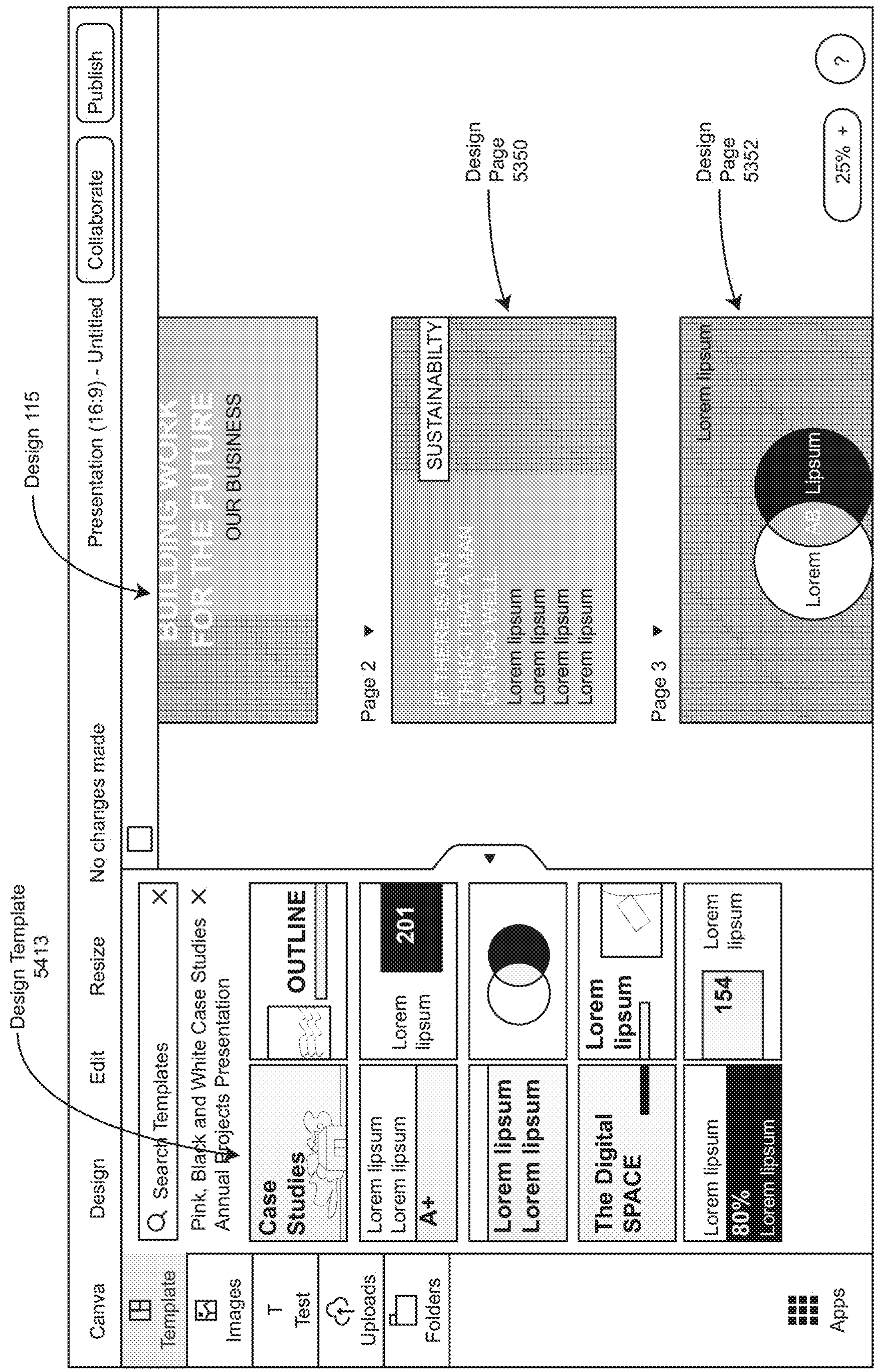
FIG. 54 illustrates particular examples of designs that may be generated by the system of FIG. 1.

FIGS. 53-54 illustrate a user story 5301 of the user 104 selecting a design template and the design service(s) 126 updating a theme of a design and a layout of an active page of the design based on the design template. In an example of FIG. 53, the user 104 selects a design page 5330 of the design template 113. The design service(s) 126, in response to receiving the selection of the design page 5330, identifies an active page of the design 103. For example, the design service(s) 126, in response to determining that a design page 5340 of the design 103 is a first (or top) fully displayed design page in a display portion of the GUI 181, designates the design page 5340 as the active page of the design 103. The remaining design pages (e.g., a design page 5342, a design page 5344, one or more additional design pages, or a combination thereof) are designated as inactive design pages of the design 103.

The design service(s) 126, in response to receiving the selection of the design page 5330, generates the design 115 having the format information 159 copied from the design template 113. The design service(s) 126, for each first design page of the design 103, adds a corresponding second design page to the design 115. For example, the design service(s) 126, adds a design page 5350, a design page 5352, and a design page 5354 corresponding to the design page 5340, the design page 5342, and the design page 5344, respectively. Each design page of the design 115 has a copy of the page tag of the corresponding design page of the design 103. For example, each of the design page 5344 and the design page 5354 has a first page tag (e.g., a title page), each of the design page 5340 and the design page 5350 has a second page tag (e.g., a Big Quotes page), and each of the design page 5342 and the design page 5352 has a third page tag (e.g., a Pie page). The design service(s) 126, in response to determining that the design page 5340 is the active page of the design 103, designates the corresponding design page (e.g., the design page 5350) of the design 115 as an active page of the design 115. The design service(s) 126 designates the remaining pages (e.g., the design page 5354 and the design page 5352) as inactive pages.

The design service(s) 126, for each inactive page of the design 115 that corresponds to a design page of the design template 113, updates the inactive page of the design 115 by copying the corresponding design page of the design template 113. For example, the design service(s) 126, in response to determining that the design page 5354 corresponds to (e.g., has the same page tag as) a design page 5334 of the design template 113, updates the design page 5354 by copying the design page 5334 (e.g., design elements and design element information). For example, the design page 5354 includes a first title text element and a second subtitle text element corresponding to a title text element and a subtitle text element of the design page 5334. The design service(s) 126 identifies a design page of the design 103 that corresponds to the inactive page of the design 115 and applies a content signature of the design page of the design 103 to the inactive page of the design 115. For example, the design service(s) 126 applies a content signature of the design page 5344 to the design page 5354. To illustrate, text of the first title text element and text of the first subtitle text element of the design page 5354 is updated based on text of a title text element and text of a subtitle text element, respectively, of the design page 5344.

The design service(s) 126, for each inactive page of the design 115 that does not correspond to any design page of the design template 113, updates the inactive page of the design 115 by copying the corresponding design page of the design 103. For example, the design service(s) 126, in response to determining that the design page 5352 does not correspond to (e.g., does not have the same page tag as) any design page of the design template 113, copies the design page 5342 (e.g., design elements and design element information) to the design page 5352. The design page 5352 is formatted based on the format information 159 (copied from the design template 113).

The design service(s) 126 updates a layout of the active page of the design 115. For example, the design service(s) 126 updates the active page (e.g., the design page 5350) of the design 115 by copying the active page (e.g., the design page 5330) of the design template 113. Copying the active page includes copying the page tag of the active page of the design template 113 to the active page of the design 115. In a particular aspect, the GUI 181, in response to receiving the selection of the design page 5330, generates an alert indicating that content transfer will not occur. In a particular aspect, the design 115 corresponds to an updated version of the design 103.

In an example of FIG. 54, the user 104 selects a design page 5430 of a design template 5413. The design service(s) 126, in response to receiving the selection of the design page 5430, designates the design page 5430 as an active page of the design template 5413, designates the design page 5350 as an active page of the design 115, generates a design 5415 having format information copied from the design template 5413, and designates a design page 5450 as an active page of the design 5415. The design service(s) 126 updates a theme of the design 5415 based on the design template 5413 and updates a layout of the design page 5450 based on a layout of the design page 5430. For example, the design service(s) 126 applies content signatures of inactive design pages of the design 103 to the corresponding design pages of the design 5415 and refrains from applying a content signature of the design page 5350 to the design page 5450.

Figure 55:
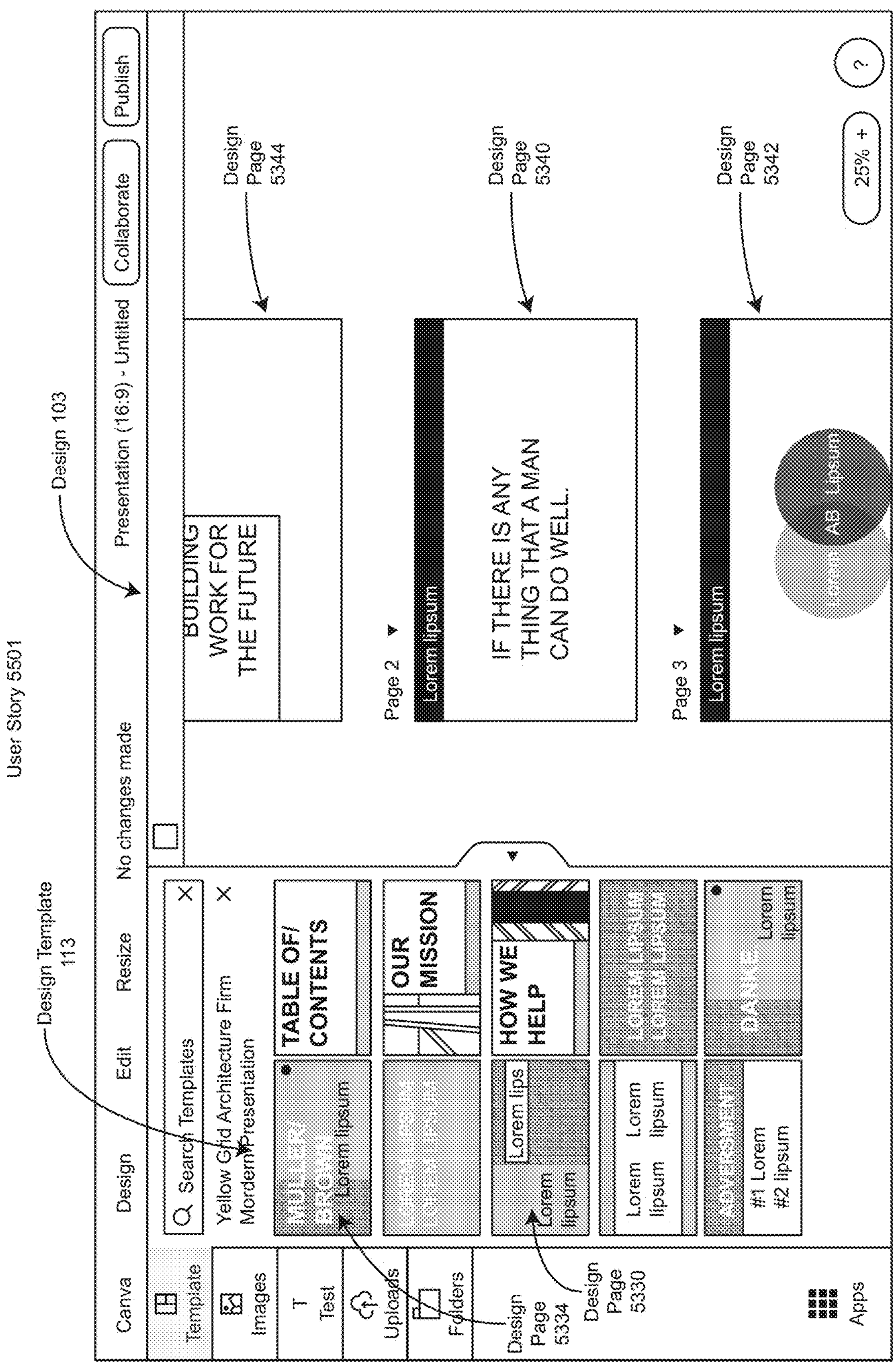
FIG. 55 illustrates particular examples of designs that may be generated by the system of FIG. 1.
Figure 56:
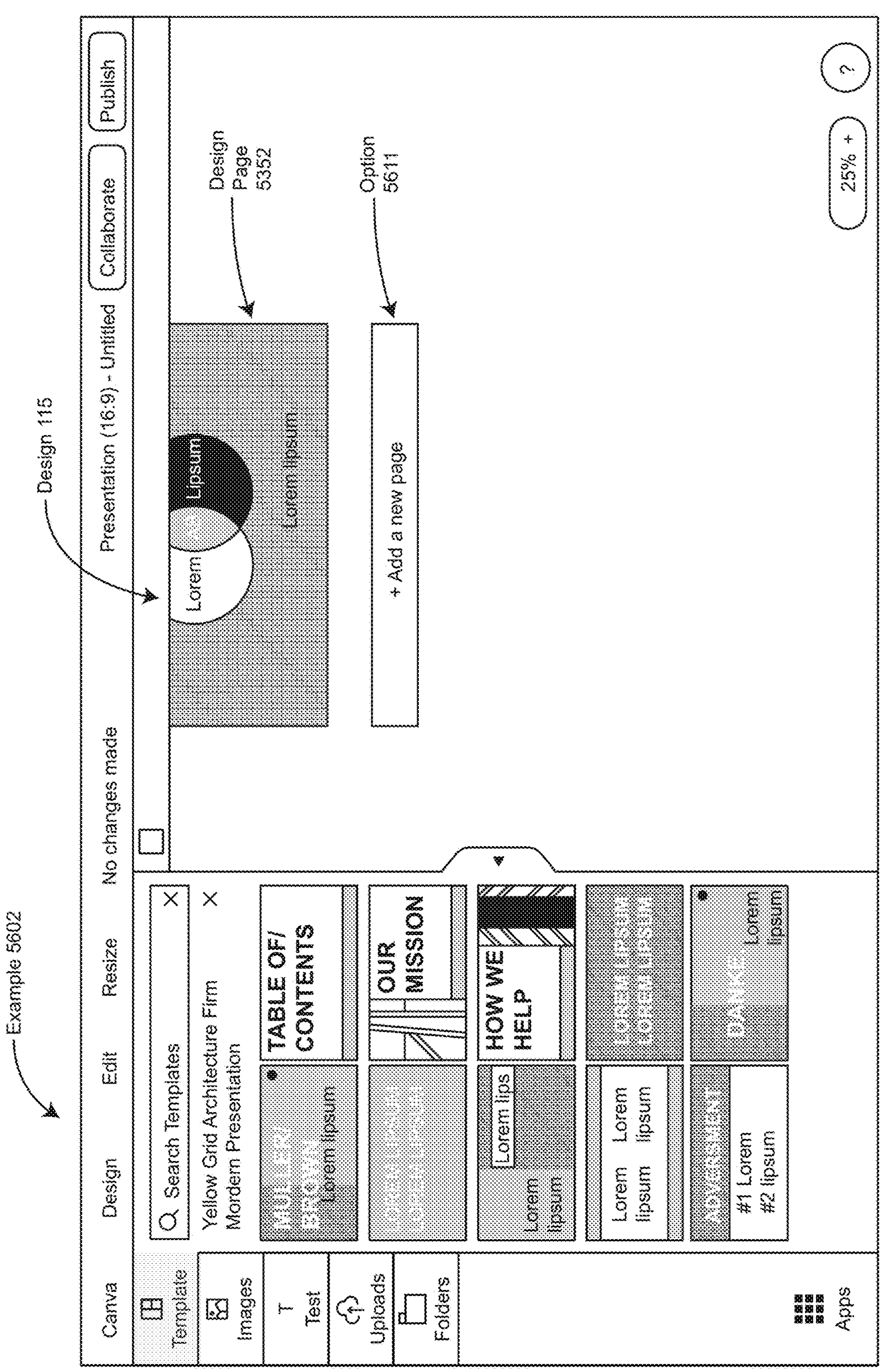
FIG. 56 illustrates particular examples of a design that may be generated by the system of FIG. 1.
Figure 57:
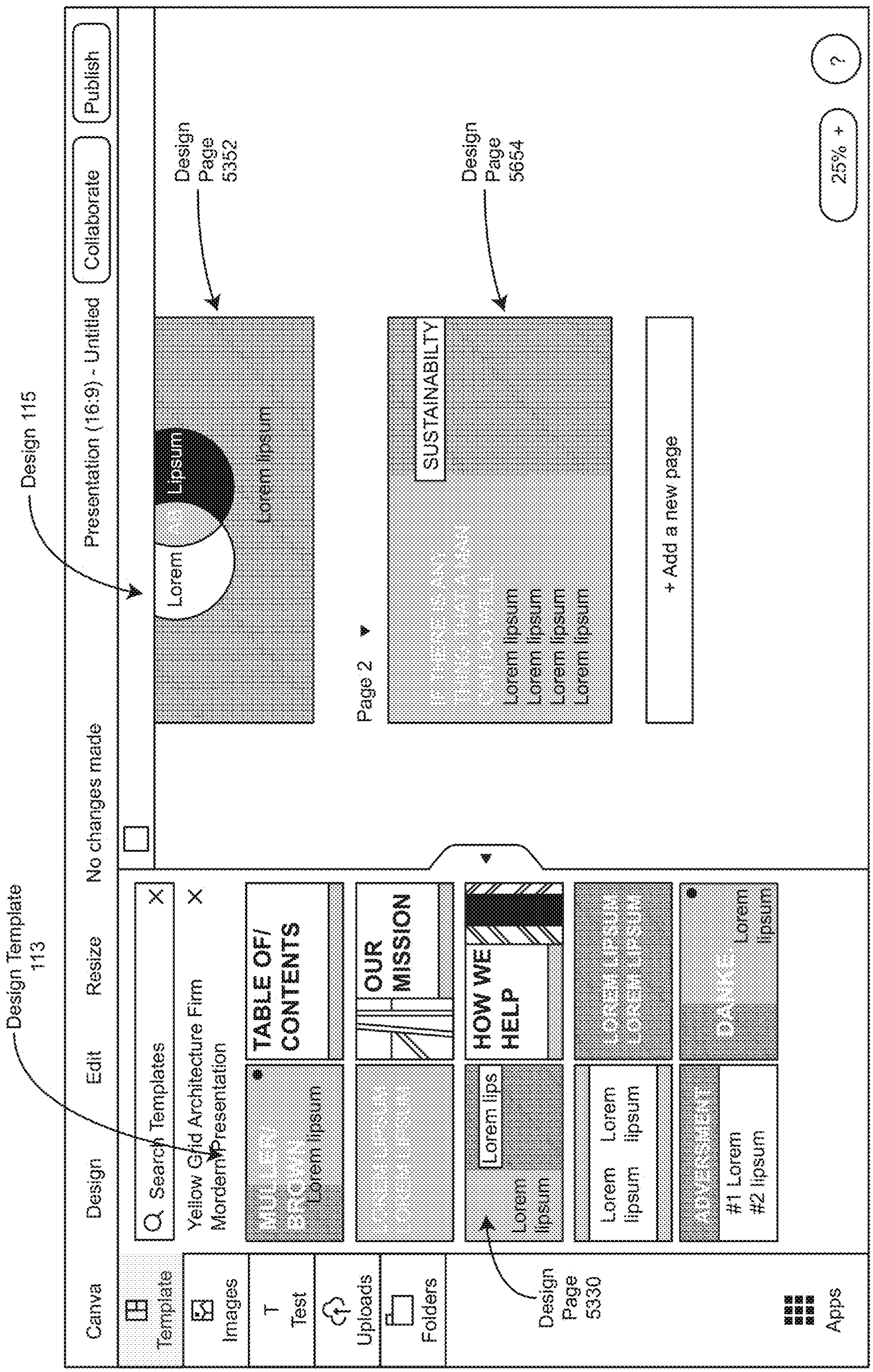
FIG. 57 illustrates a particular example of a design that may be generated by the system of FIG. 1.

FIGS. 55-57 illustrate a user story 5501 of the user 104 selecting a design template and the design service(s) 126 applying a theme of the design template to a design while a layout of the design is not updated.

The example illustrated in FIG. 55 differs from the example illustrated in FIG. 53 in that each design page of the design 115 is treated as an inactive page. For example, the design service(s) 126, in response to determining that a design page 5550 of the design 115 corresponds to (e.g., has the same page tag as) a design page 5330 of the design template 113, updates the design page 5550 by copying the design page 5330 (e.g., design elements and design element information). The design service(s) 126 applies a content signature of the design page 5340 to the design page 5550.

In an example 5602 of FIG. 56, the user 104 selects an option 5611 (e.g., an add new page option). In an example 5604 of FIG. 56, the design service(s) 126, in response to receiving the selection of the option 5611, adds a design page 5654 to the design 115. In a particular aspect, the design service(s) 126 assigns a default page tag to the design page 5654. The design page 5654 is formatted based on the format information 159 of the design 115.

In an example illustrated in FIG. 57, the user 104 selects the design page 5330 of the design template 113. The design service(s) 126, in response to receiving the selection of the design page 5330, designates the design page 5654 as an active page of the design 115 and designates the design page 5330 as an active page of the design template 113. The design service(s) 126, in response to determining that the active page of the design 115 corresponds to a default page (e.g., has a default page tag) that is unedited, updates a layout of the active page of the design 115 based on an active page of the design template 113. For example, the design service(s) 126 updates the design page 5654 by copying the design page 5330 (e.g., design elements and design element information). In a particular aspect, the design service(s) 126 updates the page tag of the design page 5654 by copying the page tag of the design page 5330.

Figure 58:
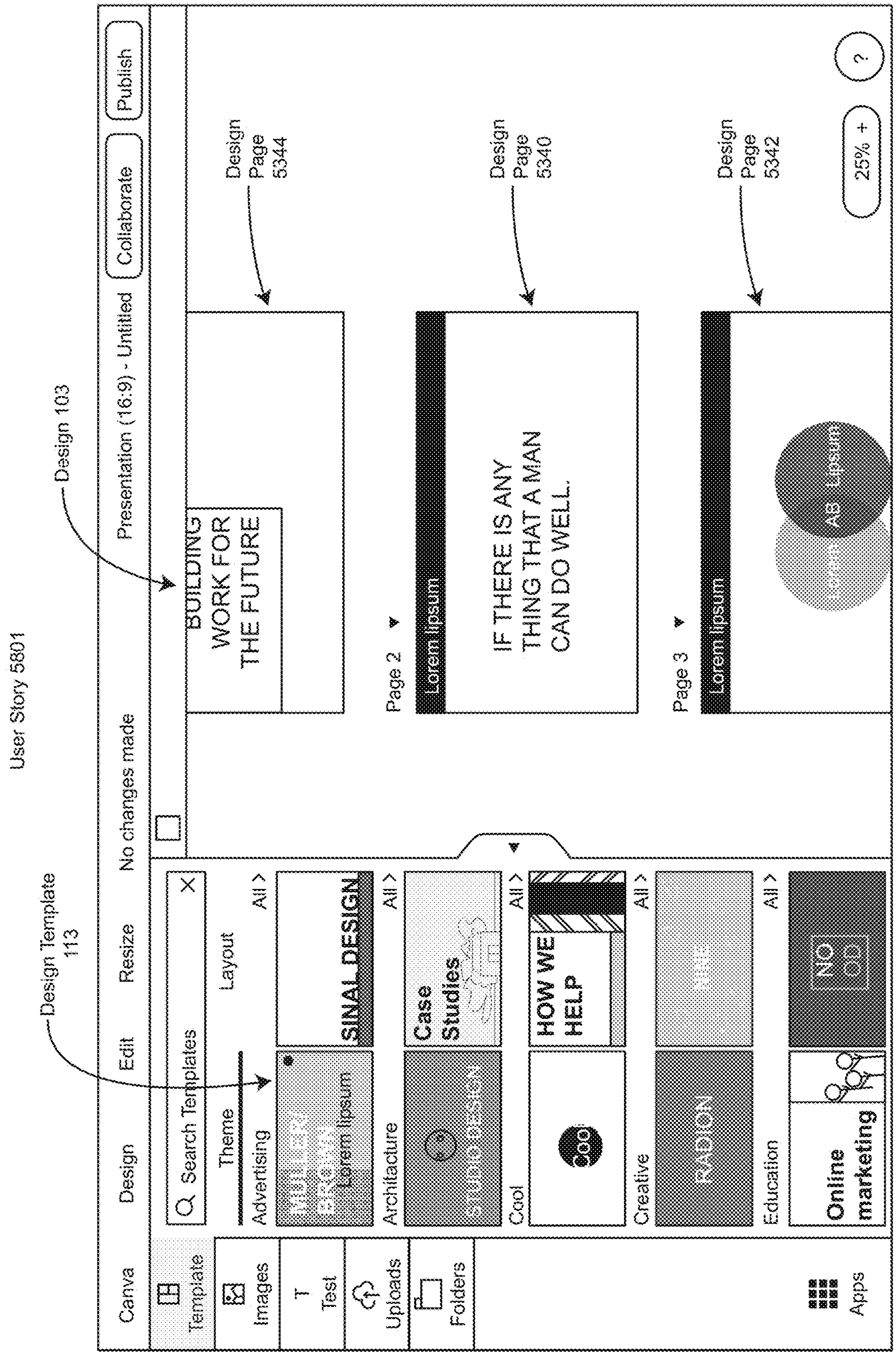
FIG. 58 illustrates particular examples of designs that may be generated by the system of FIG. 1.
Figure 59:
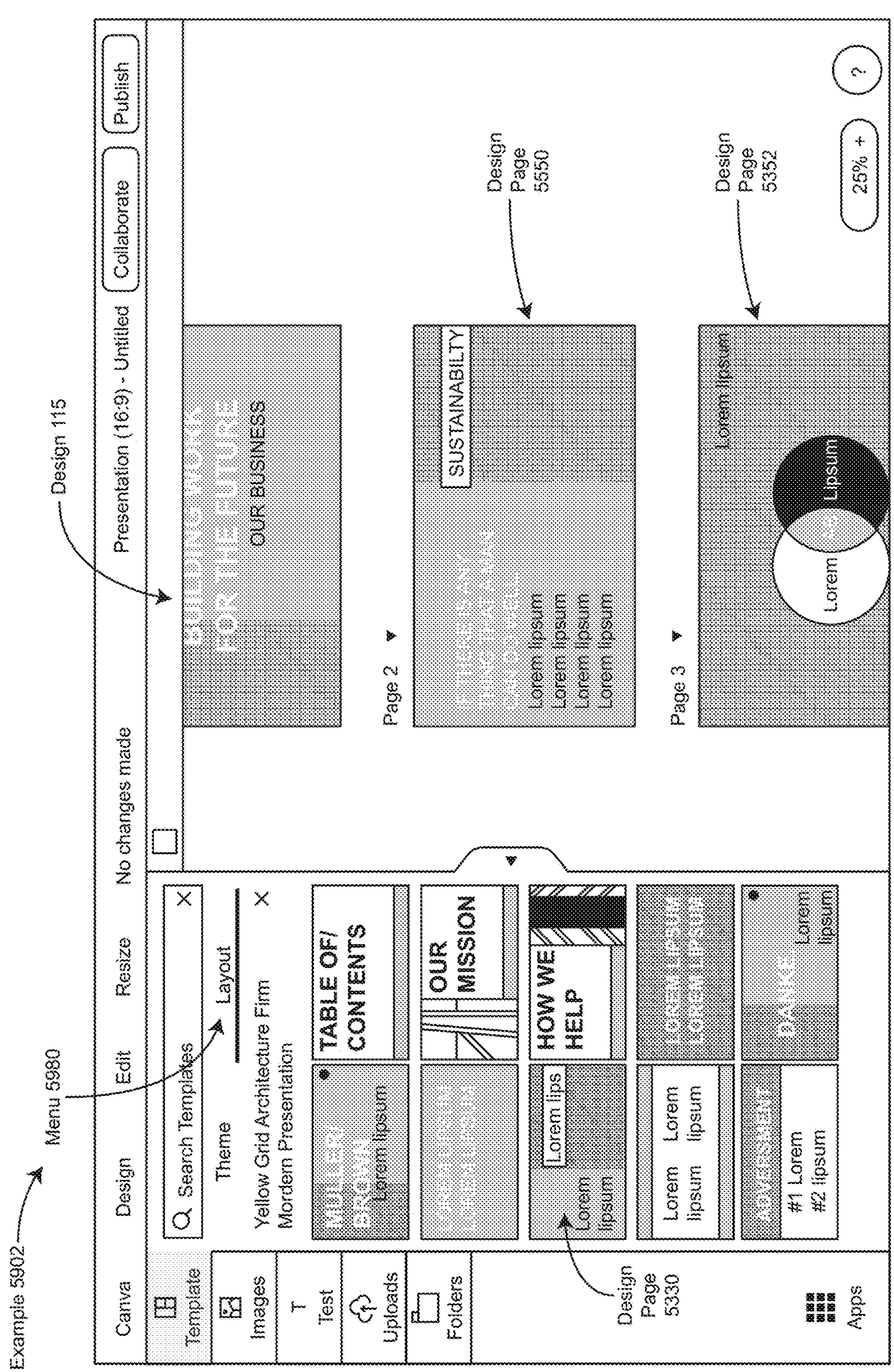
FIG. 59 illustrates particular examples of designs that may be generated by the system of FIG. 1.
Figure 60:
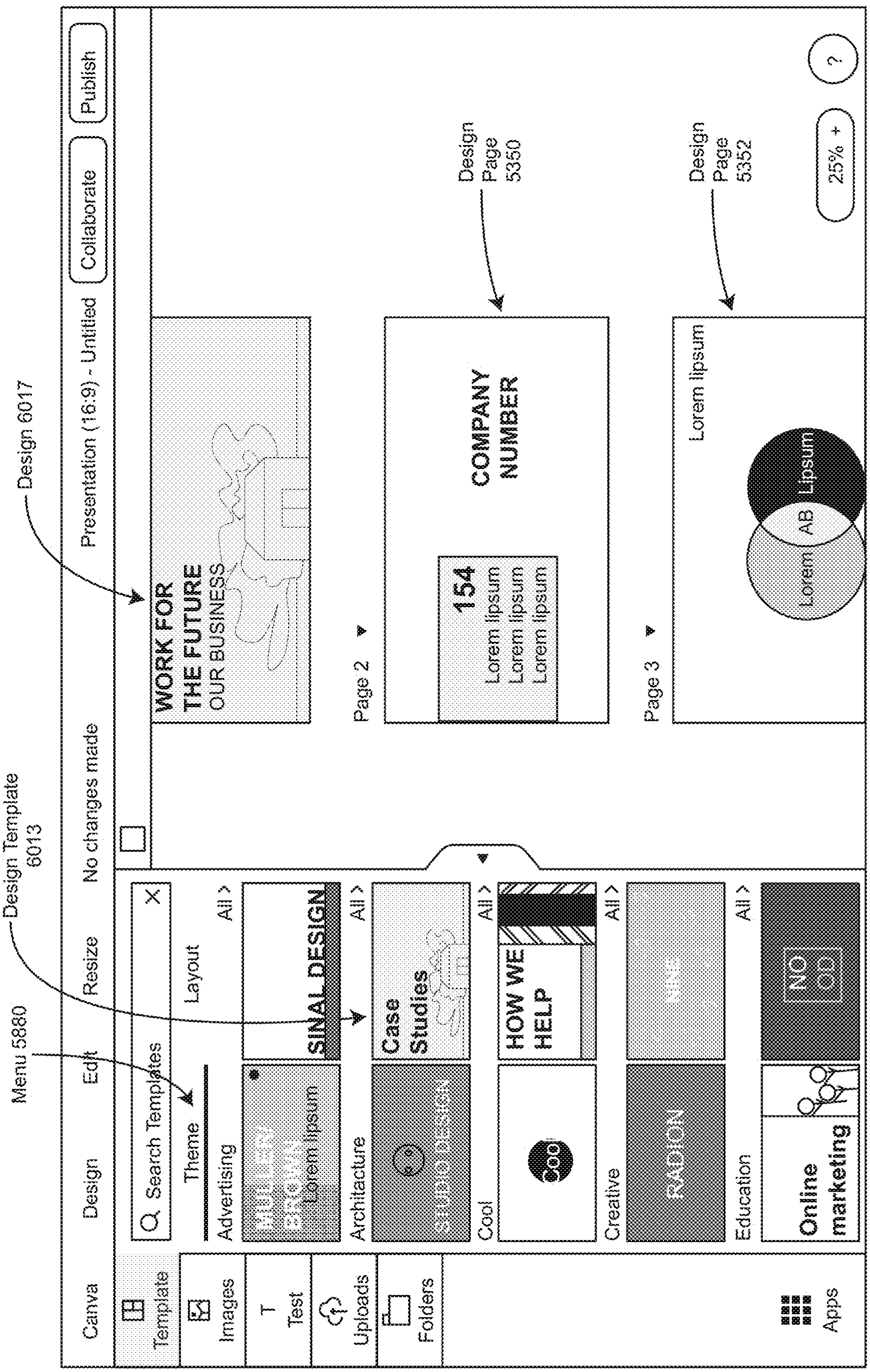
FIG. 60 illustrates a particular example of a design that may be generated by the system of FIG. 1.

FIGS. 58-60 illustrate a user story 5801 where selecting a design template in a theme menu updates a theme of a design based on the design template and selecting a design template in a layout menu updates a layout of an active page of the design (and potentially theme as well) based on the design template.

The example illustrated in FIG. 58 differs from the example illustrated in FIG. 55 in that the design service(s) 126 generated the design 115 in response to receiving a selection of the design template 113 from a menu 5880 (e.g., a theme menu or a theme tab). The design service(s) 126, in response to receiving a selection from the menu 5880, generates the design 115 by applying a theme of the design template 113 to the design 103 (a layout is not updated).

In examples illustrated in FIG. 59, the user 104 selects the design page 5330 in a menu 5980 (e.g., a layout menu or a layout tab). The design service(s) 126, in response to receiving the selection of the design page 5330 from the menu 5980, designates the design page 5330 as an active page of the design template 113 and designates the design page 5550 as an active page of the design 115.

In example 5902 of FIG. 59, the design service(s) 126, in response to receiving a selection of the design page 5330 from the menu 5980 (e.g., the layout menu), updates a layout of the active page and does not update a theme of the design 115 based on the design template 113. For example, the design service(s) removes design elements and design element information of the design page 5550, updates the design page 5550 by copying the design page 5330 (e.g., design elements and design element information), updates a page tag of the design page 5550 to include a copy of the page tag of the design page 5330, or a combination thereof. In a particular aspect, the GUI 181, in response to a selection from the menu 5980, generates an alert indicating that content transfer will not occur. In a particular aspect, the user 104 selects the design page 5330 by selecting a thumbnail image.

Example 5904 of FIG. 59 differs from the example 5902 in that the design service(s) 126 a design 5915 instead of updating the design 115. For example, the design service(s) 126 generates the design 5915 having the format information 159 of the design template 113. The design service(s) 126, for each inactive page of the design 5915 corresponds to a design page of the design template 113, updates the inactive page by copying the corresponding design page of the design template 113 and applying a content signature of a corresponding design page of the design 115 to the inactive page. The design service(s) 126, for each inactive page of the design 5915 that does not correspond to a design page of the design template 113, updates the inactive page by copying a corresponding page of the design 115. The design service(s) 126 updates the active page (e.g., a design page 5940) of the design 5915 by copying the active page (e.g., the design page 5330) of the design template 113.

In the example illustrated in FIG. 60, the design service(s) 126, in response to receiving a selection of a design template 6013 from the menu 5880 (e.g., a theme menu), generates a design 6017 by applying a theme of the design template 6013 to the design 115 (or the design 5915).

FIGS. 53-60 illustrate various approaches of applying a theme, a layout, or both, of a design template to a design. For example, FIGS. 53-54 illustrate a first approach where the theme and the layout of the design template are applied to each design page of a design. FIGS. 55-57 illustrate a second approach where the theme of the design template is applied to each page of the design and a layout of the design template is applied to an active page of the design if the active page is a default (e.g., blank) page. FIGS. 58-59 illustrate a third approach where the theme of the design template is applied to each page of the design when the design template is selected from a theme menu and a layout of the design template is applied to an active page of the design when the design template is selected from a layout menu. Various other approaches may be used to apply the theme, the layout, or both of a design template to a design.

In a particular example, the user 104 uses the GUI 181 to edit the design 103. The design 103 is based on a default template (e.g., the design template 105). In a particular example, the design 103 includes a first design page and a second design page. The user 104 selects an option to add a new page. The design service(s) 126 selects a subset of the design templates 111 and updates the GUI 181 to display GUI elements (e.g., thumbnails) corresponding to the subset. In a particular aspect, the GUI 181 includes a first set of thumbnails corresponding to a first subset (e.g., Big Quote designs) of the design templates 111, a second set of thumbnails corresponding to a second subset (e.g., Pie Chart designs) of the design templates 111, or a combination thereof. In a particular aspect, the GUI 181 includes an option to view thumbnails corresponding to additional design templates of a particular type (e.g., Big Quote designs).

The user 104 selects a first thumbnail associated with a first design template. The design service(s) 126, in response to receiving a selection of the first thumbnail, adds a third design page to the design 103. For example, the first design template is a single-page design (e.g., a Big Quote design) and the design service(s) 126 generates the third design page by copying design elements, design element information, a page tag (e.g., a Big Quote page), or a combination thereof, of the first design template. The user 104 may add one or more additional pages to the design 103.

The user 104 selects the design template 113 from the menu 5880 (e.g., the theme menu). The design service(s) 126, in response to receiving a selection of the design template 113 from the menu 5880 (e.g., the theme menu), applies the theme of the design template 113 to the design 103. For example, the design service(s) 126 generates the design 115 having the format information 159 of the design template 113. The design service(s) 126 adds a second design page to the design 115 corresponding to a first design page of the design 103. The design service(s) 126, in response to determining that the first design page of the design 103 corresponds to (e.g., has the same page tag as) a third design page of the design template 113, updates the second design page of the design 115 by copying the third design page (e.g., design elements and design element information) of the design template 113. The design service(s) 126 applies a content signature of the first design page of the design 103 to the second design page of the design 115. Alternatively, the design service(s) 126, in response to determining that the first design page of the design 103 does not correspond to any design page of the design template 113, updates the second design page of the design 115 by copying the first design page of the design 103.

In a particular aspect, the design service(s) 126 "reflows" design elements of the design 115 subsequent to applying the content signature. For example, the design service(s) 126 updates a font size of the design element 124 based on a bounding box of the design element 163. To illustrate, the design service(s) 126 updates the font size to be a largest font size such that a bounding box of the design element 124 is smaller than or equal to a bounding box of the design element 163.

The design service(s) 126 performs group reflowing for design elements that are members of a group in a design page of the design 115. Group reflowing preserves distances between members (e.g., foreground design elements) of the group. For example, the design element 163 (e.g., a first foreground element) is a particular distance from a second particular design element (e.g., a second foreground element) of the design elements 161. The design service(s) 126 sets a position of the design element 124 to be the particular distance from a first particular design element of the design elements 191. The first particular design element corresponds to the second particular design element. The design element 163 has a second width and a second height in the design template 113. In a particular aspect, the design service(s) 126 updates the design element 124 to have a first width and a first height. The group reflowing preserves width of the design elements (e.g., foreground design elements) and updates (e.g., increases or decreases) height of the design elements to preserve distances between the design elements. For example, the first width is to the same as the second width and the first height differs from the second height. In a particular aspect, the design service(s) 126, in response to determining that the foreground elements have changed in size, updates a size of a background design element based on sizes of the foreground design elements. For example, the size of the background design element is updated so that the background design element continues to encompass the group.

Figure 61:
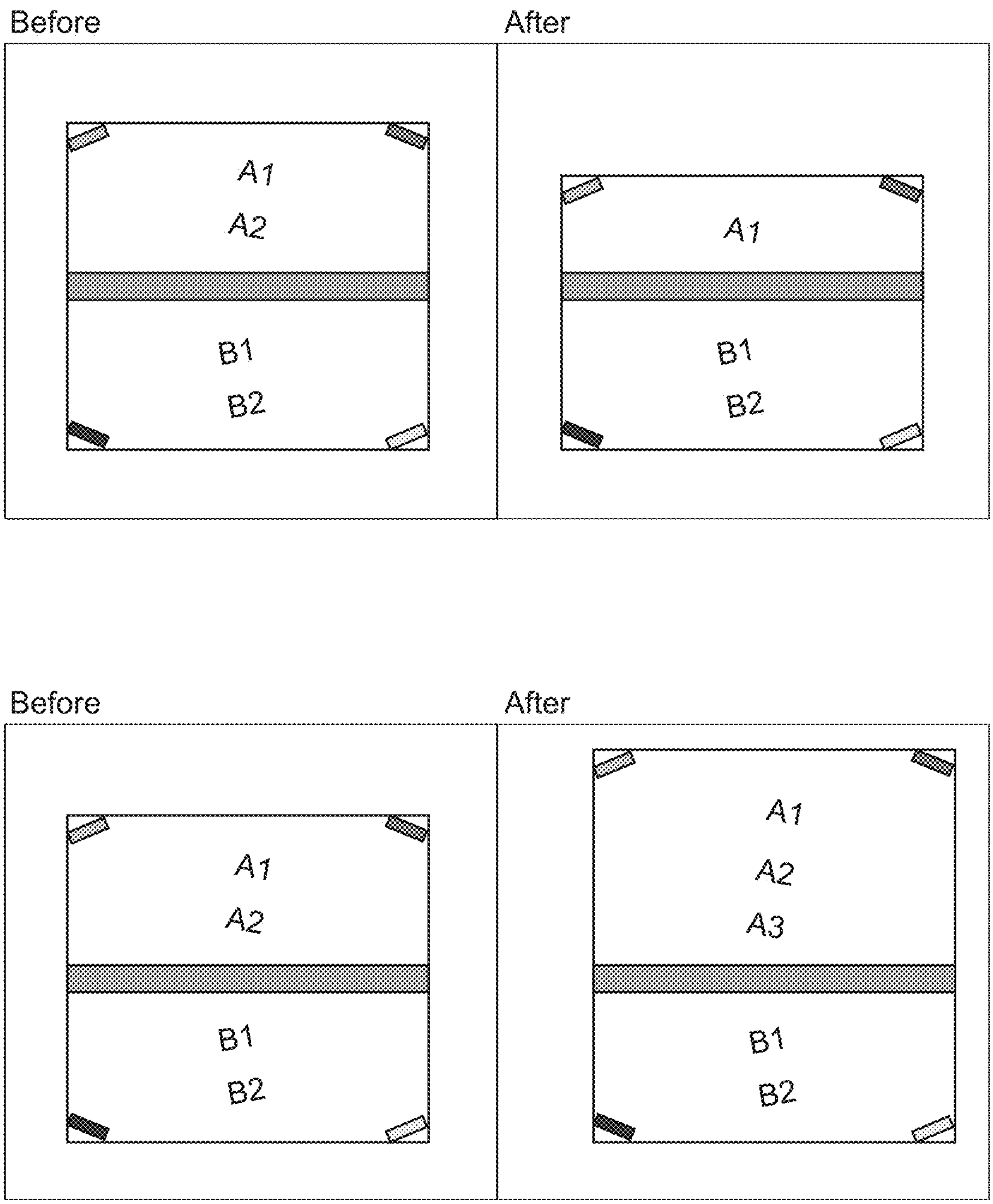
FIG. 61 illustrates particular examples of designs that may be generated by the system of FIG. 1.
Figure 62A:
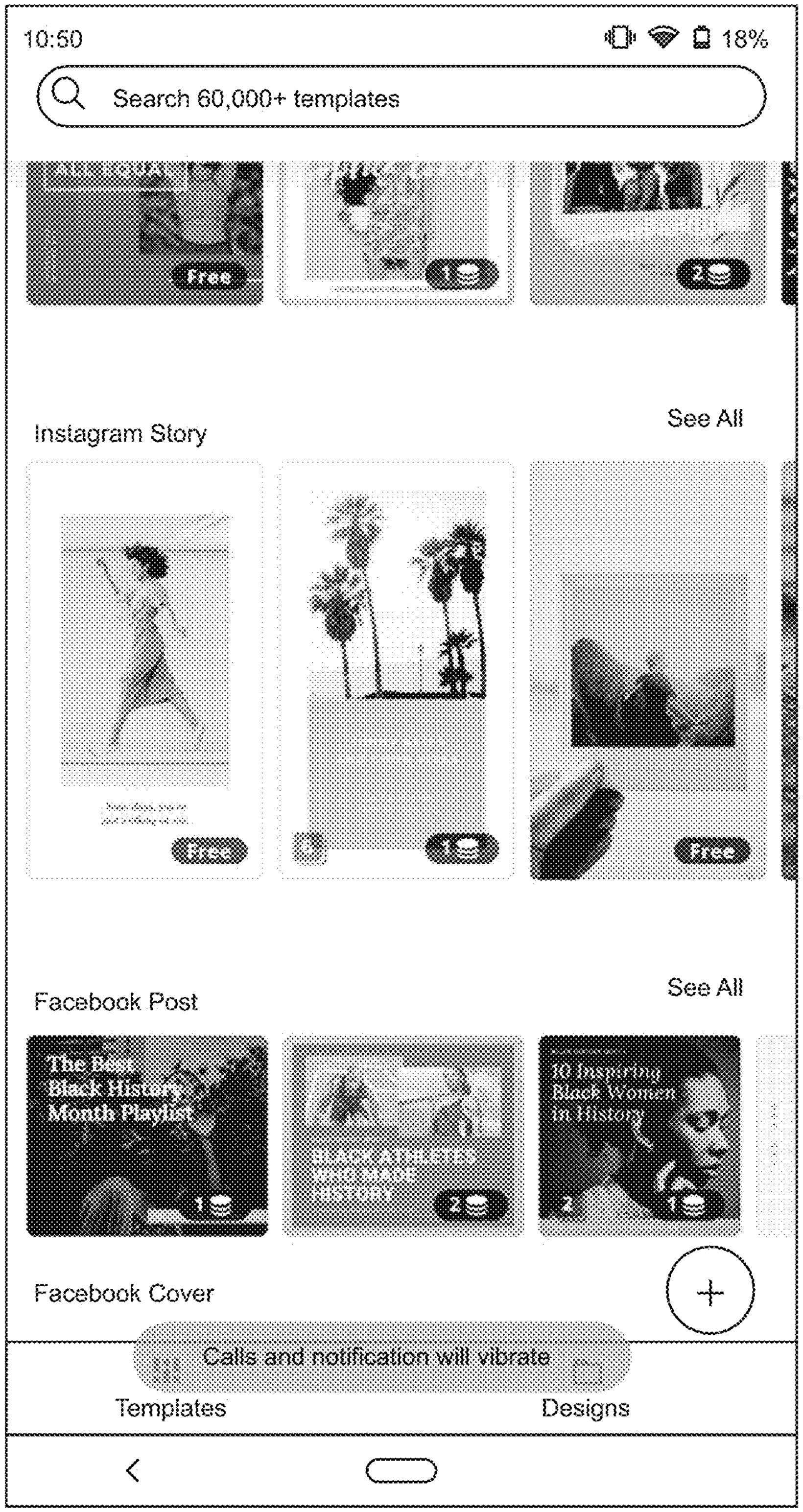
FIG. 62A illustrates a particular example of a user interface that may be generated by the system of FIG. 1.
Figure 62B:
FIG. 62B illustrates a particular example of a user interface that may be generated by the system of FIG. 1.
Figure 62C:
FIG. 62C illustrates a particular example of a user interface that may be generated by the system of FIG. 1.

FIG. 61 shows two examples of "reflow" operations that preserve (or approximately preserve) design element spacing when the number of design elements changes during content transfer. In the example at the top of FIG. 61, element A2 is not transferred, but the spacing between elements A1 and B1, and the presence of the horizontal divider image between A1 and B1, is maintained. In the example at the bottom of FIG. 61, element A3 is added. The spacing involved with the elements immediately adjacent to the horizontal divider image is maintained, and element A3 is added having the same angle of orientation as elements A1 and A2. In a particular aspect, reflow operations are performed based on design element groupings.

FIGS. 62A-63B show an example of transferring content from a user interface to a template. One or more of the operations described with reference to FIGS. 62A-63B may be referred to as mobile quick flow design or content first design. The user 104 uses a mobile phone to select a design type from a user interface (e.g., the GUI 181), such as a user interface illustrated in FIG. 62A. For example, the user 104 selects an image corresponding to an Instagram® post. In the example illustrated in FIG. 62B, the design service(s) 126 updates the GUI 181 to display one or more photographs (e.g., ordered by recency) that are stored in the mobile phone. The user 104 selects one or more of the photographs. In the example illustrated in FIG. 62C, the design service(s) 126 updates the GUI 181 to enable the user 104 to select a predetermined number of photographs. For example, the predetermined number is associated with the selected design type (e.g., an Instagram® post).

The design service(s) 126 selects a plurality of design templates of the selected design type. Each of the selected design templates includes the same number of image elements as the number of selected photographs (e.g., a count of the image elements is equal to a count of the selected photographs). The image elements correspond to a set of content roles. For example, each of the selected design templates includes a first image element and a second image element corresponding to a first content role (e.g., "photo-1") and a second content role (e.g., "photo-2"), respectively.

The design service(s) 126 generates designs by applying the selected design templates to the selected photographs. For example, the design service(s) 126 generates a content signature of the selected photographs based on the set of content roles. To illustrate, the content signature indicates that a first selected photograph is assigned the first content role (e.g., "photo-1") and that a second selected photograph is assigned the second content role (e.g., photo-2). The design service(s) generates a design 103 by copying a design template 105 and updates the design 103 by adding the selected photographs to corresponding image elements of the design 103. Similarly, the design service(s) 126 generates a design 115 by copying a design template 113 and updates the design 115 by adding the selected photographs to corresponding image elements of the design 115.

Figure 63A:
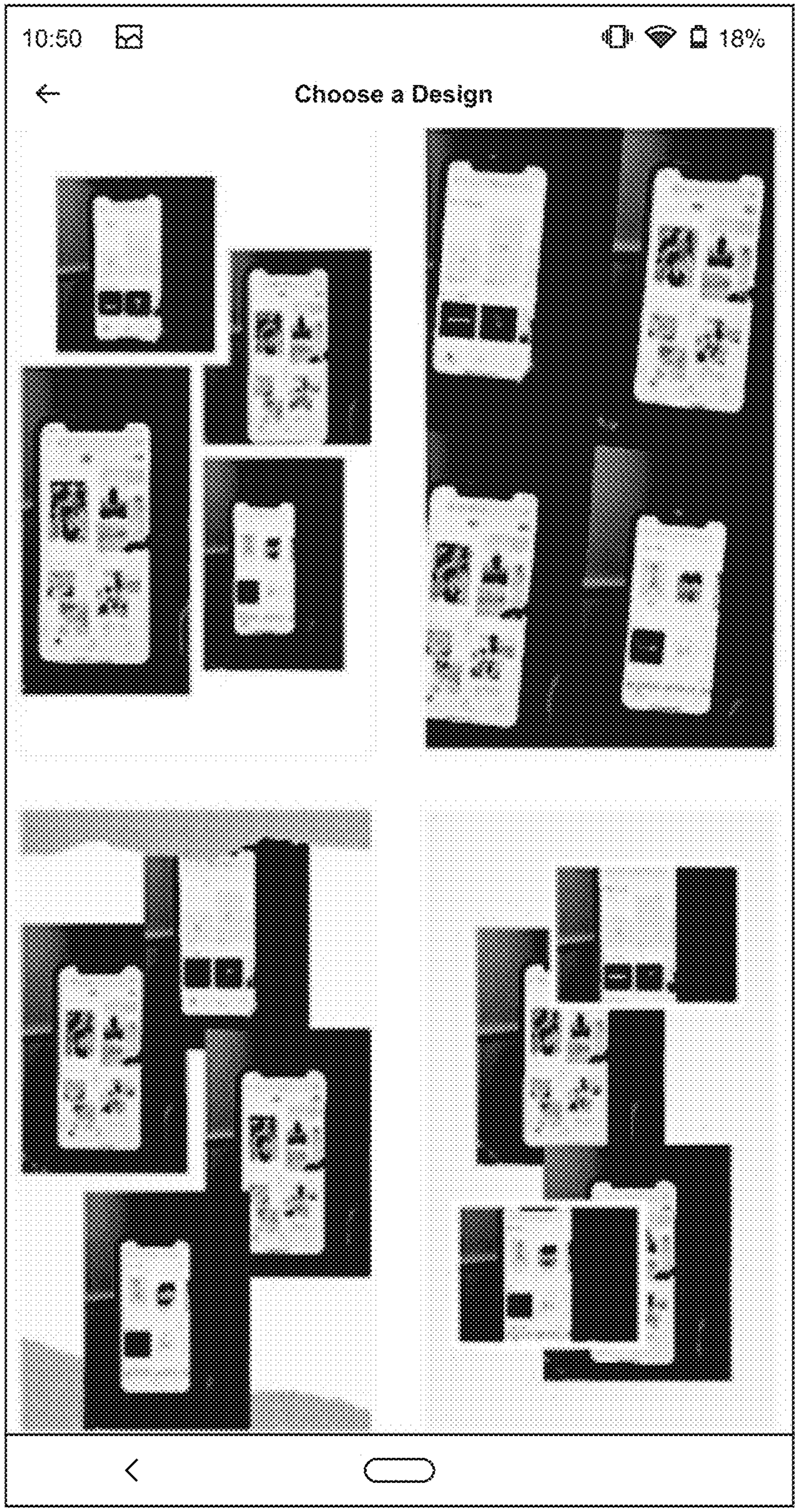
FIG. 63A illustrates particular examples of designs that may be generated by the system of FIG. 1.

In the example illustrated in FIG. 63A, the design service (s) 126 updates the GUI to display thumbnails associated with the generated designs. In a particular aspect, the design service(s) 126, in response to receiving a selection of a design, stores the design in the document database 184. In the example illustrated in FIG. 63B, the design service(s) 126 updates the GUI to enable editing of the selected design, to display an export option (e.g., "Share to Instagram®") associated with the design type, or both. The design service (s) 126, in response to receiving a selection of the export option, generates an output (e.g., an Instagram® post) based on the selected design and sends the output to an endpoint (e.g., an Instagram® server) associated with the export option.

Figure 63B:
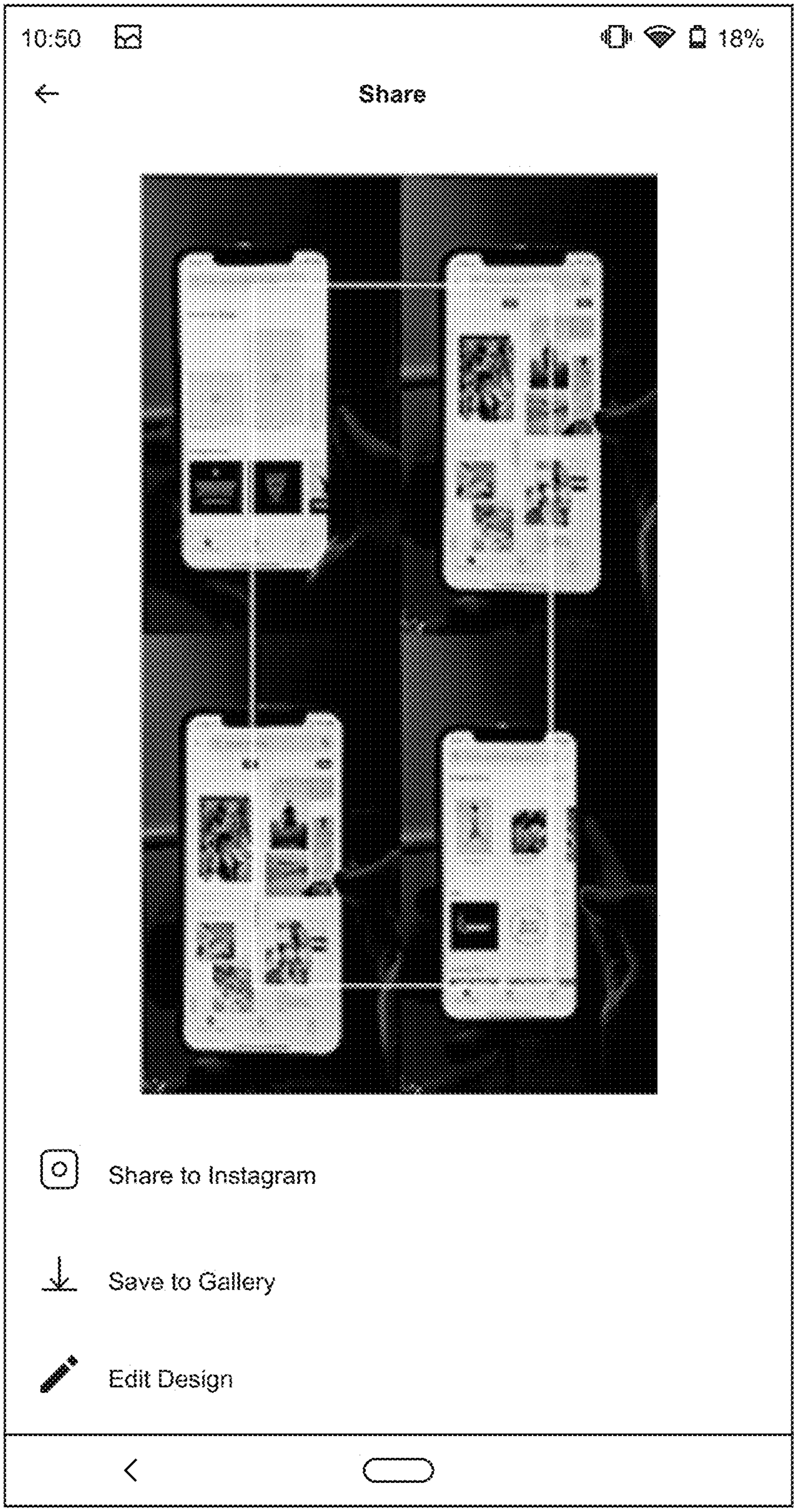
FIG. 63B illustrates a particular example of a design that may be generated by the system of FIG. 1.
Figure 64:
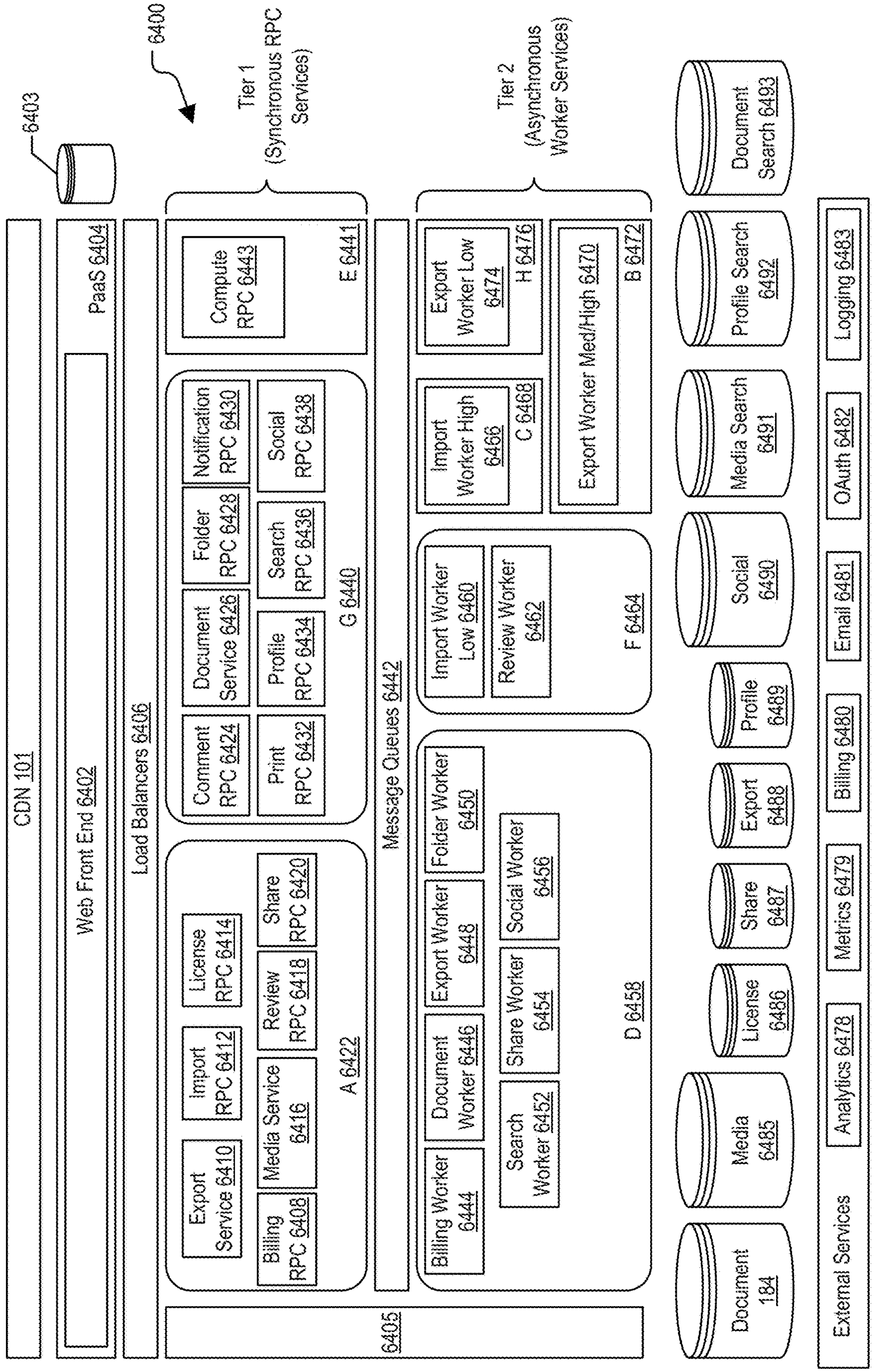
FIG. 64 illustrates another particular example of a system that is operable to generate a design based on another design and a design template.

Whereas FIG. 1 illustrates an example of a system 100 that is operable to generate a design based on a design template and another design (examples of which are illustrated and described with reference to FIGS. 2-63B), it is to be understood that operation of such a system may include various local and/or cloud-based components that are not illustrated in FIG. 1. For example, FIG. 64 depicts, in greater detail, a logical diagram of a system 6400 operable to support aspects of the present disclosure. Although illustrated in a logical diagram, it is to be understood that the various components of the system 6400 may include or may correspond to computer hardware, computer software, or a combination thereof. Moreover, components of the system 6400 may be configured to communicate with each other, for example via wired network(s) and/or wireless network(s). Thus, in various implementations, operations described herein as being performed by a particular component of FIG. 64 may be performed by dedicated hardware, software, or a combination thereof corresponding to the particular component.

In particular aspects, the system 6400 supports browser-based and mobile application-based access to a graphic design website. To illustrate, the graphic design website may correspond to the GUI 181 of FIG. 1, and some or all of the components in the system 6400 may be implemented by the computing environment, one or more servers, the document database 184, a media database 6485, the client device 192 of FIG. 1, one or more message queues 6442, load balancers 6406, and/or an export database 6488. For example, users may log in to the graphic design website and create, edit, and save graphic designs. The graphic design website may support operations including, but not limited to, creating a new design, applying a template to a design, searching for and adding images to a design, saving a design, generating a design based on another design and a template (as described with reference to the preceding figures), publishing of a design, etc.

The system 6400 includes a web front end 6402 executed at a platform as a service (PaaS) provider 6404. The PaaS provider 6404 may enable at-scale deployment of software as a service (SaaS) applications, such as web applications. For example, the web front end 6402 may represent one, five, ten, or some other number of instances of a SaaS application that executes on hardware owned by and/or leased from the PaaS provider 6404. Each such instance of the front end SaaS application may be accessible via the Internet. In some examples, a browser or a mobile application executed by a user's computing device may access the web front end 6402 via the CDN 101. The CDN 101 may also be configured to cache static content (e.g., thumbnails, static images, static web content, etc.). To illustrate, when a user requests a particular content item, such as a particular image, if the CDN 101 (e.g., a server thereof) stores a copy of the image, the CDN may respond to the request without passing the request further into the service infrastructure shown in FIG. 64. The CDN 101 may thus include multiple geographically distributed "edge" servers that cache content.

The web front end 6402 may be configured to serve a graphic design website to requestors, such as by responding to hypertext transfer protocol (HTTP) GET requests, HTTP POST requests, etc. The web front end 6402 may also be configured to respond to application programming interface (API) calls originating from web browsers and/or mobile apps. In some examples, the web front end 6402 may utilize an in-memory cache 6403 that stores session data. To illustrate, when a user logs in to the graphic design website served by the web front end 6402, information regarding the user (e.g., display name, photo, subscription level, e-mail address, etc.) may be stored in the in-memory cache 6403 for rapid retrieval, processing, and/or rendering on some or all of the webpages of the graphic design website. Use of the in-memory cache 6403 may thus enable quickly serving webpages without accessing backend systems to determine user information.

The system 6400 includes the load balancers 6406 configured to support communication and workload distribution from the web front end 6402 to a plurality of backend services or micro services that execute, for example, on one or more virtual machines in a cloud computing environment. Each such virtual machine may be implemented using physical hardware that is owned by and/or leased by a cloud service provider. The system 6400 may support scaled, dynamic deployment of services based on scale groupings in a multi-tiered configuration. In particular aspects, services may be grouped in certain virtual machines based on expected load patterns for the services. The architecture of the system 6400 may enable the reorganization of these groupings with low effort, based on changes in observed load patterns or the introduction of new services. Separating services across multiple virtual machines may also enable scaling specific service groups in response to increases in certain kinds of loads. This scaling may occur automatically based on monitoring of load, and may also be triggered manually in anticipation of load increases. To illustrate, if an increasing number of export tasks (e.g., publish tasks) are observed (e.g., based on percentage of busy vs. idle time), more virtual machines that include instances of the export service 6410 and/or an export worker 6448 may dynamically be instantiated to service the demand. Conversely, if an administrator of the system 6400 anticipates export volume (e.g., publish volume) to increase, the administrator may manually initialize additional virtual machines that include instances of the export service 6410 and/or the export worker 6448. When export volume decreases, the virtual machines may be automatically (e.g., based on percentage of busy vs. idle time) or manually scaled down.

In the example of FIG. 64, a first tier of services includes synchronous "request-response" remote procedure call (RPC) services and a second tier includes asynchronous "worker" services. A synchronous RPC service may receive first data from a requestor, perform one or more processing functions, and return second data to the requestor. Such synchronous request-response services may be used for tasks that can be completed relatively quickly, e.g., in three seconds or less, because in some examples a requestor (e.g., a web browser or mobile app) may block while waiting for a response. Conversely, the asynchronous worker services of the second tier may be used for background tasks and other tasks that cannot or may not be completed relatively quickly.

In FIG. 64, the first tier includes a first scale group 6422 (designated "A"), a second scale group 6440 (designated "G"), and a third scale group 6441 (designated "E"). The first scale group 6422 includes a billing RPC service 6408, an export service 6410, an import RPC service 6412, a license RPC service 6414, a media service 6416, a review RPC service 6418, and a share RPC service 6420. To illustrate, a virtual machine corresponding to the first scale group 6422 may execute the illustrated RPC services. The billing RPC service 6408 may be configured to perform synchronous billing tasks (e.g., checking account balance). The export service 6410 may be used to perform synchronous graphic design export tasks (e.g., publishing a design). The import RPC service 6412 may be configured to enable user importing of media assets for use in graphic design creation/editing. The license RPC service 6414 may be configured to enforce image licenses (e.g., one-time-use licenses). The media service 6416 may be configured to track and catalog media assets available via the system 6400, including but not limited to user-uploaded and/or library images, templates, fonts, etc. The review RPC service 6418 may be configured to facilitate acceptance of contributor media (e.g., uploading of media assets by authorized contributors of the graphic design website). The share RPC service 6420 may enable sharing of graphic designs with other users, such as via social media accounts.

The second scale group 6440 includes a comment RPC service 6424, a document service 6426, a folder RPC service 6428, a notification RPC service 6430, a print RPC service 6432, a profile RPC service 6434, a search RPC service 6436, and a social RPC service 6438. The comment RPC service 6424 may enable users to comment on graphic designs in comment threads. The document service 6426 may enable core design creation, design updating, and design deletion functionality of the graphic design website. The folder RPC service 6428 may enable navigating into and out of different folders associated with a user's account. The notification RPC service 6430 may enable generating and serving notifications to users via the graphic design website (e.g., when a user's design is "liked" or commented on). In some aspects, multiple such notifications may be coalesced into an e-mail that is sent to an e-mail address of the user or that is shown on a pop-up when the user accesses the graphic design website. The print RPC service 6432 may be a format service that enables sending a graphic design to a third-party printer, for example to be printed and then delivered to a physical mailing address of the user. The profile RPC service 6434 may enable users to manage their graphic design website account. The search RPC service 6436 may enable searching for images, templates, designs, etc. The social RPC service 6438 may enable users to perform social networking engagement on the graphic design website (e.g., "follow" another user, "like" another user's design, etc.) and may generate "feeds" of designs created by followed users. The third scale group 6441 includes a compute RPC service 6443 that may be dedicated for performing certain fast high-CPU-utilization operations, such as hashing and solving of passwords.

The second tier of services in FIG. 64 includes a fourth scale group 6458 (designated "D"), a fifth scale group 6464 (designated "F"), a sixth scale group 6468 (designated "C"), a seventh scale group 6476 (designated "H"), and an eighth scale group 6472 (designated "B"). The fourth scale group 6458 includes a billing worker 6444, a document worker 6446, an export worker 6448, a folder worker 6450, a search worker 6452, a share worker 6454, and a social worker 6456. The fifth scale group 6464 includes a low priority import worker 6460 and a review worker 6462. The sixth scale group 6468 includes a high priority import worker 6466. The seventh scale group 6476 includes a low priority export worker 6474. The eighth scale group 6472 includes a medium/high priority export worker 6470. In illustrative aspects, the asynchronous worker services in FIG. 64 may perform longer and/or more complex versions of the operations performed by the corresponding RPC services of FIG. 64. In a particular implementation, the priority designations shown in FIG. 64 (e.g., "low," "medium," and "high") correspond to an amount of dedicated processing resources. "High" priority may be used for jobs that are triggered by user actions whereas "medium" or "low" priority may be used for jobs that are not triggered by user actions (e.g., background jobs).

It is to be understood that the various services and groupings thereof shown in FIG. 64 is for illustration only and is not to be considered limiting. In alternative aspects, more, fewer, and/or different services may be present in the system. Moreover, a different grouping of services into different scale groups than shown in FIG. 64 may be used. In some aspects, each of the scale groups shown in FIG. 64 corresponds to a virtual hardware instance, i.e., a virtual machine running at a cloud services provider. Thus, at any given time, there may be one or more active/executing instances of each of the scale groups, and the specific numbers of active/executing virtual machine instances may dynamically change based on the overall workload being managed by the load balancers 6406. Coordination and configuration of the various instances, including communication between instances and/or services executed therein, may be managed by a coordination tool 6405, which may itself be a cloud-based system.

During operation, the synchronous RPC services of the first tier may be configured to communicate with the asynchronous workers' services of the second tier via the message queues 6442 and may utilize the asynchronous workers to perform time-consuming tasks. For example, the export service 6410 may receive a request that a user wants to export a graphical design. The export service 6410 may push a corresponding work request into the message queues 6442. An export worker (e.g., the medium/high priority export worker 6470) may respond to the work request by rendering the graphical design to a web output. The web output may then be passed back to the requesting user. As another example, the folder RPC service 6428 may receive a request indicating that a user wants to share a folder of graphic designs with another user. The folder RPC service 6428 may use the message queues 6442 to request that the folder worker 6450 set the corresponding permissions on the folder and on each of the items in that folder. As yet another example, asynchronous workers may be used to perform routine background tasks in the system 6400, such as daily verification of subscription levels.

During certain operations at the system 6400, the illustrated services may access one or more databases or data stores. For example, the document database 184 may store files corresponding to user-created graphic designs and the media database 6485 may store image uploads, fonts, and templates that are accessible via the graphic design website. In an illustrative aspect, the document database 184 may be accessed by the document worker 6446 when a user opens or saves a graphic design. In another illustrative aspect, the media database 6485 may be accessed by the media service 6416 when a user uploads or retrieves an image, a template, or a font.

The system 6400 may also include one or more of a license database 6486, a share database 6487, the export database 6488, a profile database 6489, or a social database 6490. The license database 6486 may be used by the license RPC service 6414 to track licenses (e.g., one-time-use licenses for images) that have been acquired by a user. The share database 6487 may be used by the share RPC service 6420 or the share worker 6454 to manage sharing of graphic designs with other users (e.g., via social network(s)). The export database 6488 may be used by the export service 6410, the export worker 6448, the low priority export worker 6474, or the medium/high priority export worker 6470 to track user exports of their graphic designs into different output formats. The profile database 6489 may support searching for user profiles based on different criteria. The social database 6490 may support social media aspects of the graphic design website.

The system 6400 may also include databases or data stores that support search functionality. For example, a media search database 6491 may be accessed by the search RPC service 6436 or the search worker 6452 when a user searches for images, templates, or fonts. As another example, a profile search database 6492 may be accessed by the profile RPC service 6434 when a user edits the profile information associated with their account. As yet another example, a document search database 6493 may be accessed by the document worker 6446 when a user searches for a previously saved graphic design.

Certain operations at the system 6400 may involve accessing "external" services that are not part of the core service oriented platform of the graphic design website. Examples of such external services may include, but are not limited to, an analytics service 6478, a metrics service 6479, a billing service 6480, an e-mail service 6481, an open authorization (OAuth) service 6482, or a logging service 6483. The analytics service 6478 may receive analytics events (e.g., messages) each time a user performs an action on the graphic design website, and may enable per-user and macro level analytics of graphic design website workflow, operations, and performance. The metrics service 6479 may collect and provide performance information regarding the various components of the system 6400. The billing service 6480 may interface to one or more external payment providers, such as for credit card processing, mobile payment processing, etc. The e-mail service 6481 may enable generating and/or sending e-mails to users (e.g., for notifications, password reset, etc.). The OAuth service 6482 may enable federated logins to the graphic design website using social network credentials and may also support authentication with certain publish endpoints. The logging service 6483 may index events/messages that are generated by the components of the system 6400 for later diagnostic searching.

One example of an operation that may be supported by the system 6400 is logging in to the graphic design website via an Internet browser or a mobile app. A login request may be received by the web front end 6402 from the Internet browser or mobile app. The login request may be routed by the load balancers 6406 to an instance of the profile RPC service 6434, which may "look up" the user in the profile database 6489 and may authenticate the user (federated social networking login may involve the OAuth service 6482). Once the user is authenticated, the graphic design website may load a custom homepage for the user, which may include operations being performed by an instance of the folder RPC service 6428, the document worker 6446, etc. The custom homepage may then be returned to the user's Internet browser or mobile app.

Another example of an operation that may be supported by the system 6400 is starting a new design or opening an existing design. When a user clicks on a new design template, the web front end 6402 may provide the user's Internet browser or mobile application a graphical design interface (e.g., HTML code) that is executable to edit the new or existing design. In the case of loading an existing design, the document service 6426 and/or the document worker 6446 may access the document database 184 to retrieve the existing design, and the media service 6416 may load media assets that are included in the design from the media database 6485.

Another example of an operation that may be supported by the system 6400 is when a user updates a design using the graphical design interface served by the graphic design website. As the user updates the design, the updates may be processed by the document service 6426 and/or the document worker 6446. For example, the service(s) may process image or text movement, insertion, deletion, resizing, recoloring, etc.

Another example of an operation that may be supported by the system 6400 is when a user imports an image. In this case, the import RPC service 6412 and/or one of the import workers 6460, 6466 may receive a user-uploaded image, process the image, and integrate the image into the media database 6485 for subsequent retrieval by the media service 6416.

Another example of an operation that may be supported by the system 6400 is when a user applies a template to a design. In this case, the media search database 6491 may provide via the media service 6416, media assets corresponding to the template. The insertion of the media assets into the design may then be processed by the document service 6426 and/or the document worker 6446 as an update to the user's design.

Another example of an operation that may be supported by the system 6400 is when a user searches for a media asset and then drags-and-drops the media asset into a design. For example, when a user enters a search query "dog," the search RPC service 6436 and/or the search worker 6452 may access the media search database 6491 to retrieve search results for "dog." The search results may be presented by the user's Internet browser or mobile app. When the user adds a particular search result, e.g., a particular image of a dog, to their design, the document service 6426 or the document worker 6446 may process the corresponding update to the design.

Figure 65:
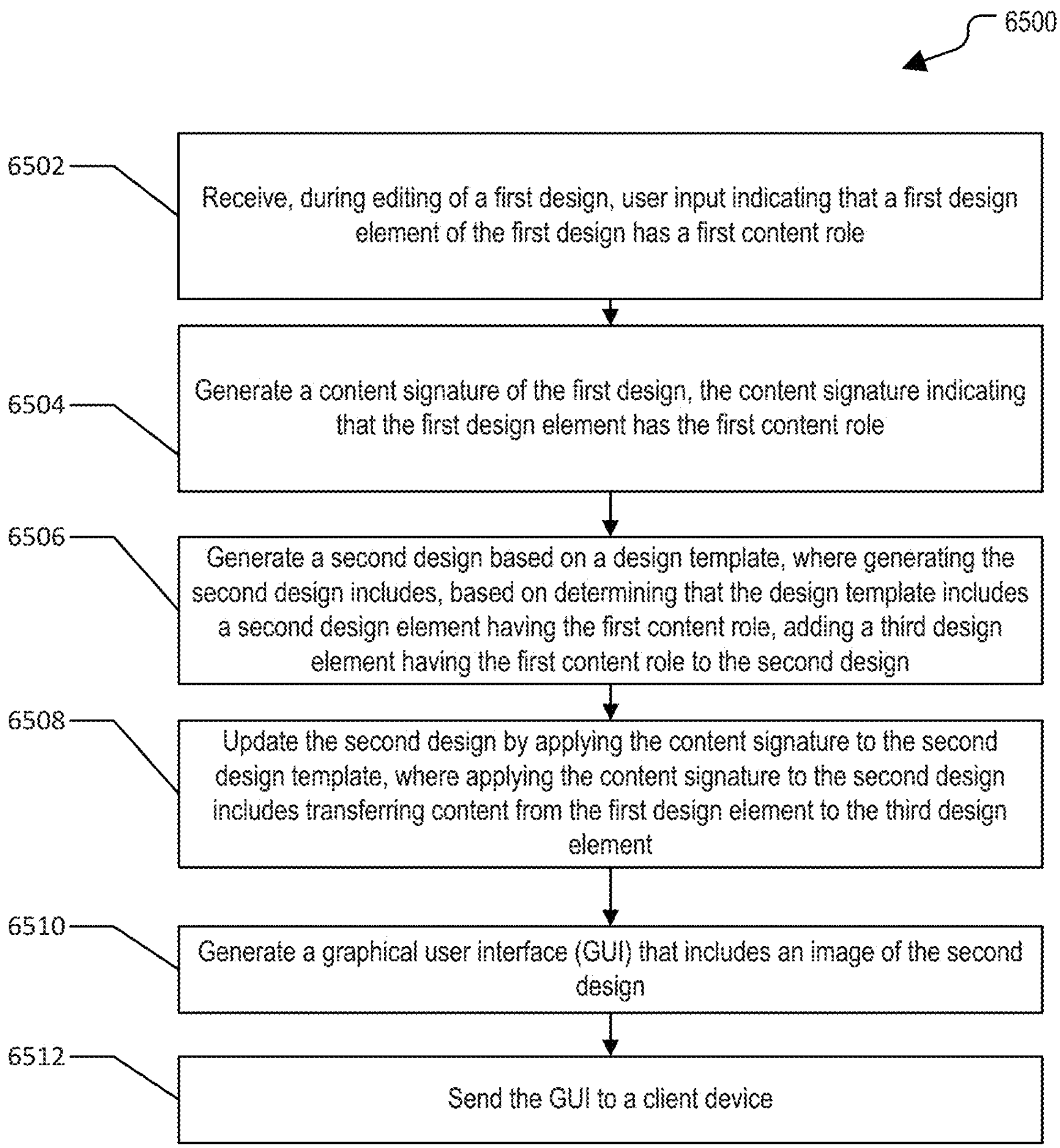
FIG. 65 illustrates a particular example of a method of generating a design based on another design and a design template.

In a particular aspect, the system 6400 may support generating a design based on another design and a template. For example, a user may generate the design by copying the template and may update the design by transferring content from another design, as described with reference to the preceding FIGS. In some aspects, component(s) of the system 6400 (and/or the system 100) may perform a method 6500 of FIG. 65 to generate the design based on another design and a template.

The method 6500 includes receiving, during editing of a first design, user input indicating that a first design element of the first design has a first content role, at 6502. For example, the design service(s) 126 receives, during editing of the design 103, user input 109 indicating that the design element 123 of the design 103 has the content role 147. The design service(s) 126 sets the content role 179 of the design element 123 to indicate the content role 147.

The method 6500 includes generating a content signature of the first design, at 6504. For example, the design service(s) 126 generates a content signature (e.g., the design element information 131) of the design 103. The design element information 131 includes the design element information 133 of the design element 123. The design element information 133 indicates the content role 179 of the design element 123. For example, the design element information 133 indicates that the design element 123 has the content role 147 (e.g., indicated by the content role 179).

The method 6500 also includes generating a second design based on a design template, at 6506. For example, the design service(s) 126 generates the design 115 based on the design template 113. Generating the design 115 includes, based on determining that the design template 113 includes the design element 163 having the content role 147, adding the design element 124 having the content role 147 to the design 115.

The method 6500 further includes updating the second design by applying the content signature to the second design, at 6508. For example, the design service(s) 126 updates the design 115 by applying the content signature (e.g., the design element information 131) of the design 103 to the design 115, as described with reference to FIGS. 1 and 6-63B. Applying the content signature of the design 103 to the design 115 includes transferring content (e.g., text) from the design element 123 to the design element 124.

The method 6500 also includes generating a graphical user interface (GUI) that includes an image of the second design, at 6510. For example, the design service(s) 126 generates the GUI 181 that includes a GUI element (e.g., a thumbnail image) of the design 115.

The method 6500 also includes sending the GUI to client device, at 6512. For example, the design service(s) 126, the web front end 6402, or both, send the GUI 181 via the CDN 101 to the client device 192.

The method 6500 thus enables generating a design (e.g., the design 115) based on another design (e.g., the design 103) and a template (e.g., the design template 113). The design 115 is generated by copying the design template 113 and is updated by automatically transferring content from the design 103 to the design 115. The automatic transfer of content may enable faster design processes and a more intuitive user experience. For example, the user may efficiently apply various design templates to an edited design without having to repetitively provide the same edits each time a different design template is applied. The user can compare the results of applying the various design templates and choose a particular design template based on the comparison.

Figure 66:
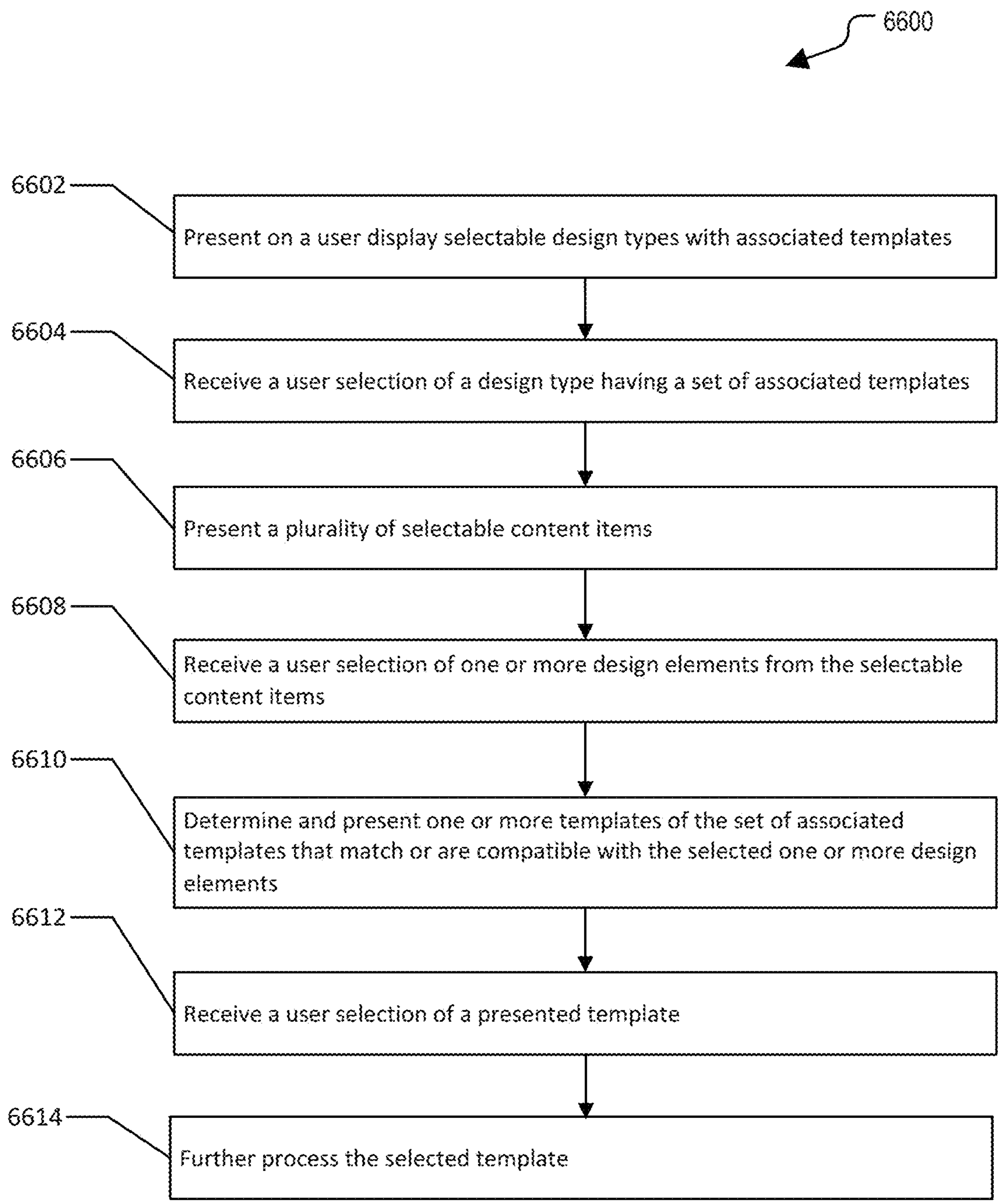
FIG. 66 illustrates a particular example of a method of generating a design based on user selected content and a design template.

In some aspects, component(s) of the system 6400 (and/or the system 100) may perform a method 6600 of FIG. 66 to generate the design based on user selected content and a template, to generate a content first design. The method 6600 may implement the example described with reference to FIGS. 62A-63B.

The method includes at 6602 presenting a user interface with a plurality of selectable design types. For example one design type may be a post for a social sharing platform. Each selectable design type is associated with a set of one or more templates, or a set of two or more templates. At 6604 the method includes receiving a user selection of a design type.

The method also includes at 6606 presenting a user interface with a plurality of selectable content items. The plurality of selectable content items include content for use as a design element in a design. Presenting the user interface with selectable content items may include, for example, providing an option to access local or remotely stored content on the device operated by the user. An example of content is an image or a video stored on the device, which may for example be a mobile device with an integrated camera for forming the images. At 6608 the method includes receiving a user selection of one or more design elements from the selectable content. The selection may be constrained to a certain number of design elements. The selection may be based on the number of corresponding design elements in the associated set of templates. For example, if all of the templates associated with the selected design type includes a single design element with content role of a picture, then the user may be provided the option to select only one image. If instead one or more of the templates have one design element with a content role of a picture and one or more of the templates have two design elements with content roles of a picture, then the user interface may allow the user to select either one or two images.

Based on the received user selections at 6604 and 6608, the method includes at 6610 identifying and presenting one or more templates from the plurality of sets of templates. Identifying templates may include matching compatible templates in the set of templates associated with the selected design type. In particular embodiments, compatible templates are those that have or can be modified by the system to have the same number of design elements with matching content roles to the selected content. In particular embodiments the compatible templates are populated with the selected content for presentation.

At least in embodiments in which two or more templates are presented at 6610, the method includes at 6612 receiving a selection of one of the templates. If the selected template was not populated with the selected content at 6610, it is populated and presented. Responsive to the selection, the method may include at 6614 providing a user interface to further process the design. The further processing may include a process to the edit the design, a process to export (e.g. post) the design and/or a process to save the design. The further processing may include a process to transfer content from the selected template to another template, for example by following one of the branches of FIG. 6 or the process of FIG. 65.

Figure 67:
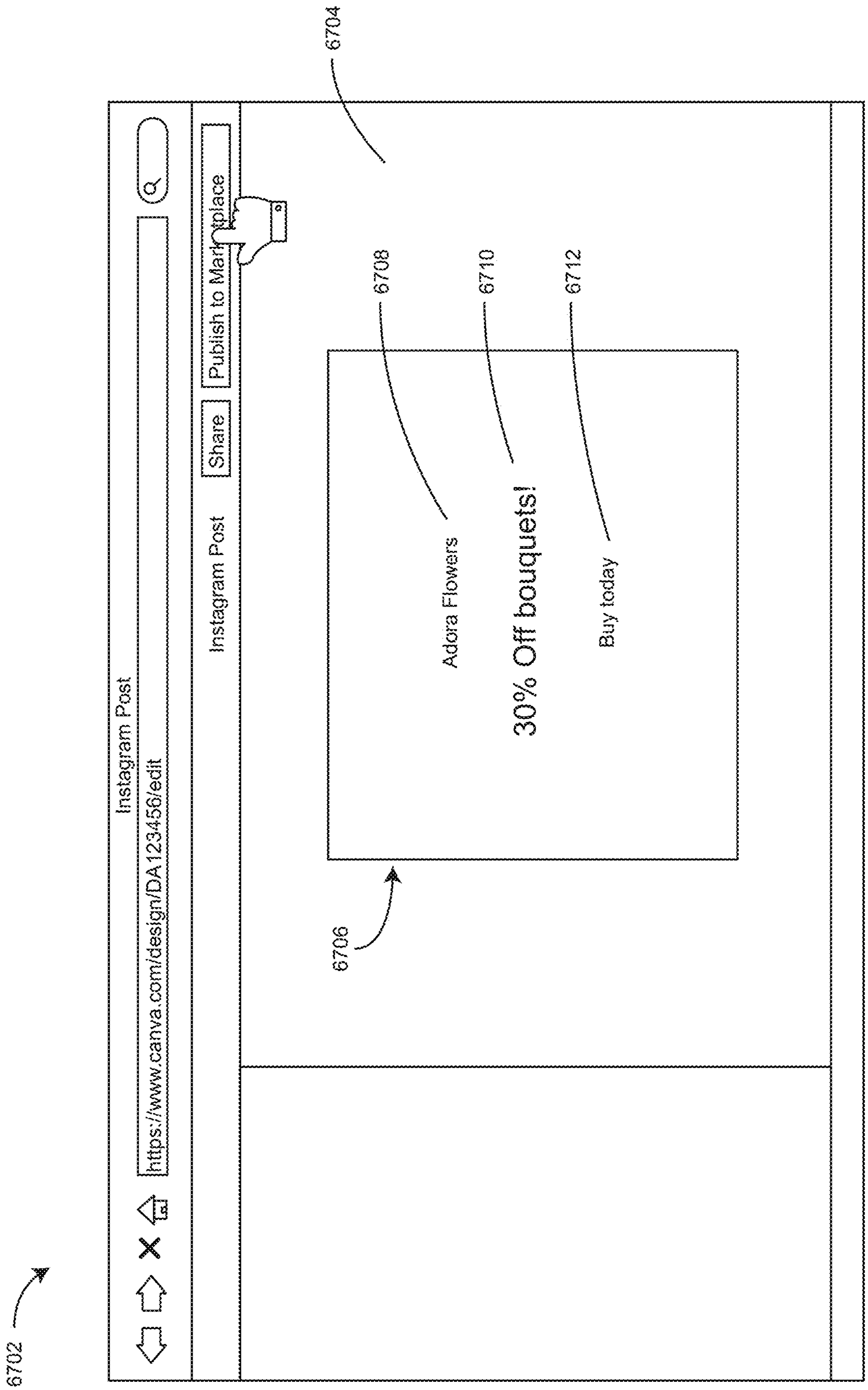
FIG. 67 illustrates a particular example of a user interface that may be generated by the system of FIG. 1.
Figure 68:
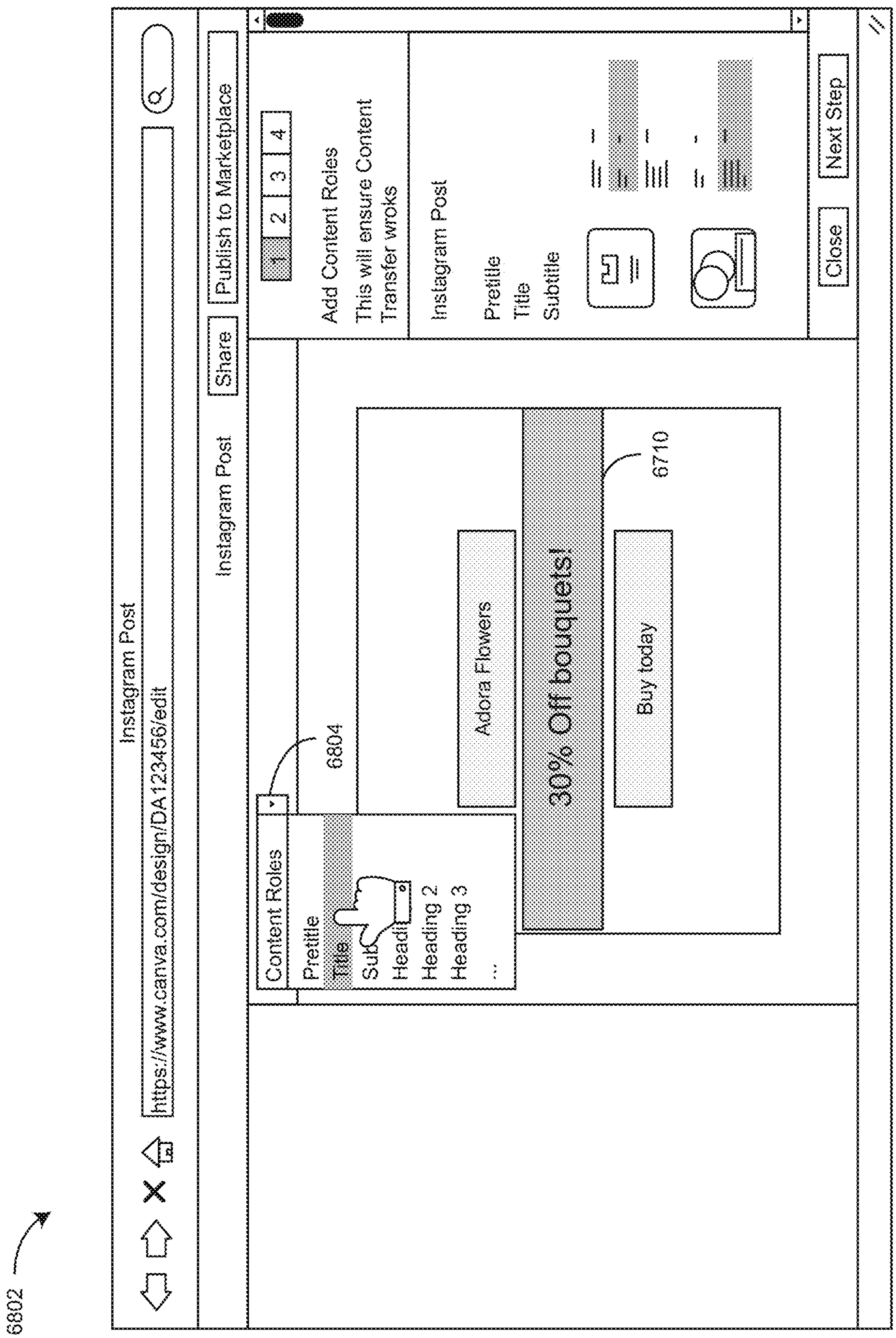
FIG. 68 illustrates a particular example of a user interface that may be generated by the system of FIG. 1.

FIGS. 67 and 68 illustrate a user story 6701 where a user interface is provided by the system to assist with the allocation of content roles. For example, the web front end may generate a graphical user interface (GUI) of the graphic design website as described above so as to include the GUIs of FIGS. 67-68. GUI 6702 includes a design display region 6704 in which a design 6706 is displayable. The design 6706 may be generated using any suitable method, including methods described herein. The design 6706 includes, in this example, three design elements 6708, 6710 and 6712, which in this case are all text elements. In other examples images or other design elements may be included. The GUI 6702 includes a selectable icon 6714. In this example the selectable icon 6714 is “Publish to Marketplace”. The user story 6701 is one in which the design has been previously indicated as intended to form an Instagram® post. In other embodiments the user may select a type of template for the design after entering one or more design elements.

In response to or following the receiving of a selection of the selectable icon 6714, the implementing system, for example the system of FIG. 1, determines that content roles may be added. The determination may be based on, for example, a determination that one or more of the design elements 6708, 6710 and 6712 do not have content roles defined and the design template includes at least one content role that is not currently assigned to a design element in the design 6706.

In response to the determination that content roles are to be added, a GUI 6714 is displayed. The GUI 6714 includes user interface elements configured to be operated by the user to add content roles to one or more of the design elements 6708, 6710 and 6712. In the example shown, the design template type includes content types of a Pretitle, Title and Subtitle. The content types in the template may be displayed in a template display region 6716. In some embodiments the implementing system suggests a content role for one or more, up to all of the design elements 6708, 6710 and 6712. A determination by the system of what content roles to suggest may be based on heuristics to map a likely correspondence. The heuristics may have determined a suggestion for the Pretitle and Subtitle based on the relative size and positioning of the design elements 6708, 6710 and 6712. In particular, the design element 6708 is suggested as a Pretitle content type by icon 6718 and the design element 6712 is suggested as a Subtitle content type by icon 6720. Design elements with an allocated content role may be indicated by other indicators, in this example by a first color shading. No suggestion is made for design element 6710 and this is indicated by indicator in the GUI 6714, in this example by icon 6722 and by a second color shading of the design element 6710, different to the first color shading. It will be appreciated that the design element 6710 may have been suggested as a Title content type, but this is omitted for purposes of illustration. The design elements of GUI 6714 are selectable to add or modify a content type assigned to them.

Referring now to FIG. 68, a user has selected design element 6710 from GUI 6714. The system displays GUI 6802 with one or more indicators that design element 6710 has been selected. In the example shown the indicators are the resizing circles at the corners of the design element 6710 and a change in color of the border of design element 6710. A selector 6804 in the GUI 6802 is configured to receive a user input to identify or select a content role for a design element. In the example shown, the selector 6804 is a drop down menu providing options for content roles. The options for content roles may include those displayed in template display region 6716, for example including the Title content role. Other options for content roles may also be included, for example Heading 1 shown in GUI 6802. The GUI 6802 shows an updated screen display after selection of the Title content role for design element 6710. All design elements are now allocated content roles, as indicated by (previously displayed) icons 6718 and 6720 and (new) icon 6806. The indication also includes displaying all design elements in the color designated to show an allocated content role. The user may select a Next Step icon 6808 or similar to continue the publication process. In some embodiments a progress indicator 6810 indicates progress towards publication.

Methods and devices that may implement aspect(s) of the various features of the present disclosure have been described with reference to the drawings. The drawings and the associated descriptions are provided to illustrate aspects and not to limit the scope of the present disclosure. Reference to any specific aspect, aspect, or implementation is intended to indicate that a particular feature, structure, or characteristic described in connection therewith is included in at least an aspect, aspect, or implementation of the present disclosure. However, the various uses of the terms "aspect," "aspect," or "implementation" are not necessarily all referring to the same single aspect, aspect, or implementation.

In a particular aspect, an apparatus includes a processor and a transmitter. The processor is configured to receive, during editing of a first design, user input indicating that a first design element of the first design has a first content role. The processor is also configured to generate a content signature of the first design. The content signature indicates that the first design element has the first content role. The processor is also configured to generate a second design based on a design template. Generating the second design includes, based on determining that the design template includes a second design element having the first content role, adding a third design element having the first content role to the second design. The processor is further configured to update the second design by applying the content signature to the second design. Applying the content signature to the second design includes transferring content from the first design element to the third design element. The processor is further configured to generate a graphical user interface (GUI) that includes an image of the second design. The transmitter is configured to send the GUI to a client device.

In another particular aspect, a method includes receiving, during editing of a first design at a device, user input indicating that a first design element of the first design has a first content role. The method also includes generating, at the device, a content signature of the first design. The content signature indicates that the first design element has the first content role. The method also includes generating, at the device, a second design based on a design template. Generating the second design includes, based on determining that the design template includes a second design element having the first content role, adding a third design element having the first content role to the second design. The method further includes updating the second design by applying the content signature to the second design. Applying the content signature to the second design includes transferring content from the first design element to the third design element. The method further includes generating, at the design, a graphical user interface (GUI) that includes an image of the second design. The method also includes sending the GUI from the device to a client device.

In another particular aspect, a computer-readable storage device stores instructions that, when executed by a processor, cause the processor to perform operations including receiving, during editing of a first design at a device, user input indicating that a first design element of the first design has a first content role. The operations also include generating a content signature of the first design. The content signature indicates that the first design element has the first content role. The operations also include generating a second design based on a design template. The operations further include updating the second design by applying the content signature to the second design. Applying the content signature to the second design includes transferring content from the first design element to the third design element. The operations further include generating a graphical user interface (GUI) that includes an image of the second design. The operations also include sending the GUI to a client device.

In another particular aspect, a method includes generating a graphical user interface (GUI) for creating or editing a design, the GUI including a first design template comprising a first plurality of design elements for creating a design, the first design template having an associated set of content roles. The GUI also includes a content role selector configured to receive a selection from the set of content roles and associate a first design element of the design template or a first design created based on the design template with the selected content role. The method also includes maintaining a second design template, different to the first design template, the second design template having at least one design element associated with the selected content role and/or maintaining a second design having at least one design element associated with the selected content role. The method further includes identifying corresponding design elements within two or more of the first template, the second template, the first design and the second design based on the association of the selected content role with the design elements.

In another particular aspect, there is provided a processing system configured to perform the method in the immediately preceding paragraph. In another particular aspect, there is provided a computer-readable storage device stores instructions that, when executed by a processor, cause the processor to perform operations including operations to perform the method in the immediately preceding paragraph.

In the foregoing description, specific details are given to provide a thorough understanding of the present disclosure. However, it will be understood by one of ordinary skill in the art that the present disclosure can be practiced without these specific details. Well-known structures and techniques may not be shown in detail, in order to avoid obscuring the illustrated aspects. For example, algorithms may be shown in block diagrams.

It is noted that aspects may be described as a process that is depicted as a flowchart, a flow diagram, a structure diagram, or a block diagram. Although a flowchart may describe operations as a sequential process, many of the operations can be performed in parallel or at least partially concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, storage may represent one or more devices that store data, including but not limited to random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a flash memory device, and/or other computer-readable or processor-readable media to store information. As used herein, a computer-readable or processor-readable storage medium/device is not a signal.

Furthermore, aspects can be implemented by hardware, software, firmware, middleware, microcode, or any combination thereof. When implemented in software, firmware, middleware or microcode, program code or code segments to perform the tasks can be stored in a memory or other storage. One or more than one processor can perform tasks in series, distributed, concurrently, or in parallel. In some examples, a virtual computer system can be constructed to implement one or more of the methods or functionality as described herein. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

Although the present disclosure has been described with a degree of particularity, it is understood that the present disclosure has been made by way of example and that other versions are possible. As various changes could be made in the above description without departing from the scope of the disclosure, it is intended that all matter contained in the above description or shown in the accompanying drawings shall be illustrative and not used in a limiting sense.

All features disclosed in the specification, including the claims, abstract, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise.

Thus, unless expressly stated otherwise, each feature disclosed is one example only of a generic series of equivalent or similar features. The above-disclosed subject matter is to be considered illustrative, and not restrictive, and the appended claims are intended to cover all such modifications, enhancements, and other aspects, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing description.

What is claimed is:

1. An apparatus comprising:

a processor configured to:

cause the display of a first graphical user interface (GUI) for editing a first design on a client device, including display of the first design that was created based on a first template and that comprises a first design element;

receive, during the editing of the first design, user input assigning a first content role to the first design element of the first design, wherein the assignment is not part of the first template;

generate from the first design a content signature of the first design, the content signature indicating that the first design element has the first content role;

generate a second design by applying a second design template to the first design, the second design template being different to the first design template and including a second design element having the first content role, wherein responsive to determining based on the content signature that the second design template requires an additional design element having the first content role, generating the second design includes adding a third design element having the first content role to the second design, wherein responsive to determining that the second design element is included as a foreground element in a first group of design elements of the design template, adding the third design element as a foreground element in a second group of design elements of the second design;

update the second design by applying the content signature to the second design, wherein applying the content signature to the second design includes transferring content from the first design element to the third design element;

generate a second GUI that includes an image of the second design; and cause the second GUI to be displayed by the client device.

2. The apparatus of claim 1, wherein the first design element includes a text element, a foreground image, or a background image.

3. The apparatus of claim 1, wherein the first design element indicates at least a first text and the processor is further configured to transfer the content from the first design element to the third design element by updating the third design element based on the first text.

4. The apparatus of claim 1, wherein the processor is further configured to, prior to receiving the user input, determine the first content role of the second design element based on at least one of a width, a height, a text-transform attribute, a count of text words, a count of text lines, a relative position, a relative font size, a relative width, a count of words that are included in each of the text of the second design element and a description of the second design template, a position rank, element group membership, or an element count of the second design element.

5. The apparatus of claim 1, wherein the processor is further configured to:

train a machine learning model to identify content roles of design elements of a plurality of test templates; and determine the first content role of the second design element by applying the machine learning model to the design template.

6. The apparatus of claim 1, wherein the processor is further configured to:

determine that the content signature indicates that a fourth design element having a second content role is included in the first design; and based at least in part on determining that the second design does not include any design elements having the second content role, add the fourth design element to the second design.

7. The apparatus of claim 1, wherein the processor is further configured to, in response to determining that the content signature indicates that a fourth design element is included in the first design and that the fourth design element is not associated with a content role, add the fourth design element to the second design.

8. The apparatus of claim 1, wherein the processor is further configured to:

determine that the content signature indicates that a fourth design element is included in the first design;

determine a first rank of the fourth design element in the first design;

determine that a fifth design element is included in the second design; and determine another rank of the fifth design element, wherein applying the content signature to the second design includes, based at least in part on determining that the rank of the fourth design element matches the rank of the fifth design element, transferring content of the fourth design element to the fifth design element.

9. The apparatus of claim 1, wherein the first design element includes a first text element, wherein the second design element includes a second text element, wherein the processor is further configured to:

determine a size of a bounding box of the second text element, and determine a largest font size that results in a bounding box of the third design element has a size that is less than or equal to the determined size of the bounding box of the second text element, and update the third design element to have the determined largest font size.

10. The apparatus of claim 1, wherein the processor is further configured to, based on determining that the second design element is included in a first group of design elements of the design template, add the third design element to a second group of design elements of the second design.

11. The apparatus of claim 1, wherein the processor is further configured to:

set the third design element to have a width equal to a width of the second design element determined by the processor; and position the third design element to be a distance from a fourth design element of the second design equal to a distance of the second design element from a fifth design element of the design template, wherein the fourth design element is associated with the fifth design element.

12. The apparatus of claim 1, wherein the processor is further configured to, based on determining that the second design element is included as a background element in a first group of design elements of the design template, add the third design element as a background element in a second group of design elements of the second design.

13. The apparatus of claim 12, wherein the second group of design elements includes a plurality of foreground elements, and wherein a first size of a bounding box of the third design element is based on sizes of bounding boxes of the foreground elements.

14. A method comprising:

causing, the display by a client device of a first graphical user interface (GUI) for editing a first design, including display of the first design that was created based on a first template and that comprises a first design element;

receiving, during editing at the client device of the first design, user input assigning a first content role to the first design element of the first design, wherein the assignment is not part of the first template;

generating from the first design, a content signature of the first design, the content signature indicating that the first design element has the first content role;

generating, a second design by applying a second design template to the first design, the second design template being different to the first design template and including a second design element having the first content role, wherein responsive to determining based on the content signature that the second design template requires an additional design element having the first content role, generating the second design includes adding a third design element having the first content role to the second design, wherein responsive to determining that the second design element is included as a foreground element in a first group of design elements of the design template, adding the third design element as a foreground element in a second group of design elements of the second design;

updating the second design by applying the content signature to a second design, wherein applying the content signature to the second design includes transferring content from the first design element to the third design element;

generating, a second GUI that includes an image of the second design; and causing the display of the second GUI by the client device.

15. The method of claim 14, wherein the first design element indicates at least a first image and the transferring content from the first design element to the third design element includes updating the third design element based on the first image.

16. The method of claim 15, further comprising:

receiving, from the client device, user input indicating a selection of the image; and in response to receiving the user input indicating a selection of the image, replacing the first design with the second design in a data storage device.

17. The method of claim 15, further comprising:

receiving, from the client device, user input indicating a selection of the image;

in response to receiving the user input indicating a selection of the image, generating a third GUI including one or more fields to edit the second design; and causing the client device to display the third GUI.

18. A non-transitory computer-readable medium having stored thereon instructions that, when executed by one or more processors, cause the one or more processors to perform operations comprising:

causing, the display by a client device of a first graphical user interface (GUI) for editing a first design, including display of the first design that was created based on a first template and that comprises a first design element;

receiving, during editing at the client device of a first design, user input assigning a first content role to a first design element of the first design, wherein the assignment is not part of the first template;

generating from the first design a content signature of the first design, the content signature indicating that the first design element has the first content role;

generating a second design by applying a second design template to the first design, the second design template being different to the first template and including a second design element having the first content role, wherein responsive to determining that the second design template requires an additional design element having the first content role, generating the second design includes adding a third design element having the first content role to the second design, wherein responsive to determining that the second design element is included as a foreground element in a first group of design elements of the design template, adding the third design element as a foreground element in a second group of design elements of the second design;

updating the second design by applying the content signature to the second design, wherein applying the content signature to the second design includes transferring content from the first design element to the third design element;

generating a second GUI that includes an image of the second design; and causing the display of the second GUI by the client device.

19. The non-transitory computer-readable medium of claim 18, wherein the content is transferred from the first design element to the third design element based at least in part on determining that the content signature indicates that the first design element has been edited in the first design.

20. An apparatus comprising:

a processor configured to:

receive, during editing of a first design that was created based on a first template and that comprises a first design element, user input assigning a first content role to the first design element of the first design, wherein the assignment is not part of the first template;

generate a content signature of the first design, the content signature indicating that the first design element has the first content role;

generate a second design based on a second design template different to the first design template and including a second design element having the first content role, wherein:

responsive to determining based on the content signature that the second design template requires an additional design element having the first content role, generating the second design includes adding a third design element having the first content role to the second design;

responsive to determining that the second design element is included as a foreground element in a first group of design elements of the design template, generating the second design includes adding the third design element as a foreground element in a second group of design elements of the second design;

update the second design by applying the content signature to the second design, wherein applying the content signature to the second design includes transferring content from the first design element to the third design element;

generate a graphical user interface (GUI) that includes an image of the second design; and cause the GUI to be displayed by a client device.

21. A method comprising:

receiving, during editing at a device of a first design that was created based on a first template and that comprises a first design element, user input assigning the first design element of the first design a first content role, wherein the assignment is not part of the first template;

generating, at the device, a content signature of the first design, the content signature indicating that the first design element has the first content role;

generating, at the device, a second design based on a second design template different to the first design template and including a second design element having the first content role, wherein generating the second design includes:

responsive to determining based on the content signature that the second design template requires an additional design element having the first content role, adding a third design element having the first content role to the second design; and responsive to determining that the second design element is included as a foreground element in a first group of design elements of the design template, generating the second design includes adding the third design element as a foreground element in a second group of design elements of the second design;

updating the second design by applying the content signature to a second design, wherein applying the content signature to the second design includes transferring content from the first design element to the third design element;

generating, at the device, a graphical user interface (GUI) that includes an image of the second design; and causing the display of the GUI by a client device.

* * * * *